United States Patent

[11] 3,634,662

[72] Inventor Kenneth Leonard Slawson
Depew, N.Y.
[21] Appl. No. 744,392
[22] Filed July 12, 1968
[45] Patented Jan. 11, 1972
[73] Assignee Houdaille Industries, Inc.
Buffalo, N.Y.
Continuation-in-part of application Ser. No. 652,968, July 12, 1967, now abandoned.
This application July 12, 1968, Ser. No. 744,392

[54] NUMERICAL CONTROL SYSTEM AND METHOD
42 Claims, 90 Drawing Figs.
[52] U.S. Cl. .................................................. 235/151.11,
318/568, 318/570, 318/601, 340/172.5
[51] Int. Cl. ...................................................... G06f 15/46,
B23q 21/00
[50] Field of Search ........................................... 235/151.11,
151.1, 197; 340/172.5; 318/568, 569, 570, 600, 601

[56] References Cited
UNITED STATES PATENTS
3,254,203 5/1966 Kveim .......................... 235/151.11 X
3,328,655 6/1967 Tripp ............................ 235/197 X
3,390,315 6/1968 McDonough et al. ......... 235/151.11 X
3,430,036 2/1969 Patrick .......................... 235/151.11
3,465,298 2/1969 Duke et al. .................... 235/151.11 X Primary Examiner—Malcolm A. Morrison
Assistant Examiner—Felix D. Gruber
Attorney—Hill, Sherman, Meroni, Gross & Simpson ABSTRACT: A control system having a stored program digital computer for transmitting commands to digital servos for one or a plurality of punch presses; for changing new commands to correct for preceding servo errors and/or mechanical tolerance errors in the servos; the monitoring machine tool and servo condition and supervising punching, tool change and positioning operations; and having provision for assisting in the generation of coded record command tapes on the basis of incremental and/or absolute dimensional input, on a time sharing basis with automatic operation of the servos from a previously generated record tape.

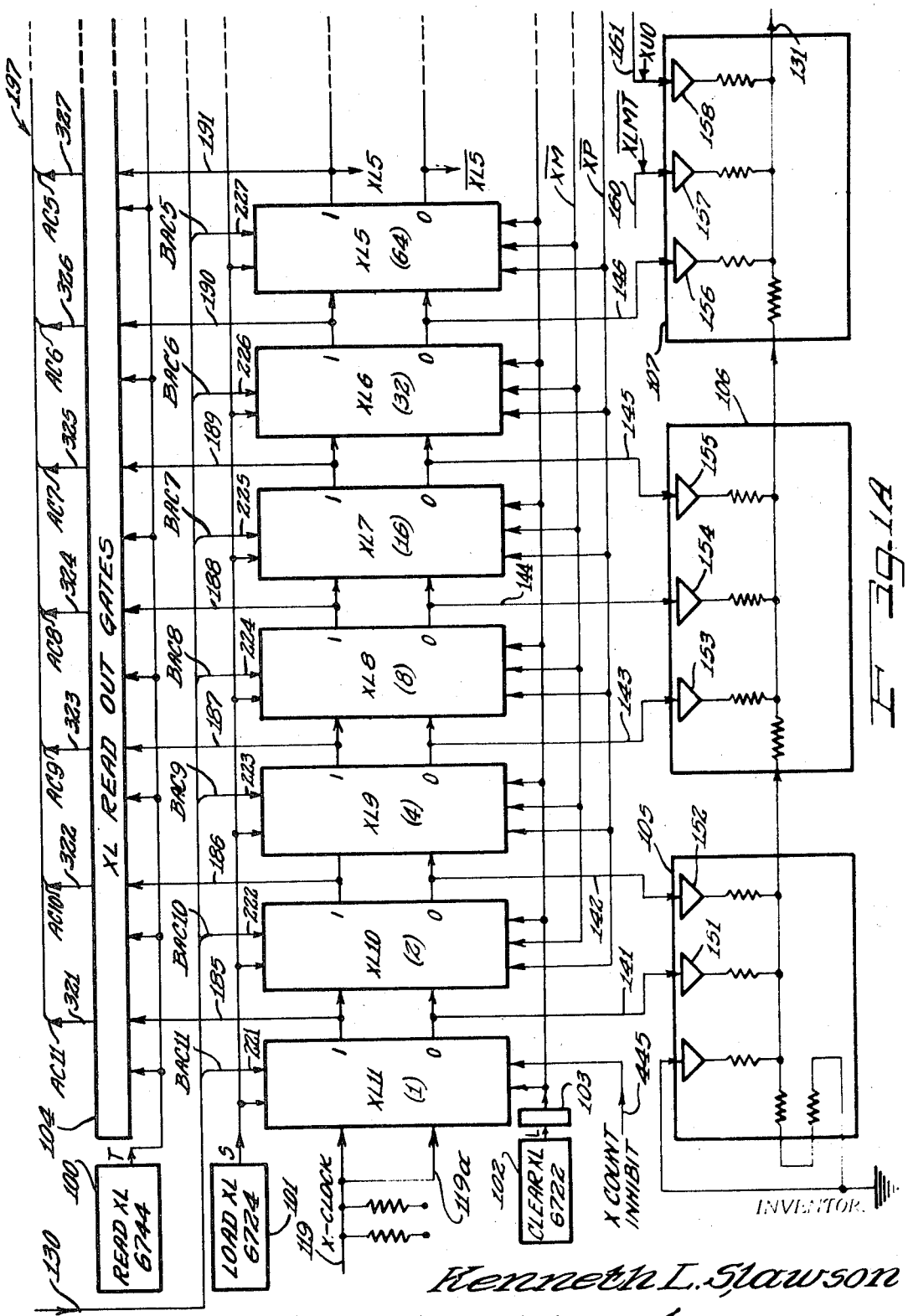

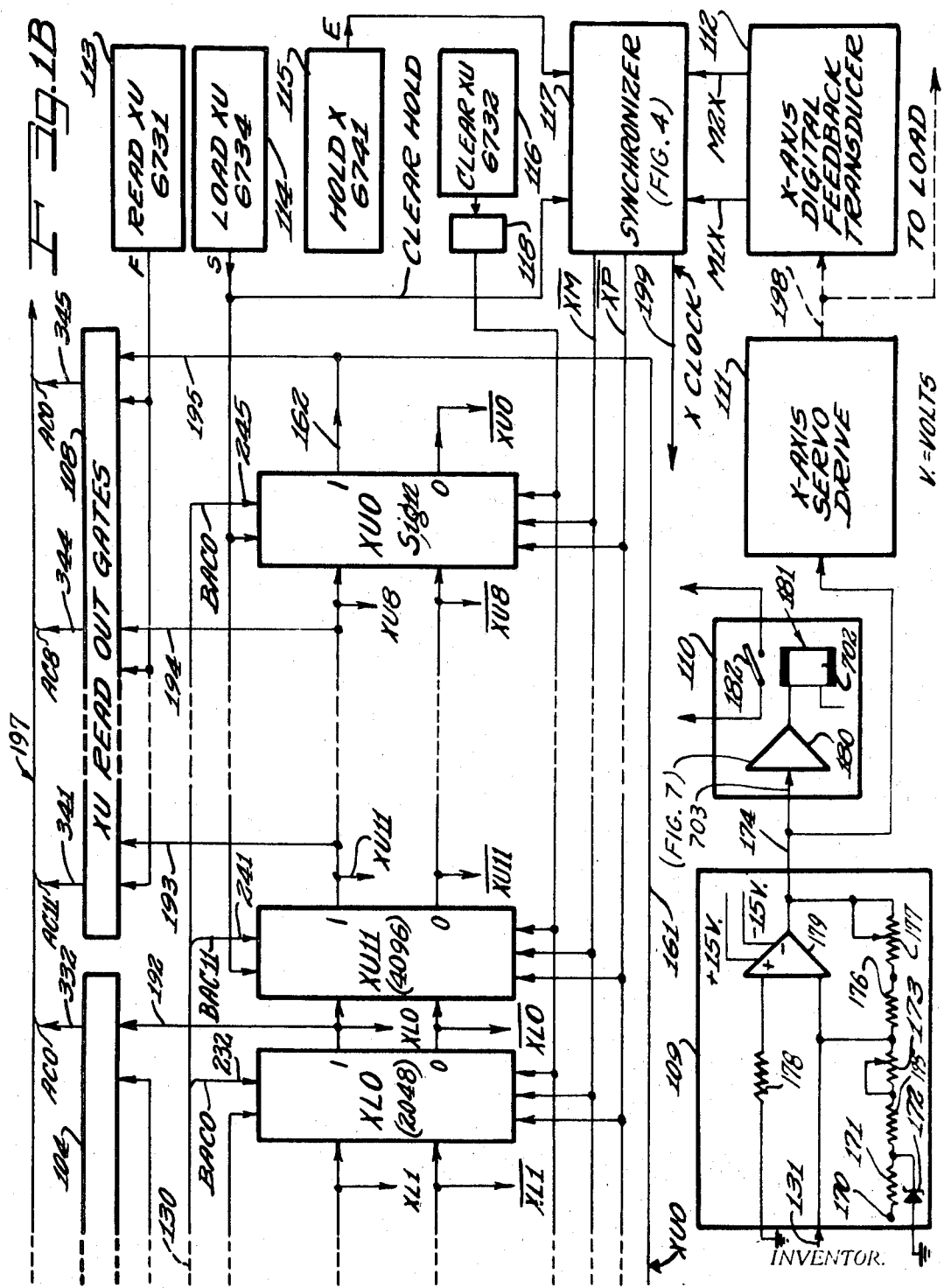

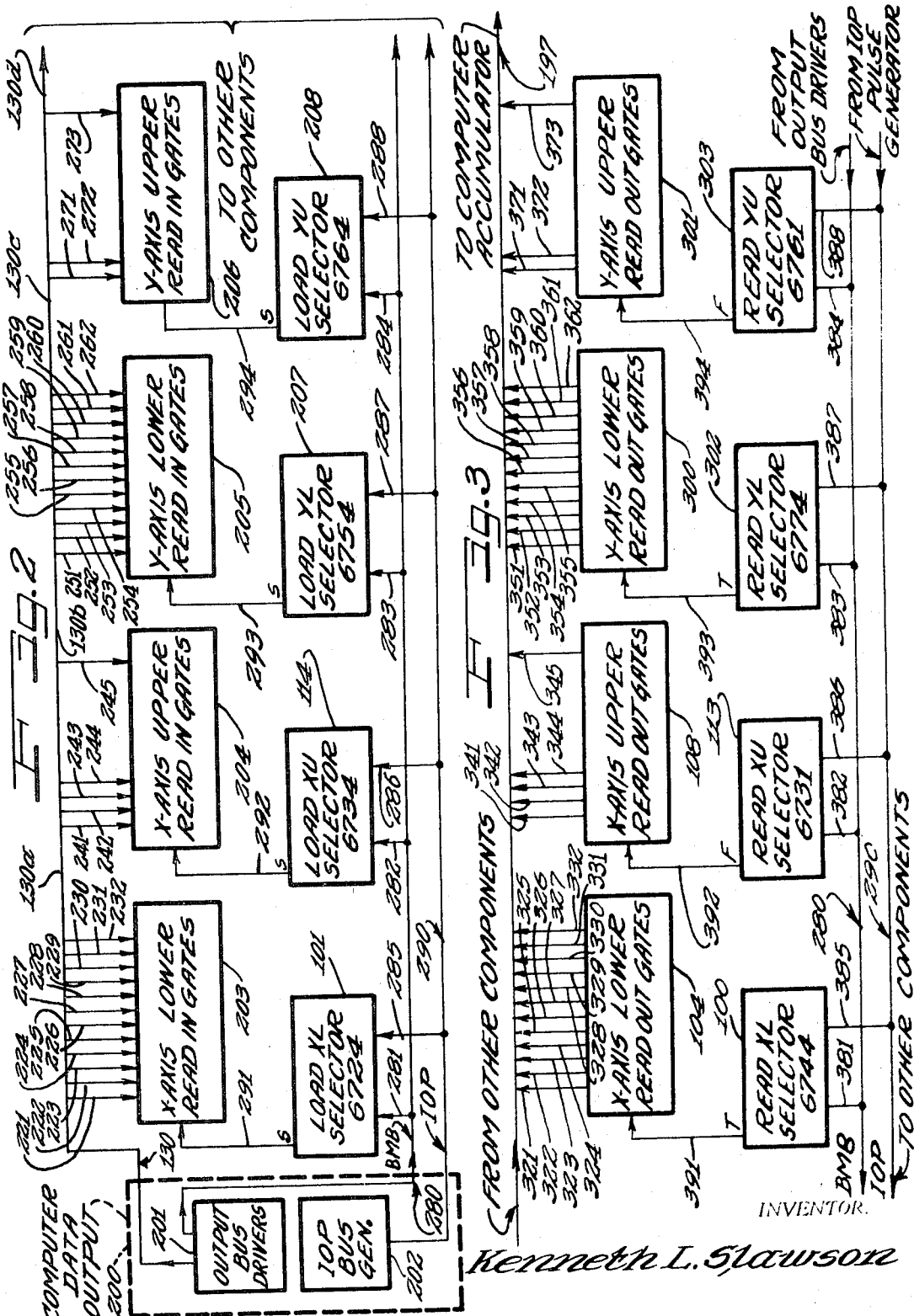

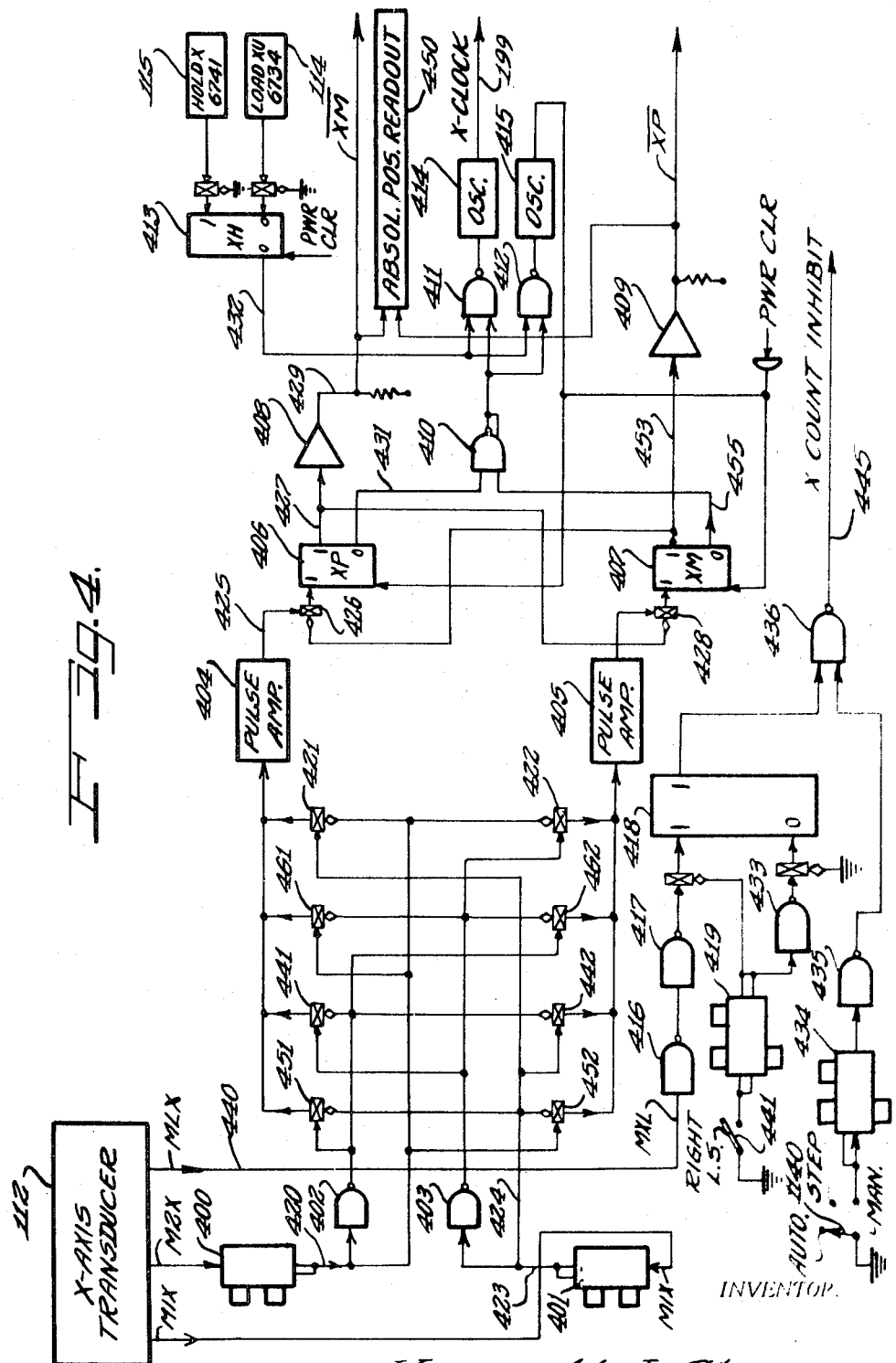

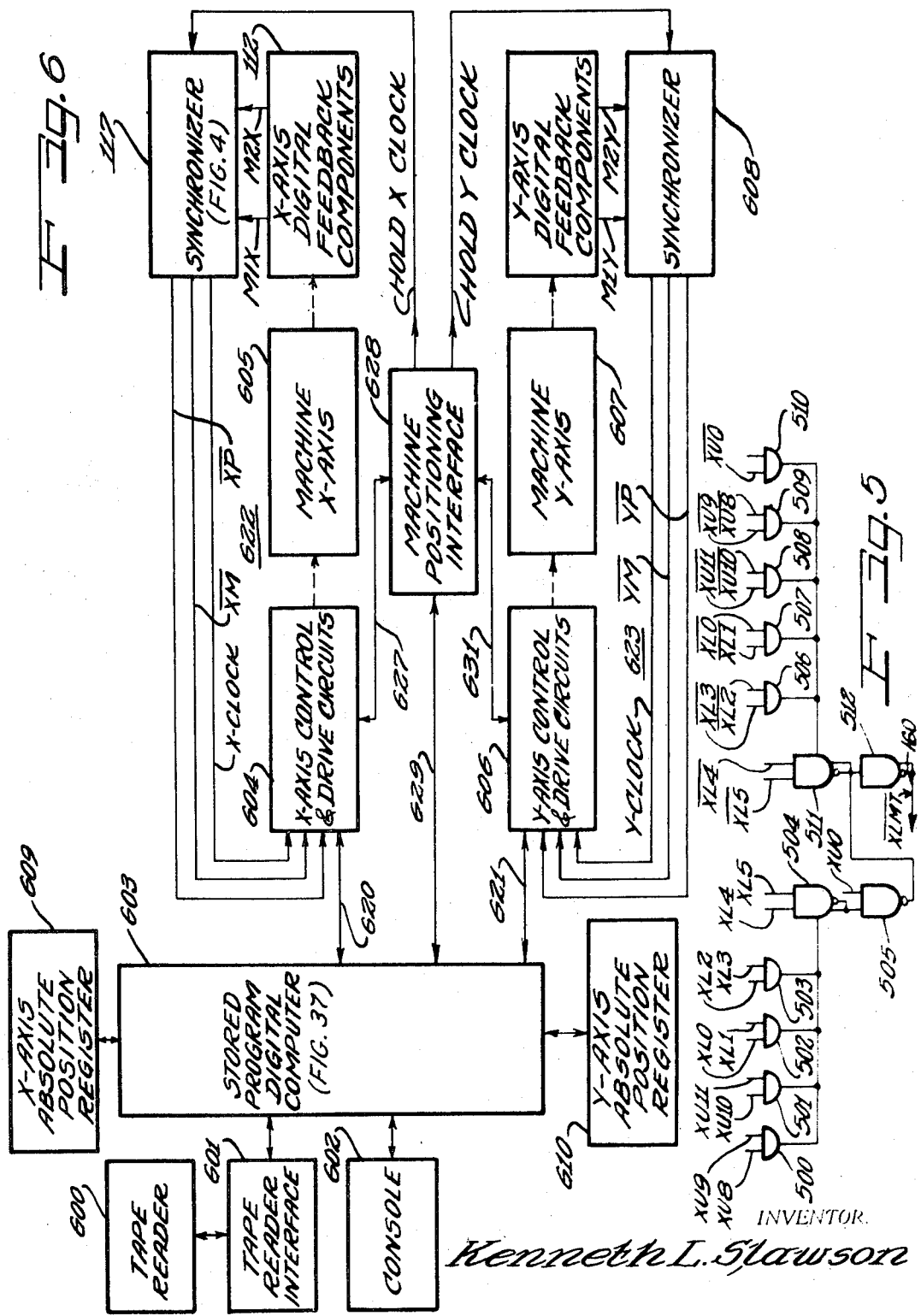

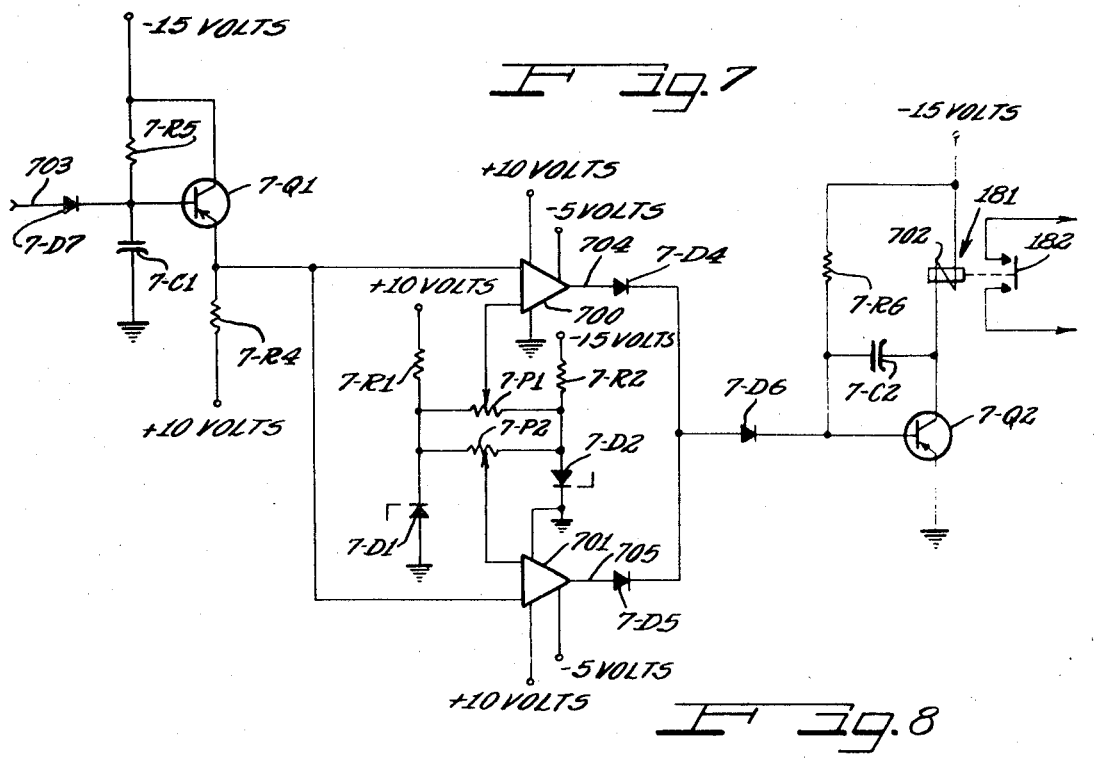
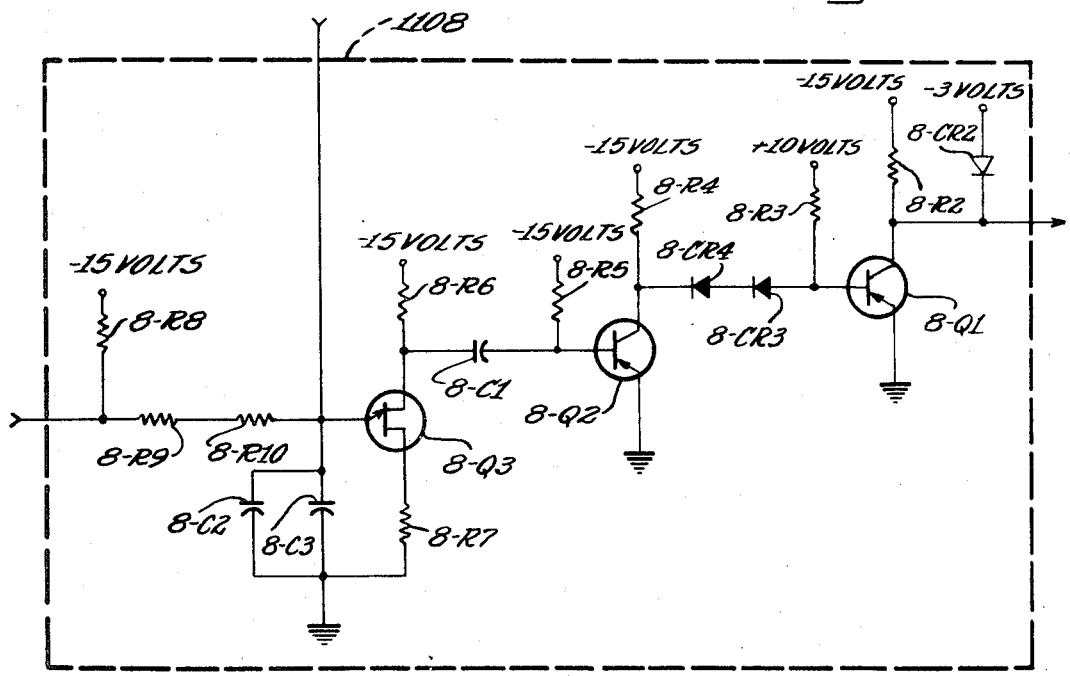

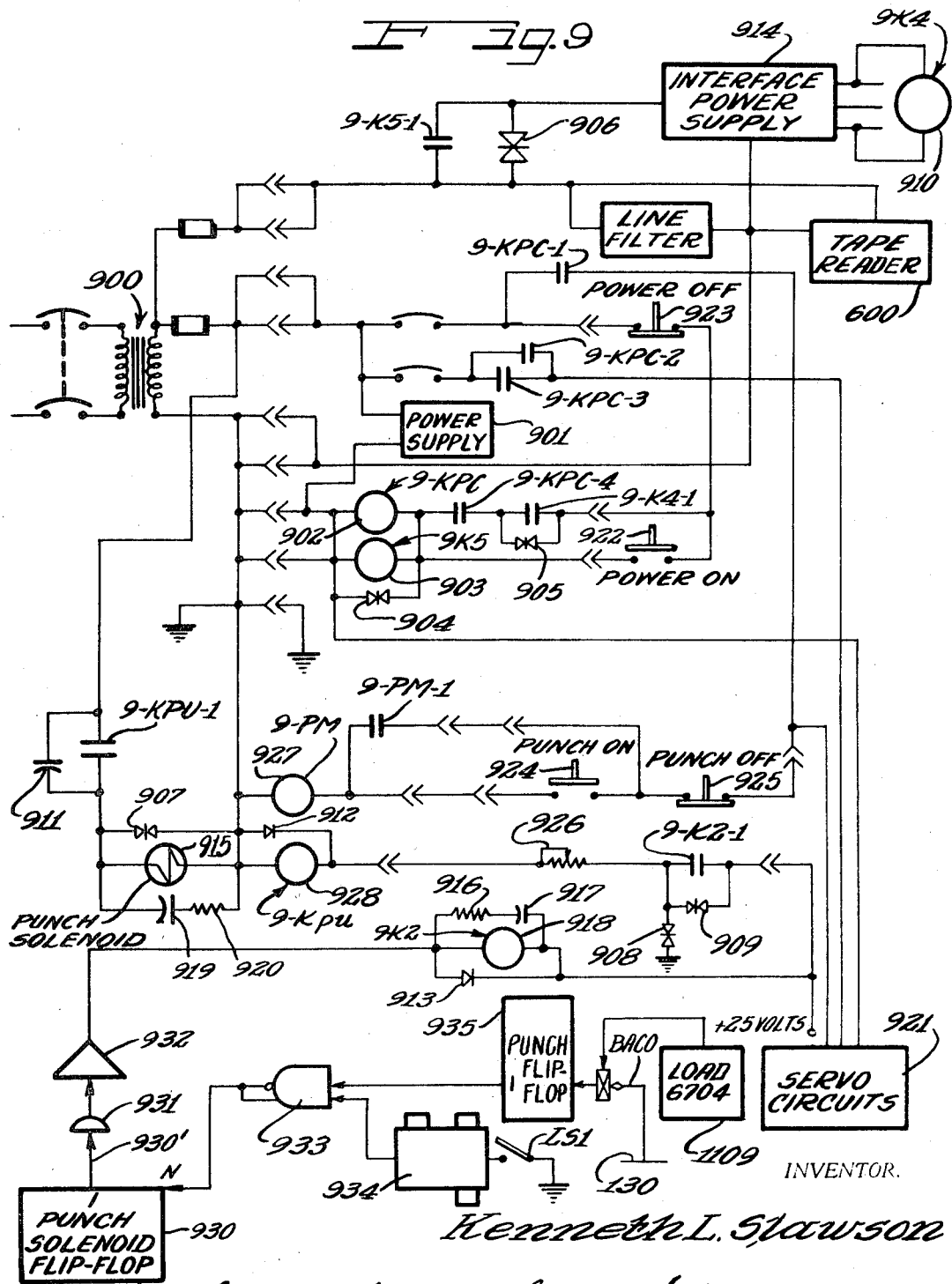

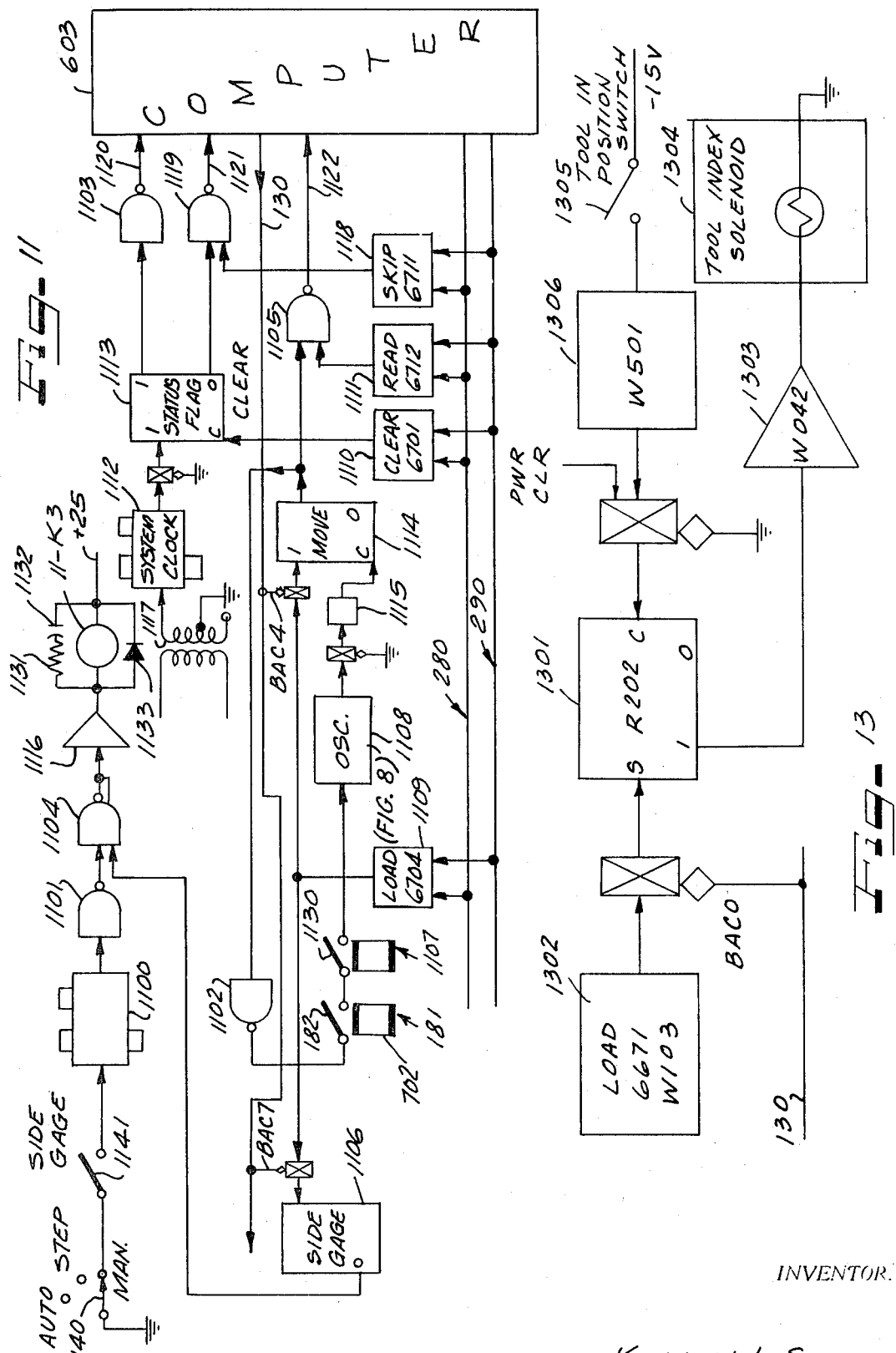

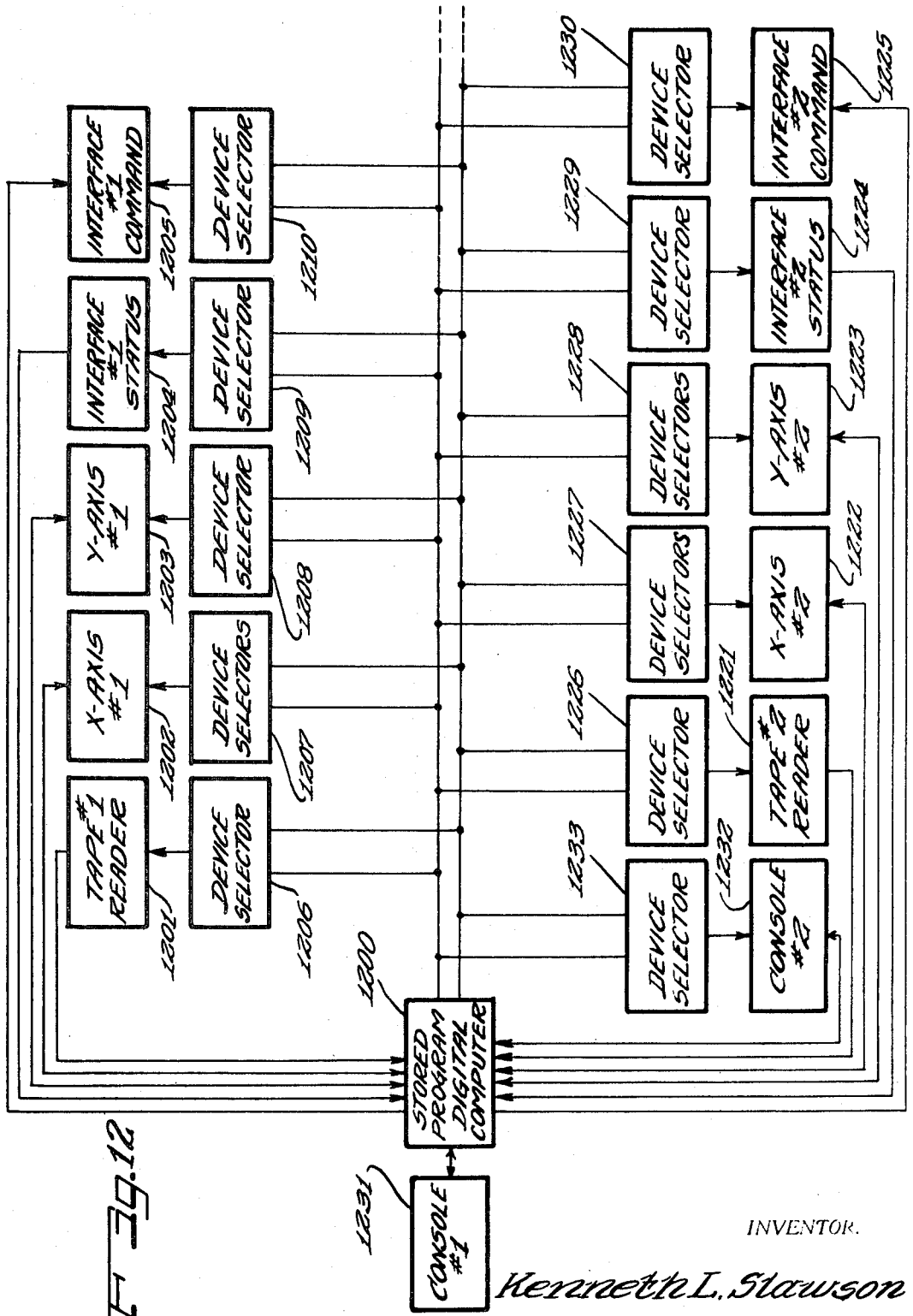

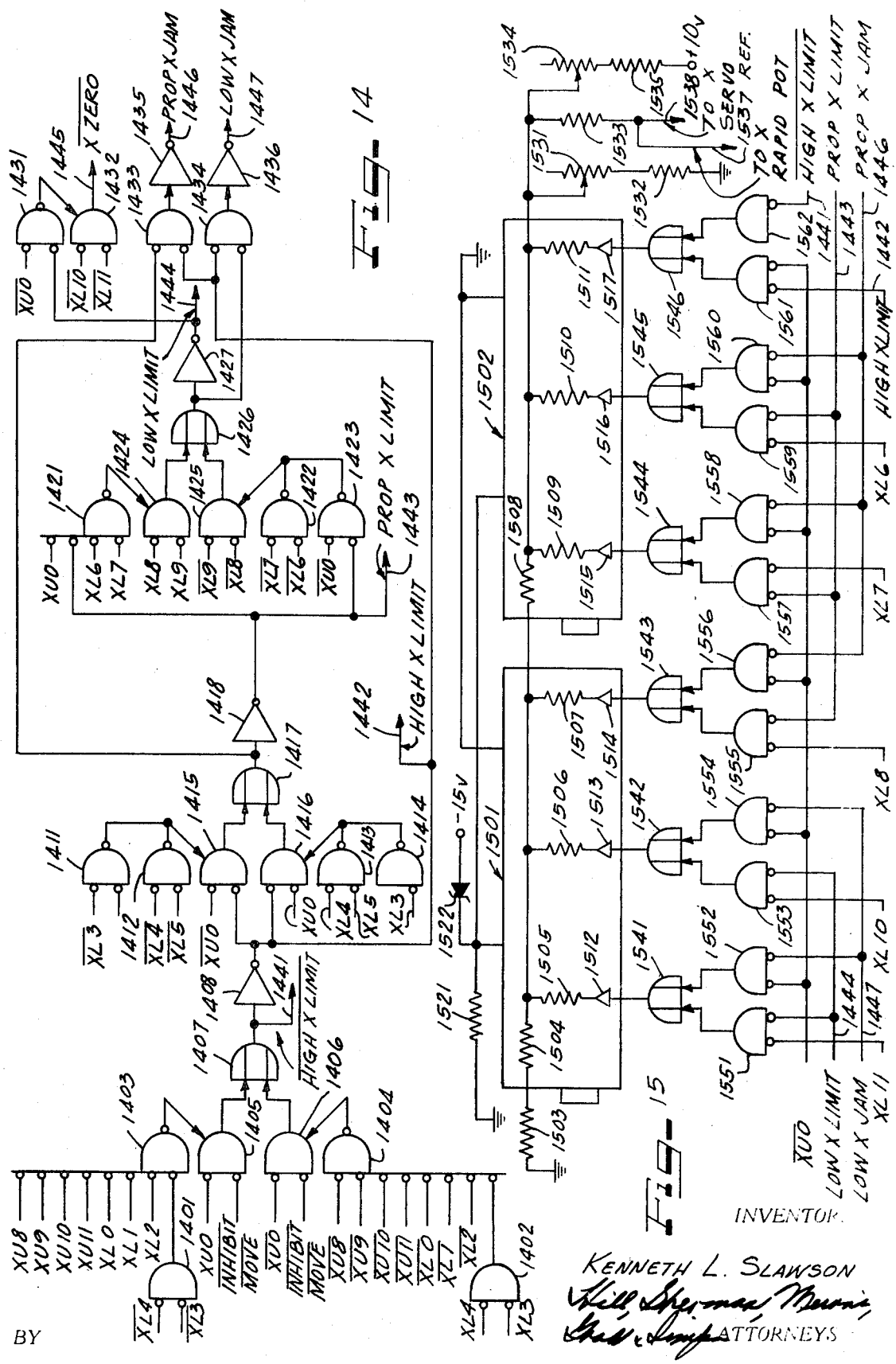

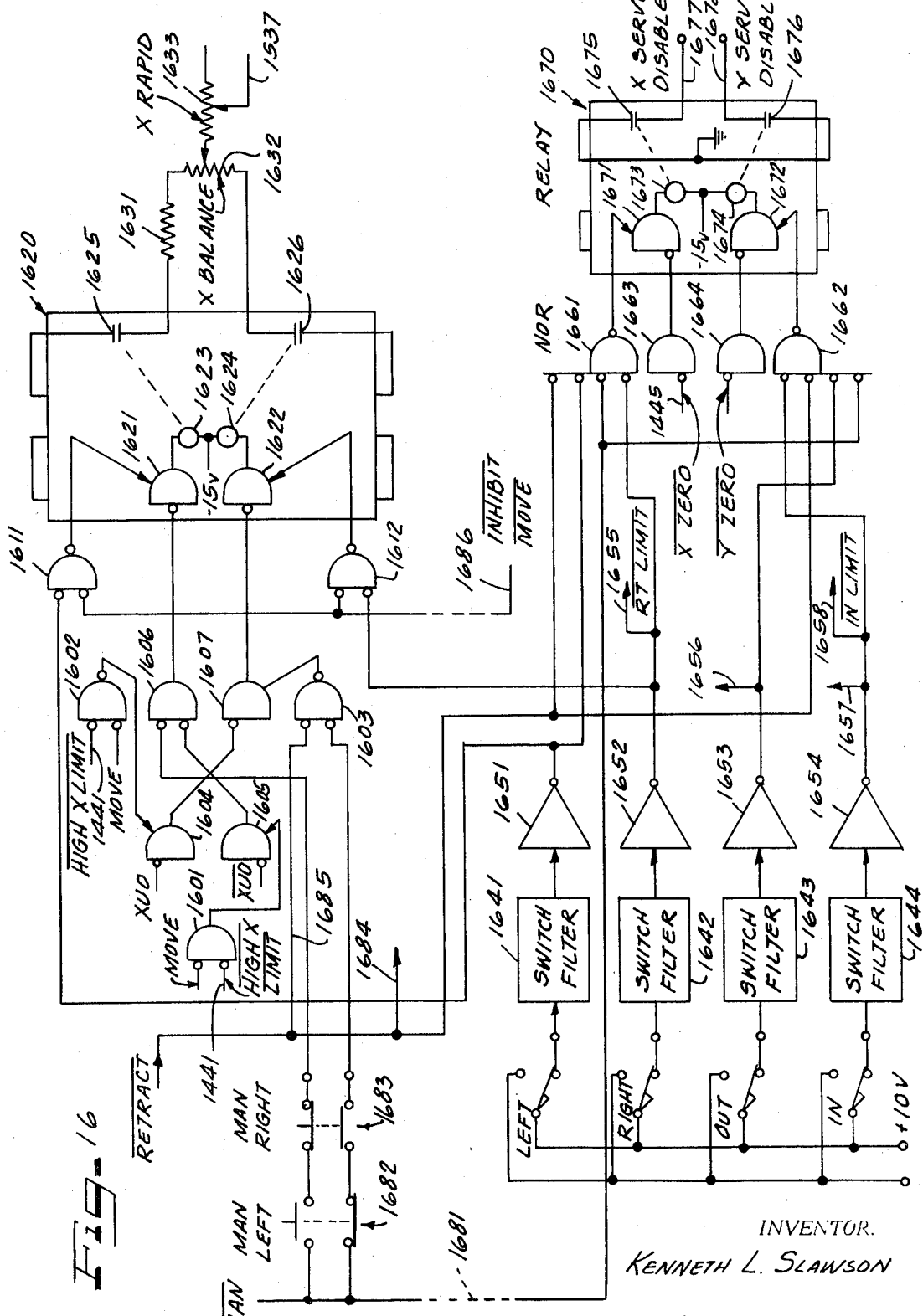

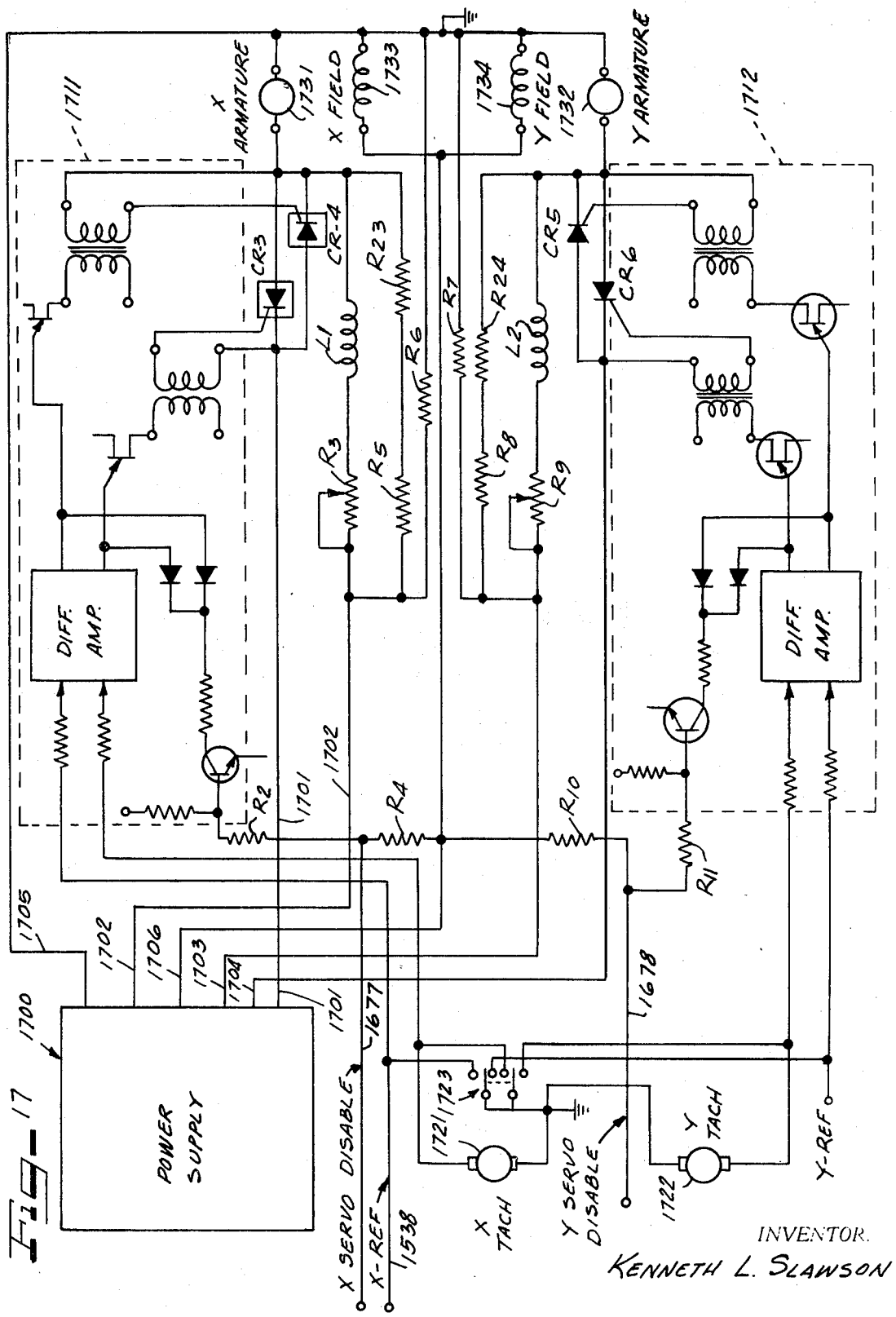

INVENTOR.
KENNETH L. SLAWSON

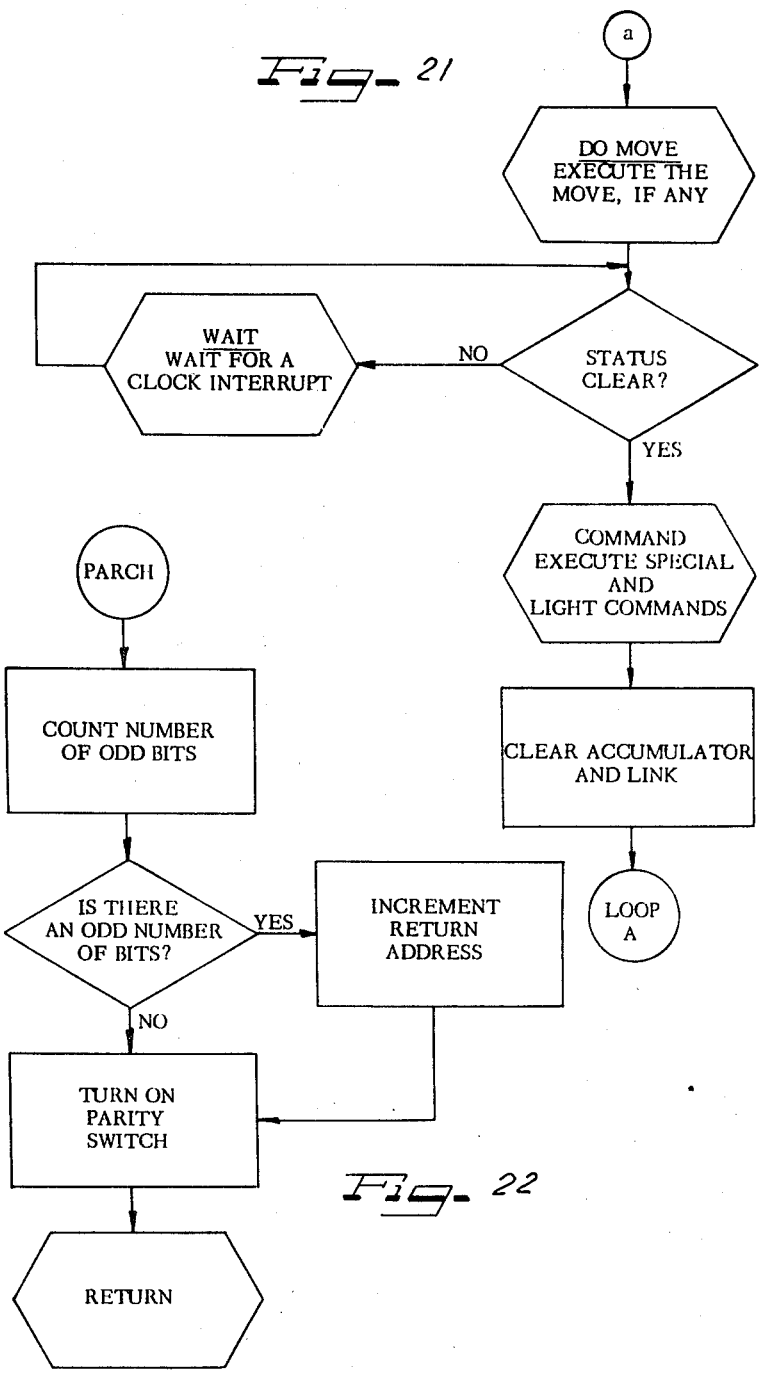

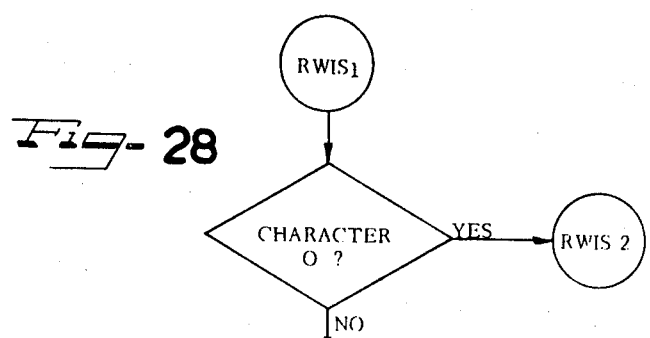
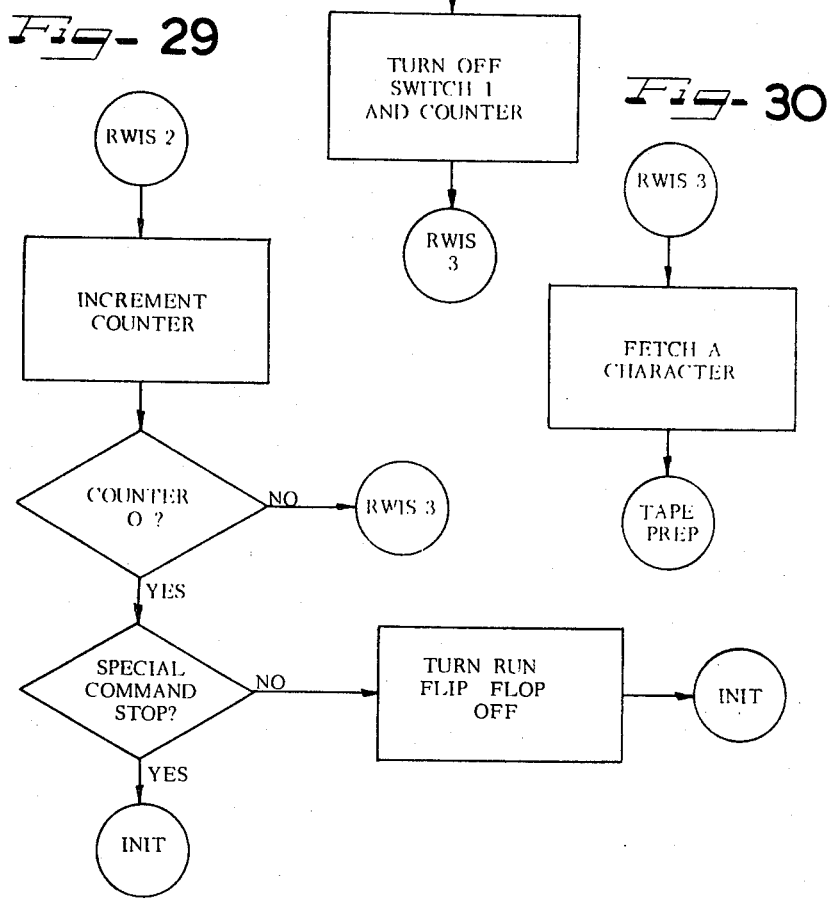
Fig-28
Fig-29
Fig-30

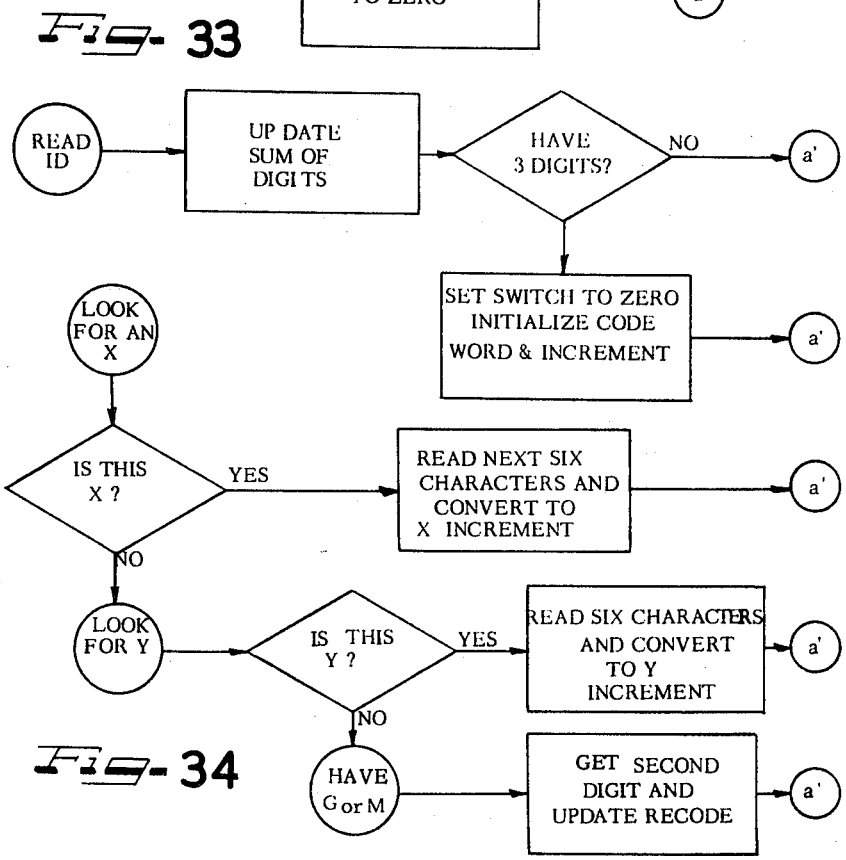

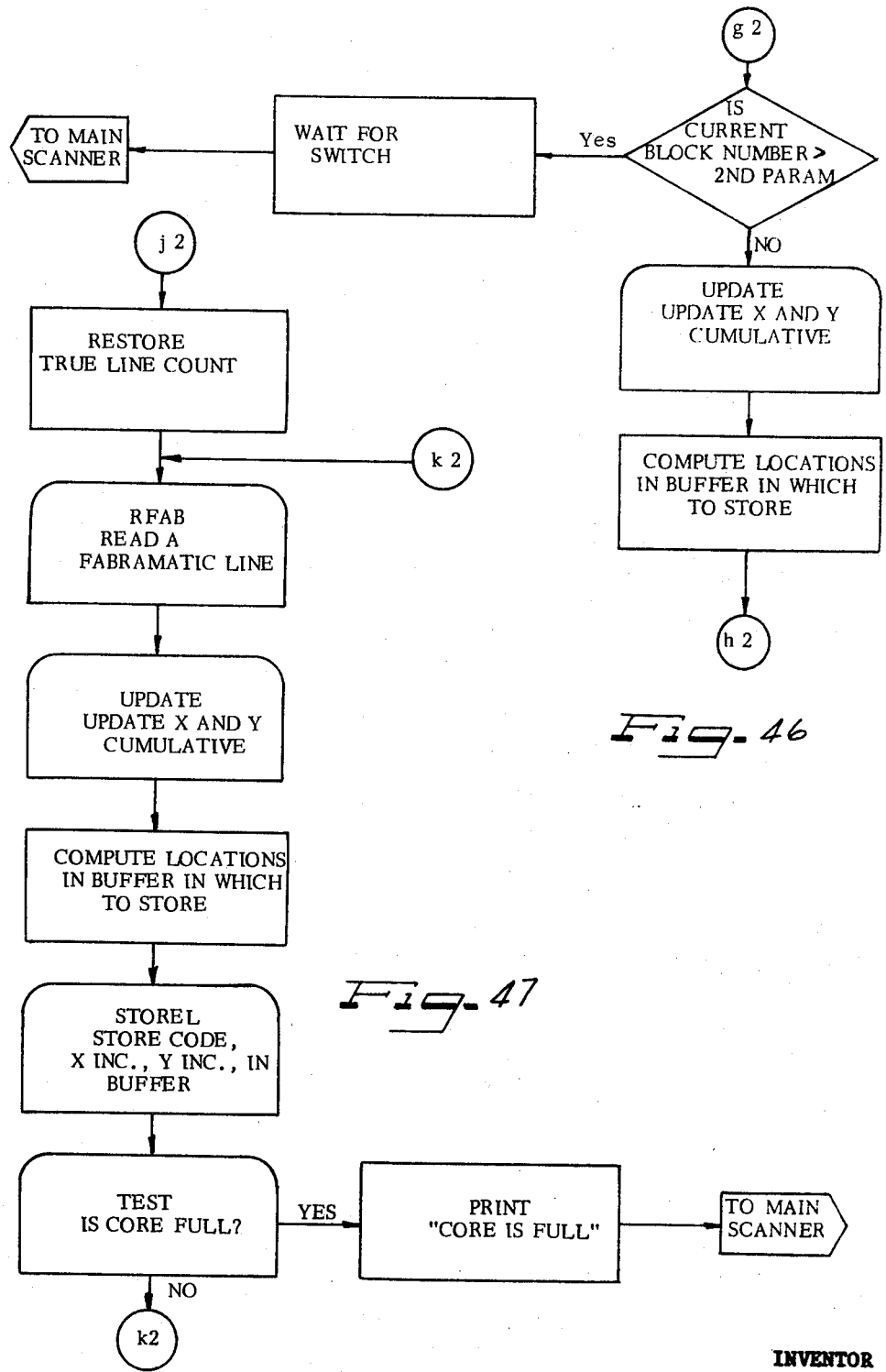

INVENTOR
KENNETH L. SLAWSON

BY

ATTORNEYS

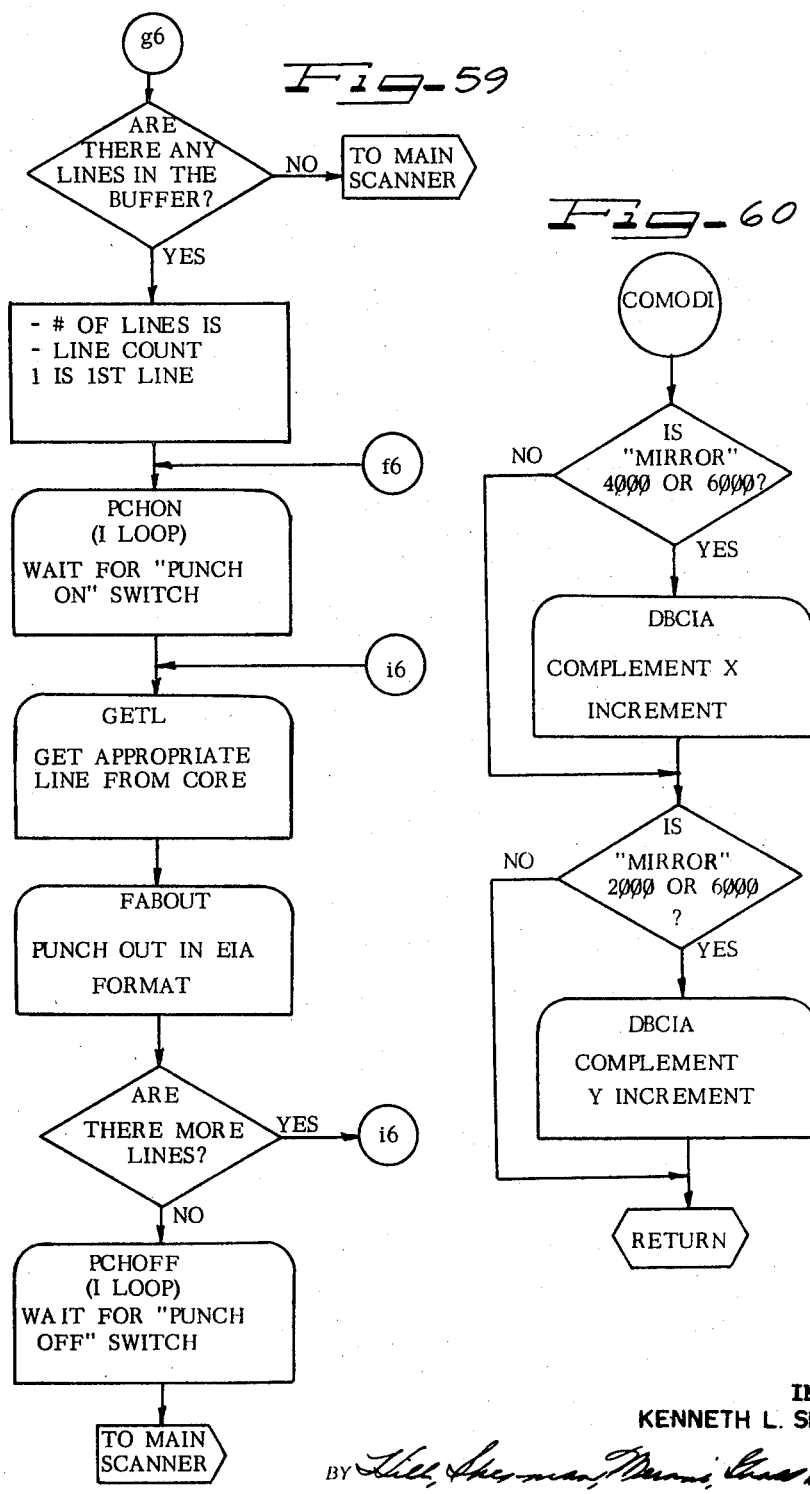

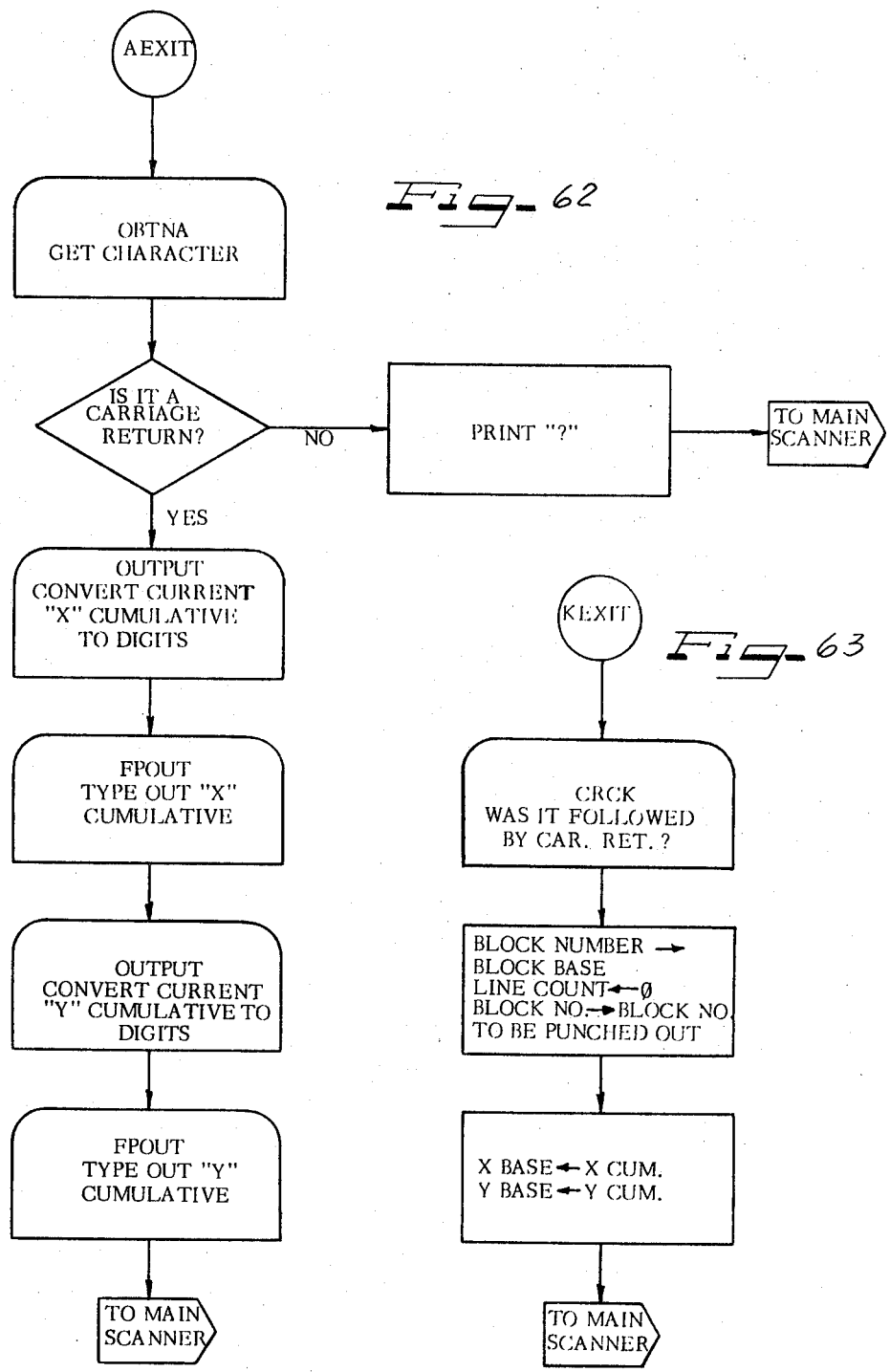

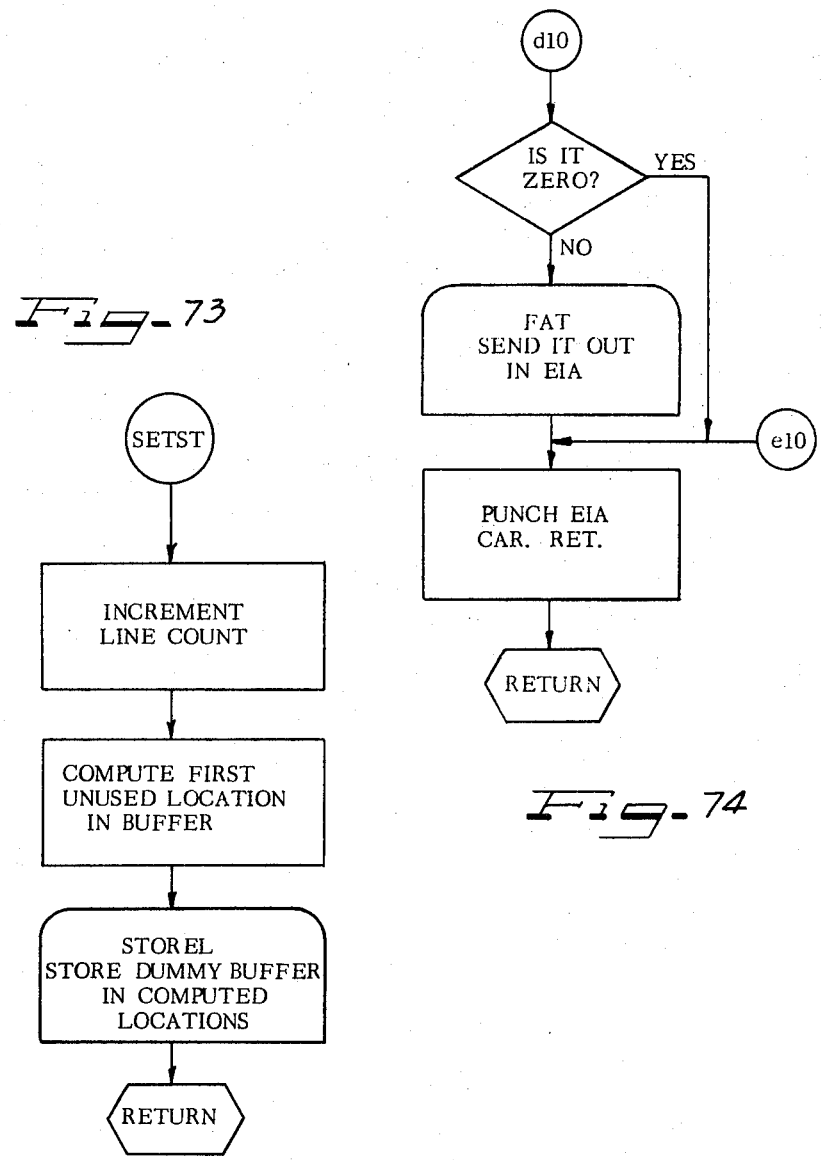

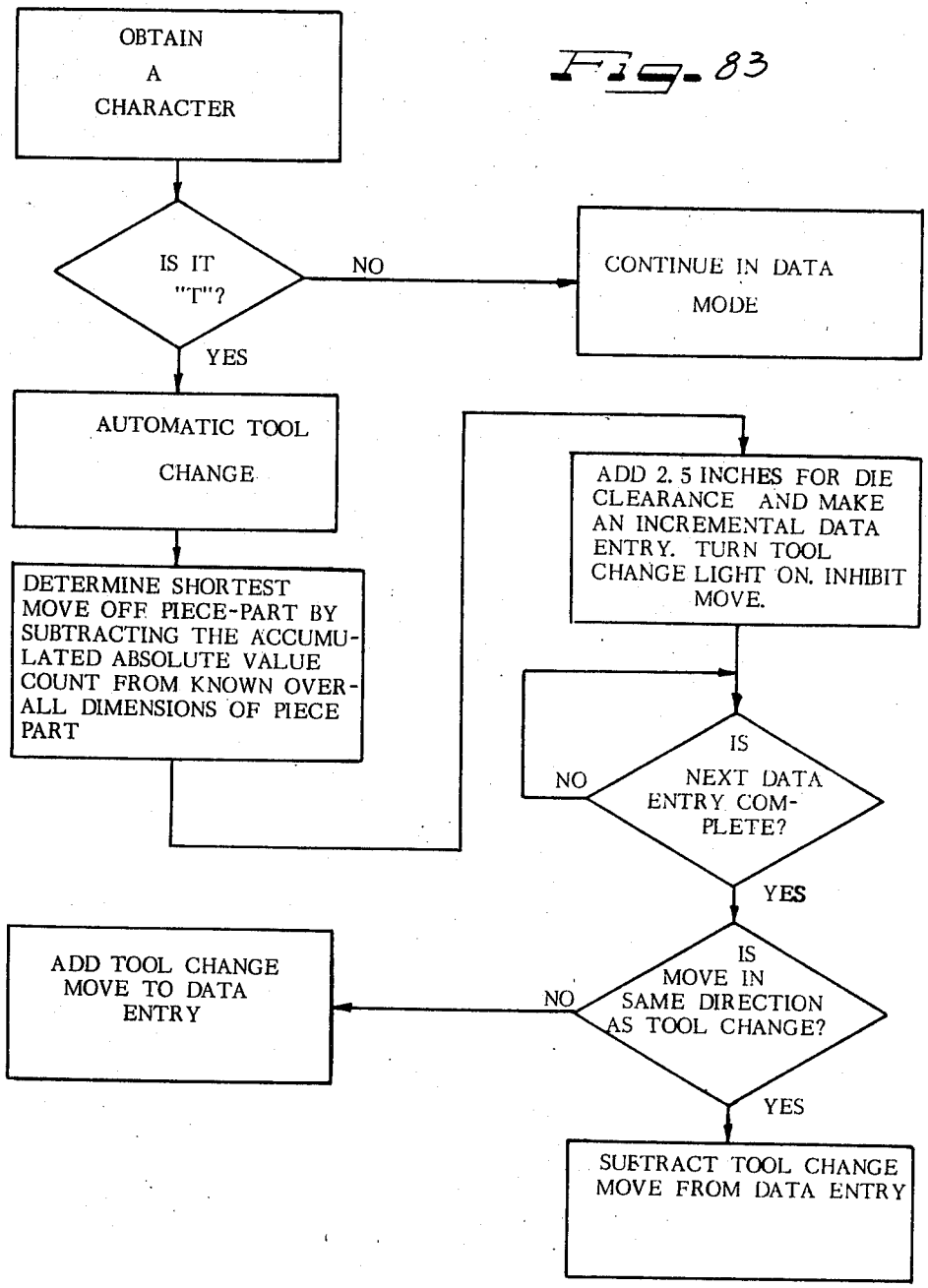

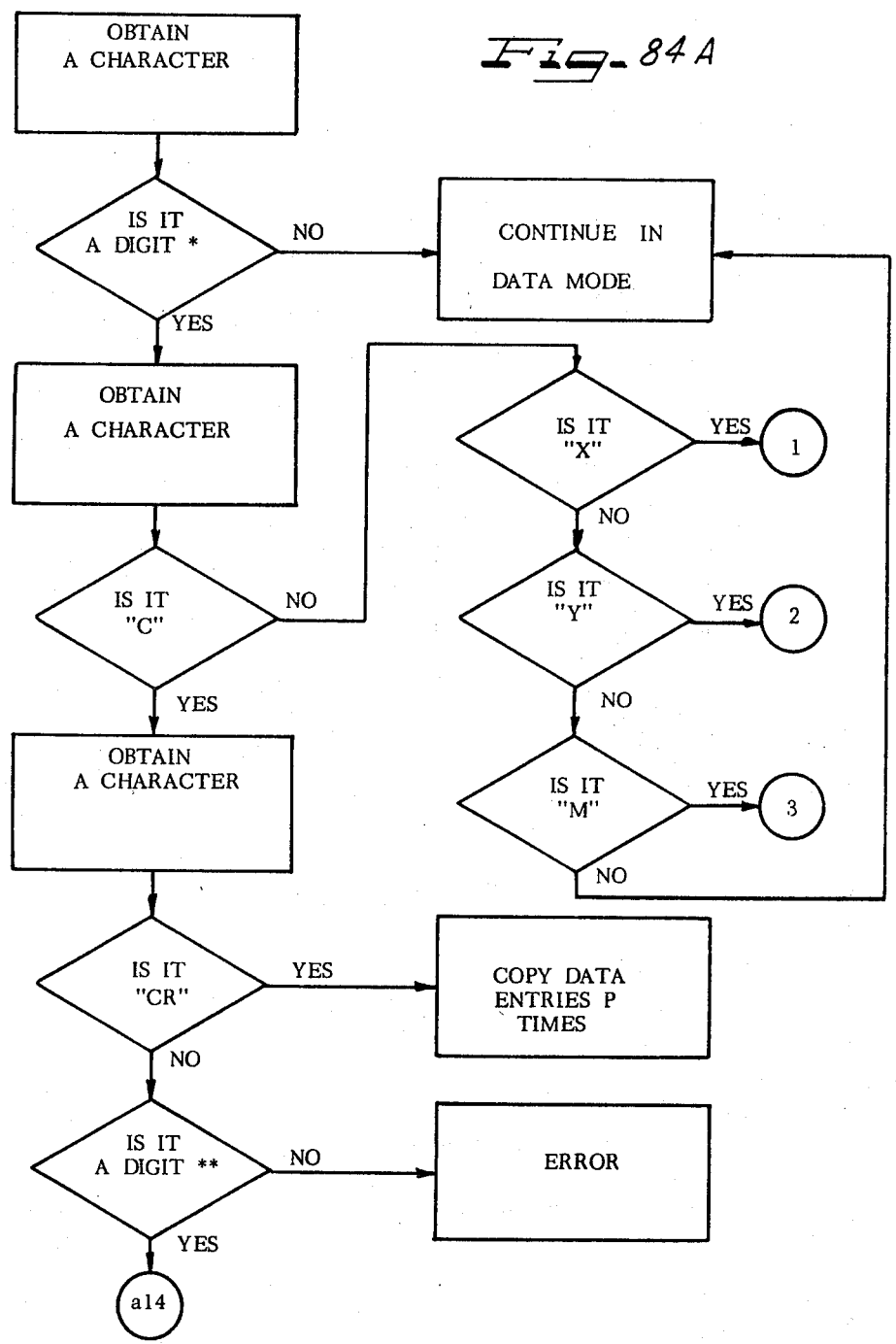

NUMERICAL CONTROL SYSTEM AND METHOD

CROSS-REFERENCES TO RELATED APPLICATIONS

The present application is a continuation-in-part of my copending application Ser. No. 652,968 filed July 12, 1967, (now abandoned), and the disclosure of said copending application is incorporated herein by reference.

BACKGROUND OF THE INVENTION

In existing machine tool control systems for punch presses and the like specialized numerical control hardware is furnished which is subject to rapid technical obsolescence. Said systems produce analog control signals for the drives of the respective machine axes corresponding to each successive positioning step, and signal the tape reader for more data as each step is completed. The preparation of numerical control tapes for the control systems is a time-consuming and laborious process requiring separate facilities.

SUMMARY OF THE INVENTION

A basic objective of the present invention is to provide a substantially more flexible machine tool control system capable of producing desired machine operations from basic data such as parts blueprints or the like with a substantially reduced overall expenditure of time and effort.

A further object of the invention is to provide such a machine tool control system and method which is competitive in cost with existing machine tool control systems.

Another basic objective is to provide a machine tool control system of substantially greater flexibility and throughput efficiency and yet which is of cost justifying its immediate introduction in job shops and other diversified parts production facilities.

A further object of the invention is to provide a machine tool control system and method capable of generating a coded record for a machine tool in response to both incremental and absolute input data in any desired order.

A still further object of the invention resides in the provision of a numerical control system and method enabling the changing of input commands to correct for previous minor positioning errors and/or mechanical tolerance errors so as to provide improved overall accuracy.

Still another object of the invention is to provide a numerical control system and method with provision for substantially expediting the generation of new numerical control programs.

Yet another object of the invention is to provide a system and method for facilitating the generation of machine positioning numerical control programs.

Another and further object of the invention is to provide a numerical control system and method capable of simultaneously controlling the operation of one or more machine tools and/or of assisting in the generation of new numerical control-positioning programs for future use in controlling machine tools.

Still another and further object is to provide such a system capable of controlling the operation of a plurality of machine tools and simultaneously providing a stored program digital computer facility available for simultaneous program generation.

A more specific object of the invention is to provide a relatively economical and simple numerical control digital servo capable of accurately and reliably producing relatively large increments of movement in a given time interval.

A further more specific object is to provide such a digital servo having proportional slowdown which becomes effective as an end point is approached and which allows for a substantial overshoot without loss of positioning accuracy.

A still further more specific object of the invention resides in the provision of a digital to analog converter for supplying an analog error as a substantially linear function of plus or minus counts in the vicinity of zero while providing at least a limit value of analog error for digital input signals having a wide range of values at one side of the linear range.

BRIEF DESCRIPTION OF THE DRAWINGS

FIGS. 1A and 1B show the X-axis control circuits of a numerical positioning control system in accordance with the present invention, FIG. 1B being a continuation of FIG. 1A to the right, and dash lines being utilized to represent stages which have been omitted;

FIG. 2 is a diagrammatic illustration showing means for controlling the transfer of digital command signals from a stored program digital computer to the X and Y control circuits of a plurality of machine tools;

FIG. 3 is a diagrammatic illustration similar to FIG. 2 but showing the means for transferring data from the control circuits of the machines to the computer;

FIG. 4 is a schematic diagram showing details of the X-axis synchronizer component of FIG. 1B, and also showing the circuitry controlling the X-count inhibit line of FIG. 1A, and the connections to an absolute position readout device for the X-axis;

FIG. 5 is a diagrammatic showing of a limit gate circuit associated with the system of FIGS. 1A and 1B;

FIG. 6 is a block diagram illustrating an overall numerical control system and method in accordance with the present invention;

FIG. 7 is a schematic electric circuit diagram showing the circuit utilized for actuating the X-axis and Y-axis null detector relays, the circuit for the X-axis being specifically shown;

FIG. 8 is an electric circuit diagram showing the details of the relaxation oscillator circuit utilized in various parts of the present system;

FIG. 9 is a schematic electric circuit diagram showing the arrangement of certain relays and of the punch-operating solenoid and indicating certain noise suppression features which have been incorporated;

FIG. 11 is a diagrammatic illustration of certain components of the machine interface system which provide for periodic interrupt operation of the computer and enable the computer to communicate with the control system servo circuits, to execute various auxiliary functions, to sense the end of a commanded movement, and to determine the status of various points of interest in the system during an interrupt cycle;

FIG. 12 illustrates a numerical control system in accordance with the present invention utilizing more than one machine control station and/or more than one operator's console station for time-sharing tape preparation and the like, the figure also indicating the feasibility of adding on additional control or console stations as desired;

FIG. 13 is a diagrammatic illustration of circuitry for enabling the computer to effect a tool change in response to an input command;

FIG. 14 is a logic diagram illustrating a portion of the converter circuitry for a commercial system in accordance with the present invention;

FIG. 15 is a diagrammatic illustration of a further portion of the converter circuitry having extensive interconnections with FIG. 14;

FIG. 16 illustrates diagrammatically servocontrol circuitry which is connected with the circuitry of FIG. 14;

FIG. 17 is a diagrammatic illustration of servo circuits for the commercial system;

FIG. 21 is a flow diagram illustrating a further portion the control loop;

FIG. 22 is a flow diagram illustrating a parity check subroutine;

FIGS. 28, 29 and 30 illustrate further portions of the subroutine of FIG. 27;

FIGS. 32, 33 and 34 are flow diagrams of subroutines of the commercial system which are associated with the reader interrupt subroutine of FIG. 31;

FIGS. 38 through 53, 54A through 54E and 55 through 81 are flow diagrams illustrating the tape preparation program for the commercial system;

FIG. 83 shows a flow diagram for illustrating tape preparation with computer generated displacement commands to allow for tool change and corresponds to Flow Diagram B of the of the aforementioned copending application; and FIGS. 84A and 84B taken together illustrate tape preparation with provision for computer generation of repetitive or similar positioning command data and corresponds to Flow Diagram C of said copending application.

DESCRIPTION OF THE ILLUSTRATED EMBODIMENTS

Figure 10:
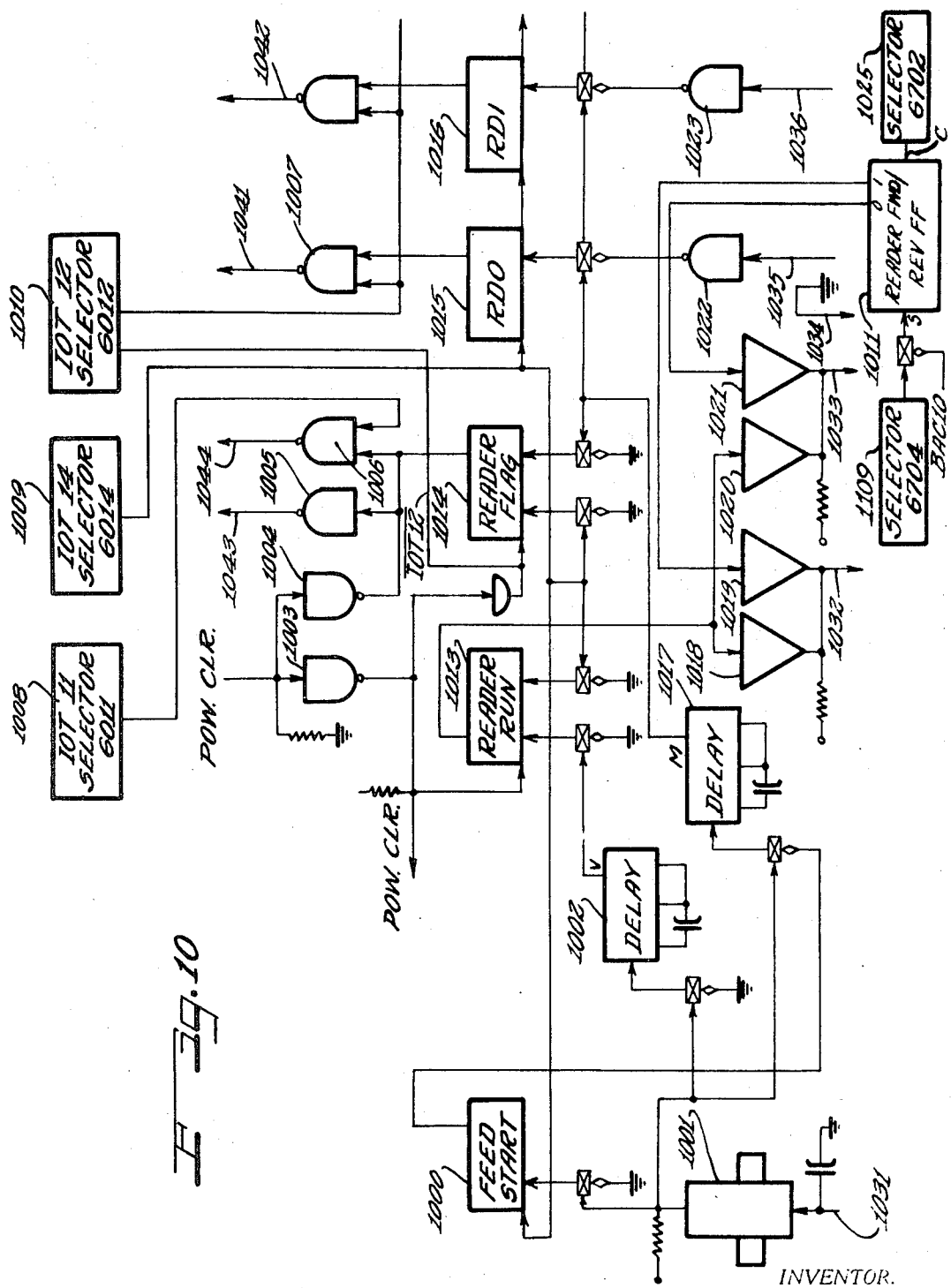
FIG. 10 is a diagrammatic illustration of a representative portion of the tape reader interface component utilized in the illustrated system.

By way of introduction of the circuitry of a first embodiment in accordance with the present invention, the components shown in FIGS. 1-11 of the drawings have been assigned respective general reference numerals, and a brief description of each such component is given in the following tabulations. The components of each figure have in general been assigned three-digit reference numerals wherein the first or most significant digit of the reference numeral corresponds to the figure number, (the reference numerals in FIGS. 1A and 1B beginning at 100, those in FIG. 2 beginning with 200 and so forth) except that the same component appearing in successive drawing figures has received the same reference numeral. The tabulations also refer to a suitable commercial source where the component is commercially available, or otherwise identify or explain the structure of the component.

TABLES OF EXEMPLARY COMPONENTS—Table I (Figs. 1A and 1B)

| Reference character identifying component | Description of component | Reference to figure showing circuit, or identification of suitable commercial source [1] |
|---|---|---|
| XL0-XL11, XU8-XU11, XU0. | Binary Up-Down Counter (See DEC-A, [2] pages 39 and 40, which is incorporated herein by reference.). | R201 (17 required). |
| 100 | Read XL Selector (Code 6744). | W103. [3] |
| 101 | Load XL Selector (Code 6724). | W103. |
| 102 | Clear XL Selector (Code 6722). | W103. |
| 103 | Pulse Amplifier | R602. |
| 104 | XL Read Out Gates | R123 (2 required). |
| 105, 106, 107 | Digital-Analog Converter. −10 Volt Reference Supply. | A601 (3 required). A702. |
| 108 | XU Read Out Gates | R123. |
| 109 | Operational Amplifier | Fig. 1B. |
| 110 | Null Detector | Fig. 7. |
| 111 | X-Axis Servo Drive | Part of present numerically controlled positioning systems. [4] |
| 112 | X-Axis Feedback Transducer. | Part of present numerically controlled positioning systems. [5] |
| 113 | Read XU Selector (Code 6731). | W103. |
| 114 | Load XU Selector (Code 6734). | W103. |
| 115 | Hold X Selector (Code 6741). | W103. |
| 116 | Clear XU Selector (Code 6732). | W103. |
| 117 | Synchronizer (X-Axis) | Fig. 4. |
| 118 | Pulse Amplifier | R602. |

[1] Available as a module with the indicated designation from Digital Equipment Corporation, Maynard, Mass., U.S.A. unless orherwise specified.
[2] DEC-A refers to the Digital Logic Handbook published by Digital Equipment Corporation, 1967 Edition (404 pages).
[3] One is required unless otherwise specified. In certain instances one commercial component will contain duplicate circuits.
[4] The servo drive utilized a General Electric Company direct current servo motor. The servo drive is furnished by the Strippit Division of Houdaille Industries, Inc., Akron, New York, U.S.A., with its Fabramatic Model 15/30 punch presses.
[5] The feedback transducer is of the photovoltaic type. An amplifier is preferably provided within the transducer housing such as the module W501A of the Digital Equipment Corporation to limit sensitivity to noise pickup. (The W501A module is the same as the W501 except for the addition of a jumper wire from a junction point between diodes D9 and D10, to the anode terminal of diode D4, having reference to the Digital Equipment Corporation drawing RS-B-W501-5 copyright 1964.) The transducer is of the type furnished with the Fabramatic punch presses referred to above.

TABLE II (FIG. 2)

| Component reference No. | Component description | Identification of suitable source [1] |
|---|---|---|
| 200 | Computer Data Output Circuits (see DEC-B,[3] pages 88, 89 and 424-427, all of which is incorporated herein by reference). | Part of PDP-8.[2] |
| 201 | Output Bus Drivers | Part of PDP-8. |
| 202 | IOP (Input-Output Pulse) Pulse Generator. | Part of PDP-8. |
| 203 | X-Axis Lower Read-In Gates | Part of R201 (12 required). |
| 204 | X-Axis Upper Read-In Gates | Part of R201 (5 required). |
| 205 | Y-Axis Lower Read-In Gates | Part of R201 (12 required). |
| 206 | Y-Axis Upper Read-In Gates | Part of R201 (3 required). |
| 207 | Load YL Selector (Code 6754) | W103. |
| 208 | Load YU Selector (Code 6764) | W103. |

[1] Available from Digital Equipment Corporation unless otherwise specified.
[2] The PDP-8 is a stored-program digital computer available from Digital Equipment Corporation.
[3] DEC-B refers to The Digital Small Computer Handbook published by Digital Equipment Corporation, 1967 edition (494 pages).

TABLE III (FIG. 3)

| Reference number identifying component | Description of component | Identification of suitable DEC [1] module |
|---|---|---|
| 300 | Y-Axis Lower Read Out Gates | R123 (2 required). |
| 301 | Y-Axis Upper Read Out Gates | R123. |
| 302 | Read YL Selector (Code 6774) | W103. |
| 303 | Read YU Selector (Code 6761) | W103. |

[1] DEC is used herein to refer to the Digital Equipment Corporation, Maynard, Massachusetts, U.S.A.

TABLE IV (FIG. 4)

| Component reference number | Component description | Figure reference or source identification |
|---|---|---|
| 400, 401 | Negative Input Converter and Schmitt Trigger Circuits. | W501A (2 required). |
| 402, 403 | Inverter Circuits | R107. |
| 404, 405 | Pulse Amplifiers each using four Diode-Capacitor-Diode Gate Circuits (see DEC-A, pages 29 and 30, which is incorporated herein by reference). | R601 (2 required. |

TABLE IV (FIG. 4)

| Component reference number | Component description | Figure reference or source identification |
|---|---|---|
| 406, 407 | XP and XM Flip-Flops (Bistable Circuits) each using one Diode-Capacitor-Diode Gate Circuit at its set input. | R202. |
| 408, 409 | Inverter Amplifiers | W051. |
| 410, 411, 412 | NAND/NOR Gates (negative input NAND, positive input NOR). | R111. |
| 413 | XH Flip-Flop with two Diode-Capacitor-Diode Gate Circuits. | R202. |
| 414 | Relaxation Oscillator triggered by a positive input pulse for supplying a positive output pulse after a 27 microsecond delay. | Like the oscillator of Fig. 8. |
| 415 | Relaxation Oscillator triggered by a positive input pulse for supplying a positive (clearing) pulse after a 32 microsecond delay. | Like the oscillator of Fig. 8. |
| 416, 417 | Inverters | R107. |
| 418 | Flip-Flop with two diode-capacitor-diode gates at its inputs. | R202. |
| 419 | Negative Input Converter and Schmitt Trigger. | W501. |
| 433 | NAND/NOR Gate | R111. |
| 434 | Negative Input Converter and Schmitt Trigger. | W501. |
| 435 | Inverter | R107. |
| 436 | NAND/NOR Gate | R111. |
| 450 | Binary Coded Decimal Up/Down Counter Providing a Visual Decimal Readout of Absolute X-Axis position. (There is a similar counter associated with the Y-axis circuits which are analogous to the X-axis circuits.) | Janus Control Corporation. |

TABLE V (FIG. 5)

| Component reference number | Description of component | DEC module designation |
|---|---|---|
| 500–503 | Diode networks | R002 |
| 504, 505 | Expandable NAND/NOR Gates, with diode networks 500–503 connected to node terminal F of Gate 504. | R111 |
| 506–510 | Diode networks | R002 |
| 11, 512 | Expandable NAND/NOR Gates, with diode networks 506–510 connected to node terminal F of gate 511. | R111 |

TABLE VI (FIG. 6)

| Component reference number | Component description | Identification of commercial source, or figure reference |
|---|---|---|
| 600 | High Speed Punched Tape Reader | Digitronics B-3000 Paper Tape Reader. |
| 601 | Tape Reader Control and Interface | Fig. 10. |
| 602 | Keyboard-Printer and Tape Reader-Punch Console (see DEC-B, pages 128–131 and pages 207–210, and 288–291, all of which is incorporated herein by reference). | Teletype Model 33 ASR Console. |
| 603 | Stored Program Digital Computer with random access core memory, and providing priority rated, interrupt operation. (See DEC-B, pages 81–109, 203–206, all of which is incorporated herein by reference.) | Digital Equipment Corporation Programmed Data Processor-8 (PDP-8). |
| 604 | X-Axis Control and Drive Circuits | Figs. 1A, 1B, 2, 3 and 5. |
| 605 | Machine X-Axis | X-Axis of Strippit Fabramatic Model 15/30 punch press. |
| 606 | Y-Axis Control and Drive Circuits (corresponds to Component 604 except for number of stages required). | Figs. 2 and 3. |
| 607 | Machine Y-Axis | Y-Axis of Strippit Fabramatic Model 15/30 punch press. |
| 608 | Synchronizer (Y-Axis) | Corresponds to Fig. 4. |
| 609 | X-Axis Absolute Position Register located within the computer memory (double precision arithmetic may be used). | PDP-8 core memory (24 bits). |
| 610 | Y-Axis Absolute Position Register located within the computer memory (double precision arithmetic may be used). | PDP-8 core memory (24 bits). |
| 611 | Y-Axis Digital Feedback Components | Corresponds to X-Axis Component 112. See Table I. |

Table VII (FIG. 7)—Null Detector Circuit 110

| Element Reference Character | Type or Value |
|---|---|
| 7-D7 | IN3604 |
| 7-R5 | 10 k.* |
| 7-C1 | 150 pf.** |
| 7-Q1, 8-Q2 | 2N3638 |
| 7-R4 | 6.2 k. |
| 7-R1 | 510 ohms |
| 7-D1 | IN702 |
| 7-P1 | Potentiometer (0 to 1 k.) |
| 7-P2 | Potentiometer (0 to 1 k.) |
| 7-R2 | 750 ohms |
| 7-D2 | IN702 |
| 7-D4, 7-D5 | IN3604 |
| 7-D5 | IN3604 |
| 7-R6 | 7.5 k. |
| 7-C2 | 1 microfarad |
| 700 | comparator*** |
| 701 | comparator*** |
| 702 | relay coil of relay 181, FIG. 1B |

*Throughout this disclosure, the abbreviation "K." stands for kilohms.

**pf. stands for picofarads (micromicrofarads)

***Fairchild Camera and Instrument Corp. Model A710

Table VIII (FIG. 8)—Relaxation Oscillator 1108

| Element Reference Character | Type or Value |
|---|---|
| 8-R8 | 10 k. |
| 8-R9 | *100,000 ohms |
| 8-R10 | *20,000 ohms |
| 8-C2 | *1 microfarad |
| 8-C3 | *zero (an open circuit) |
| 8-R7 | 100 ohms |
| 8-Q3 | 2N1671 |
| 8-R6 | 22 ohms |
| 8-C1 | 0.01 microfarad |
| 8-R5 | 15 k. |
| 8-Q2 | 2N3638 |
| 8-R4 | 7.5 k. |
| 8-CR4 | IN3604 |
| 8-CR3 | IN3604 |
| 8-R3 | 100 k. |
| 8-R2 | 7.5 k. |
| 8-Q1 | 2N3638 |
| 8-CR2 | IN3604 |

*The values of 8-R9, 8-R10, 8-C2 and 8-C3 determine the time constant of the circuit.

Table IX (FIG. 9)

| Element Reference Character | Description or Value |
| --- | --- |
| 900 | 220 volt AC primary, 60 Hz., 117 volt AC secondary, 3 kilovolt-amperes |
| 901 | Burr Brown Power Supply (Model 501) |
| 902 | coil of relay 9-kpc having normally open contacts 9-kpc-1, 9-kpc-2, 9-kpc-3, 9-kpc-4 |
| 903 | coil of relay k5 controlling normally open contacts 9-k5-1 |
| 904-909 | General Electric Company Thyrecters |
| 910 | coil of relay 9-k4 having normally open contacts 9-k4-1 |
| 911 | 3 microfarad capacitor |
| 912, 913 | diodes |
| 914 | Interface Power Supply |
| 915 | Punch operating solenoid |
| 916 | Resistor 100 ohms |
| 917 | Capacitor—0.1 microfarad |
| 918 | Coil of relay k2 having normally Open contacts 9-k2-1 |
| 919 | Capacitor—2 microfarads |
| 920 | Resistor—20 ohms |
| 921 | X- and Y-Axis Servo Preamplifier, Servo Drive, and Power Supply Circuits corresponding to that presently in use on the Strippit Fabramatic punch presses |
| 926 | 50 ohm rheostat—25 watts |
| 927 | Coil of Punch Motor Control Relay 9-PM |
| 928 | Coil of Relay kpu having normally open contacts 9-kpu-1 |
| 930 | Punch Solenoid Flip-Flop, DEC Type R201 is set by command from the computer |
| 931 | Gate DEC-R001 |
| 932 | Relay Driver DEC-W061 |
| 933 | NAND-Gate R111 |
| 934 | Trigger DEC-W501 responsive to the condition of limit switch LS1 to prevent punch operation in case of an unsafe condition |
| 935 | Punch Flip-Flop DEC-R201 |

TABLE X (FIG. 10).—TAPE READER INTERFACE 601

| Component reference number | Description of component | DEC module identification |
| --- | --- | --- |
| 1000 | Feed Start Flip-Flop | R203. |
| 1001 | Negative Input Converter and Schmitt Trigger. | W501. |
| 1002 | Delay (One Shot) 80 Microseconds recovery time. | R302. |
| 1003-1007 | Input Bus Gate | R123. |
| 1008-1010 | Device Selector (IOT11, IOT14, IOT12, Codes 6011, 6014, 6012). | W103. |
| 1011 | Flip-Flop (Reader Forward/Reverse) Controlled by Device Selectors (Codes 6702, 6704). | R203. |
| 1013-1016 | Flip-Flops (Reader Run, Reader Flag, RD0, RD1). | R202.[1] |
| 1017 | Delay (One Shot) 1 millisecond | R302. |
| 1018-1021 | Inverter Amplifiers | W051. |
| 1022-1023 | Inverters | R107. |
| 1025 | Reader Reverse Device Selector (Code 6702). | W103. |

[1] Two required.

TABLE XI (FIG. 11)

| Component reference number | Description of component | Figure reference or DEC module identification |
| --- | --- | --- |
| 1100 | Negative Input Converter and Schmitt Trigger. | W501. |
| 1101-1103 | Inverters | R107. |
| 1104 | NAND/NOR | R111. |
| 1105 | NAND/NOR | R123. |
| 1106 | Side Gage Flip-Flop | R203. |
| 1107 | Y Axis Null Detector Relay | Figure 11. |
| 1108 | Relaxation Oscillator | Figure 8. |
| 1109-1111 | Device Selectors (Codes 6704, 6701 and 6712). | W103.[1] |
| 1112 | System Clock Trigger Circuit | Figure 11. |
| 1113 | Status Flag Flip-Flop | R203. |
| 1114 | Move Flip-Flop | R203. |
| 1115 | Pulse Amplifier | R601. |
| 1116 | Relay Driver | W061. |
| 1118 | Device Selector (Code 6711) | W103. |
| 1119 | NAND/NOR | R111. |

[1] Two required.

Operation of FIGS. 1A and 1B

In operation of the components of FIGS. 1A and 1B, digital command signals from the accumulator (AC) of computer 603 (FIG. 6) are supplied via bus cable 130. As indicated by reference characters applied to conductors branching from the cable 130, the input gates of counter stages XL11 and XU11 are connected with the BAC11 output from component 201, FIG. 2, of the computer output circuits 200. The read-in gates for stages XL11 through XL0 are represented by block 203 in FIG. 2, and the read-in gates for stages XU11, XU10, XU9, XU8 and XU0 are represented by component 204 in FIG. 2. The BAC10 terminal of the computer is connected with stages XL10 and XU10, the terminal BAC9 is connected with XL9 and XU9, and the terminal BAC8 is connected with XL8 and XU8. The terminals BAC7 through BAC1 are connected with counter stages XL7, XL6, XL5, XL4, XL3, XL2 and XL1, respectively, The BAC0 terminal of the computer is connected with the input gate of counter stage XL0 and also with the input gate of counter stage XU0, both shown in FIG. 1B.

Thus, when the load XL component 101 is selected by virtue of the output of component 201, FIG. 2, the gates 203, FIG. 2, will be enabled to load digital command signals from the computer into the XL counting stages. Similarly when the load XU COMPONENT 114 is selected, digital command data will be loaded into the XU counting stages of FIG. 1B.

When a positioning cycle is then initiated, an error signal will be generated at the output 131 of the digital to analog converter stages 105-107 which will determine the direction and speed of operation of the X-axis servo drive 111. As shown in FIG. 1A, the complement outputs of stages XL11-XL6 are supplied via lines 141-146 to the inputs of the converter stages. The circuitry of component R201 specifically referred to in table I is such that when XL11 is clear, conductor 141 is held at −3 volts so as to provide a 0-volt output from amplifier 151. On the other hand, when the counting stage XL11 is set, the output at line 141 is at ground potential, and amplifier 151 supplies a predetermined voltage increment with respect to the output line 131. If this output voltage increment is arbitrarily assigned a value of unity, then the outputs of amplifiers 152-158 would have relative values of 2, 4, 8, 16, 32, 64, and 128, respectively.

Conductor 160 leading to the input of amplifier 157 of converter stage 107 is connected to the output of inverter 512, FIG. 5. Conductor 161 leading to the input of amplifier 158 of converter stage 107 connect with the set output line 162 of counting stage XU0. Thus if stage XU0 is set, line 161 is at a potential of −3 volts and amplifier 158 contributes nothing to the output voltage at 131. On the other hand, if counting stage XU0 is in a clear (or reset) condition, then the output at line 161 will be at ground potential, and amplifier 158 will supply its relative voltage increment of 128. It will be observed that the connection 161 to the set output of counting stage XU0 differs from the connection of conductors 141-146 to the clear or complement output terminals of stages XL11-XL6.

The purpose of the illustrated connections to the respective counting stages and the desired functioning of the limit gate circuitry of FIG. 5 will be apparent from the following tabulations entitled table A1, table A2, table B1, and table B2 which show the operation of the circuits of FIGS. 1A and 1B for the case of a positive digital command signal and for the case of a negative digital command signal from the computer. The tables A1, A2 and B1, B2 will be referred to in a collective sense as tables A and B, respectively.

It will be observed from a consideration of tables A and B that the amplifiers 157 and 158 of converter stage 107 are switched in such a way that for high-positive counts above +6, TABLE A1.—OPERATION OF COUNTING STAGES OF FIGS. 1A AND 1B FOR A POSITIVE DIGITAL COMMAND SIGNAL FROM THE COMPUTER

| Decimal count | XL stages | | | | | | | | | | | | XU stages | | | | |
|---|---|---|---|---|---|---|---|---|---|---|---|---|---|---|---|---|---|
| | [1]11 | 10 | 9 | 8 | 7 | 6 | 5 | 4 | 3 | 2 | 1 | 0 | 11 | 10 | 9 | 8 | 0 |
| 2,048 | 0 | 0 | 0 | 0 | 0 | 0 | 0 | 0 | 0 | 0 | 0 | 1 | 0 | 0 | 0 | 0 | 0 |
| 1,024 | 0 | 0 | 0 | 0 | 0 | 0 | 0 | 0 | 0 | 0 | 1 | 0 | 0 | 0 | 0 | 0 | 0 |
| 512 | 0 | 0 | 0 | 0 | 0 | 0 | 0 | 0 | 1 | 0 | 0 | 0 | 0 | 0 | 0 | 0 | 0 |
| 255 | 1 | 1 | 1 | 1 | 1 | 1 | 1 | 0 | 0 | 0 | 0 | 0 | 0 | 0 | 0 | 0 | 0 |
| 128 | 0 | 0 | 0 | 0 | 0 | 0 | 1 | 0 | 0 | 0 | 0 | 0 | 0 | 0 | 0 | 0 | 0 |
| 127 | 1 | 1 | 1 | 1 | 1 | 1 | 0 | 0 | 0 | 0 | 0 | 0 | 0 | 0 | 0 | 0 | 0 |
| 64 | 0 | 0 | 0 | 0 | 0 | 1 | 0 | 0 | 0 | 0 | 0 | 0 | 0 | 0 | 0 | 0 | 0 |
| 63 | 1 | 1 | 1 | 1 | 1 | 0 | 0 | 0 | 0 | 0 | 0 | 0 | 0 | 0 | 0 | 0 | 0 |
| 32 | 0 | 0 | 0 | 0 | 1 | 0 | 0 | 0 | 0 | 0 | 0 | 0 | 0 | 0 | 0 | 0 | 0 |
| 31 | 1 | 1 | 1 | 1 | 0 | 0 | 0 | 0 | 0 | 0 | 0 | 0 | 0 | 0 | 0 | 0 | 0 |
| 3 | 1 | 1 | 0 | 0 | 0 | 0 | 0 | 0 | 0 | 0 | 0 | 0 | 0 | 0 | 0 | 0 | 0 |
| 2 | 0 | 1 | 0 | 0 | 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 | 0 | 0 | 0 |
| −1 | 1 | 1 | 1 | 1 | 1 | 1 | 1 | 1 | 1 | 1 | 1 | 1 | 1 | 1 | 1 | 1 | 1 |
| −2 | 0 | 1 | 1 | 1 | 1 | 1 | 1 | 1 | 1 | 1 | 1 | 1 | 1 | 1 | 1 | 1 | 1 |
| −3 | 1 | 0 | 1 | 1 | 1 | 1 | 1 | 1 | 1 | 1 | 1 | 1 | 1 | 1 | 1 | 1 | 1 |
| −31 | 1 | 0 | 0 | 0 | 0 | 1 | 1 | 1 | 1 | 1 | 1 | 1 | 1 | 1 | 1 | 1 | 1 |
| −32 | 0 | 0 | 0 | 0 | 1 | 1 | 1 | 1 | 1 | 1 | 1 | 1 | 1 | 1 | 1 | 1 | 1 |
| −63 | 1 | 0 | 0 | 0 | 0 | 0 | 1 | 1 | 1 | 1 | 1 | 1 | 1 | 1 | 1 | 1 | 1 |
| −64 | 0 | 0 | 0 | 0 | 0 | 1 | 1 | 1 | 1 | 1 | 1 | 1 | 1 | 1 | 1 | 1 | 1 |

[1] Stage XL11 which is the first stage of the counting chain is shown at the left in FIG. 1A, and for this reason is shown at the left in the tables, even though it represents the least significant digit position in interpreting the binary number in the counter. The binary digit 0 is represented when the associated stage is in the clear or reset condition, and the binary digit 1 is represented by a counting stage when the stage is in the set condition.

TABLE A2.—OPERATION OF CONVERTER STAGES OF FIGS. 1A AND 1B AND THE LIMIT GATE OF FIG. 5 FOR A POSITIVE DIGITAL COMMAND SIGNAL FROM THE COMPUTER

| Decimal count | Converter stages | | | | | | | | Net Analog Error (with Bias = −128)[1] |
|---|---|---|---|---|---|---|---|---|---|
| | 151 | 152 | 153 | 154 | 155 | 156 | 157 | 158 | |
| | (1)[1] | (2)[1] | (4)[1] | (8)[1] | (16)[1] | (32)[1] | (64)[1] | (128)[1] | |
| 2048 | 0 | 0 | 0 | 0 | 0 | 0 | (1) | (1) | +64 |
| 1024 | 0 | 0 | 0 | 0 | 0 | 0 | (1) | (1) | +64 |
| 512 | 0 | 0 | 0 | 0 | 0 | 0 | (1) | (1) | +64 |
| 255 | 1 | 1 | 1 | 1 | 1 | 1 | (1) | (1) | +127 |
| 128 | 0 | 0 | 0 | 0 | 0 | 0 | (1) | (1) | +64 |
| 127 | 1 | 1 | 1 | 1 | 1 | 1 | (1) | (1) | +127 |
| 64 | 0 | 0 | 0 | 0 | 0 | 0 | (1) | (1) | +64 |
| 63 | 1 | 1 | 1 | 1 | 1 | 1 | (0) | (1) | +63 |
| 32 | 0 | 0 | 0 | 0 | 0 | 1 | (0) | (1) | +32 |
| 31 | 1 | 1 | 1 | 1 | 1 | 0 | (0) | (1) | +31 |
| 3 | 1 | 1 | 0 | 0 | 0 | 0 | (0) | (1) | +3 |
| 2 | 0 | 1 | 0 | 0 | 0 | 0 | (0) | (1) | +2 |
| 1 | 1 | 0 | 0 | 0 | 0 | 0 | (0) | (1) | +1 |
| 0 | 0 | 0 | 0 | 0 | 0 | 0 | (0) | (1) | 0 |
| −1 | 1 | 1 | 1 | 1 | 1 | 1 | (1) | (0) | −1 |
| −2 | 0 | 1 | 1 | 1 | 1 | 1 | (1) | (0) | −2 |
| −3 | 1 | 0 | 1 | 1 | 1 | 1 | (1) | (0) | −3 |
| −31 | 1 | 0 | 0 | 0 | 0 | 1 | (1) | (0) | −31 |
| −32 | 0 | 0 | 0 | 0 | 1 | 1 | (1) | (0) | −32 |
| −63 | 1 | 0 | 0 | 0 | 0 | 0 | (1) | (0) | −63 |
| −64 | 0 | 0 | 0 | 0 | 0 | 0 | (1) | (0) | −64 |

[1] The output of the digital to analog converter is expressed as a relative magnitude taking the output of the converter stage 151 as unity.

TABLE B2.—OPERATION OF THE CONVERTER STAGES OF FIGS. 1A AND 1B AND THE LIMIT GATE OF FIG. 5 FOR A NEGATIVE DIGITAL COMMAND SIGNAL FROM THE COMPUTER

| Decimal count | Converter stages | | | | | | | | Net Analog Error (with Bias = −128)[1] |
|---|---|---|---|---|---|---|---|---|---|
| | 151 | 152 | 153 | 154 | 155 | 156 | 157 | 158 | |
| | (1)[1] | (2)[1] | (4)[1] | (8)[1] | (16)[1] | (32)[1] | (64)[1] | (128)[1] | |
| −2048 | 0 | 0 | 0 | 0 | 0 | 0 | (0) | (0) | −128 |
| −1024 | 0 | 0 | 0 | 0 | 0 | 0 | (0) | (0) | −128 |
| −512 | 0 | 0 | 0 | 0 | 0 | 0 | (0) | (0) | −128 |
| −256 | 0 | 0 | 0 | 0 | 0 | 0 | (0) | (0) | −128 |
| −128 | 0 | 0 | 0 | 0 | 0 | 0 | (0) | (0) | −128 |
| −64 | 0 | 0 | 0 | 0 | 0 | 0 | (0) | (0) | −128 |
| −63 | 1 | 0 | 0 | 0 | 0 | 0 | (1) | (0) | −64 |
| −32 | 0 | 0 | 0 | 0 | 0 | 1 | (1) | (0) | −63 |
| −31 | 1 | 0 | 0 | 0 | 0 | 1 | (1) | (0) | −32 |
| −3 | 1 | 0 | 1 | 1 | 1 | 1 | (1) | (0) | −31 |
| −2 | 0 | 1 | 1 | 1 | 1 | 1 | (1) | (0) | −3 |
| −1 | 1 | 1 | 1 | 1 | 1 | 1 | (1) | (0) | −2 |
| 0 | 0 | 0 | 0 | 0 | 0 | 0 | (0) | (1) | −1 |
| +1 | 1 | 0 | 0 | 0 | 0 | 0 | (0) | (1) | 0 |
| +2 | 0 | 1 | 0 | 0 | 0 | 0 | (0) | (1) | +1 |
| +3 | 1 | 1 | 0 | 0 | 0 | 0 | (0) | (1) | +2 |
| +31 | 1 | 1 | 1 | 1 | 1 | 0 | (0) | (1) | +3 |
| +32 | 0 | 0 | 0 | 0 | 0 | 1 | (0) | (1) | +31 |
| +63 | 1 | 1 | 1 | 1 | 1 | 1 | (0) | (1) | +32 |
| | | | | | | | | | +63 |

[1] The output of the digital analog converter is expressed as a relative magnitude taking the output of the converter stage 151 as unity.

TABLE B1.—OPERATION OF THE COUNTING STAGES OF FIGS. 1A AND 1B FOR A NEGATIVE DIGITAL COMMAND SIGNAL FROM THE COMPUTER

| Decimal count | XL Stages | | | | | | | | | | | | XU Stages | | | | |
|---|---|---|---|---|---|---|---|---|---|---|---|---|---|---|---|---|---|
| | 11[1] | 10 | 9 | 8 | 7 | 6 | 5 | 4 | 3 | 2 | 1 | 0 | 11 | 10 | 9 | 8 | 0 |
| −2048 | 0 | 0 | 0 | 0 | 0 | 0 | 0 | 0 | 0 | 0 | 0 | 1 | 1 | 1 | 1 | 1 | 1 |
| −1024 | 0 | 0 | 0 | 0 | 0 | 0 | 0 | 0 | 0 | 0 | 1 | 1 | 1 | 1 | 1 | 1 | 1 |
| −512 | 0 | 0 | 0 | 0 | 0 | 0 | 0 | 0 | 0 | 1 | 1 | 1 | 1 | 1 | 1 | 1 | 1 |
| −256 | 0 | 0 | 0 | 0 | 0 | 0 | 0 | 0 | 1 | 1 | 1 | 1 | 1 | 1 | 1 | 1 | 1 |
| −128 | 0 | 0 | 0 | 0 | 0 | 0 | 0 | 1 | 1 | 1 | 1 | 1 | 1 | 1 | 1 | 1 | 1 |
| −64 | 0 | 0 | 0 | 0 | 0 | 0 | 1 | 1 | 1 | 1 | 1 | 1 | 1 | 1 | 1 | 1 | 1 |
| −63 | 1 | 0 | 0 | 0 | 0 | 0 | 1 | 1 | 1 | 1 | 1 | 1 | 1 | 1 | 1 | 1 | 1 |
| −32 | 0 | 0 | 0 | 0 | 0 | 1 | 1 | 1 | 1 | 1 | 1 | 1 | 1 | 1 | 1 | 1 | 1 |
| −31 | 1 | 0 | 0 | 0 | 0 | 1 | 1 | 1 | 1 | 1 | 1 | 1 | 1 | 1 | 1 | 1 | 1 |
| −3 | 1 | 0 | 1 | 1 | 1 | 1 | 1 | 1 | 1 | 1 | 1 | 1 | 1 | 1 | 1 | 1 | 1 |
| −2 | 0 | 1 | 1 | 1 | 1 | 1 | 1 | 1 | 1 | 1 | 1 | 1 | 1 | 1 | 1 | 1 | 1 |
| −1 | 1 | 1 | 1 | 1 | 1 | 1 | 1 | 1 | 1 | 1 | 1 | 1 | 1 | 1 | 1 | 1 | 1 |
| 0 | 0 | 0 | 0 | 0 | 0 | 0 | 0 | 0 | 0 | 0 | 0 | 0 | 0 | 0 | 0 | 0 | 0 |
| +1 | 1 | 0 | 0 | 0 | 0 | 0 | 0 | 0 | 0 | 0 | 0 | 0 | 0 | 0 | 0 | 0 | 0 |
| +2 | 0 | 1 | 0 | 0 | 0 | 0 | 0 | 0 | 0 | 0 | 0 | 0 | 0 | 0 | 0 | 0 | 0 |
| +3 | 1 | 1 | 0 | 0 | 0 | 0 | 0 | 0 | 0 | 0 | 0 | 0 | 0 | 0 | 0 | 0 | 0 |
| +31 | 1 | 1 | 1 | 1 | 0 | 0 | 0 | 0 | 0 | 0 | 0 | 0 | 0 | 0 | 0 | 0 | 0 |
| +32 | 0 | 0 | 0 | 0 | 1 | 0 | 0 | 0 | 0 | 0 | 0 | 0 | 0 | 0 | 0 | 0 | 0 |
| +63 | 1 | 1 | 1 | 1 | 1 | 0 | 0 | 0 | 0 | 0 | 0 | 0 | 0 | 0 | 0 | 0 | 0 |

[1] Stage XL11 which is the first stage of the counting chain is shown at the left in Fig. 1A, and for this reason is shown at the left in the tables, even though it represents the least significant digit position in interpreting the binary number in the counter. The digit 0 is represented when the associated stage is in the clear or reset condition, and the binary digit 1 is represented by a counting stage when the stage is in the set condition.

the relative output from the converter stages at line 131 is maintained at a relatively high value, for example above a limit value of +63. Between a count of +63 and −64, the output at 131 varies as a linear function of the count in the counting stages. For counts below about −64, the output at 131 is maintained at an absolute value above the limit value of about 64. Further, it will be observed that as the count in the counting stages increases from +63 to +127, the output at 131 continues to increase in a linear fashion. For a count of 128, however, the output at 131 falls to a value of +64 on a relative scale previously referred to. As the count further increases, the output at 131 again linearly increases to a maximum value of 127. This fluctuation in the output at 131 continues as the count in the counter stages continues to increase so long as the counting stage XU0 remains in the clear condition, and thus supplies an analog output of +128 which is substantially equal to the bias of −128 in the relative units which is introduced at amplifier component 109. Similarly, as the count in the counting stages progresses below −64, the analog output at 131 will linearly increase in the negative direction until a count of −128. At a counting of −129, the output at 131 abruptly decreases to −64. Further counting in the negative direction leads to a further linear change in analog output voltage until a count of −256 is reached. At a count of −257, the output at 131 again abruptly decreases to −64. It will be observed, however, that beyond a count of +63 and beyond (in the negative direction) a count of −64, the net analog voltage at output 131 never falls below an absolute value of approximately 63 in the relative units previously referred to.

Referring to circuit 109 in FIG. 1B, a bias reference voltage of +10 volts may be introduced at point 170. One terminal of a resistor 171 is connected to circuit point 170, and a Zener diode 172 is connected between the other terminal of resistor 171 and ground. A 1,000 ohm potentiometer 173 may be adjusted with a count of zero registered in the counting stages so as to provide a 0-analog output at 174 under these conditions. The values of the circuit elements in component 109 may be as follows: resistor 171, 510 ohms; voltage rating of Zener diode 172, 5.6 volts; zero adjustment potentiometer 173, 0 to 1,000 ohms; resistor 175, 470 ohms; resistor 176, 100 ohms; gain adjustment potentiometer 177, 0 to 5,000 ohms; and resistor 178, 500 ohms. Amplifier component 179 may be a Burr Brown Model 1507 operational amplifier.

Null detector component 110 includes an amplifier circuit 180 which is adjustable by means of two potentiometers (7-P1 and 7-P2, FIG. 7) to actuate relay 181 whenever the input to the amplifier circuit 180 remains within a predetermined range about the zero error value. Thus one adjustment potentiometer of component 110 may adjust a first comparator (comparator 700, FIG. 7) of circuit 180 to provide an enabling output level whenever the input potential corresponds to a count in the counting stages of less than +3 while the second adjustment potentiometer may adjust a second comparator (comparator 701, FIG. 7) to provide an enabling output level whenever the count in the counting stages is greater than −3. Thus when both comparators 700 and 701 provide an enabling output level, the count will be between +3 and −3. The normally open contacts 182 of relay 181 when closed may enable an energizing circuit for a relaxation oscillator (oscillator 1108, FIG. 11) which is adjusted to respond only when the energizing circuit remains closed for a predetermined time interval such as 100 milliseconds. Thus, if the count in the counting stages remains between +3 and −3 for 100 milliseconds, for example, (and if the Y-null detector contact 1130 is closed during the interval), the relaxation oscillator will become operative to discontinue the positioning cycle.

Because of the operation of the null detector circuitry, it is possible for the movement with respect to a machine axis to come to a stop with a count other than zero registered in the counting stages. The count remaining in the counting stages may be determined so as to be well within the tolerance requirements of the machine tool, and yet with many successive positioning steps, it is conceivable that the absolute error of a later end point with respect to a fixed reference point would be unacceptable. To deal with this possibility, provision is made for the computer to read the condition of the counting stages when the movement with respect to an axis has stopped. The computer could be programmed in a number of different ways to take care of the problem, but in the illustrated embodiment, provision is made for the computer processor to algebraically combine the remainder in the counting stages with a succeeding command so as to provide a modified command signal to the control circuits which will correct for the error in the previous positioning operation.

For the purpose of determining the condition of the counting stages after the movement with respect to a machine axis has stopped, the counting stages are provided with output lines such as those indicated at 186–195 leading from the set output lines of stages XL11–XL5, XL0, XU11, XU8 and XU0. Similar output lines would be provided for stages XL4, XL3, XL2, XL1, XU10 and XU9. The XL output lines such as 185–192 lead to an XL Read OUt Gates component 104 controlled by a Read XL component 100. The XU Read Out Gates component 108 receives the output lines such as 193–195 of the XU counting stages and is controlled by the Read XU component 113. As indicated by the reference characters applied to the output lines of the XL Read Out Gates component 104, cable 197 connects with terminals AC11 through AC0 of the computer accumulator. Similarly the output lines from the XU Read Out Gates component 108, FIG. 1B, lead to terminals AC11, AC10, AC9, AC8 and AC0, respectively. The gate components 104 and 108 are, of course, enabled on different cycles so that the computer can distinguish the AC11 output of gate 104 from the AC11 output of gate 108, for example.

In the foregoing description, certain output lines which connect with the same terminal of the computer have been identified with a reference character indicating this fact. Specifically the designations AC0 through AC11, and BAC0 through BAC11 has this significance. Individual reference numerals have also been applied to the respective conductors bearing the more general reference character designations. It is believed that this procedure will facilitate comprehension of the drawings by those skilled in the art. Similarly in the following description the outputs from the XL and XU counting stages have been designated by the same reference characters as used for the respective counting stages. Thus, in FIG. 1A, an output line from the "set" output terminal of counter stage XL5 has been designated by the reference character XL5, while the output from the "clear" terminal of counting stage XL5 has been designated with the symbol for the complement of XL5 ($\overline{XL5}$). (Referring to FIG. 1A, it will be observed that line 191 is connected to a common circuit point with line XL5 at the "set" output of counting stage XL5.) Certain other conductors have been given a general character designation and a reference numeral designation as well. See for example conductors 160 and 161 at the lower right in FIG. 1A.

Referring to the lower part of FIG. 1B, the output line 174 from amplifier circuit 109 is connected to the input of the X-axis servo drive component 111 whose mechanical output is indicated by dash line 198. The transducer component 112 may be of the photoelectric type and include a suitable preamplifier so as to supply square waveform signals at the output lines M1X and M2X leading to synchronizer 117. The synchronizer component will enable the line designated as the complement of XM ($\overline{XM}$) if the transducer is rotating in one direction and will enable the line designated as the complement of XP ($\overline{XP}$) if the transducer is being driven in the opposite direction. The synchronizer 117 will also supply an X clock pulse at line 199 for each increment of rotation of the transducer 112. By way of example, the transducer may be mechanically coupled to the output shaft 198 in such a way as to produce an X clock pulse for each increment of rotation corresponding to a linear displacement of the machine axis of 0.001 inch. The X clock pulses from the synchronizer are supplied to the input of counting stage XL11 which is arranged so that each clock pulse causes the counting stage to change its state. The stage XL11 thus acts in the manner of a toggle switch or binary counting stage. If the line $\overline{XM}$ is enabled, the counting s stages will count in the "up" or positive direction. On the other hand if the line $\overline{XP}$ is enabled, the "set" output of each counting stage is effectively coupled to the next succeeding counting stage so that the counting stages will count in the "down" or minus direction.

The Hold X component 115 causes synchronizer 117 to interrupt the supply of X clock pulses for a sufficient interval to ensure that the counting stages may be inspected by the computer. The "hold" interval introduced by actuation of component 115 is sufficient short, however, so that any feedback pulse from transducer 112 which might occur during this interval could only be blocked for a portion of its duration. Thus even if a slight movement of the feed back transducer occurred during the hold interval, the count in the counting stages would reflect such movement. (Further details of the "Hold X" operation will be apparent from the circuit shown in FIG. 4 and described below.)

After the computer has read out the condition of the counting stages with the machine axis essentially stopped, the computer will actuate Clear XL component 102 and the Clear XU component 116 to reset the counter to a zero reading in preparation for the transfer of a new digital command signal. Of course, if the read out from the counter shows an error in excess of tolerance, the computer may be programmed to delay clearing the counter, and to enable the servo drives for an additional interval.

Operation of FIGS. 2 and 3

In FIG. 2, the BAC output bus 130 has been indicated as leading to input conductors 221—232 of gate component 203. These same reference numerals have been applied in FIG. 1A and FIG. 1B to assist in correlation of these figures. Input conductors 221–227 as shown in FIG. 1A are also designated by reference characters BAC11 through BAC5 to indicate that these conductors are connected by means of cable 130 with terminals BAC11 through BAC5 of component 201, FIG. 2. Similarly, conductor 232 in FIG. 1B has also been designated by the reference character BAC0 which is the terminal to which this conductor connects at component 201. The input conductors to gate component 204 in FIG. 2 have been designated by reference numerals 241–245 and lead, respectively, to terminals BAC11, BAC10, BAC9, BAC8 and BAC0. In practice, the cable 130 may lead to a connector at the component 203, and a further cable such as indicated at 130a may lead from component 203 to component 204, while cable 130b may lead from component 204 to component 205, cable 130c may lead from component 205 to 206, and cable 130d may lead to a further component of a second machine tool control, for example. By actuating components 203, 204, 205 206 and subsequent corresponding components in sequence, a desired number of components may all connect with terminals BAC11 through BAC0 of component 201. Thus, conductors 251–262 of read in gates component 205 would connect with terminals BAC11 through BAC0 of component 201 and conductors 271—273 of component 206 would connect with terminals BAC11, BAC10 and BAC0 of component 201.

The manner of selection of gates such as 203–206 in sequence is explained in detail in *The Digital Small Computer Handbook* (cited in table II, supra) at pages 429 and 430, and a specific circuit is disclosed for components 101, 114, 207, and 208 in *The Digital Logic Handbook* (cited in table I, supra) at page 142, and these disclosures are incorporated herein by reference. In general, the BMB cable 280 from component 201 (or two multiconductor cables as represented by line 280) may contain at least 12 conductors. Lines 281–284 may represent connections from one of each of six pairs of conductors of cable 280 to components 101, 114, 207 and 208, for example. The memory buffer register of the computer may have bits 3–8 thereof connected at both the binary 1 and binary 0 outputs thereof to the component 201, and cable 208 may connect with terminals MB3(1) through MB8(1) and MB3(0) through MB8(0) of component 201. The corresponding outputs of component 201 would be BMB3(1) through BMB8(1) and BMB3(0) through BMB8(0). It may be noted that the convention used for the selectors herein is to use the middle two digits of the code numbers of the selectors to indicate the octal complement of the BMB selection pattern. The final digits indicates whether an 10T1, 10T2, or 10T4 pulse is supplied. The initial 6 in the code indicates an input/output selection signal. Thus the selector 101 with a code of 6724 would be addressed on BMB cable 280 by a selection code of 72 (octal), with the final digit 4, indicating that an 10T4 is to be transmitted. Thus, taking the selection code for component 101 as 72 (octal), the following terminals would be connected to component 101 via cable 281: BMB3(0), BMB4(0), BMB5(0) and BMB6 (1), BMB7(0), BMB8(1). To give one further example, if the code for component 114 is 73(octal), then cable 282 would connect with the following terminals: BMB3(0), BMB4(0), BMB5(0) and BMB6(1), BMB7(0), BMB8(0). It is evident that any number of additional device selectors may be assigned two-digit octal codes (up to a total of 63 in decimal notation). The operation of each of the selector components such as 101, 114, 207, 208 in FIG. 2 and such as 100, 113, 302 and 303 in FIG. 3 will be apparent from the foregoing description.

In FIG. 2, branch cables are indicated at 285–288 leading from IOP cable 290 to selectors 101, 114, 207 and 208, respectively. The cable 290 is connected to the output of an IOP bus generator component 291 of the computer, and the cable 290 may comprise three conductors carrying respective pulses I0P1, I0P2, and IOP4 as described, for example, in *The Digital Small Computer Handbook*, supra, at pages 88–90, pages 221–223, and pages 426–427, and this description is incorporated herein by reference. The device selector components when enabled regenerate the respective IOP pulses as IOT command pulses. The positive or negative version of any of the successive regenerated pulses IOT1, IOT2 or IOT4 may be supplied via output lines such as indicated at 291–294 in FIg. 2. The output terminals in FIG. 2 to which conductors 291–294 are connected are designated by letters which correspond to the distinctive letters in the terminal designations utilized in the commercially available module W103. Thus, terminal S of selector 101 may supply an initially positive-going version of the 10T4 pulse, the T terminal of selector 100 may supply an initially negative-going 10T4 pulse, for example, and the terminal F of selector 113 may supply an initially negative-going 10T1 pulse. The timing of the 10T cycle is shown at page 425 of *The Digital Small Computer Handbook*, supra, and this disclosure is incorporated herein by reference.

In FIG. 3, the reference numeral 197 designates generally the cable extending between the accumulator terminals AC11 through AC0 of the computer and the successive gate components such as 104, 108, 300 and 301. As mentioned with reference to cable 130, the cable 197 may actually comprise successive lengths of multiconductor cable, for example connecting from component 301 to the computer, connecting between components 300 and 301, connecting between components 108 and 300, and connecting between components 104 and 108. Further lengths of cable may connect gate component 104 with gate components for other axes or for the axes of other machines, or separate buffering may be utilized in conjunction with a separate cable directly from the computer as will be apparent to those skilled in the art.

In FIG. 3 the conductors leading from components 104, 108, 300 and 301 have been assigned reference numerals 321–332, 341–345, 351–362 and 371–373. The reference numerals 321–327, 332 and 341, 344 and 345 have been applied to the corresponding conductors in FIGS. 1A and 1B. Conductors 321–332 connect with terminals AC11 and AC0 of the computer, conductors 341–344 connect with terminals AC11 through AC8, conductor 345 connects with terminal AC0, conductors 351 through 362 connect with terminals AC11 through AC0, conductors 371 and 372 connect with terminals AC11 and AC10, and conductor 373 connects with terminal AC0.

The structure and function of conductor cables 385–388 and conductors 391–394 in FIG. 3 will be apparent from the comparable discussion with respect to cables 285–288 and conductors 291–294 of FIG. 2.

Operation of FIG. 4

In FIG. 4, 90° out of phase rectangular waveforms arrive at lines M1X, M2X from the digital feedback transducer 112, FIG. 1B. The function of the synchronizer circuit is to energize output line $\overline{XM}$ (complement) for one direction of rotation of the transducer, and to enable the output line $\overline{XP}$ (complement) for the opposite direction of rotation of the transducer. For one direction of rotation of the transducer the input at M2X leads the input at M1X by 90 degrees, and for the other direction of rotation of the transducer, the input at M1X leads the input at M2X by 90°. If a positive signal level first appears at conductor 420 in a cycle of operation, for example, gates 421 and 422 will be enabled. A subsequent positive going signal at 423 is then transmitted via line 424 to the pulse input of gate 421, and a negative going pulse at the input of pulse amplifier 404 generates a positive pulse at line 425 leading to gate 426. Gate 426 is enabled if flip-flop 407 is clear, and a negative pulse is transmitted to the set input of flip-flop 406 placing this flip-flop in a set condition. The result is a negative output level at conductor 427 which serves to disable gate 428 at the input of flip-flop 407. The negative level at the input of driver amplifier 408 results in an enabling level at the output conductor 429 connected with conductor $\overline{XM}$ (complement). The setting of flip-flop 406 produces a positive going pulse at output line 431 leading to NOR-gate 410, which thus supplies a negative going pulse to NAND-gates 411 and 412. With flip-flop 413 in a clear condition, output line 432 thereof is negative enabling gates 411 and 412. Gates 411 and 412 thus transmit positive going pulses to the relaxation oscillator components 414 and 415. If the oscillator 414 supplies a positive going output pulse after a delay of 27 microseconds, while the component 415 supplies a positive output pulse after a delay of 32 microseconds, the result will be the transmission of a clock pulse of 5 microsecond duration to output conductor 199. When the output of component 415 goes positive, it serves to clear flip-flop 406, disabling line $\overline{XM}$ (complement) and supplying a negative potential at line 431 which is transmitted by gates 410 and 411 to shut off oscillator 414 and place the circuit in condition for a further cycle.

If now the negative going portion of the waveform at 420 leads the negative going portion of the waveform at 423, gates 441 and 422 will be enabled, and the negative going waveform at 423 will be transmitted by inverter 403 as a positive going pulse, resulting in a negative going pulse at the output of gate 414. Thus, output line XM (complement) will continue to be enabled, causing the counting chain of FIGS. 1A and 1B to count up. Thus, the operation of the circuit continues so long as the transducer component 112, FIG. 1B, continues to rotate in the same direction.

If the direction of rotation of the transducer reverses, the waveform at 423 will go positive (to ground potential) 90° ahead of the waveform at 420, enabling gates 451 and 452. The subsequent positive going pulse of the waveform at 420 is transmitted by gate 452 as a negative pulse triggering pulse amplifier 405 and serving to place flip-flop 407 in the set condition. In this case, output line 453 is driven negative to place line $\overline{XP}$ (complement) in enabling condition, and thus causing the counter to count down. At the same time, the positive or ground level output at conductor 455 is transmitted by NOR-gate 410 and by NAND-gates 411 and 412 to trigger oscillators 414 and 415 and generate a further clock pulse at line 199. Similarly, on the next half cycle of the waveforms at 420 and 423, gates 451 and 462 will be enabled through inverter component 403, and flip-flrp 407 will be again placed in set condition to generate another clock pulse at line 199.

The oscillators 414 and 415 preferably employ the circuit of FIG. 8, but with modified values for circuit elements 8–R9, 8–R10, 8–C2 and 8–C3 as follows: for oscillator 414, total series resistance (8–R9 plus 8–R10) 10,000 ohms, and total shunt capacitance (8–C2 plus 8–C3)0.0022 microfarad; for oscillator 415, total series resistance 15,000 ohms, and total shunt capacitance 0.0022 microfarad.

For the sake of convenience there has been added to the showing of the synchronizer in FIG. 4 a representation of the X-axis transducer circuits components 112 which supplies the M1X and M2X waveforms. The transducer also supplies a pulse MLX upon each complete revolution thereof at a predetermined point. These revolution marker pulses MLX are supplied via a conductor 440 to the input of inverters 416 and 417. The output of the trigger 419 is normally at ground potential to enable the gate at the input of flip-flop 418, so that the pulses from inverter 417 are transmitted to the set input of the flip-flop maintaining the flip-flop in a set condition. When however the carriage of the machine tool approaches the extreme right limit of its travel (along the X-axis), the right limit switch 441 is closed and remains closed as the carriage continues its movement to the right. This provides a negative level output from trigger 419 blocking the MLX pulses and placing the flip-flop 418 in a clear condition. The result is a negative potential at the output of gate 436 which disables the input gates in input lines 119 and 119a leading to the first counting stage XL11, FIG. 1A. The X count inhibit line has been given the reference designation 445 in FIG. 1A and in FIG. 4. If selector 1140 is placed in the manual position, the output of trigger 434 is at a negative level, the output of inverter 435 is at a ground level, and the output line 445 is at the negative count inhibiting potential regardless of the condition of the right limit switch 441. This circuitry will therefore illustrate the manner in which provision may be made to place the machine tool under manual control.

Where the count has been inhibited because of the operation of the right limit switch 441, the count will be resumed after the carriage releases the limit switch to its open condition and the first marker pulse MLX is received. The carriage is not programmed to move to its extreme limit, so that limit switch 441 would not be closed in the course of the correct execution of a program.

Operation of FIG. 5

In FIG. 5, components 500–504 constitute a negative input NAND gate and a positive input NOR gate, and the same is true of components 506–511. The set inputs of counter stages XU8 through XU11 and XL0 through XL5 are thus connected to one gate circuit, while the components, the clear outputs of the same counting stages together with the clear output of counting stage XU0 are supplied to the right-hand gate circuit shown in FIG. 5. A study of the gate circuitry will reveal that the results indicated in Tables A1, A2 and B1, B2 will be obtained with this gate arrangement. Thus, for a high positive count, counting stage XU0 will be in a clear condition providing a negative level input at gate 510, while one or more of the other inputs to gates 506–511 will be at ground potential corresponding to a set condition of the associated counting stage. The gate 511 acting as a positive or ground input NOR gate provides a negative level at the input to gate 512. Similarly, with counting stage XU0 clear, the set output XU0 will be at ground potential at the input of gate 505, providing a negative level at the output of gate 505. The negative input to gate 12 results in a ground level output which when supplied to amplifier 157 causes the amplifier to provide an analog voltage increment having a relative value of +64. Thus, even if each of stages XL11 through XL6 is in clear condition, the output at 131 of the converter stages will always be at least +64 where the output of amplifier 151 is taken as a relative value of unity.

When the count in the counter is +63 or less, all of the counting stages above XL6 will be in a clear condition, providing a negative level input to each of gates 506–511. The result will be a ground level input to gate 512 and a negative level output from gate 512 which serves to switch off converter amplifier stage 157.

When the count in the counter goes to −1, counting stage XU0 assumes a set condition, providing a ground level input to gate 510 and a negative output from gate 511. Since all the stages above XL6 will be in set condition, there will be a negative level input to each of gates 500–504, resulting in a ground level output from gate 504 and a negative level output from gate 505. The negative level input to gate 512 results in a ground level output from gate 512 gain enabling converter stage 157.

When the counting stages reach a negative value above −64, one or more of the counting stages above XL6 will be in a clear condition, providing a ground level input to one of the gates 500–504 and thus a negative level output from gate 504. The set output of XU0 is also negative resulting in a ground level output from gate 505 and a negative level output from gate 512 which serves to disable the converter stage 157.

Operation of FIG. 6

Referring to FIG. 6, computer 603 may have a first stored program therein enabling it to interpret command input numerical positioning data from components 600,601 so as to transmit the data via communication channels such as generically indicated at 620 and 621 to the upper and lower stages of the X-axis and Y-axis counting chains. Once these digital command signals have been transmitted to the digital servo loops which are generally designated by the reference numbers 622 and 623, the servo loops are capable of independent functioning in initially driving the respective machine axis 605 and 607 at relatively high speed toward the commanded end points. When the respective axes come within about 0.063 inch of the respective end points, for example, the digital to analog converter stages of FIG. 1A provide a proportional analog error signal, and the machine axes in response to the diminishing magnitude of the analog error signal progressively slow down the respective axes. The linear region of the converter stage error signal as a function of count is such as to enable an overshoot of for example 0.063 inch without losing control of the axis. As soon as both axes remain in the vicinity of the required end point for the required time, the null director components such as X-axis null detector 110, FIG. 1B, signal the computer, for example via channel 627, machine-positioning interface component 628 and channel 629. Other operations of the computer 603 may thus be interrupted by means of a program interrupt signal from the interface 628, at which time the computer will energize the axis Hold component such as 115, FIG. 1B and read the contents of the associated counter chain. The stored program then may result in the combining of the remainder read from the counting chain with the new command in such a way as to compensate for any tolerance error in the preceding positioning cycle. Thus, if in the preceding cycle the X-axis had moved one count too far in the positive direction, and the next command were for a positive movement, this one count would be subtracted from the new positive command signal, and the result entered into the X-axis counting chain in the next cycle.

When both axes have sufficiently approached their end points to actuate the associated null detector circuits, the computer 603 is advised, for example via channels 627, 628, 629 and 631, 628, 629. The computer is then in a position to determine if a punch, tool change, or other operation should be initiated before a new positioning cycle takes place. Such commands may be transmitted as illustrated in FIGS. 9 and 11.

The computer may have a further stored program so as to enable the generation of new programs from the console 602 simultaneously with the machine control operation. This second stored program may greatly facilitate the generation of new programs, for example by automatically keeping track of block member, storing successive blocks without actually punching the same in a record tape, and advising the operator when he has programmed a move off the piece part. While the program being generated is stored in the memory of the computer, any items thereof may be recalled to the console 602 for modification or checking, and the computer may also provide arithmetical checks and the like. When desired, the operator can then signal the computer to read out the numerical control program so generated from its memory and enter the program on punched tape or the like. It has been found in practice that the assitance of a stored program in the computer during numerical control program preparation greatly speeds this operation.

FIG. 7

FIG. 7 shows the circuit actually employed for the null detector component 110, FIG. 1B. Potentiometers 7–P1 and 7–P2 are adjusted to enable operation of relay 181 for input voltages at 703 of relatively positive and relatively negative values, respectively. To adjust the potentiometers, a signal of the threshold vale corresponding to the plus or minus count limit desired is supplied at 703 and an oscilloscope is connected at the relevant test point 704 or 705. The associated potentiometer 7–P1 or 7–P2 is then adjusted until the signal at the test point shifts between a relatively positive potential and a relatively negative potential. Back and forth manual adjustment of the potentiometer in the neighborhood of the correct setting will cause the output at the test point to oscillate between the two potential levels, and the potentiometer may thus be set at substantially the critical setting which corresponds to the threshold level input. As previously described in connection with FIG. 1B, when both comparators 700 and 701 provide an enabling output level, the relay 181 will be energized signifying that the error count is between the desired plus and minus values (such as plus 3 and minus 3).

FIG. 8

FIG. 8 shows an exemplary circuit for relaxation oscillator 1108 of FIG. 11. The oscillators 414 and 415, FIG. 4, have comparable circuits but with components 8–R9, 8–R10, 8–C2 and 8–C3 selected to give the desired time constants for the respective circuits. Oscillator 1108 may be constructed to provide a delay of 100 milliseconds, for example, so as to preclude response in the case of momentary closure of the contacts 182 and 1130 (FIG. 11) of the X and Y null detector relays 181 and 1107.

FIG. 9

FIG. 9 shows certain relay circuitry and includes a pushbutton 922 for establishing "power on" condition, and a pushbutton 923 for shutting off power. A further pushbutton is shown at 924 controlling energization of relay 9–PM which controls punch motion. A further pushbutton 925 serves to disable punch motion. The computer may supply an enabling potential to line 930' for energizing relay 9–K2 controlling energization of punch solenoid 915.

It has been found important to provide arc-suppressing elements and damping circuits as indicated for example, at 911, 919, 920, 907, 912, 913, 916, 917 to avoid the generation of noise which might adversely affect the accuracy and reliability of the positioning operation. Steps were also taken to shield and remove critical signal lines from probable transient lines (especially those having inductive loads) and to run these transient lines e.g., servo armature and field, relays and solenoids, in twisted pairs to reduce electrical interference.

FIG. 10

FIG. 10 illustrates exemplary details of the tape reader interface component 601 of FIG. 6. A portion of the circuit is illustrated including conductors 1031–1036 which are detachably connected with circuits in the tape reader 600 known respectively as "OV" channel from which sprocket hole pulses are received, "run, stop, forward" channel, "run, stop, reverse" channel, "ground," "data channel 8," and "-data channel 7." Data channels 6 through 1 of the tape reader may be connected to circuits corresponding to the circuit 1022, 1015, 1007 (associated with data channel 8) for transmitting data to the computer via conductors such as indicated at 1041 (for data channel 8) and 1042 (for data channel 7). Conductors 1043 and 1044 connect with the program interrupt request bus 1120 (FIG. 11) and the skip input bus 1121 (FIG. 11) of the computer. See *The Digital Small Computer Handbook*, supra, pages 425, 430–431, and 435–436 for further details. When a line of data has been read into the register including components 1015 and 1016, the reader flag flip-flop 1014 is set normally to transmit an interrupt signal to the computer. The computer responds to the interrupt signal after completing the current instruction, storing the number of the next instruction in a predetermined memory location and proceeding to determine the cause of the interrupt signal. The computer may then respond by actuating selector components 1008–1010 (which constitute a single device selector Module W103). The 10T1 negative pulse on the output line from component 1008 serves to advise the computer of the status of reader flag 1014. The 10T2 negative pulse from component 1010 serves to interrogate the line of gates such as 1007, the information stored in the corresponding line of registers such as 1015 and 1016 being accepted by the computer if reader flag component 1014 indicates that new information is present (via skip conductor 1044). The 10T2 positive-going pulse from component 1010 may be supplied to conductor 10T2 to "reset" or "clear" the reader flag flip-flop 1014. (The 10T12 conductor may connect with terminal AL of the commercial Module type W103 previously referred to.) The 10T4 positive-going pulse from component 1009 then serves to rest register components 1015 and 1016, and to insure that reader flag component 1014 is reset. It also serves to clear or reset feed start flip-flop 1000, and to set reader-run flip-flop 1013. An enabling potential is then supplied at conductor 1032 to restart the tape reader which then transmits another line of data, and a further sprocket pulse to conductor 1031 which serve to again reset the reader-run flip-flop 1013 and to set the reader flag flip-flop 1014 to repeat the cycle.

FIG. 11

FIG. 11 illustrates the manner in which the computer may be controlled to cyclically scan for interrupt conditions. Transformer 1117 may supply alternating current of commercial frequency such as 60 cycles per second clock trigger 1112 which thus under normal operating conditions will serve to set the status flag flip-flop 1113, 60 times per second. The "set" output of status flag component 1113 is supplied to the computer via inverter 1103 and conductor 1120 so as to place the computer in the interrupt mode, the computer then completing the current instruction, storing the address of the next instruction of the regular program in memory, and proceeding to scan the various flag flip-flops such as status flag component 1113, FIG. 11, and reader flag component 1014, FIG. 10.

The manner in which the status of various flip-flops may be read into the computer in response to an interrupt signal is typified by the example of the move flip-flop 1114. When an interrupt signal has been received, the computer may actuate read selectors such as 1111 and 1112 which may enable gates such as indicated at 1105 and 1119 to transmit the status of twelve different flip-flops, for example, via computer input cable 197, FIG. 3. Thus conductor 1122 at the output of NAND-gate 1105 may lead to terminal AC4 of the accumulator of the computer.

The "clear" or "reset" output of flip-flop 1113 partially enables NAND-gate 1119 when the flip-flop is reset. When the selector 1118 is selected by the computer (by means of the BMB cable 280), the 10T1 pulse of negative polarity which is transmitted to gate 1119 from the selector 1118 causes a positive pulse to be transmitted from the output of gate 1119 to the computer 603 via conductor 1121. The 12-bit word thus transmitted to the accumulator is compared with the previously transmitted word which has been stored in the computer memory, by subtracting the one word from the other. If the result is zero, then there has been no change in status. If the result is of some other value, then by assigning the input signals different predetermined binary weights, the computer can determine which of the flip-flops such as move flip-flop 1114 has signalled a change in status.

As soon as the computer has responded to the call for interrupt service, for example responding to the completion of a positioning movement by setting punch flip-flop 935, FIG. 9, which controls the punch solenoid 915, FIG. 9, the computer may resume its normal operation by transferring the next instruction location from its memory and proceeding with the execution of this instruction.

The manner in which the computer may direct operations of the system in response to input commands is also illustrated in FIG. 11. Thus the output bus cable 130 from component 201, FIG. 2, is shown having a connection with an input gate of the move flip-flop 1114 and of the side gauge flip-flop 1106. For example, terminal BAC4 may connect with the gate leading to move flip-flop 1114 and terminal BAC7 may connect with the gate leading to the set input of side gauge flip-flop 1106. Thus if the associated register in the computer provides an enabling potential at terminal BAC4 and then actuates selector circuits such as 1109 and 1110, the move flip-flop 1114 will be set, and a ground level will appear at reset output 1140.

When contact 182 of the X-axis null detector relay 181 and contact 1130 of the Y-axis null detector relay 1107 have been simultaneously closed for the requisite time interval, oscillator component 1108 will be effective to reset the move flip-flop 1114. This new condition of the move flip-flop 1114 will then be detected by the computer at the next interrupt service cycle.

Similarly, the computer might provide an enabling potential at terminal BAC7 and then actuate the selector 1109 so as to energize side gauge flip flop 1106 which controls side gauge solenoid 11–K3. Relay 11–K3 is shunted by a resistor 1131 having a value of 100 ohms and a capacitor 1132 having a value of 1 microfarad in series, and is also shunted by a diode 1133 to avoid the generation of noise in the critical components of the system.

A manually operable switch is indicated at 1140 having three positions "manual," "step" and "automatic." When the selector switch 1140 is in the manual position, a manual side gate switch 1141 may be actuated to energize the side gauge relay 11–K3. The circuitry of FIG. 11 will be sufficient to indicate those skilled in the art the manner in which the circuitry may accommodate either command signals from the computer or manual commands directly by the operator of the punch press. The components of FIG. 11 are typical of the circuitry which may be represented by the machine positioning interface component 628 of FIG. 6. The interface 628 may also include components such as selector 115 shown at the upper right in FIG. 4 and flip-flop 413 for generating the "-Hold X Clock" signal at line 432, for example.

FIG. 12

FIG. 12 illustrates a numerical control system wherein a stored program digital computer 1200 such as the Digital Equipment Corporation PDP–8 or PDP–8S computer services a plurality of machine tools such as the machine tool system represented by components 1201–1210 and the machine tool system represented by components 1221–1230. The computer 1200 may further service a first console 1231 in the normal manner as described in the publication reference DEC–B.

FIG. 12 also illustrates how a second console 1232 may be serviced by the computer 1200 which the aid of a device selector 1233. Thus the console 1232 may be included in the stations scanned by the computer 1200 during each interrupt cycle, and the computer may communicate with console 1232 by actuating the device selector 1233 whenever this console requires service.

FIG. 12 thus illustrates the extreme flexibility of the numerical control system contemplated herein. For example, additional machines or consoles may be added to a system in the field whenever the need arises.

FIG. 13

FIG. 13 illustrates how the control system may effect a tool change in response to a command from punched tape, for example. Thus, in response to a command from the punched tape input, the computer may load a bit in its output register for delivery via conductor BACO of cable 130 to a flip flop 1301 which when actuated serves to step a tool positioning device to a predetermined position. A suitable device selector 1302 (with octal code number 6671, for example) is then actuated to set the flip-flop 1301, and the flip-flop 1301 in its set condition enables the tool positioning means including amplifier 1303 and step by step solenoid drive 1304 until the flip-flop 1301 is reset by the tool associated with the flip-flop reaching the operating position. Specifically when the selected tool reaches operating position, switch 1305 closes and causes trigger circuit 1306 to transmit a reset pulse to flip-flop 1301.

Examples of Computer Operation in Machine Control Mode

The following tables C1 and C2 will concretely illustrate computer operation to adaptively compensate succeeding commands for any previous positioning errors.

TABLE C1.—X-AXIS (POSITIVE ERROR)

| | | |
|---|---|---|
| Error | 0 1 0 0 0 0 0 0 0 0 0 0 : 0 0 0 0 0 | +2 |
| New Move | 0 0 0 0 1 0 0 0 0 0 0 0 : 0 0 0 0 0 | +16 |
| Add Error & New Move for Lower X-Axis | 0 1 0 0 0 0 0 0 0 0 0 0<br>0 0 0 0 1 0 0 0 0 0 0 0    Link | +18 |
| | 0 1 0 0 1 0 0 0 0 0 0 0    (0) | |
| Add Upper Error & Link | 0 0 0 0 0<br>0 | |
| | 0 0 0 0 0 | |
| Add Upper New Move & X-Axis to Error Link Sum | 0 0 0 0 0<br>0 0 0 0 0 | |
| | 0 0 0 0 0 | |
| New Corrected Move | 0 1 0 0 1 0 0 0 0 0 0 0 / 0 0 0 0 0 | +18 |

TABLE C2.—X-XIS (NEGITIVE ERROR)

| | | |
|---|---|---|
| Error | 0 1 1 1 1 1 1 1 1 1 1 1 : 1 1 1 1 1 | −2 |
| New Move | 0 0 0 0 1 0 0 0 0 0 0 0 : 0 0 0 0 0 | +16 |
| Add Error & New Move for Lower X-Axis | 0 1 1 1 1 1 1 1 1 1 1 1    Link<br>0 0 0 0 1 0 0 0 0 0 0 0    (1) | +14 |
| | 0 1 1 1 0 0 0 0 0 0 0 0 | |
| Add Upper error & Link | 1 1 1 1 1<br>1 | |
| | 0 0 0 0 0 | |
| Add New Move Upper X-Axis to Error Link Sum | 0 0 0 0 0<br>0 0 0 0 0 | |
| | 0 0 0 0 0 | |
| New Corrected Move | 0 1 1 1 0 0 0 0 0 0 0 0 / 0 0 0 0 0 | +14 |

Summary of Features

An important objective of the present invention has been to provide a computerized punching machine control for the average metalworking shop. The control system is capable of simultaneous computer-assisted piece-part programming and machine tool control, as well as additional highly significant functions. For example, absolute position readout devices such as 450, FIG. 4, may be connected to outputs such as the XM (complement) and XP (complement) outputs of FIG. 4 so as to provide absolute position information with respect to the X and Y axes at each successive tool location. This provides for the verification of the numerical control program tape and also for piece-part verification. The computer program may provide for the execution of any desired auxiliary functions such as a punch operation as represented in FIG. 9 and side gauge control as indicated in FIG. 11. Other desired operations such as tool change and the like can be handled as represented for the case of side gauge operation in FIG. 11. Thus, as illustrated in FIG. 13, in response to a command from punched tape, the computer may load a bit in its output register for delivery via conductor 130 to a flip-flop 1301 which when actuated serves to step a tool positioning device to a predetermined position. A suitable device selector 1302 is then actuated to set the flip-flop, and the flip-flop in its set condition enables the tool positioning drive until the same is reset by the tool associated with the flip-flop reaching the operating position.

Because of the low cost and great versatility of the system, it is particularly well suited for small job shops as well as in-plant metal fabrication departments. At present, metalworking shops are faced with the necessity of buying a machine tool, a numerical control, tape preparation equipment, and program and part verification equipment. Although machine downtime especially on short run production, is drastically reduced through the application of conventional numerical control, the relationship between real machine time and off-line tape preparation, verification and inspection time has remained disproportionate.

Some of the significant advantages of the present computer control system are as follows.

1. The computer control is one complete unitized device. It eliminates the need for the usual off-line equipment. Immediately upon delivery, it is ready for use by average shop personnel (without special training).

2. The computer control is inexpensive. When compared in cost and performance to the auxiliary equipment it replaces (i.e., tape preparation and verification equipment, machine controller and the usual part inspection equipment), the computer control is actually less costly. There is the further important fact of the additional flexibility of the versatile digital computer.

3. The computer control is capable of performing two or more jobs at one time. Because of the built-in ability of the control to operate simultaneously, through time-sharing, the control can be operating a punching machine while a programmer is remotely and simultaneously putting data into the computer for generating another program.

4. The control has dual EIA/ASCII capabilities. For example, data in ASCII code is entered into the control and automatically converted to EIA coded punched tape. Tapes prepared in either code can be read by the control and utilized to generate the digital command signals for the servosystems.

5. Parts can be randomly programmed employing either incremental or absolute dimensions, or a combination of both. Both incremental and absolute data can be fed to the computer control. It will automatically convert any data input into the required machine format. The control automatically calculates and converts all position data into both incremental and absolute dimensions, and prints out a hard copy thereof as a program verification with each block separately identified.

6. Data input from the computer console in generating numerical control programs results in enabling the programming operation to take place at least twice as fast as is done by any other commercially available tape preparation method. The flexibility of the digital-type computer, combined with a simplified input, makes programming twice as fast. All repetitive or common operations are automatically programmed. Recognized errors are electronically corrected without repair or scrapping of tape, thus further saving time.

7. The control improves machine speed and accuracy. A combination of control features allows for a greater range of acceleration, deceleration and unlimited overshoot, improving both machine speed and accuracy.

8. The control can be programmed to assist in trouble shooting, and the computer itself is also equipped with a self-diagnostic program. Thus, the control automatically checks, isolates trouble spots and identifies them through print-outs at the console and thereby simplifies repair.

Basically, the control performs the function of a solid state digital computer and a solid state machine numerical control. It thus forms a "total capabilities" hole-punching and notching system. Total responsibility for the "package," that is, installation, service, initial programming instruction and standard programs may rest with the supplier of the system. This relieves the user of the time-consuming, costly job of dealing with several unrelated suppliers.

The computer itself being a general purpose digital computer is resistant to technical obsolescence, and may be readily programmed to take advantage of new techniques and to perform new functions. In addition, the control offers the flexibility of being used either to operate multiple punching machines (each producing a different part) as illustrated in FIG. 12, or being used with additional tape preparation stations, all operating simultaneously, as is also illustrated in FIG. 12. The control can also be used to operate multiple punching machines and to service additional tape preparation stations at the same time, as is also illustrated in FIG. 12. An additional console and/or an additional servosystem may be added to the system in the field as the need arises.

It will be apparent that many modifications and variations may be effected without departing from the scope of the novel concepts of the present invention.

Description of a Preferred Embodiment

FIGS. 14–18 illustrate the modifications of the embodiment of FIGS. 1–11 which have been made in the production of a commercial system now in successful operation.

In FIG. 14, conventional logic symbols have been utilized so that the operation of the circuit will be apparent to those skilled in the art. The inputs to the various gate circuits have been labeled in conformity with the designations of the outputs from the counting stages of FIGS. 1A and 1B (note the designations XL5 and $\overline{XL5}$ for counter stage XL5 and the similar designations indicated for stages XL0, XU11 and XU0 which are indicated in FIGS. 1A and 1B as typical examples). Thus, when the counter stage XL11 is in a "ONE" indicating condition, an output voltage of minus 3 volts appears at the "1" output terminal so that the output XL11 is "TRUE," and the "0" output $\overline{XL11}$ is "FALSE." Conversely, when the counter stage XL11 is in the "ZERO" representing condition, the output terminal $\overline{XL11}$ will be at minus three volts, and the "1" output XL11 will be at ground potential.

The tables D1 and D2 on the following pages will illustrate respectively the count values at which the various outputs in FIG. 14 will assume their "TRUE" condition, and the analog outputs from FIG. 15 as a function of different count values.

For the sake of a specific example, the various components in FIGS. 14–17 have been given suitable reference numerals, and certain commercially available components for carrying out the desired functions have been indicated in tables XII–XV which follow tables D1 and D2.

Table D1—Critical Count Ranges in FIG. 14

| Converter Control Output | Range of is "TRUE" (−3 Volts) | Counts for Which Output |
|---|---|---|
| *(Positive Counts)* | | |
| High X-Limit | 384 | through 65535 |
| High X-Limit | Zero | through 383 |
| Prop X-Limit | Zero | through 63 |
| Low X-Limit | Zero | 1, 2, 3 |
| Prop X-Jam | 64 | through 383 |
| Low X-Jam | 4 | through 383 |
| *(Negative Counts)* | | |
| High X-Limit | −385 | through −65536 |
| High X-Limit | −1 | through −384 |
| Prop X-Limit | −1 | through −64 |
| Low X-Limit | −1, | −2, −3, −4 |
| Prop X-Jam | −65 | through −384 |
| Low X-Jam | −5 | through −384 |

TABLE D2.—ANALOG OUTPUT IN FIG. 15 (IN ARBITRARY UNITS) AS A FUNCTION OF COUNT

| Count range | Input to Converter Unit (N=−3 volts) (G=ground) | | | | | | Analog Output |
|---|---|---|---|---|---|---|---|
| | 1 | 2 | 4 | 8 | 16 | 32 | |
| 384–65535 | N | N | N | N | N | G | 32 |
| 64–384 | G | G | G | G | G | G | 63 |
| 48–62 | G | G | N | G | G | G | 59 |
| 40–47 | G | G | G | N | G | G | 55 |
| 32–39 | G | G | N | N | G | G | 51 |
| 24–31 | G | G | G | G | N | G | 47 |
| 16–23 | G | G | N | N | N | G | 43 |
| 8–15 | G | G | G | N | N | G | 39 |
| 3–7 | G | G | N | N | N | G | 35 |
| 2 | N | G | N | N | N | G | 34 |
| 1 | G | N | N | N | N | G | 33 |
| 0 | N | N | N | N | N | G | 32 |
| −1 | G | G | G | G | G | N | 31 |
| −2 | N | G | G | G | G | N | 30 |
| −3 | G | N | G | G | G | N | 29 |
| −4 – −8 | N | N | G | G | G | N | 28 |
| −9 – −16 | N | N | N | G | G | N | 24 |
| −17 – −24 | N | N | G | N | G | N | 20 |
| −25 – −32 | N | N. | N | N | G | N | 16 |
| −33 – −40 | N | N | G | G | N | N | 12 |
| −41 – −48 | N | N | N | G | N | N | 8 |
| −49 – −64 | N | N | G | N | N | N | 4 |
| −65 – −384 | N | N | N | N | N | N | 0 |
| −385 – −65536 | N | N | N | N | N | G | 32 |

\* Bias=−32 units.

TABLE XII (FIG. 14)

| Component Ref. No. | Component Description | DEC Module Designation |
|---|---|---|
| 1401, 1402 | NAND Gates | R113 |
| 1403, 1404 | Diode Networks | R002 |
| 1405, 1406 | NAND Gates | R111 |
| 1407 | (Conductors from 1405 and 1406 connected directly to input of 1408) | |
| 1411–1414 | Diode Networks | R002 |
| 1415, 1416 | NAND Gates | R111 |
| 1417 | (Outputs of 1415 and 1416 connected to input of 1418) | |
| 1408, 1418 | Inverters | R111 |
| 1421–1423 | Diode Networks | R002 |
| 1424, 1425 | NAND Gates | R111 |
| 1426 | (Outputs of 1424 and 1425 connected directly to the input of 1427) | |
| 1427 | Inverter | R111 |
| 1431 | Diode Network | R002 |
| 1432–1434 | NAND Gates | R111 |
| 1435, 1436 | Inverters | R107 |

TABLE XIII (FIG. 15)

| Component Ref. No. | Component Description | DEC Module Designation |
|---|---|---|
| 1501, 1502 | Converter Stages | A601 |
| 1503–1511 | Resistance values of 1000 ohms, 7000 ohms, 8000 ohms, 4000 ohms, 2000 ohms, 7000 ohms, 8000 ohms, 4000 ohms, and 2000 ohms, respectively | |
| 1512–1517 | Amplifiers | |
| 1521 | Resistance value of 100 ohms, two watts | |
| 1522 | Zener Diode 1N3732 | |
| 1531 | X gain potentiometer, 0 to 1000 ohms, two watts | |
| 1532 | Resistance value 330 ohms, one half watt | |
| 1533 | Resistance value 100 ohms, one half watt | |
| 1534 | X Zero potentiometer, 0 to 500 ohms, two watts | |
| 1535 | Resistance value 1800 ohms, one half watt | |
| 1541–1546 | A direct conductive connection is utilized to perform the logical "OR" function as in Fig. 14 | |
| 1551–1562 | NAND Gates | R111 |

TABLE XIV (FIG. 16)

| Component Ref. No. | Component Description | DEC Module Designation |
|---|---|---|
| 1601–1603 | Diode Networks | R002 |
| 1604–1607 | NAND Gates | R111 |
| 1611, 1612 | Diode Networks | R002 |
| 1620 | Relay Circuit | W800 |
| 1621, 1622 | NAND Gates | |
| 1623, 1624 | Relay Energizing Coils | |
| 1625, 1626 | Normally open contacts of relays 1623 and 1624 respectively. | |
| 1631 | Resistance value 1500 ohms, one half watt. | |
| 1632 | X balance potentiometer, zero to 1000 ohms, two watts. | |
| 1633 | X rapid potentiometer, zero to 10,000 ohms, two watts. | |
| 1641–1644 | Switch Filters | W700 |
| 1651–1654 | Inverters | R107 |
| 1661, 1662 | Diode Networks | R002 |
| 1663, 1664 | NOR Gates | R111 |
| 1670 | Relay | W800 |

TABLE XIV (FIG. 16)

| Component Ref. No. | Component Description | DEC Module Designation |
|---|---|---|
| 1671, 1672 | NAND Gates | |
| 1673, 1674 | Relay Coils | |
| 1675, 1676 | Normally open contacts of relays 1673 and 1674, respectively. | |

TABLE XV (FIG. 17)

| Component Ref. No. | Component Description | DEC Module Designation |
|---|---|---|
| 1700 | Transformer with 117 volt alternating current primary, 2.3 kilovolt ampere. | |
| 1701, 1702 | Conductors connected to terminals of secondary winding of 1700 with a filter connected across the secondary winding between 1701 and 1702. | |
| 1703, 1704 | Conductors connected to opposite terminals of a secondary winding with filter thereacross. | |
| 1705, 1706 | Conductors connected to opposite terminals of a full wave rectifier energized by a secondary winding of the transformer of 1700 so that conductor 1706 is of negative polarity. | |
| 1711, 1712 | Servo preamplifiers | A-110973* |
| 1721, 1722 | X and Y tachometers | |
| 1723 | Balance switch | |
| R2, R11 | Resistance values 2000 ohms each, two watts. | |
| R4, R10 | Resistance values 4000 ohms each, five watts | |
| R3, R9 | Potentiometer, zero to 2500 ohms, ten watts. | |
| L1, L2 | Inductance values, 4.5 henries each | |
| R5, R23, R8, R24 | Resistance values 1500 ohms each, two watts. | |
| R6, R7 | Resistance values 3 ohms each 100 watts. | |
| CR-3, CR-4, CR-5 and CR-6 | Controlled rectifiers 2N686 | |
| 1731, 1732 | X and Y armatures | |
| 1733, 1734 | X and Y fields | |

*Supplied by Hughes Aircraft Company.

Interconnections Between FIGS. 14–18

To assist in identifying the connections between FIGS. 14 and 15, reference numerals 1441–1447 have been assigned in FIG. 14 and conductors 1441–1444, 1446 and 1447 are also indicated in FIG. 15. Conductor 1441 also connects with one input of component 1602, FIG. 16. Conductor 1444 also connects with an input of component 1802, FIG. 18. Conductor 1445 connects with an input to NOR-gate 1663, FIG. 16.

Conductor 1537 at the right in FIG. 15 connects with the movable tap of potentiometer 1633, FIG. 16. Conductor 1538 at the right in FIG. 15 connects with an input to the X-axis servo preamplifier 1711, FIG. 17.

In FIG. 16, certain Y-axis components corresponding to components 1601–1612, 1620–1626, 1631–1633 of the X-axis, have been omitted as merely duplicating the X-axis components. As indicated at 1681, the Y-axis components would include MAN OUT and MAN IN switches similar to the MAN LEFT and MAN RIGHT switches 1682 and 1683. Conductor 1684 for the Y-axis components corresponds to conductor 1685. The conductor 1686 (INHIBIT MOVE) would connect to the Y-axis diode networks corresponding to 1611 and 1612.

In FIG. 16, at high limit counts, the relay 1620 serves to supply a saturating current of proper polarity to the conductor 1537, FIG. 15, to saturate preamplifier 1711, FIG. 17, with the proper polarity to correct for the existing error.

The operation of the various Y-axis circuits corresponds to that explained for the X-axis.

Figure 18:
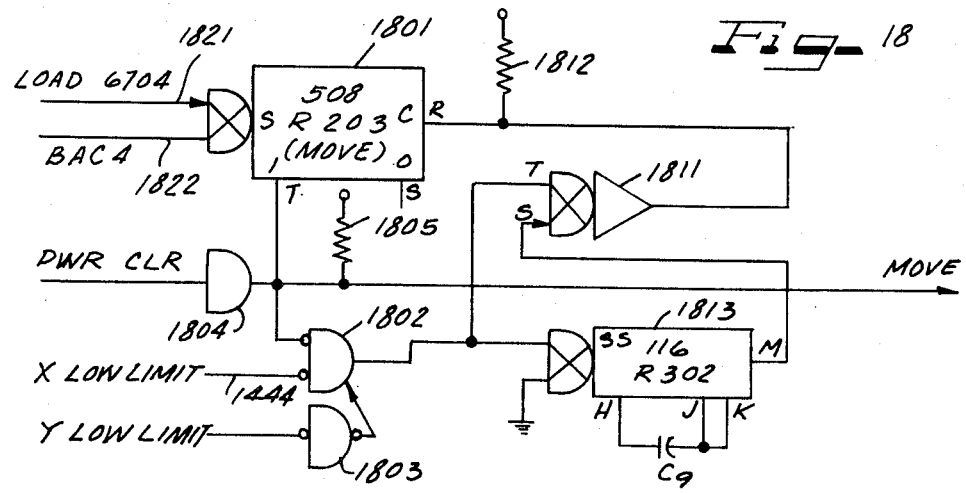
FIG. 18 is a diagrammatic showing of the control circuit for the MOVE flip-flop in the commercial system.

In FIG. 18, the monostable 1813 may use a capacitor C9 of 38 microfarads. The circuit 1813 may be adjusted to provide a time delay of approximately 100 milliseconds, so that both the X and Y low limit inputs must be "TRUE" for at least 100 milliseconds before the MOVE flip-flop 1801 is reset.

Excerpts From Operation Manual

The following excerpts from the operation manual for a commercial computer control system in accordance with the present invention will assist in understanding the practical construction and operation of the invention. The subject matter of sections 1 and 2 following refers to the commercial system. In section 2, reference numerals have been inserted referring to the drawings so that this section will serve also to summarize the operation of the illustrated embodiment.

SECTION 1—OPERATION AND PROGRAMMING INSTRUCTIONS 1.1—General:
This section contains operating and programming instructions for a commercial Computer Control System in accordance with the present invention. Prior to operating the system it is advisable to become familiar with the system, and the controls and indicators.

1.2—Control and indicator description:

| Control or indicator | Function |
|---|---|
| Machine control module: | |
| SYSTEM ON | Pressing the SYSTEM ON SWITCH applies power to the Machine Control Module. |
| SYSTEM OFF | Removes power from the Machine Control Module. |
| MACHINE ON | Pressing the MACHINE ON switch applies power, through relays, to the Machine Tool. |
| MACHINE OFF | Removes power from the Machine Tool. |
| MANUAL MODE | For manual operation of the High Speed Tape Reader (loading and winding) and for manual operation of the machine tool using the X, Y and PUNCH switches. |
| TYPE MODE | Pressing the TYPE MODE switch permits the use of the console typewriter for the addition of X and Y data on an existing piece part program. |
| STEP MODE | The STEP MODE permits the system to interpret one block of tape and execute the command. |
| AUTO MODE | For AUTOMATIC Operation of the MACHINE TOOL, and simultaneous operation of the console typewriter in any move. |
| X LEFT | Permits X LEFT positioning of the MACHINE TOOL, in the MANUAL MODE. |
| X RIGHT | For X RIGHT positioning of the MACHINE TOOL, in the MANUAL MODE. |
| Y IN | Permits Y IN positioning of the MACHINE TOOL, in the MANUAL MODE. |
| Y OUT | For Y OUT positioning of the MACHINE TOOL, in the MANUAL MODE. |
| DATA RESET | Pressing the DATA RESET switch clears the control registers. |
| TAPE START | The TAPE START starts the High Speed Tape Reader and starts Auto Operation. |
| TAPE ERROR (Indicator) | Indicates a TAPE (PARITY) ERROR. The computer will sense an error and stop the system. |
| TAPE STOP | Stops High Speed Tape Reader operation and Auto Operation. |
| X RESET | Resets the X Axis Absolute Readout counters to zero (optional item). |
| Y RESET | Resets the Y Axis Absolute Readout counters to zero (optional item). |
| FWD-NORM-REV | Switch for High Speed Tape Reader FWD and REV during MANUAL MODE, NORM for Normal AUTO MODE or STEP MODE operation. |
| Computer Module: | |
| POWER SWITCH | In the counterclockwise position this key-operated switch removes primary power from the computer, and in the clockwise position applies power. |
| PANEL LOCK | When this key-operated switch turned clockwise, all keys and switches except the SWITCH REGISTER are disabled. In this condition the program can not be disturbed by inadvertent key operation. With this switch turned counterclockwise all keys and switches function normally. |
| DATA FIELD AND INSTR. FIELD. | Used with accessory computer memory. |
| | NOTE: These six keys should remain in the DOWN position during normal operation. |
| SWITCH REGISTER | The twelve binary bits are used to set-up the proper computer address. The Control Program uses an 0400 address. |
| START | Starts the computer program. |

| Control or indicator | Function |
|---|---|
| LOAD ADD | This key is used to apply the Load Address to the program counter. |
| DEP | The DEP key is used to deposit the contents of the Switch Register into the computer memory unit as specified by the program counter. |
| EXAM | Examines the contents of the memory address as specified by the program counter. |
| STOP | Stops computer. |
| CONT | Starts computer if computer was in STOP position. |
| SING STEP AND SING INST. | These keys are used for single instr. and debugging a computer program. NOTE: These keys should normally be in the DOWN position. |
| DATA FIELD (indicators and switches). | The indicators denote the content of the data field register (DF) and the switches serve as an extension of the SR to load the DF by means of the LOAD ADDRESS key. The DF determines the core memory field of data. |
| INST FIELD (indicators and switches). | The indicators denote the content of the instruction filed register (IF) and the switches serve as an extension of the SR to load the IF by means of the LOAD ADDRESS key. The IF determines the core memory from which instructions are to be taken. |
| PROGRAM COUNTER (indicators). | Indicate the content of the PC. When the machine is stopped, the content of the PC indicates the core memory address of the first instruction to be executed when the START KEY is operated. The instruction to be executed after the CONTINUE KEY is operated is currently sitting in the MB, and PC indicates the next instruction to be executed. |
| MEMORY ADDRESS (indicators). | Indicate the content of the MA. Usually the content of the MA denotes the core memory address of the word currently or previously read or written. After operation of either the DEPOSIT or EXAMINE key, the content of the MA indicates the core memory address at which information was just written or read. |
| MEMORY BUFFER (indicators). | Indicate the content of the MB. Usually the content of the MB designates the word just read or written at the core memory address held in the MA. |
| ACCUMULATOR (Indicators). | Indicates the content of the AC. |
| LINK (indicators). | Indicates the content of the L. |
| Instruction Indicators (AND, TAD, ISZ, DCA, JMS, JMP, IOT, OPR). FETCH, INDEX. DEFER, EXECUTE, END AND BREAK indicators. | Indicate the decoded output of the IR as the instruction currently in progress. Indicate the primary control state of the machine and that the current processor cycle is a Fetch, Index, Defer, Execute, End or Break cycle, respectively. |
| ION (indicator). | Indicates the "ONE" status of the INT. ENABLE flip-flop. When lit, the program in progress can be interrupted by receipt of a Program Interrupt Request signal from an I/O device. |
| PAUSE (indicator). | Indicates the "ONE" status of the PAUSE flip-flop when lit. A memory request sets the PAUSE flip-flop to inhibit advance of the processor timing generator. The PAUSE flip-flop is automatically reset by the memory when a memory cycle has been completed and the data has either been removed from the memory or loaded from memory into the memory buffer. |
| Activated only on systems containing the Memory Extension Control option. | |
| RUN (Indicator). | Indicates the "ONE" status of the RUN flip-flop. When lit, the internal timing circuits are enabled and the machine performs instructions. |
| Console Typewriter Module: REL. | Disengages the tape in the punch |

| Control or indicator | Function |
|---|---|
| (pushbutton). | to allow tape removal or tape loading. |
| B. SP (pushbutton). | Backspaces the tape in the punch by one space, allowing manual correction or rub out of the character just punched. |
| OFF and ON (pushbutton). | Control use of the tape punch with operation of the typewriter keyboard printer. |
| START/STOP/FREE (switch). | Controls use of the tape reader with operation of the typewriter. In the lower FREE position the reader is disengaged and can be loaded or unloaded. In the center STOP position the reader mechanism is engaged but de-energized. In the upper START position the reader is engaged and operated under program control. |
| KEYBOARD | Provides a means of printing on paper in use as a typewriter and punching tape when the punch ON pushbutton is pressed, and provides a means of supplying input data to the LINE/OFF/LOCAL switch is in the LINE position. Provides input media to machine in type mode. |
| LINE/OFF/LOCAL (switch). | Controls application of primary power in the console typewriter and controls data connection to the processor. In the LINE position the typewriter is energized and connected as an I/O device of the computer. In the OFF position the typewriter is de-energized. In the LOCAL position the typewriter is energized for offline operation, and signal connections to the processor are broken. |

The console typewriter module provides both a manually operable keyboard and a coded record device for punching new tapes and for reading previously prepared tapes. The console typewriter as indicated at 3703 in FIG. 37 thus includes a manually operable line-type character generator (for example the keyboard) for generating successive lines of coded input signals, the end of each line being signalled by actuation of the carriage return. The console typewriter module 3703 further includes a display device (provided by the printout capacity of the typewriter) which includes a display region where the successive characters generated in a single line operation of the character generator are displayed as a horizontal line on the display region.

(See the example of actual block print out hereinafter.)

Figure 19:
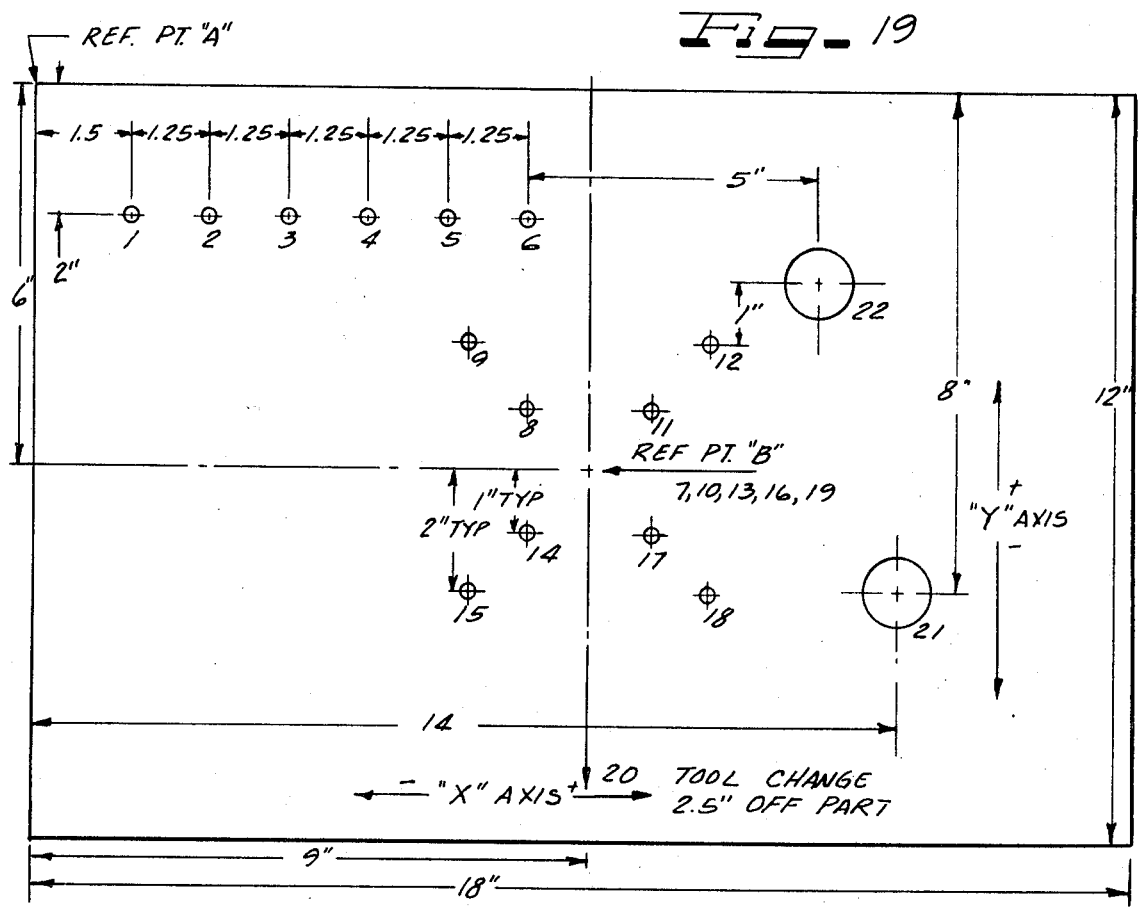
FIG. 19 is a plan view showing an exemplary piece part and is used in explaining piece part programming with the commercial system.
Figure 20:
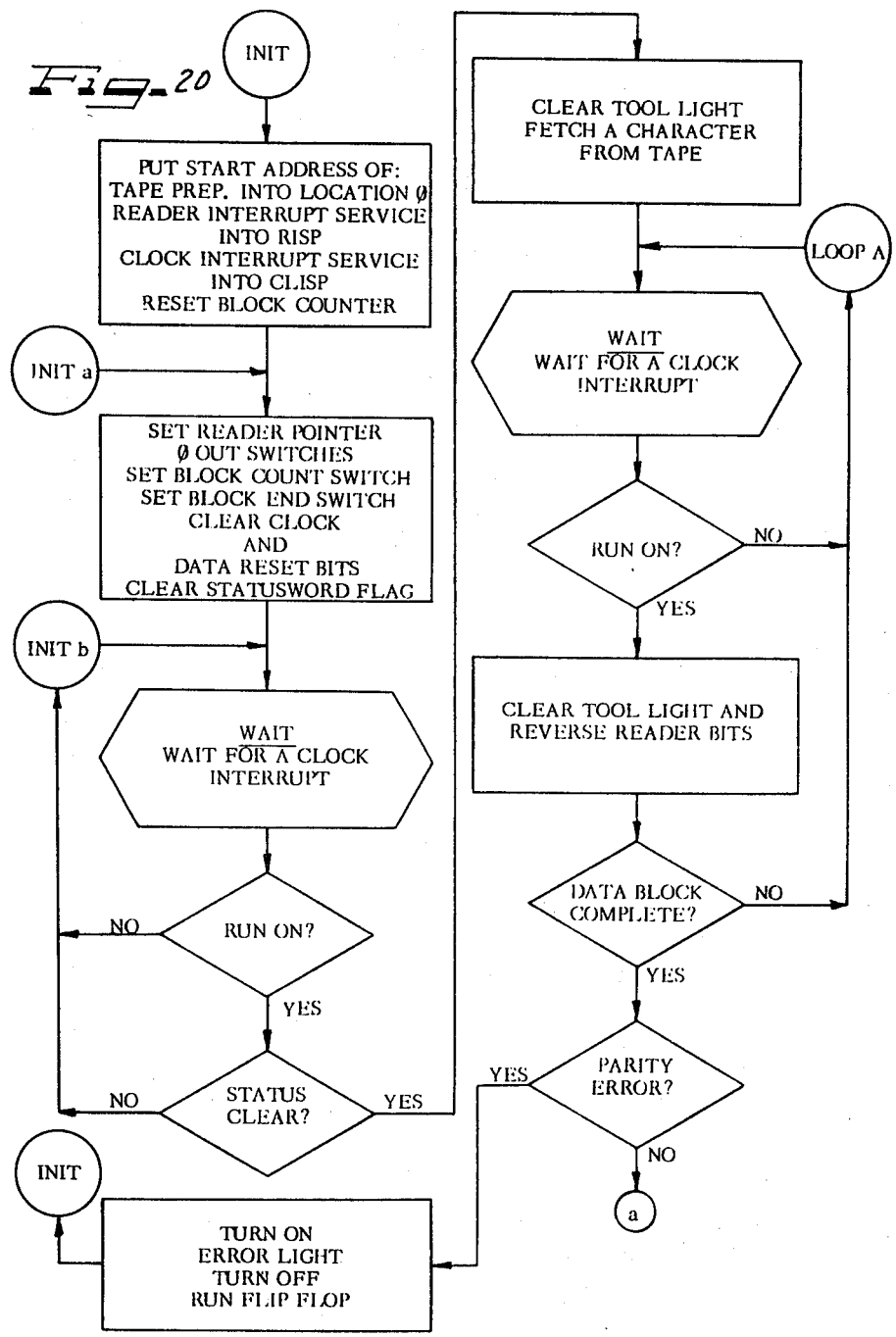
FIG. 20 is a flow diagram illustrating a portion of the control loop for controlling the commercial system.
Figure 23:
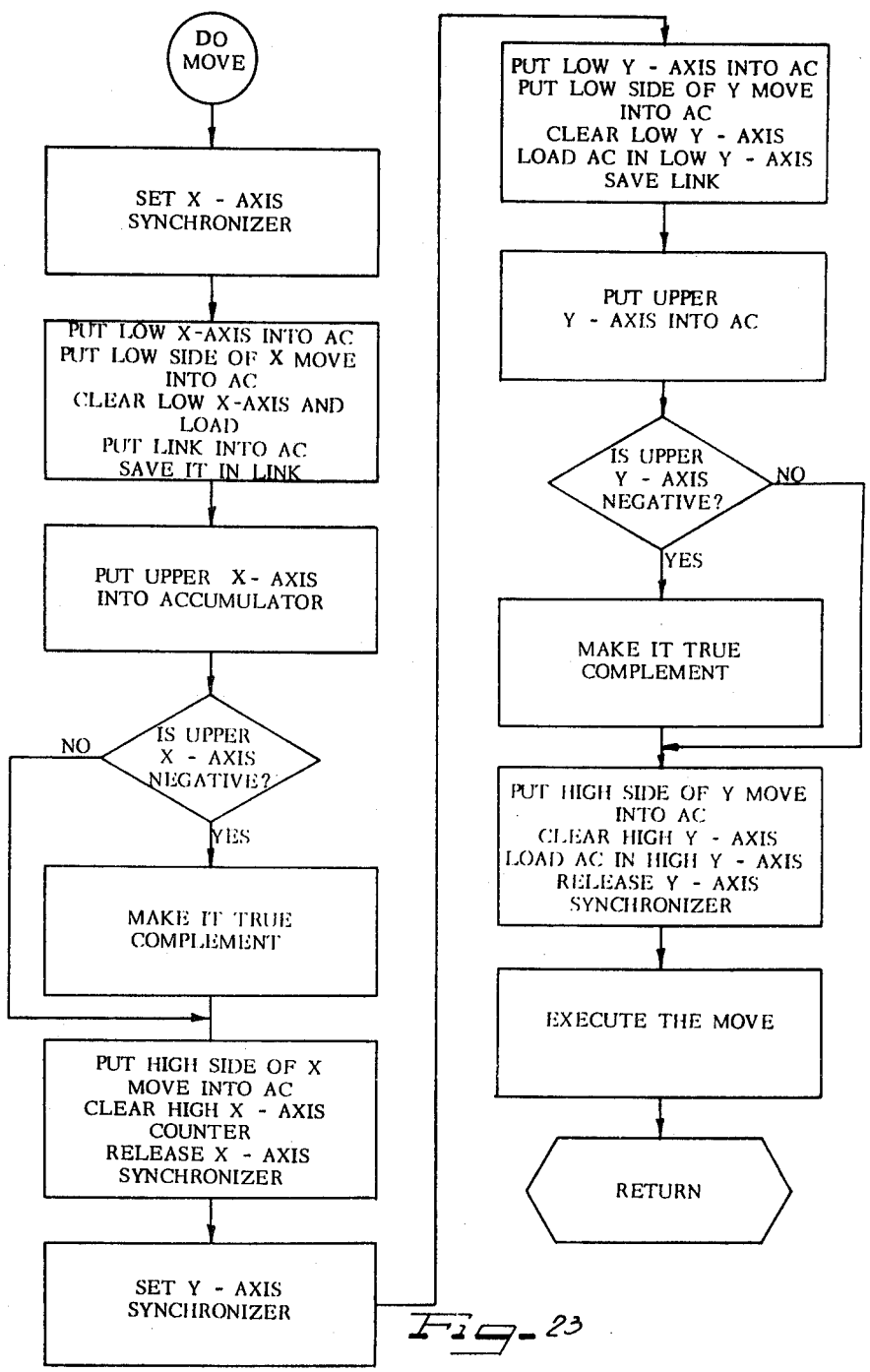
FIG. 23 is a flow diagram illustrating a subroutine for executing a displacement command.
Figure 24:
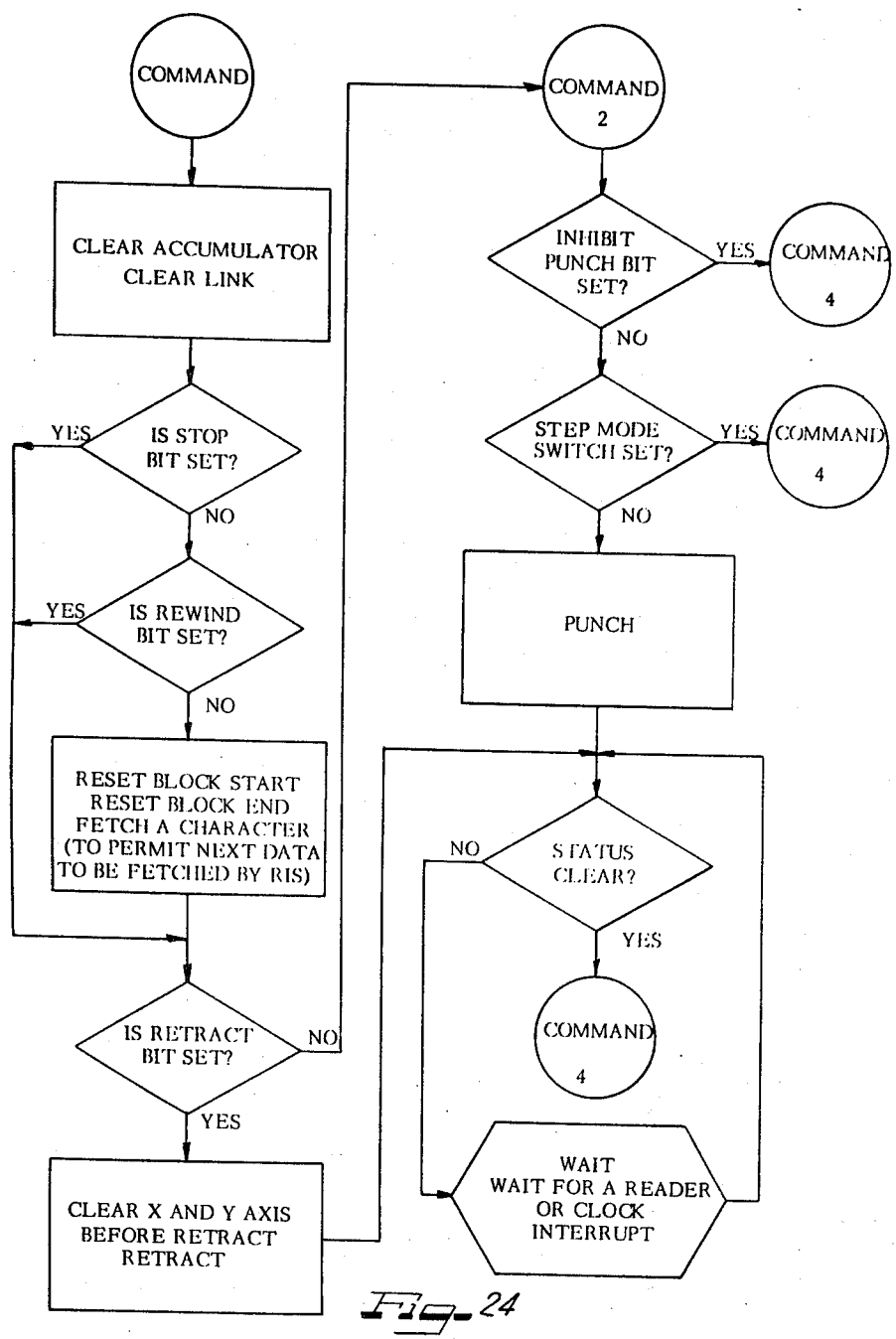
FIG. 24 is a flow diagram illustrating a portion of a subroutine for executing special and light commands.
Figure 25:
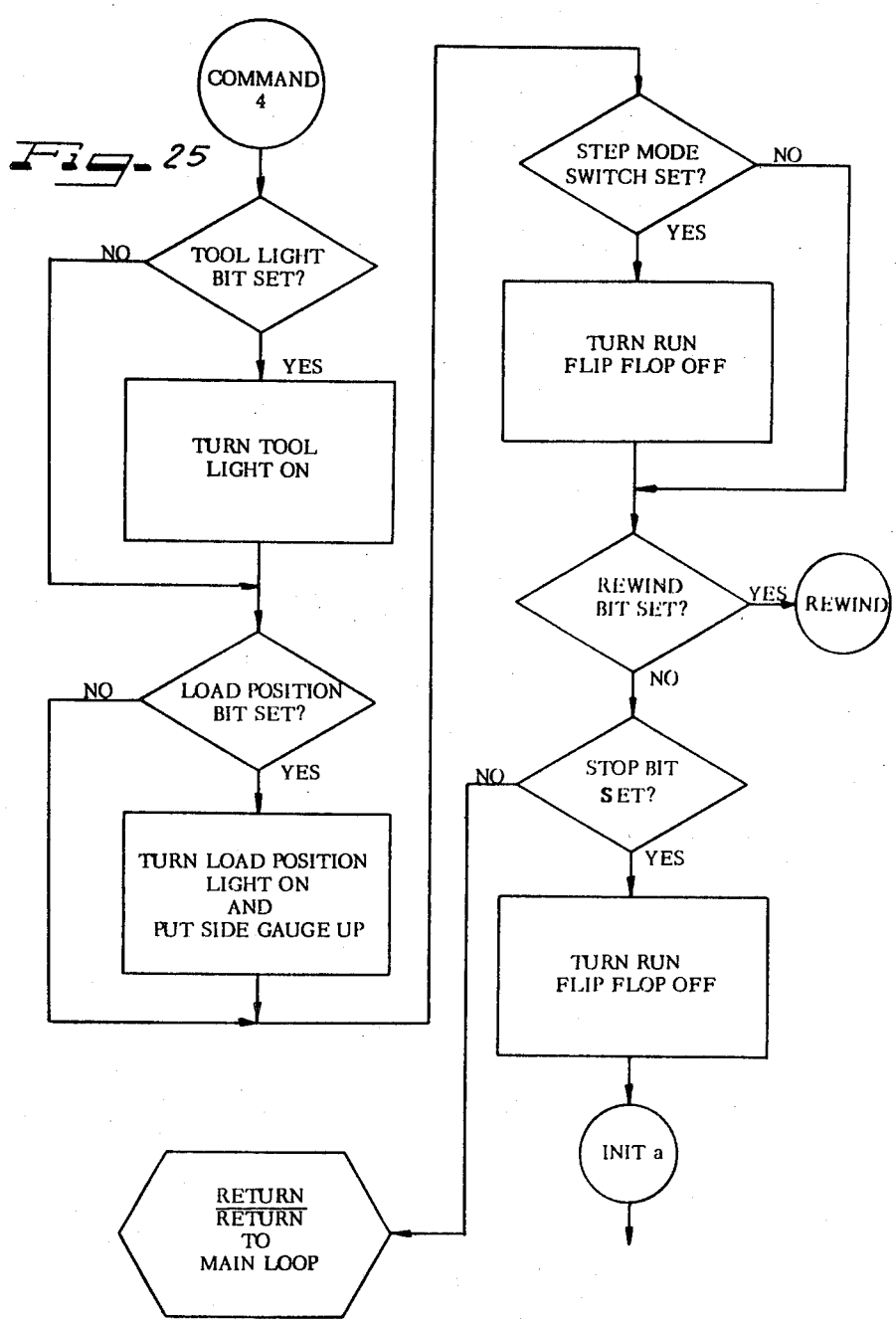
FIG. 25 is a flow diagram illustrating a further portion of the subroutine of FIG. 24.
Figure 26:
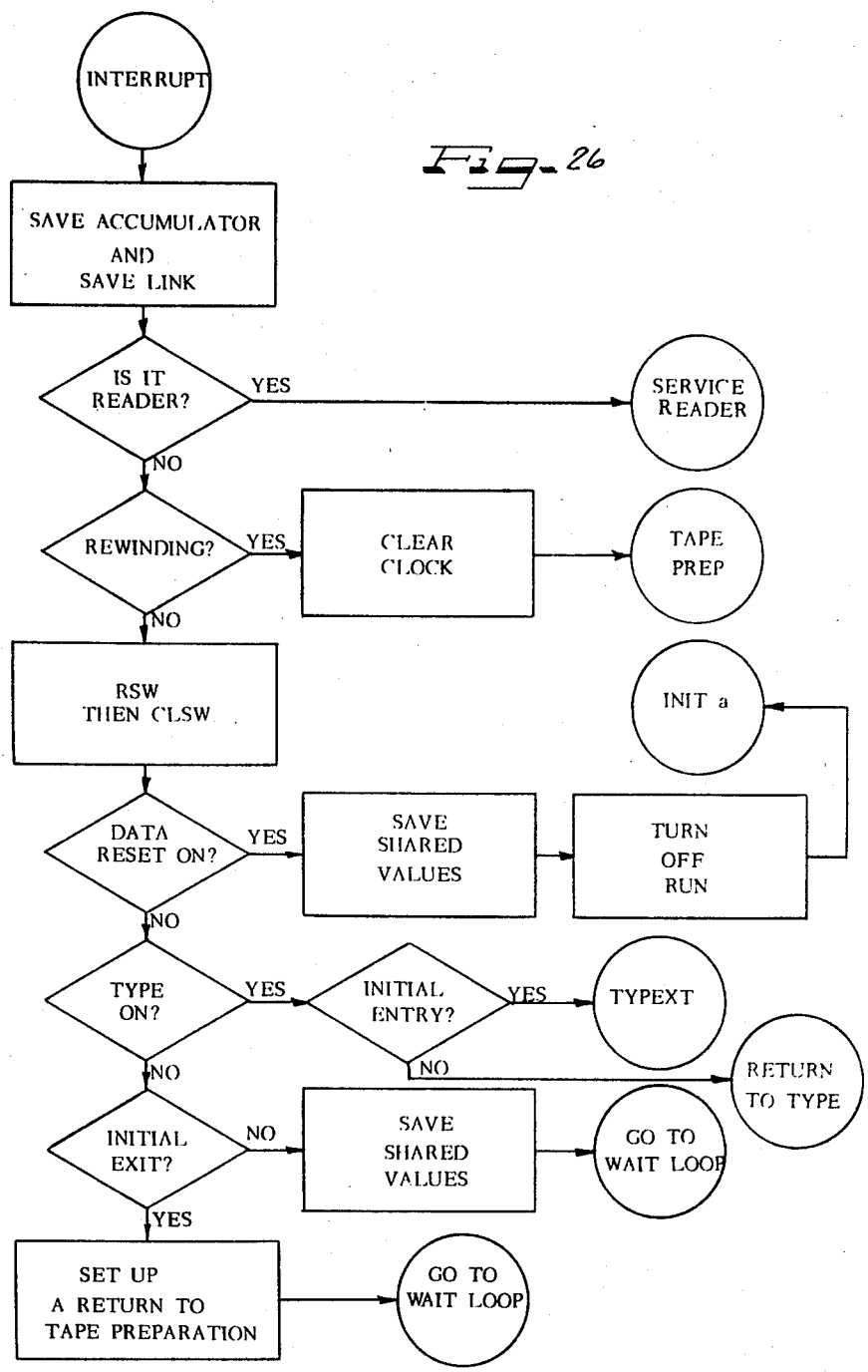
FIG. 26 is a flow diagram illustrating an interrupt control routine for the commercial system.
Figure 27:
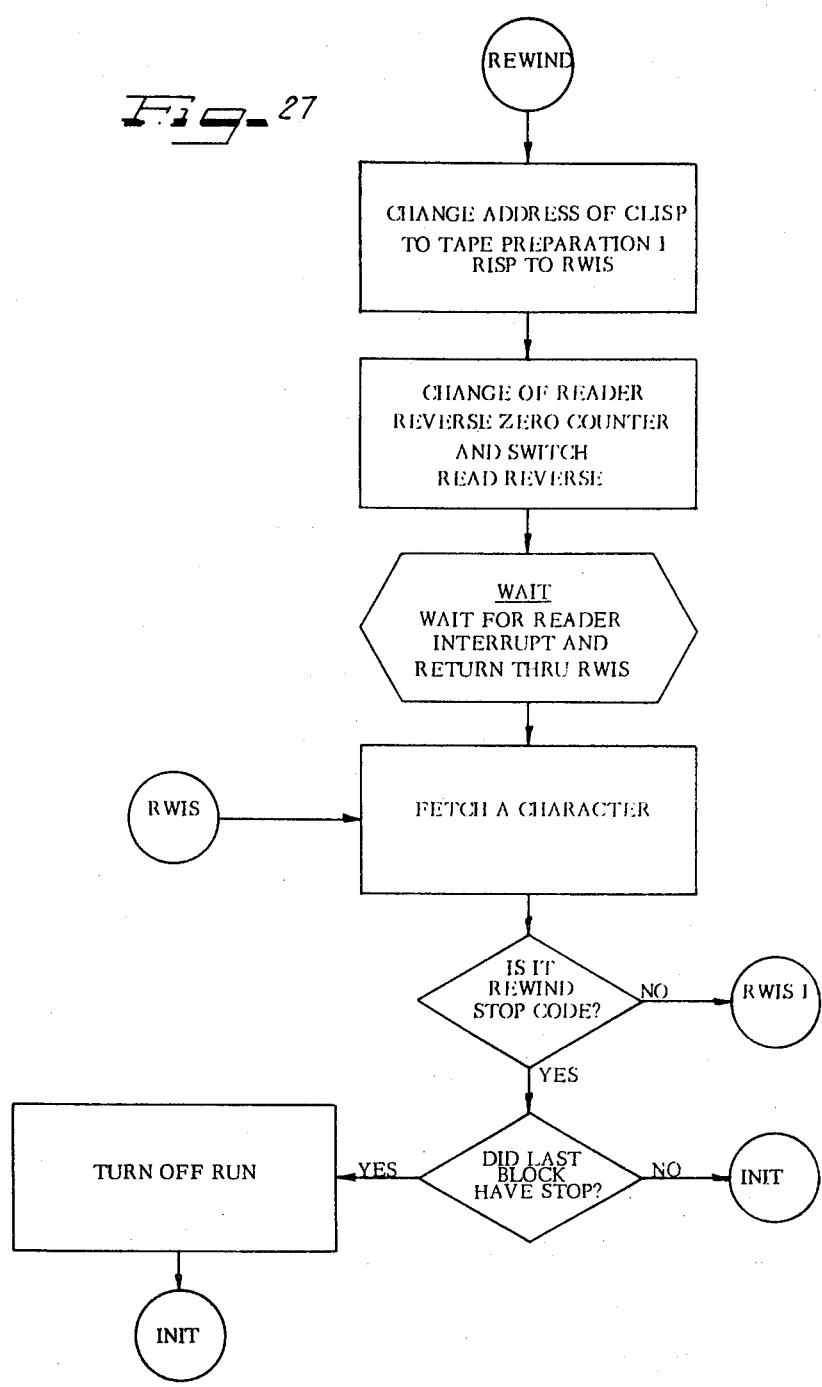
FIG. 27 is a flow diagram illustrating a portion of a rewind subroutine.
Figure 31:
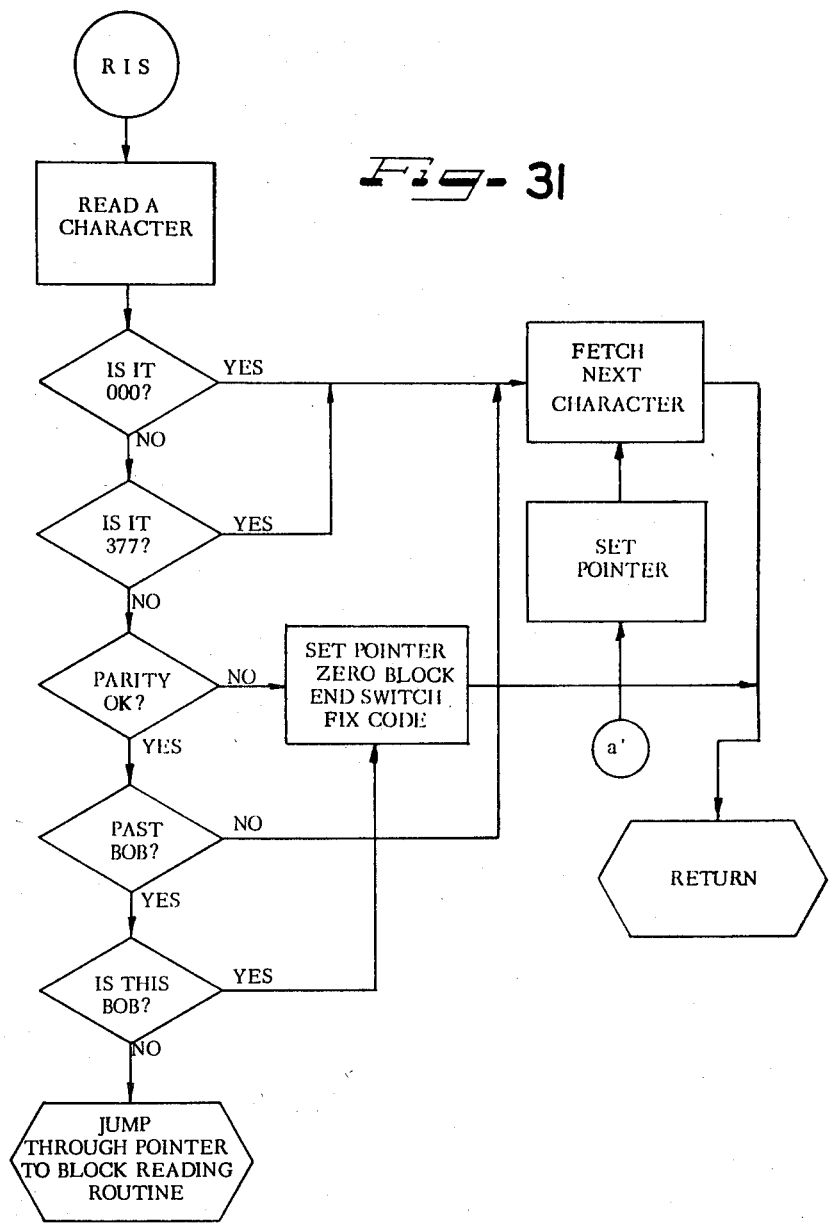
FIG. 31 is a flow diagram illustrating a reader interrupt subroutine for the commercial system.
Figure 35:
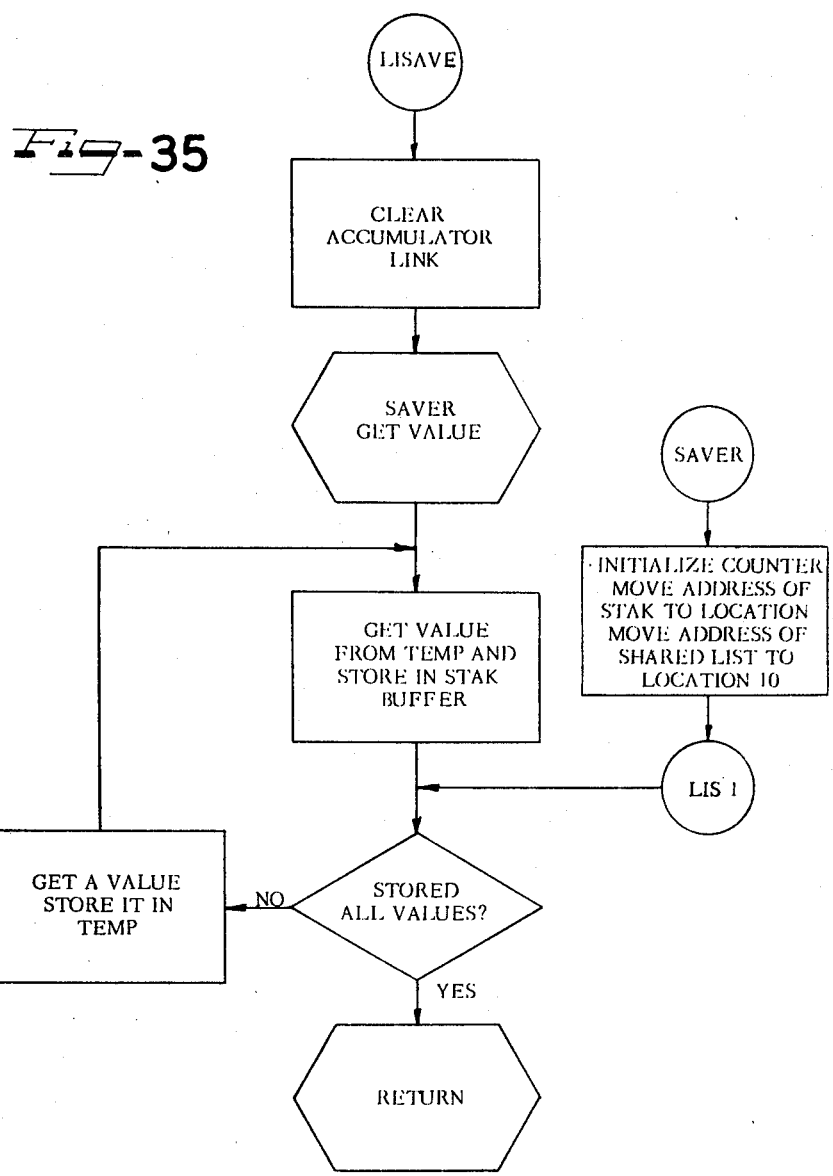
FIG. 35 is a flow diagram illustrating a subroutine for saving current values of locations used by tape preparation and control programs.
Figure 36:
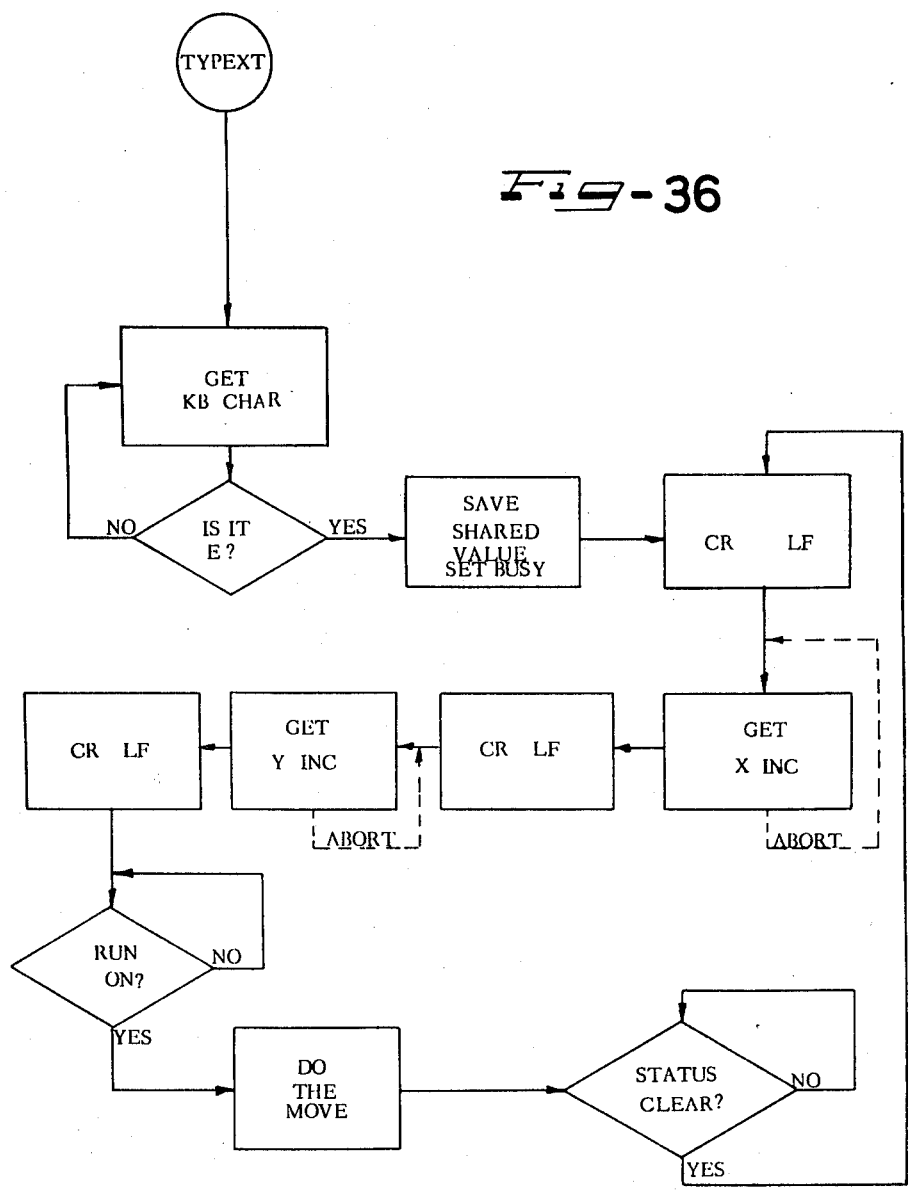
FIG. 36 shows a flow diagram relating to "Type" mode operation of the commercial system.

It will be noted from reference block 0022 (given hereinafter) that the typewriter is operable to generate a displacement type coded input signal including a series of displacement values (e.g. −14. +9. −1.25 +5.) whose algebraic sum (equals −1.250) represents a coordinate value specifying a movement of the worktable relative to one of the axes (e.g. the X-axis as represented in FIG. 19). (Note the X-coordinate value for the whole number 22 in FIG. 19.) It will be noted that a pattern-type coded input signal (such as 4C2 at block 0003, hereinafter) can be generated in a single line operation of the typewriter module 3703.

1. 3 PRELIMINARY OPERATING PROCEDURES

Prior to Tape Preparation and Normal Operation it is necessary to become familiar with Switch Register Operation, Taper Reader operation, crimp loader checks and the Installation of the master program tape for the machine tool.

1.4 SWITCH REGISTER OPERATION

The 12 bits of the switch register, are used to setup the proper computer address. The 12 keys (bits) are colored in groups of three, alternating from three black keys, starting from the extreme left, three white, three black and three white. The first key in the first group of three keys (colored black, extreme left) is called bit zero.

1.5 CRIMP LOADER CHECK

To check the series of instructions that permit the computer to interpret the high speed tape reader output, prior to the installation of the machine tool master program tape and normal operation proceed as follows.

Procedure

A. setup switch register address of 7753.

B. Press Load Add. Key.

C. Verify proper program counter light indication. The indicator above each switch register key should glow if the respective key is in the UP position and will not glow if the respective key is in the DOWN position.

D. Press Exam. Key.

E. Verify proper indication of Memory Buffer lights, for the respective UP or DOWN for the CONTENTS NO. (7600).

F. Continue pressing the Exam key and verifying the Memory Buffer lights, in respect to the equivalent CONTENTS NO. in the progression as outlined in Crimp Loader Table Below.

G. Should an error be detected, repeat the check to make certain that the error was not a human one. If the error still exists, proceed as follows:

1. At the point of the error, Press Load Add. Key and verify proper (address no.) indicating lights in the program counter.
2. Setup proper corresponding CONTENTS NO. on the switch register, and press the DEPOSIT Key.
3. Verify memory buffer light indication with the corresponding Contents number.
4. Continue normal check as outlined in step F.

CRIMP LOADER FOR PDP–8/S (with high-speed reader)

Starting Address: 7753
```
7753-7600
7754-6016
7755-7160
7756-7006
7757-7140
7760-7006
7761-6011
7762-5361
7763-7510
7764-5353
7765-7006
7766-6012
7767-7430
7770-3376
7771-3776
7772-6014
7773-7420
7774-2376
7775-5357
7776-0000
```

To initially load system, LOAD CRIMP, LOAD ADDRESS 7753, put 0 bit down, press START. BINARY LOADER AND CONTROL will load, PRESS CONTINUE and TAPE PREP, will load. NOTE: AC must be zero after programs are loaded in core.

1.6 HIGH SPEED TAPE READER OPERATION

The high-speed tape reader is a device that rapidly interprets a punched tape. A FWD–REV switch provides for forward or reverse winding operation in the MANUAL MODE. The tape used may be placed on 6-inch reels, a loop or a single length. A tape tank is provided for storage of tape lengths or a continuous loop of tape. To install a reel of tape on the reader, place the full reel with the tape sprocket holes toward the reader, on the right spindle. Thread the tape over the dancer arms, sprocket feed device and onto the empty reel placed on the left spindle. A tape loop need not be placed around the spindles. (Brake spindles must be held with a rubber band to maintain power to reader.)

1.7 MASTER PROGRAM INSTALLATION

The master control tape, for the machine tool to be controlled is supplied and must be inserted into the computer memory before normal operation.

Procedure

A. Install master control tape on tape reader.

B. Check Crimp Loader.

C. Load Address 7753—Press Load Address Key.

D. PLACE BIT ZERO DOWN.

E. Press AUTO MODE switch.

F. Press computer start key. Part one of the control program will load and stop.

G. Verify that all but the LINK light in the ACCUMULATOR are off.

H. Press CONTINUE key. Part two of the control program will load and stop.

I. Verify that all but the LINK lights are off in the Accumulator.

J. Remove Master Control Program Tape from reader.

1.8 TAPE PREPARATION—PIECE PART PROGRAMMING

There are two modes of operation within the tape preparation program, Command ("ALT") Mode and Data ("E") Mode. Command "ALT" Mode is entered when initially starting the program and is not left until an appropriate command to enter the Data "E" Mode is given. When in Data Mode, Command "ALT" Mode can be reentered by typing an "ALT MODE" on the typewriter; the bell and carriage return is a signal that Command "ALT" Mode has just been reentered.

When in Command "ALT" Mode any of the following commands may be used. Most commands should be terminated by a carriage return. An illegal character in a command will cause printing of a "?" and causes complete abortion of the command so that it must be completely retyped. A " " causes legal abortion of the command.

The following command cause entry into Data "E" Mode:

1. S—START

Upon typing an S, the typewriter will print out "START" and the "X-Limit =." At this point, the user should type in the X-dimension of the piece that is being programmed and then depress the return key. This number should be in the legal format as discussed under "Data Entry Format." Then the typewriter will ask, in the same manner, for Y-limit, and then will type out "001" which means that the user should now begin his data block entries.

Typing an "ALT MODE" erases any partial entries of a sequence which may be one or two blocks long.

2. E—ENTER DATA MODE

Upon typing an E (and then depressing return key) the typewriter will print out a block number which is the next available block in the buffer and the user should now begin his data block entries.

Command Mode can be reentered by typing "ALT MODE" as explained above.

3. I—INSERT

I is a Legal command only if followed by one parameter—"IN" (plus return key) where N is a block number. Any data that is entered after an I (plus return key) command is inserted before block number N. More than one block may be inserted—block numbers are not printed out; Command "ALT" Mode is reentered by typing "ALT MODE."

The following are commands which remain in Command "ALT" Mode after execution:

1. L—LIST

Upon typing an L (plus return key) the typewriter (which may be one sold under the trademark "Tapetyper") will print out all the information which is currently entered in the buffer. If the user desires to have only one block listed, he may type "LN" where N is the number of the desired block. A selected group of blocks may be listed by typing "LM,N" where the desired blocks are M through N inclusive.

2. D—DELETE

D: (plus return key) is a Legal command only if followed by one or two parameters. "DN": (plus return key) deletes the N th block and "DM,N" deletes blocks M through N inclusive.

3. C—COPY

A command of the form "xCM,N": (plus return key) will copy blocks M through N inclusive into the buffer x times. If no x is stated x is assumed to be one. If no N is given only block M will be copied. If neither M nor N is given the entire buffer will be copied.

4. X—COPY WITH X MIRRORED

The X: (plus return key) command is identical to the C except that the blocks are copied with the X-signs reversed.

5. Y—COPY WITH Y MIRRORED

The Y: (plus return key) command is identical to the C except that the blocks are copied with Y-signs reversed.

7. N—NEW TAPE

The N: (plus return key) command allows the user to punch out leader tape and the beginning block sequence. Upon typing an N, the user should turn on the punch and press the return key on the Tapetyper. When the punch stops, the user should then turn the punch off and press the return key on the Tapetyper.

8. T—TAPE TRAILER

In order to get tape leader or trailer the user should type a T: (plus return key) turn the punch and press return. When the punch stops, turn the punch off and again press the return key.

9. P—PUNCH TAPE

In order to punch out the information in the buffer (in EIA) the user should type a P: (plus return key) turn on the punch and press the return on the Tapetyper. When the punch stops, turn the punch off and again press the return key of the Tapetyper. A, P will punch the entire contents of the buffer, A, PM, N punches block M through N inclusive.

10. K—KILL BUFFER

Upon typing a K: (plus return key) the entire buffer is "KILLED" so that the blocks of data are no longer there but the current block number and absolute position remain. This allows multiple buffer tapes.

11. RE—READ EIA TAPE
12. RA—READ ASCII TAPE

The READ command may be used to read a tape in EIA or ASCII format into the buffer. RE: (plus return key) or RA: (plus return key) may be followed by none, one, or two parameters. The blocks will be renumbered in the buffer starting with one. Before typing an RE or an RA, the user should place the tape into the Tapetyper reader. After typing the RE or RA he should turn the reader on. When Tapetyper reading is completed, he should turn the reader off, and press the return key on the Tapetyper.

13. W—PUNCH REWIND STOP CHARACTER

The W: (plus return key) command punches a rewind stop code. Upon typing a W, the user should turn the punch on and press the return key. Upon completion, turn the punch off and press the return key on the Tapetyper.

NOTE: When the operator types an E on the Tapetyper the system will be in the "E" Mode.

Data blocks in general will be of this form:
Codes
X-Move
Y-Move

With the exception of insert, a block number will be printed out by the Tapetyper before enty of a data block.

1. LEGAL CODES: As many of the following as desired may entered:

S —Stop
R —Retract
I —Inhibit punch
W —Rewind
D —Turn on die change light
L —Turn on load position light
P —Punch on
C —Index clamps down If an "R": (plus return key) is one of the codes typed, increment entries are not allowed and the next block number will be typed out. Illegal codes cause the typing of a "?" but do not affect the codes previously entered nor the further entry of codes. See section on abortion.

2. MOVE ENTRIES:

All numbers are taken to be thousandths of an inch unless a decimal pointed is typed. The following functions may be utilized in Data Mode. 101

"+" Allow numbers to be added

"Space " Space or carriage return between numbers

"Carriage Return" is taken as plus sign.

"—" This gives a negative value to the number it precedes in the algebraic summation.

"=" This signals the end of number entry so that the algebraic sum will be computed and printed out.

"*" The occurrence of an asterisk as the initial entry of a move enters the value of the preceding (same axis) move. That is, if "* " were used in a X-move sequence, it would take on the value of the preceding X-move. "*" is a legal function only in sequence data entry and should not be used during insertion.

"A" This at the beginning of a move entry signals that the number entered is to be taken as an absolute coordinate.

"T" If a "T" is typed at the beginning of a data block, an automatic Tool Change will be computed and the next block number will be printed out. At this point the user should enter the next move as if Tool Change had not been specified. Any of the above-named functions may be used to enter the moves. The appropriate move back from the Tool Change will be computed and inserted into the buffer using this information. If Command Mode is reentered without completion of the two-block Tool Change sequence, neither block is put into the buffer.

3. ABORTIONS

There are two types of data abortions. These are made by depressing the "CNTRL" keys and typing the appropriate letter.

Cntrl F—Abort the current numeric field. This does not abort the absolute or * but only the current number. The line feed signals numeric field abortion.

Cntrl Q—Abort the entire block and try again. All codes and moves are aborted and the block number will be printed out again.

4. DIAGNOSTICS

At various times which may be of the following types, the user may encounter Tapetyper printouts.

Overflow—This diagnostic alerts the user that the last block contained an increment which caused the cumulative coordinates to be off the piece as specified previously by limits. The overflow message will specify in which direction the limits were exceeded by an overflow but does not mean that the data will be ignored. In general, an overflow will mean a user error in data entry, but in the case of a nonautomatic Tool Change, the overflow should be ignored since it is an intentional move off the piece. (Automatic Tool Change does not give a diagnostic)

PARITY (Pe)—This can occur only while reading a tape and indicates that a character with bad (even) parity was read. Upon reading a bad character, the reader stops and the program returns to Command Mode so that the user may again command a read. The block with a bad character will have been ignored but may be inserted later with an "I" command.

No Block # Punched—If a Recommand is followed by parameters but no block numbers are on the EIA tape to be read the user will receive this diagnostic and be returned to Command Mode. If however, R does not have parameters, block numbers on the input tape are not essential.

Core is Full—If too many data blocks are in the buffer and another entry would overflow the data area this diagiostic is given and the user is returned to Command Mode.

NOTES:

The buffer has 95 block capacity. With optional progressive move the buffer capacity is 75 blocks.

SH–EQ—Pressing the shift and equals keys, used after programming of X- and Y-axis move.

It is not necessary to program a "P" after a block that has an inhibit punch.

When programming the Progressive Move Proceed as follows:

1. In the block where the index clamps are to come down program an "IC" command in the data (E) mode of tape preparation. This will allow the index clamps to come down with an inhibit punch.
2. The following block should include an "I" inhibit punch with the appropriate X-Move for the progressive move. Upon completion of the move the index clamps will come up and progressive move will terminate.

Summary of Commands for the system (with Progressive Move Option)

COMMAND ALT MODE COMMANDS
S—INITIAL DATA
E—RETURN DATA
I—SPECIAL ENTRY DATA
C—COPY
C—COPY X REV
Y—COPY Y REV
M—COPY X & Y REV
RE—READ TAPE, EIA CODED
RA—READ TAPE, ASCII CODED
P—PUNCH TAPE
T—PUNCH TRAILER
N—PUNCH-MOVE TO ORGIN
W—REWIND STOP CHARACTER
L—LIST
K—KILL
D—DELETE
DATA "E" MODE—COMMANDS
R—RETRACT
W—REWIND
I—INHIBIT PUNCH
S—STOP
L—LOAD POINT
D—DIE CHANGE
T—AUTO TOOL CHANGE
P—PUNCH ON
C—INDEX CLAMPS DOWN
DATA MODE—OTHER DATA CHARACTERS
A—ABSOLUTE
DATA MODE—ERROR RECOVERY
(WITH CONTROL SHIFT)
F—DELETES NUMERIC FIELD
Q—DELETES BLOCK 1.9 PIECE PART PROGRAMMING PROCEDURE
  A. Load computer address 0400.
  B. Press START Key.
  C. Press desired mode switch, other than TYPE Mode. (See type mode operation.)
  D. Program the piece part tape, referring to the piece part drawing and the list of commands.
  E. Verify the program by receiving a printout of the program.
  F. Make Tape.
  Verify tape on the Tapetyper reader, if desired.
  H. Piece part tape is ready for use with system to fabricate piece parts. Refer to Normal Operation.

1.10 EXAMPLE OF PIECE PART PROGRAMMING
An example of piece part programming is presented to assist the operator in familiarizing himself with the system.

Example Objective:
Prepare a piece part program for a quantity of panels; see FIG. 19.

Procedure to program the tape by completing steps A, B and C above. Program piece part type, as follows:

| Reference Block No. | The Operator Will Type | The Tapetyper Will Printout | Example of Actual Block Printout |
|---|---|---|---|
| Start | S | X Limit= | Start |
|  | 18. (plus return key) | Y Limit= | X Limit=18. |
|  | 12. (plus return key) | 0001 | Y Limit=12. |
| 0001 | 1.5 (SH-EQ) | =+1.500 (Verif) | 0001 |
|  |  |  | 1.5 |
|  |  |  | =+1.500 |
|  | −2. (SH-EQ) | =−2.000 (Verif) | −2. |
|  |  | 0002 | =−2.000 |
| 0002 | 1.25 (SH-EQ) | =+1.250 (Verif) | 0002 |
|  |  |  | 1.25 |
|  |  |  | =+1.250 |
|  | SH-EQ | =+.000 (Verif) | =+.000 |
|  |  | 0003 |  |
| 0003 | ALT (plus return key) |  | 0003 |
|  | 4C2 (plus return key) |  | 4C2 |
|  | E (plus return key) | 0007 | E |
| 0007 | I (plus return key) |  | 0007 |
|  |  |  | I |
|  |  |  | A9. |
|  |  |  | =+9.000 |
|  | A9. (SH-EQ) | =+9.000 (Verif) | A-6.— |
|  | A6. (SH-EQ) | =−6.000 (Verif) | =−6.000 |
|  |  | 0008 |  |
| 0008 | −1. (SH-EQ) | =−1.000 (Verif) | 0008 |
|  | 1.0 (SH-EQ) |  | −1. |
|  |  |  | =−1.000 |
|  |  | =+1.000 (Verif) | 1. |
|  |  | 0009 | =+1.000 |
| 0009 | −1. (SH-EQ) | =−1.000 (Verif) | 0009 |
|  |  |  | −1. |
|  | 1. (SH-EQ) | =+1.000 (Verif) | =−1.000 |
|  |  |  | 1. |
|  |  | 0010 | =+1.000 |
| 0010 | I (plus return key) |  | 0010 |
|  |  |  | I |
|  |  |  | 2. |
|  |  |  | =+2.000 |
|  | 2. (SH-EQ) | =+2.000 (Verif) | −2. |
|  |  |  | =−2.000 |
|  | −2. (SH-EQ) | =−2.000 (Verif) |  |
|  |  | 0011 |  |

| Reference Block No. | The Operator Will Type | The Tapetyper Will Printout | Example of Actual Block Printout |
|---|---|---|---|
| 0011 | ALT | | 0011 |
| | X8, 10 | | X8, 10 |
| | Y8, 10 | | Y8, 10 |
| | M8, 10 | 0020 | M8, 10 |
| 0020 | E (plus return key) | | E |
| | T (plus return key) | | 0020 |
| | | 0021 | T |
| 0021 | A14. (SH-EQ) | =+14.000 (Verif) | 0021 |
| | | | A14. |
| | | | =+14.000 |
| | A-8. (SH-EQ) | =-8.000 (Verif) | A-8. |
| | | | =-8.000 |
| 0022 | W (plus return key) | | 0022 |
| | -14.+9.-1. | =-1.250 (Verif) | W |
| | 25+5 | | -14.+9.-1.25+5. |
| | (SH-EQ) | | =-1.250 |
| | 2.+2.+1. | =+5.000 (Verif) | 2.+2.+1. |
| | (SH-EQ) | | =+5.000 |
| | | 0023 | |
| 0023 | ALT (plus return key) | | |
| | L (plus return key) | | |
| | T (plus return key) | NOTE: IGNORE | See list next page. |
| | W (plus return key) | TAPETYPER | |
| | N (plus return key) | PRINTOUT | |
| | P (plus return key) | | |
| | T (plus return key) | | |

TAPETYPER PRINTOUT OF PIECE PART PROGRAMMING EXAMPLE

| Block No. | Commands | | Incremental Move | | Absolute Move | |
|---|---|---|---|---|---|---|
| | | | X Axis | Y Axis | X Axis | Y Axis |
| 0023 | | | | | | |
| L | | | | | | |
| 0001 | | P | +1.500 | -2.000 | +1.500 | -2.000 |
| 0002 | | | +1.250 | +.000 | +2.750 | -2.000 |
| 0003 | | | +1.250 | +.000 | +4.000 | -2.000 |
| 0004 | | | +1.250 | +.000 | +5.250 | -2.000 |
| 0005 | | | +1.250 | +.000 | +6.500 | -2.000 |
| 0006 | | | +1.250 | +.000 | +7.750 | -2.000 |
| 0007 | | I | +1.250 | -4.000 | +9.000 | -6.000 |
| 0008 | | P | -1.000 | +1.000 | +8.000 | -5.000 |
| 0009 | | | -1.000 | +1.000 | +7.000 | -4.000 |
| 0010 | | I | +2.000 | -2.000 | +9.000 | -6.000 |
| 0011 | | P | +1.000 | +1.000 | +10.000 | -5.000 |
| 0012 | | | +1.000 | +1.000 | +11.000 | -4.000 |
| 0013 | | I | -2.000 | -2.000 | +9.000 | -6.000 |
| 0014 | | P | -1.000 | -1.000 | +8.000 | -7.000 |
| 0015 | | | -1.000 | -1.000 | +7.000 | -8.000 |
| 0016 | | I | +2.000 | +2.000 | +9.000 | -6.000 |
| 0017 | | P | +1.000 | -1.000 | +10.000 | -7.000 |
| 0018 | | | +1.000 | -1.000 | +11.000 | -8.000 |
| 0019 | | I | -2.000 | +2.000 | +9.000 | -6.000 |
| 0020 | S | ID | +.000 | -8.500 | -14.500 | |
| 0021 | | P | +5.000 | +6.500 | +14.000 | -8.000 |
| 0022 | W | | -1.250 | +5.000 | +12.750 | -3.000 |

1.11 NORMAL OPERATION

Manual Mode
1. Press Manual Mode switch.
2. Position machine using X-Right, X-left, Y-In and Y-Out positioning switches. Press "PUNCH" if desired.

Step Mode
1. Press Step Mode switch.
2. Press Tape Start switch. System will interpret one block of tape, position machine and stop.
3. Press Tape Start switch each time each block and move.
4. NEVER ATTEMPT ANY PROGRESSIVE MOVE OPERATION WITH THE STEP MODE.

Type Mode
1. Press "TYPE" Mode switch.
2. Type the letter "E" and Tapetyper will do a carriage return and line feed.
3. Input: A PLUS or MINUS SIGN and 5 DIGITS for X-Move and A PLUS or MINUS SIGN and 5 DIGITS for Y Move.
4. Press "TAPE START" on control panel and move will be executed.

NOTES:
A) ERROR Recovery is "Control and M Keys" followed by the sign and 5 digits of coordinate.
B) Tape prep must be residing in memory.
C) To return to tape prep from type mode press auto or step switch on control panel.

EXAMPLE
+5.750 inches in X and -0.01 inches in Y is desired.
E
+05750
-00010

To continue just input sign and 5 digits for X and then Y.
TIPS: If no move is desired for one of the coordinates enter minus 0 as such: -00000

Auto Mode
1. Place piece tape on high-speed tape reader.
2. Install piece part on machine
3. Press Auto Mode switch
4. Push Tape Start switch. Part will be fabricated. If programmed, the tape will rewind to be in readiness for the next piece part.

Section-2 SYSTEM SUMMARY

2.1 SUMMARY OF THE MODES OF OPERATION OF THE MACHINE TOOL CONTROL

Automatic Mode

In the automatic mode of operation, numerical control tape is read from the high-speed tape reader 600, FIG. 6, into the digital computer 603; the computer then loads a corresponding binary number into the position control logic of interface 628. The position control logic then controls positioning of the machine tool to the coordinate represented by the binary number. Upon positioning to a given coordinate a command is given to the computer by means of relays 181 and 1107, FIG. 11, signifying an in-position condition. If all other conditions are favorable, the machine tool will then be allowed to perform it's job, whether it be to drill, punch, etc., and at this time another block of tape is read from the high-speed reader. Due to the fact that a high-speed tape reader is used, a block of information can be read and ready for use before a machine function can be completed. Machine tool operation will continue in this fashion until a tool change or machine step is indicated by the piece part punched tape program.

Step Mode

In the step mode of operation, the computer controls reads one block of information, executes the move and inhibits the machine function and waits for a command to proceed with the next move. Subsequent moves are executed individually by the machine tool operator giving appropriate signals to the computer. This mode of operation can be used by the machine tool operator to verify the positioning of machine tools without producing a piece part.

Type Mode

The type mode allows positioning coordinates to be entered to a computer control via the typewriter at the console. Upon receiving a proper command the machine tool will accurately position to a specified coordinate. This mode is extremely valuable in that it allows an accurate positioning means of manually entered data.

Manual Mode

The manual mode permits a machine tool operator to manually position a machine tool anywhere within the allowable limits of travel.

2.2 SUMMARY OF COMPUTER OPERATION

Since more than one simultaneous job is required of the computer, the computer must have the capability to operate on a time-sharing principle. It must be capable of decoding an interrupt request received from external hardware and appropriately going to various positions of the stored computer program to perform different tasks.

At the present time, approximately one-fourth of a 4096 12-bit word computer memory is used to control a single two axes punching machine tool. The other three-fourths s of the memory is used to assist a piece part programmer in numerical tape preparation.

The present computer control employs a machine tool system clock 1112, FIG. 11, which interrupts the computer at a rate of 60 times a second. The computer, upon receiving this checks the status of the machine tool to determine if the status of the machine tool has changed since the last sampling period. If the status has changed, the computer takes appropriate action.

Program Interrupt

When an input/output device is in need of service from the digital computer, it signifies the need through a status flange. A status flag is nothing more than a flip-flop connected to the interrupt bus of the computer. Upon receiving an interrupt, the computer completes the instruction which it may be processing and then stores the location of the next instruction so it may return after servicing the interrupt; the computer then enters an interrupt service routine, whereby it would check status flags on a previously determined priority basis in order to identify the input/output device requiring service. It may also be noted, more than one computer program can exist in the computer memory simultaneously, and any one or all can be running separately or concurrently.

2.3 SUMMARY OF POSITION CONTROL LOGIC

The purpose of the position control logic is to accept binary coordinate information from the computer and to position the machine tool to that specified coordinate. FIG. 6 shows a block diagram of a two axes position control logic scheme.

In an operating condition the computer reads X and Y binary coded decimal coordinate information for the high-speed tape reader 600 and converts this data into 2's complement binary. This information is then loaded into external up/down binary counters such as illustrated in FIG. 1. At this point the desired incremental move is stored and the computer is free to process other information from other input/output devices.

The numbers stored in the external up/down binary counters are monitored by digital to analog converters such as 105–107, FIG. 1A, to produce DC voltages proportional to the digital count. The analog output voltage is then applied to servoamplifiers such as 109, FIG. 1B, which in turn drive the X- and Y-axes axes motors.

Position feedback is obtained from digital transducers such as indicated at 112, FIG. 1B, mounted on the axes leadscrews. The transducer pulses are decoded to determine direction of travel and applied to pulse synchronizing networks such as indicated at 117, FIG. 1B. If the computer is not sampling or loading the external counters, the transducer pulses are transmitted to count down the incremental position coordinate stored in the up/down counters.

Thus, positioning continues in this fashion with the computer periodically checking machine tool status until the machine tool has completed the specified incremental move.

As the machine tool is approaching the desired position, an in-position detector such as indicated at 110, FIG. 1B, monitors the external binary up/down counters to determine when the remaining count is an acceptable distance away from desired position. The in-position detector has a variable bandwidth and is directly related to overall positioning time. As an example, a large in-position deadband permits faster point positioning times.

Upon receiving an in-position signal the computer checks the status of the machine tool and if all other conditions are favorable, the machine tool is permitted to punch, drill, etc., depending on the specific machine tool.

At the same time, the digital computer will read the external counters to determine the positioning error; this error, if any, is normally small, its size being determined by the adjustment of the in-position detector. The computer, having read this error, then proceeds to appropriately compensate the next move already decoded from the high-speed tape reader.

As an example, if the machine tool's next move was in the same direction as a previous move with an overshoot error, the computer would subtract the amount of overshoot error from the next move, thereby compensating every move individually.

2.4 SUMMARY OF OVERALL PIECE PART FABRICATION

Piece Part Tape Production

In present fabrication systems, considerably longer time is spent in tape preparation for short-run jobs than in actual machine running time. Thus, it would seem that the area of tape preparation needs the most refinement remembering that the total time to prepare a numerical piece part tape consists of calculation of dimension, selection of a punching sequence, verification, correction and tape preparation before a valid piece part can be produced.

The present system is most beneficial in the area of tape preparation as will become evident in the following sections. The computer control eliminates the need for the usual additional off-line tape preparation equipment and it is ready immediately upon delivery for use by average shop personnel without special training. In the area of tape preparation, the computer control permits tape to be prepared faster than other commercially available tape preparation methods. This is due mainly to the flexibility of a digital computer combined with simplified input requirements compared to noncomputer-oriented tape preparation equipment, and to the speed with which piece part programs can be processed and programming mistakes corrected in operation of the present system in comparison with the operation of large computer tape preparation centers.

Part Programmer Input Format

The computer control allows piece part programmers to enter positioning coordinate information, as well as machine tool control information, by using simplified mnemonic characters. In addition, a piece part programmer may program the machine tool directly from a schematic without having to first make a work sheet. Upon starting a new piece part program the computer will interrogate the piece part programmer as to the size of the work piece. The computer will then store this information for further use in, (1) maintaining absolute position for verification, and (2) effecting automatically programmed tool change.

After having received the size of the piece part the computer will type the first information or data block number. It may be noted at this point that the part programmer need never enter block numbers, these are provided by the computer.

The programming console is now in a data mode and the part programmer may begin to enter coordinate information. In data entry the sign of an increment will be assumed positive unless otherwise indicated, and any number of individual increments may be summed to form a given position coordinate.

All numbers are assumed to be in thousandth's of an inch unless a decimal point is specified. Also, trailing zeros need not be entered; as an example, a positive 1-inch move may be entered as 1., 1.0, 1.00, 1.000 or 1,000.

After completing a piece part program the part programmer has the option to insert a beginning block sequence before the data coordinates. In the case of a punching machine, this sequence would include (1) 12 inches of tape feed holes to facilitate spooling and handling, (2) a carriage retract, (3) a move in X and Y to a load position, (4) illuminate the tool change and load position lites, and (5) a move to the left-topmost corner (Absolute Reference) of the piece part. All the foregoing information is punched on tape after the computer receives one character from the console typewriter.

Absolute and/or Incremental Data Entries

Incremental and/or absolute dimensioning may be used at will to form any specific positioning coordinate. The piece part programmer distinguishes an absolute entry by prefixing the data with the letter "A." This feature is extremely valuable in that off-line calculations to convert all data to either incremental or absolute form are eliminated.

Automatically Programmed Tool Change Position

If, in the process of part programming, a tool change is needed, the part programmer may type the letter "T." The computer will then compute the shortest move off the piece, sufficient to change a punch and die and print out the next block number. The part programmer then enters the next coordinate information and the computer will automatically compensate this move by the amount it previously added to the last move to execute a tool change.

Copy Statement

The piece part programmer also has the use of a copy statement at his disposal. A command of the form XCN,M will copy data information blocks N through M, inclusive, X times, into the computer memory. If no X is stated, X is assumed to be one. If no N is given, only block M will be copied. If neither N or M is given, all information data blocks existing in memory will be copied.

The copy command is an example of a pattern-type coded input signal which may include a block-identifying signal (the code characters N, M specifying block numbers N through M, inclusive) and which may include a repeat signal (the character X specifying a pattern-type operation on the series of blocks X times). Other examples of pattern-type coded input signals are the tool change signal (represented by the character T in data mode) and the mirror image coded input signals (X, Y and M). See also the software refinements given in the second paragraph under section 2.6.

Mirror Image Statement

Another form of copy statement is the X copy statement. The X command is identical to the C copy statement except that the data blocks are copied with the X signs reversed. Likewise, a Y copy statement is identical to a Y copy statement except that the data blocks are copied with the Y signs reversed. Finally, an M copy statement where data blocks are copied with both X and Y signs reversed.

Read Tape

By using the read command, tape in either EIA or ASCII format may be read into memory to be used as data blocks. The read command can be followed by none, one or two block numbers.

This feature is extremely important in that previously prepared tape may be inserted into a newly prepared part tape at the discretion of a programmer.

Part and Program Verification

Part Verification

The computer control can be equipped with two methods of part verification. The first method involves the use of absolute value display counters such as 450, FIG. 4. These absolute value display counters can be reset at the reference point of the piece part, then the machine tool operator may stop the piece part at any point in a particular job and examine the schematic diagram against the value displayed in the counters to verify positioning accuracy. The second method of part verification involves using a standard machine tool control program. This control program will allow the machine to punch any given part at its maximum speed, while at the same time the console typewriter attached to the computer control will be printing out as fast as it can the positioning error for X and Y for each move on the piece part. Thus, when the piece part is finished and the typewriter has stopped printing, the machine operator will have a finished part and written record of the positioning accuracy of the machine tool.

List Command

If the part programmer desires to examine any or all data blocks presently stored in memory, he may do so by using a list command. A list command of the form LA, B will cause the computer to type the incremental, absolute values and auxiliary commands of data blocks A thru B. If a B is not specified, the computer will list block A, and if A and B are both not specified, the computer will list all data blocks currently stored in memory. This feature is invaluable in that it allows a part programmer to verify the part program before a numerical positioning tape is punched. It may also be noted that, since the absolute value of each move is given, the part programmer may compare the absolute value of the last move on the schematic with the absolute value given by the list command, and if they are identical he may be quite assured that he has programmed the previous moves correctly.

Illegal Characters

If an illegal character (one that has no meaning in tape preparation) should inadvertently be entered by the part programmer, the computer will type a question mark and ignore the entry. This feature aids the part programmer in that he is aware he made an error and he doesn't have to correct it.

Diagnostics

At various times during tape preparation the user may encounter typewriter printouts. These diagnostics aid the part programmer in verification and aid him in properly preparing punched tape. One such diagnostic alerts the part programmer that the last data block contains an incremental move which would be off the piece part. Many accidental part programming errors are detected in this manner. The diagnostic will specify in what direction the piece part limits were exceeded, but the data block will be validly accepted.

In general, this diagnostic will mean a user error in data entry, but in the case of the nonautomatic tool change, the diagnostic should be ignored since the move is intentionally off the piece part. (Automatically programmed tool change does not give a diagnostic.)

Another diagnostic would be a parity error. If, while in the process of reading a punched tape, a character with improper parity is detected, the reader will stop and the computer will print a parity error diagnostic.

Tape Error Correction

During the time positioning coordinates are being entered into the computer's memory via the console typewriter, no numerical tape is being punched. Only at the decision of the programmer will any tape be punched. This method of preparing numerical tape allows for discovered errors to be corrected within the computer. Using other tape preparation systems, numerical tape would be initially punched and therefore in error and in need of correction. Correcting the punched tape would amount to backspacing the tape an appropriate number of lines and mechanically rubbing out the erroneous information. This method would work if the error is the last entry on the tape. If not, the error must be spliced out or a new tape run, and these two methods are very time consuming. In the present computer control system, if errors are found during verification, such as coordinates left out, duplication of data blocks, or typing errors, the computer still allows for easy correction. A block of information can be deleted from memory simply by typing the appropriate block number and a delete symbol, and new information can then be inserted in its place. The computer system also allows for easy correction of previously prepared tape which might need to be changed due to engineering changes or because of errors. This tape is read into the computer's memory and then can be electronically corrected. The part programmer may examine, delete, change or insert any number of data blocks he desires.

Delete Command

By typing the letter "D" followed by a block number, the part programmer may delete that particular data block or if he types DA, B data block A thru B will be deleted.

Insert Command

If the part programmer wishes to insert a data block in place of one previously deleted, or to insert data blocks anywhere in the part program, he types the letter "I" followed by a block number. The computer in effect opens the tape at that particular point and inserts the data information that will follow.

2.5 SUMMARY OF PIECE PART PRODUCTION

Machine Tool Control (Method of Operation)

When a machine tool operator is ready to use the machine tool, he indicates his readiness to the computer through the machine tool control panel. If in the automatic mode, the digital computer issues a command to the tape reader 600, FIG. 6 and reads a data block of information. Included in the data block of information are auxiliary functions along with coordinate information. The format of the punched tape may be fixed sequential block or word address according to EIA machine tool standards. The computer interprets the data block, issues commands to auxiliary input/output devices turning on lights and activating relays, etc., and executes the move through the position control logic.

Unlimited Overshoot

The computer control system can recover from unlimited overshoot unlike other numerical controls which can tolerate only a limited amount of overshoot. This feature permits the computer control to position machine tools from point to point faster since higher starting forces may be used. The computer, having this overshoot capability, allows a larger initial force to be applied to the carriage, resulting in controllable overshoot and faster positioning for very near coordinates, the smaller traveling time for far away coordinates.

Variable Speed and Accuracy

The speed and accuracy obtained in controlling machine tools with a computer control are variable and directly proportional to each other. For example, a larger setting of the in-position detector results in faster positioning times. A typical range of accuracy settings for a computer control would be from 0.0005 to 0.064 inch.

2.6 SUMMARY OF OPTIONAL FEATURES

Capabilities Without Memory Extension

Additional Tape Preparation Assistance

Due to the extreme flexibility of the digital computer, many changes and variations in the previously described formats can be accomplished. For example, the tape preparation station can be programmed to permit preparation of numerically punched tape for other type machine tools.

Also, further software refinements can be added to facilitate preparation of piece part programs. Examples of these would be as follows: (1) Pattern Repetition. Pattern repetition would be the ability to duplicate a regular or irregular pattern to some other location on the workpiece. (2) Pattern Generation. Pattern generation would be the ability to generate regular patterns given some starting information. Uses would include squares, equilateral triangles, circles. (3) Scaling. Scaling would allow repetition of a pattern with an increase or decrease in magnitude between hole coordinates.

Multiple Machine Control

Due to the flexibility of the computer to service many input/output devices and the manner in which the positioning loop is closed outside the computer, more than one machine tool may be controlled by the computer as illustrated in FIG. 12, for example. Depending upon the number and type of machine tools, different methods of control are possible. For instance, if more than one machine tool of the same make are used, it is possible to share some portions of the control. In the case of dissimilar machine tools, individual tape readers, servo systems and position control logic will be necessary in controlling these machine tools. However, the incremental cost for these items is expected to be less than the price of an individual numerical control. The number of different types of machine tools that can be controlled by the computer control depends on a large number of variables.

The complexity of the machine tool, the amount of memory available and the method of approach all are factors in determining the number and speed of servicing these machine tools. The present computer control can tolerate 64 input/output devices. Input/output devices are things such as tape readers, console typewriter, machine tools, position control logic.

When a customer purchases a computer control with the console typewriter and one machine tool, it is very similar to purchasing an electronic switchboard and two extension telephones. If more machine tools are to be controlled, it is very similar to purchasing more extension telephones. If the switchboard becomes overloaded because too many extension telephones are trying to use it at the same time, a busy signal will be given and the telephones will be serviced as others are made free. Likewise, the computer control operates on an interrupt system wherein, if more than one machine tool would come into position at the same time, they would be serviced based on a previously determined priority.

Other Computer Uses

Since the computer control is capable of operating in a time-sharing mode it can control a machine tool and at the same time be used to solve engineering, accounting, inventory or other customer specified tasks. Due to the limited amount of memory available using a small digital computer, all these features could not be stored in memory concurrently; however, being software they could be constantly available in the form of previously prepared tape. The amount of time necessary to use these features is only a matter of minutes using the high-speed tape reader.

Maintenance & Troubleshooting

Computer control maintenance is minimized by the use of reliable solid-state, plug-in components.

Should a malfunction occur within the computer or the logic circuitry, the computer may be equipped with diagnostic programs to assist in pinpointing the problem.

Capabilities with Memory Extension

Additional extended memory would allow the user concurrent operation of the specific features previously discussed. Other features could be provided such as (1) optimum positioning path selection, (2) automatic tool changer, (3) adaptive speed control, (4) control of more sophisticated machine tools, and (5) further tape preparation aids.

2.7 SUMMARY OF COMPUTER CONTROL FEATURES

The most important feature of the computer control is again its flexibility and resistance to technical obsolescence. Because of this flexibility, it is able to simultaneously control machine tools and prepare numerical punched tape. The computer control can control multiple machine tools at an incremental cost less than standard numerical controls, and the time to prepare punched tape has been drastically reduced, reducing the time to complete production of piece parts. The computer control also provides for continuous program and piece part verification while allowing input of piece part data in a simplified format. Dual EIA/ASCII capabilities are available and the programmer has the option to program coordinates in either incremental and/or absolute dimensions.

Finally, all repetitive or common operations are automatically programmed, errors are electronically corrected, and the machine tool positioning time has been significantly decreased.

Contents of Computer Memory

By way of concrete illustrations only and not by way of limitation, a copy of a listing of the contents of computer memory for a commercial system in accordance with the present invention is set forth in section I on the following pages. In order to clarify the significance of the contents which is expressed in octal notation, a symbolic explanation of the contents is included as section II. The listings have reference to the PDP-8/S digital computer which is a general purpose digital computer having random-address memory for storing instructions and data.

I. LISTING OF MEMORY LOCATIONS AND THEIR CONTENT.

| | | | | | | | | |
|---|---|---|---|---|---|---|---|---|
| 0000 | 2000 | 5402 | 0503 | 0000 | 0000 | 0000 | 0000 | 0000 |
| 0010 | 0000 | 0002 | 1160 | 7402 | 7402 | 7402 | 7402 | 7402 |
| 0020 | 0000 | 0000 | 0000 | 0000 | 0000 | 0000 | 0000 | 4000 |
| 0030 | 2000 | 1000 | 0400 | 0200 | 0100 | 0060 | 0014 | 0004 |
| 0040 | 0002 | 0100 | 0020 | 7600 | 0002 | 0012 | 0400 | 0004 |
| 0050 | 7700 | 0000 | 0000 | 0000 | 0000 | 0000 | 0000 | 0000 |
| 0060 | 0000 | 0000 | 0000 | 0000 | 0000 | 0000 | 0000 | 0000 |
| 0070 | 0000 | 0000 | 0532 | 0000 | 2000 | 0600 | 1226 | 0200 |
| 0100 | 0246 | 0000 | 0000 | 0000 | 0000 | 0000 | 0000 | 0000 |
| 0110 | 0000 | 0000 | 0000 | 0000 | 0000 | 0000 | 0000 | 0000 |
| 0120 | 0000 | 0000 | 0000 | 0000 | 0000 | 0000 | 0000 | 0000 |
| 0130 | 0000 | 0000 | 0000 | 0001 | 0000 | 0007 | 4430 | 0000 |
| 0140 | 0000 | 0000 | 0000 | 0000 | 0000 | 0000 | 0000 | 0000 |
| 0150 | 0200 | 0000 | 0001 | 6665 | 5622 | 0000 | 6032 | 6031 |
| 0160 | 5157 | 6032 | 5555 | 0000 | 0000 | 7772 | 7563 | |
| 0170 | 7506 | 7540 | 7773 | 7775 | 0010 | 7000 | 7520 | 0017 |
| 0200 | 0000 | 7300 | 1600 | 3021 | 3022 | 3023 | 1377 | 3020 |
| 0210 | 3024 | 3025 | 4235 | 4323 | 4235 | 4235 | 4323 | 7300 |
| 0220 | 1421 | 2021 | 0376 | 1025 | 3023 | 7204 | 1024 | 3022 |
| 0230 | 2020 | 5210 | 7300 | 2200 | 5600 | 0000 | 7300 | 1023 |
| 0240 | 7004 | 3023 | 1022 | 7004 | 3022 | 5635 | 0000 | 7300 |
| 0250 | 1646 | 3021 | 7001 | 1021 | 3020 | 1420 | 7041 | 3420 |
| 0260 | 7204 | 3020 | 1421 | 7040 | 1020 | 3421 | 2246 | 7300 |
| 0270 | 5646 | 0000 | 7300 | 1671 | 3021 | 1421 | 3022 | 2021 |
| 0300 | 1421 | 3023 | 4246 | 0022 | 4323 | 2271 | 5671 | 0000 |
| 0310 | 7200 | 1707 | 3021 | 1421 | 3022 | 2021 | 1421 | 3023 |
| 0320 | 4323 | 2307 | 5707 | 0000 | 7300 | 1025 | 1023 | 3025 |
| 0330 | 7204 | 1024 | 1022 | 3024 | 7300 | 5723 | 4362 | 1361 |
| 0340 | 7640 | 5336 | 4550 | 4775 | 3064 | 4775 | 3066 | 6712 |
| 0350 | 0041 | 7650 | 5347 | 4476 | 6712 | 0043 | 7640 | 5354 |
| 0360 | 5342 | 7473 | 0000 | 6712 | 0047 | 7650 | 5472 | 6031 |
| 0370 | 5363 | 5774 | 5762 | 7402 | 1333 | 1342 | 0017 | 7773 |
| 0400 | 7300 | 1074 | 3000 | 1031 | 3070 | 1377 | 3071 | 1031 |
| 0410 | 6704 | 7300 | 3073 | 2052 | 2051 | 1376 | 3775 | 6714 |
| 0420 | 6701 | 4267 | 6712 | 0050 | 1050 | 7640 | 5221 | 6702 |
| 0430 | 6014 | 4267 | 6712 | 0041 | 7650 | 5231 | 6702 | 1052 |
| 0440 | 7640 | 5231 | 1060 | 7640 | 5263 | 1073 | 7640 | 1031 |
| 0450 | 1031 | 6704 | 4774 | 6712 | 0043 | 7650 | 5261 | 4267 |
| 0460 | 5253 | 4773 | 5231 | 1036 | 6704 | 7300 | 5203 | 0000 |
| 0470 | 7604 | 7010 | 7620 | 5276 | 1372 | 3000 | 1053 | 7110 |
| 0500 | 1054 | 6001 | 5400 | 3054 | 7004 | 3053 | 6011 | 5471 |
| 0510 | 4470 | 5270 | 6701 | 6712 | 6714 | 0044 | 7650 | 5324 |
| 0520 | 1037 | 6704 | 7300 | 5212 | 6712 | 0047 | 7650 | 5667 |
| 0530 | 4475 | 5771 | 4770 | 5276 | 6701 | 5270 | 0000 | 0000 |
| 0540 | 0000 | 0000 | 0000 | 0000 | 0000 | 0000 | 0000 | 0000 |
| 0550 | 0000 | 0000 | 0000 | 0000 | 0000 | 0000 | 0000 | 0000 |
| 0560 | 0000 | 0000 | 0000 | 0000 | 0000 | 0000 | 0000 | 0000 |
| 0570 | 0621 | 0336 | 2022 | 0631 | 1226 | 1026 | 1032 | 0512 |
| 0600 | 0000 | 4207 | 1461 | 3411 | 2057 | 5216 | 5600 | 0000 |
| 0610 | 1377 | 3057 | 1376 | 3010 | 1375 | 3011 | 1410 | 3061 |
| 0620 | 5607 | 0000 | 4207 | 1411 | 3461 | 2057 | 5216 | 5621 |
| 0630 | 0000 | 0000 | 1062 | 3230 | 1230 | 0046 | 7640 | 2026 |
| 0640 | 1230 | 0045 | 7640 | 3026 | 1230 | 7010 | 7630 | 5257 |
| 0650 | 1230 | 0037 | 7640 | 4257 | 2051 | 2052 | 6014 | 1230 |
| 0660 | 7012 | 7620 | 5273 | 6732 | 6722 | 6762 | 6752 | 1032 |
| 0670 | 6704 | 7300 | 5305 | 1026 | 7650 | 5313 | 6712 | 0042 |
| 0700 | 7640 | 5313 | 1027 | 6704 | 7300 | 6712 | 0043 | 7650 |
| 0710 | 5313 | 4774 | 5305 | 1230 | 0041 | 7650 | 5322 | 1034 |
| 0720 | 6704 | 7300 | 1230 | 7010 | 0041 | 7650 | 5332 | 1035 |
| 0730 | 6704 | 7300 | 6712 | 0042 | 7650 | 5341 | 1037 | 6704 |
| 0740 | 7300 | 1230 | 7012 | 7010 | 7630 | 5773 | 1230 | 7010 |
| 0750 | 7620 | 5631 | 1037 | 6704 | 7300 | 5772 | 0000 | 0000 |
| 0760 | 0000 | 0000 | 0000 | 0000 | 0000 | 0000 | 0000 | 0000 |
| 0770 | 0000 | 0000 | 0412 | 1266 | 0467 | 0755 | 1316 | 7764 |
| 1000 | 0000 | 6012 | 7450 | 5227 | 3055 | 4777 | 5217 | 1051 |
| 1010 | 7640 | 5626 | 1055 | 1043 | 7650 | 5217 | 5626 | 1376 |
| 1020 | 3226 | 3052 | 1062 | 7040 | 3062 | 5600 | 1032 | 6014 |
| 1030 | 5600 | 4226 | 1055 | 1375 | 7640 | 5231 | 1327 | 3063 |
| 1040 | 3073 | 4226 | 1055 | 0177 | 1073 | 3073 | 2063 | 5241 |
| 1050 | 3051 | 7040 | 3062 | 3064 | 3065 | 3066 | 3067 | 4226 |
| 1060 | 1055 | 1374 | 7640 | 5272 | 4330 | 1361 | 3064 | 1362 |
| 1070 | 3065 | 4226 | 1055 | 1373 | 7640 | 5344 | 4330 | 1361 |
| 1100 | 3066 | 1362 | 3067 | 4226 | 4226 | 4226 | 1055 | 0177 |
| 1110 | 1316 | 3312 | 7402 | 0062 | 3062 | 5257 | 1316 | 7773 |
| 1120 | 7776 | 7777 | 7777 | 7577 | 7677 | 7767 | 7377 | 7775 |
| 1130 | 0000 | 1166 | 3063 | 1372 | 3012 | 4226 | 1055 | 3412 |
| 1140 | 2063 | 5335 | 4475 | 4477 | 1162 | 1361 | 0035 | 7640 |
| 1150 | 5353 | 4500 | 0022 | 1022 | 3361 | 1023 | 3362 | 4771 |
| 1160 | 5730 | 0000 | 0000 | 0000 | 0000 | 0000 | 0000 | 0000 |
| 1170 | 0000 | 0621 | 1160 | 7710 | 7711 | 7673 | 1032 | 1200 |
| 1200 | 0000 | 1377 | 3057 | 3060 | 1055 | 7010 | 7430 | 2060 |
| 1210 | 2057 | 5205 | 7300 | 1060 | 7010 | 7420 | 5222 | 7300 |
| 1220 | 2200 | 5224 | 7200 | 7001 | 3060 | 5600 | 0000 | 0000 |
| 1230 | 6741 | 6744 | 1065 | 6726 | 7204 | 3056 | 6731 | 7510 |
| 1240 | 1376 | 1056 | 1064 | 6736 | 7300 | 6771 | 6774 | 1067 |
| 1250 | 6756 | 7204 | 3056 | 6761 | 7510 | 1375 | 1056 | 1066 |
| 1260 | 6766 | 7300 | 1033 | 6704 | 7300 | 5626 | 1374 | 3071 |
| 1270 | 1373 | 3070 | 3063 | 1040 | 6704 | 7300 | 6014 | 4772 |
| 1300 | 0000 | 6012 | 1371 | 7640 | 5315 | 1770 | 7010 | 7620 |
| 1310 | 5767 | 1037 | 6704 | 7300 | 5767 | 6014 | 5766 | 0271 |
| 1320 | 0323 | 0246 | 0200 | 0235 | 0307 | 0021 | 0020 | 0022 |
| 1330 | 0023 | 0024 | 0025 | 6036 | 1167 | 7650 | 5343 | 6036 |
| 1340 | 6046 | 5765 | 0000 | 1166 | 3760 | 7126 | 3011 | 4764 |
| 1350 | 3411 | 2760 | 5347 | 4477 | 0004 | 1003 | 7012 | 5762 |
| 1360 | 1546 | 0002 | 1534 | 5742 | 0362 | 0372 | 0470 | 0403 |
| 1370 | 0630 | 7765 | 0467 | 1300 | 0534 | 3770 | 3760 | 7772 |
| 1400 | 3325 | 5212 | 1377 | 3325 | 5212 | 1376 | 3325 | 5212 |
| 1410 | 1375 | 3325 | 4774 | 5216 | 5232 | 5245 | 1126 | 7450 |
| 1420 | 5773 | 7041 | 3324 | 1324 | 3322 | 3321 | 4266 | 2772 |
| 1430 | 5223 | 5263 | 4771 | 0146 | 4393 | 4770 | 4767 | 1131 |
| 1440 | 4766 | 2127 | 2772 | 5235 | 5263 | 7200 | 1146 | 3323 |
| 1450 | 1147 | 7040 | 1146 | 3324 | 1323 | 3321 | 1324 | 3322 |
| 1460 | 4266 | 2772 | 5254 | 7240 | 3772 | 5773 | 0000 | 2321 |
| 1470 | 4771 | 1521 | 4393 | 4770 | 4767 | 1131 | 2127 | 4766 |
| 1500 | 2322 | 5267 | 5666 | 0000 | 1325 | 7004 | 7620 | 5311 |
| 1510 | 4765 | 0102 | 1325 | 7006 | 7620 | 5317 | 4765 | 0104 |
| 1520 | 5703 | 0000 | 0000 | 0000 | 0000 | 0000 | 4764 | 4155 |
| 1530 | 1363 | 4553 | 4155 | 5773 | 7630 | 5340 | 4500 | 0022 |
| 1540 | 4355 | 3346 | 4355 | 7001 | 3350 | 1022 | 7402 | 1023 |
| 1550 | 7402 | 4550 | 2754 | 5730 | 1342 | 0000 | 1754 | 3362 |
| 1560 | 1762 | 5755 | 0000 | 0013 | 6521 | 0246 | 6276 | 2326 |
| 1570 | 4037 | 2505 | 2162 | 2026 | 3400 | 6000 | 2000 | 4000 |
| 1600 | 0000 | 7300 | 1777 | 7640 | 5227 | 1776 | 7640 | 5247 |
| 1610 | 7200 | 1112 | 3024 | 1113 | 3025 | 4775 | 0106 | 4775 |
| 1620 | 0114 | 4775 | 0110 | 1024 | 7710 | 5232 | 5247 | 1776 |
| 1630 | 7640 | 5305 | 7200 | 1112 | 3024 | 1113 | 3025 | 4775 |
| 1640 | 0106 | 4775 | 0106 | 1024 | 7710 | 5264 | 5305 | 7200 |
| 1650 | 1106 | 3024 | 1107 | 3025 | 4775 | 0114 | 4775 | 0110 |
| 1660 | 1024 | 7710 | 5305 | 5326 | 7200 | 1112 | 3024 | 1113 |
| 1670 | 3025 | 4775 | 0106 | 4774 | 6046 | 7200 | 1024 | 3773 |
| 1700 | 1025 | 3772 | 3771 | 3770 | 5350 | 7200 | 1106 | 3024 |
| 1710 | 1107 | 3025 | 4767 | 0024 | 4775 | 6046 | 7200 | 1024 |
| 1720 | 3773 | 1025 | 3772 | 3771 | 3770 | 5350 | 7200 | 1114 |
| 1730 | 3024 | 1115 | 3025 | 4767 | 0024 | 4775 | 0110 | 4775 |
| 1740 | 6046 | 7200 | 1024 | 3771 | 1025 | 3770 | 3773 | 3772 |
| 1750 | 7200 | 1773 | 3102 | 1772 | 3103 | 7200 | 1771 | 3104 |
| 1760 | 1770 | 3105 | 3766 | 5765 | 5600 | 6045 | 6044 | 0246 |
| 1770 | 6043 | 6042 | 6041 | 6040 | 0307 | 0271 | 6120 | 6121 |
| 2000 | 7300 | 6046 | 1152 | 7650 | 5217 | 3152 | 1377 | 4776 |
| 2010 | 4775 | 1374 | 7640 | 5217 | 4550 | 1373 | 4776 | 3126 |
| 2020 | 7001 | 3127 | 7300 | 6046 | 4550 | 5772 | 4550 | 7040 |
| 2030 | 3362 | 4775 | 3131 | 4771 | 7410 | 5332 | 1370 | 3016 |
| 2040 | 1367 | 3017 | 1131 | 7041 | 3361 | 1416 | 7450 | 5554 |
| 2050 | 1361 | 7640 | 5256 | 1417 | 3020 | 5420 | 2017 | 5245 |
| 2060 | 0000 | 0305 | 0303 | 0330 | 0331 | 0315 | 0322 | 0313 |
| 2070 | 0320 | 0314 | 0304 | 0301 | 0311 | 0323 | 0302 | 0316 |
| 2100 | 0324 | 0257 | 0327 | 0215 | 0000 | 0000 | 2200 | 1400 |
| 2110 | 1402 | 1405 | 1410 | 2600 | 2463 | 5704 | 5626 | 5400 |
| 2120 | 4207 | 5255 | 2246 | 2700 | 2400 | 2450 | 6132 | 1526 |
| 2130 | 2027 | 0000 | 1131 | 0177 | 3363 | 4775 | 3131 | 4771 |
| 2140 | 5354 | 1363 | 7006 | 7006 | 1131 | 1176 | 3363 | 4775 |
| 2150 | 3131 | 4771 | 7410 | 5554 | 1363 | 4766 | 7041 | 3362 |
| 2160 | 5234 | 0000 | 0000 | 0000 | 4040 | 4040 | 6705 | 2105 |
| 2170 | 2060 | 3455 | 2336 | 7011 | 7447 | 5502 | 6600 | 7001 |
| 2200 | 4777 | 3776 | 3775 | 1774 | 7640 | 5221 | 4550 | 1127 |
| 2210 | 4773 | 4550 | 4772 | 4771 | 4326 | 2127 | 1131 | 4770 |
| 2220 | 5204 | 4767 | 1366 | 3101 | 4771 | 4326 | 2127 | 1131 |
| 2230 | 4770 | 4550 | 1127 | 4773 | 4550 | 4772 | 4765 | 4771 |
| 2240 | 4326 | 2127 | 1131 | 4770 | 3774 | 5204 | 7200 | 3775 |
| 2250 | 7001 | 3151 | 7040 | 3101 | 3106 | 3107 | 3110 | 3111 |
| 2260 | 1364 | 4763 | 1362 | 4763 | 4761 | 1360 | 4763 | 4757 |
| 2270 | 3130 | 3126 | 7001 | 3133 | 7001 | 3127 | 7040 | 3134 |
| 2300 | 3116 | 3117 | 3120 | 3121 | 3151 | 5201 | 2401 | 2224 |
| 2310 | 1512 | 0000 | 3040 | 1411 | 1511 | 2440 | 7540 | 0000 |
| 2320 | 3140 | 1411 | 1511 | 2440 | 7540 | 0000 | 0000 | 2126 |
| 2330 | 1126 | 4756 | 1175 | 3131 | 4755 | 5726 | 1354 | 4553 |
| 2340 | 1774 | 7650 | 5352 | 3774 | 7040 | 1126 | 3126 | 7040 |
| 2350 | 1127 | 3127 | 5753 | 6502 | 0207 | 6200 | 2520 | 4235 |
| 2360 | 2320 | 4222 | 2312 | 6600 | 2306 | 6000 | 0111 | 1600 |
| 2370 | 6276 | 4037 | 3600 | 6735 | 4036 | 3341 | 4035 | 6521 |
| 2400 | 4777 | 4155 | 7200 | 3134 | 1376 | 3247 | 1375 | 6041 |
| 2410 | 5207 | 6046 | 2247 | 5207 | 1374 | 3101 | 3102 | 3103 |
| 2420 | 3104 | 3105 | 4773 | 1372 | 3101 | 1371 | 3103 | 1135 |
| 2430 | 3104 | 1136 | 3105 | 4773 | 1174 | 3101 | 1370 | 3103 |
| 2440 | 3104 | 3105 | 4773 | 4155 | 7040 | 3134 | 5767 | 0000 |
| 2450 | 4777 | 4155 | 1376 | 3247 | 6041 | 5254 | 6046 | 2247 |
| 2460 | 5254 | 4155 | 5767 | 4777 | 7240 | 1127 | 3130 | 3126 |
| 2470 | 7200 | 1106 | 3116 | 1107 | 3117 | 7200 | 1110 | 3120 |
| 2500 | 1111 | 3121 | 1127 | 3133 | 5767 | 0000 | 7200 | 1705 |
| 2510 | 3131 | 1531 | 4320 | 1331 | 3131 | 4332 | 2305 | 5705 |
| 2520 | 0000 | 3330 | 1330 | 1330 | 1330 | 1330 | 1330 | 5720 |
| 2530 | 0000 | 7000 | 0000 | 4346 | 3101 | 4346 | 3102 | 4346 |
| 2540 | 3103 | 4346 | 3104 | 4346 | 3105 | 5732 | 0000 | 1531 |
| 2550 | 2131 | 5746 | 0000 | 1173 | 3362 | 1366 | 4553 | 2362 |
| 2560 | 5355 | 5752 | 0000 | 0577 | 1500 | 2601 | 0040 | 2026 |
| 2570 | 4704 | 0764 | 0311 | 4400 | 0002 | 0000 | 7600 | 6521 |
| 2600 | 3277 | 4777 | 1376 | 7450 | 5211 | 1375 | 7640 | 5554 |
| 2610 | 2277 | 1126 | 3273 | 1374 | 3126 | 4773 | 5221 | 5274 |
| 2620 | 5240 | 6032 | 1273 | 3126 | 4772 | 4771 | 2126 | 1126 |
| 2630 | 4770 | 1175 | 3131 | 4767 | 2127 | 1131 | 4766 | 5224 |
| 2640 | 5752 | 1273 | 3126 | 4772 | 1132 | 7510 | 5765 | 7041 |
| 2650 | 1146 | 7740 | 5243 | 1132 | 7041 | 1147 | 7710 | 5764 |
| 2660 | 4771 | 2126 | 1126 | 4770 | 1175 | 3131 | 4767 | 2127 |
| 2670 | 1131 | 4766 | 5243 | 0000 | 1273 | 3126 | 5554 | 0000 |

| | 45 | | | | | | | | | 46 | | | | | | | |
|---|---|---|---|---|---|---|---|---|---|---|---|---|---|---|---|---|---|
| 2700 | 1126 | 3273 | 1374 | 3126 | 4773 | 5317 | 5310 | 5274 | 4300 | 3352 | 7300 | 3350 | 1531 | 3353 | 2131 | 1531 | 3354 |
| 2710 | 1146 | 3133 | 7240 | 3134 | 1273 | 3126 | 5763 | 3134 | 4310 | 7200 | 1022 | 3024 | 1023 | 3025 | 7300 | 1025 | 1354 |
| 2720 | 1273 | 3126 | 5763 | 0000 | 4762 | 3351 | 1172 | 3020 | 4320 | 3025 | 7204 | 1024 | 1353 | 3024 | 7420 | 5336 | 7200 |
| 2730 | 1361 | 3350 | 4762 | 3750 | 2350 | 2020 | 5332 | 4760 | 4330 | 1024 | 3022 | 1025 | 3023 | 2350 | 5310 | 1350 | 3752 |
| 2740 | 0140 | 1351 | 0357 | 7640 | 5723 | 4756 | 0022 | 5723 | 4340 | 2352 | 2131 | 2351 | 5301 | 1023 | 3144 | 2250 | 5650 |
| 2750 | 0000 | 0000 | 4551 | 6032 | 5241 | 0140 | 0246 | 0060 | 4350 | 0000 | 0000 | 0000 | 0000 | 0116 | 0440 | 2205 | |
| 2760 | 0200 | 0140 | 3067 | 2026 | 5553 | 5551 | 6276 | 6200 | 4360 | 2422 | 0140 | 7774 | 6122 | 0253 | 0246 | 0255 | 6072 |
| 2770 | 2520 | 4037 | 3000 | 3400 | 1750 | 0004 | 7473 | 5502 | 4370 | 6050 | 3200 | 5527 | 2026 | 5200 | 5502 | 0212 | 0215 |
| 3000 | 0000 | 4267 | 1377 | 7440 | 5201 | 4267 | 3142 | 4267 | 4400 | 0000 | 4777 | 1376 | 4553 | 1134 | 7640 | 5211 | 4777 |
| 3010 | 3143 | 4267 | 3144 | 3140 | 3141 | 4776 | 0140 | 1023 | 4410 | 5223 | 3132 | 4775 | 0132 | 2133 | 1142 | 4774 | 1143 |
| 3020 | 3132 | 7240 | 3101 | 3103 | 3102 | 3105 | 3104 | 4267 | 4420 | 4774 | 1144 | 4774 | 1101 | 0373 | 7450 | 5254 | 3020 |
| 3030 | 4775 | 0147 | 4254 | 4775 | 0067 | 4774 | 4775 | 0070 | 4430 | 1372 | 4553 | 1371 | 4553 | 1020 | 7012 | 7430 | 5246 |
| 3040 | 4773 | 4775 | 0124 | 5246 | 4267 | 5241 | 4254 | 5241 | 4440 | 7012 | 7630 | 5252 | 1370 | 4553 | 1366 | 5254 | 5246 |
| 3050 | 1101 | 7040 | 3101 | 5600 | 0000 | 4267 | 4267 | 0177 | 4450 | 4553 | 5315 | 1366 | 5244 | 1102 | 1103 | 7650 | 5265 |
| 3060 | 1772 | 3131 | 1531 | 0101 | 3101 | 4267 | 5654 | 0000 | 4460 | 1365 | 4553 | 4775 | 0102 | 4764 | 1104 | 1105 | 7650 |
| 3070 | 7200 | 6031 | 5271 | 6036 | 3131 | 5354 | 7450 | 5270 | 4470 | 5276 | 1363 | 4553 | 4775 | 0104 | 4764 | 1342 | 3020 |
| 3100 | 3131 | 4775 | 0377 | 5270 | 1770 | 7640 | 5315 | 4775 | 4500 | 1101 | 7010 | 4321 | 7012 | 4321 | 7012 | 4321 | 7010 |
| 3110 | 0200 | 5250 | 4767 | 1131 | 5667 | 1131 | 0366 | 1376 | 4510 | 4321 | 7010 | 4321 | 7010 | 4321 | 7200 | 1363 | 4553 |
| 3120 | 3131 | 4765 | 5324 | 5313 | 4775 | 0215 | 5250 | 4775 | 4520 | 5600 | 0000 | 2020 | 7420 | 5721 | 3021 | 1361 | 4553 |
| 3130 | 0255 | 7410 | 2131 | 1131 | 0364 | 1342 | 3337 | 7402 | 4530 | 1420 | 7012 | 7010 | 0366 | 4774 | 1420 | 0366 | 4774 |
| 3140 | 3131 | 5313 | 1343 | 0147 | 0067 | 0070 | 0147 | 0160 | 4540 | 1021 | 5721 | 4542 | 0012 | 0071 | 0073 | 0074 | 0006 |
| 3150 | 0100 | 0124 | 0105 | 0603 | 1131 | 1167 | 7650 | 5771 | 4550 | 0075 | 1146 | 1130 | 3146 | 1147 | 1130 | 0074 | 0006 |
| 3160 | 1131 | 5276 | 4040 | 4040 | 0007 | 3455 | 0177 | 3540 | 4560 | 2753 | 0124 | 0200 | 0070 | 6307 | 0067 | 0007 | 0031 |
| 3170 | 2677 | 2026 | 5752 | 3530 | 3520 | 5135 | 0200 | 7673 | 4570 | 0010 | 0026 | 0147 | 0412 | 6332 | 4250 | 0105 | 2552 |
| 3200 | 0000 | 7200 | 3140 | 3141 | 3142 | 3143 | 3144 | 3337 | 4600 | 0000 | 1130 | 1777 | 4776 | 1172 | 3020 | 4775 | 2020 |
| 3210 | 3340 | 5214 | 4777 | 3131 | 1131 | 1376 | 7650 | 5326 | 4610 | 5206 | 1374 | 3131 | 1373 | 3020 | 1101 | 3340 | 1340 |
| 3220 | 1131 | 1375 | 7650 | 5326 | 1131 | 1374 | 7650 | 5326 | 4620 | 7110 | 3340 | 7630 | 4350 | 4775 | 2131 | 2020 | 5217 |
| 3230 | 1131 | 1171 | 7650 | 5326 | 1131 | 1373 | 7650 | 5772 | 4630 | 1372 | 3020 | 1340 | 7012 | 3340 | 1340 | 7110 | 3340 |
| 3240 | 1131 | 1371 | 7650 | 5342 | 1131 | 1370 | 7650 | 5767 | 4640 | 7630 | 4350 | 4775 | 2131 | 2020 | 5235 | 7200 | 1101 |
| 3250 | 1131 | 1366 | 7650 | 5765 | 1131 | 1176 | 7710 | 5303 | 4650 | 0371 | 7640 | 5600 | 1172 | 3020 | 4775 | 2020 | 5255 |
| 3260 | 1131 | 1170 | 7700 | 5303 | 1131 | 0177 | 3131 | 1337 | 4660 | 4770 | 0102 | 4767 | 4775 | 4775 | 4775 | 4770 | 0104 |
| 3270 | 7650 | 5312 | 1340 | 1173 | 7650 | 5303 | 1131 | 3420 | 4670 | 4767 | 1172 | 3020 | 4775 | 2020 | 5273 | 7200 | 1102 |
| 3300 | 2020 | 2340 | 5212 | 1364 | 4553 | 1363 | 4553 | 4777 | 4700 | 3024 | 1103 | 3025 | 4766 | 0122 | 7200 | 1024 | 3122 |
| 3310 | 3131 | 5201 | 1141 | 3140 | 1142 | 3141 | 1143 | 3142 | 4710 | 1144 | 3024 | 1105 | 3025 | 4766 | | | |
| 3320 | 1144 | 3143 | 1131 | 3144 | 2340 | 5212 | 4762 | 0140 | 4720 | 0124 | 7200 | 1024 | 3124 | 1025 | 3125 | 4770 | 0122 |
| 3330 | 1341 | 7650 | 5335 | 4761 | 0022 | 3341 | 5600 | 0000 | 4730 | 4767 | 4775 | 4775 | 4775 | 4770 | 0124 | 4767 | 5600 |
| 3340 | 0000 | 0000 | 1363 | 4553 | 3341 | 3140 | 3141 | 3142 | 4740 | 0000 | 0323 | 0322 | 0327 | 0311 | 0304 | 0314 | 0320 |
| 3350 | 3143 | 3144 | 3337 | 3340 | 5212 | 1603 | 1077 | 1500 | 4750 | 0000 | 1531 | 4553 | 2350 | 5750 | 1130 | 1765 | 5760 |
| 3360 | 3374 | 0246 | 0200 | 0212 | 0277 | 6540 | 7557 | 5125 | 4760 | 5721 | 1146 | 1130 | 5764 | 5735 | 5702 | 0307 | 5200 |
| 3370 | 7564 | 7572 | 6220 | 7522 | 7503 | 7523 | 7525 | 5527 | 4770 | 4250 | 0002 | 7775 | 7774 | 4741 | 6559 | 6735 | 5702 |
| 3400 | 0000 | 7201 | 3146 | 1126 | 3147 | 4777 | 3131 | 1131 | 5000 | 0000 | 3164 | 3165 | 1163 | 7650 | 7410 | 5211 | 4777 |
| 3410 | 1167 | 7650 | 5600 | 4255 | 5554 | 2200 | 4267 | 1020 | 5010 | 3131 | 4776 | 5207 | 5207 | 5261 | 5244 | 4335 | 0275 |
| 3420 | 7041 | 1127 | 7750 | 5554 | 1020 | 3146 | 1131 | 1376 | 5020 | 5263 | 4335 | 0301 | 5775 | 4335 | 0206 | 5353 | 4335 |
| 3430 | 7640 | 5755 | 4777 | 3131 | 4255 | 5554 | 2200 | 4267 | 5030 | 0214 | 5325 | 4335 | 0221 | 5774 | 4335 | 0256 | 5244 |
| 3440 | 1020 | 7041 | 1127 | 7750 | 5554 | 1146 | 7041 | 1020 | 5040 | 4335 | 0252 | 5773 | 5346 | 4772 | 7200 | 1164 | 3024 |
| 3450 | 7710 | 5554 | 1020 | 3147 | 5755 | 0000 | 1131 | 1176 | 5050 | 1165 | 3025 | 4771 | 7200 | 1024 | 3164 | 1025 | 3165 |
| 3460 | 7710 | 5655 | 1131 | 1170 | 7710 | 2255 | 5655 | 0000 | 5060 | 5211 | 2770 | 5207 | 4767 | 0164 | 4766 | 4550 | 1765 |
| 3470 | 3317 | 5306 | 1317 | 7510 | 5554 | 7106 | 1317 | 7104 | 5070 | 7640 | 5303 | 1600 | 3131 | 1164 | 3531 | 2131 | 1165 |
| 3500 | 1131 | 3317 | 4777 | 3131 | 4255 | 5312 | 1131 | 1176 | 5100 | 3531 | 2200 | 5600 | 1200 | 3131 | 1364 | 1531 | 3316 |
| 3510 | 3131 | 5272 | 1317 | 7550 | 5554 | 3020 | 5667 | 0000 | 5110 | 7200 | 1164 | 3024 | 1165 | 3025 | 4763 | 0000 | 7200 |
| 3520 | 0000 | 4775 | 1022 | 3102 | 1023 | 3103 | 4774 | 5720 | 5120 | 1024 | 3164 | 1025 | 3165 | 5272 | 1151 | 7640 | 5762 |
| 3530 | 0000 | 4775 | 1022 | 3104 | 1023 | 3105 | 4774 | 5730 | 5130 | 4550 | 3163 | 3765 | 3770 | 5201 | 0000 | 7200 | 1131 |
| 3540 | 0000 | 1373 | 3366 | 3367 | 1131 | 7010 | 7430 | 2367 | 5140 | 7041 | 1735 | 7640 | 2335 | 2335 | 5735 | 1361 | 4553 |
| 3550 | 2366 | 5345 | 1367 | 7010 | 7620 | 5360 | 7300 | 5740 | 5150 | 1360 | 4553 | 5207 | 1360 | 4553 | 3163 | 3770 | 5207 |
| 3560 | 1372 | 4771 | 4155 | 5770 | 2005 | 0000 | 0000 | 4553 | 5160 | 0212 | 0277 | 3342 | 0271 | 0004 | 4035 | 5200 | 4250 |
| 3570 | 2336 | 6600 | 3564 | 7770 | 3067 | 2723 | 7524 | 5502 | 5170 | 3341 | 0323 | 3200 | 5240 | 6540 | 6155 | 6242 | 5527 |
| 3600 | 0000 | 1101 | 0377 | 3312 | 7240 | 3101 | 4776 | 3131 | 5200 | 0000 | 1377 | 4553 | 1145 | 4553 | 1140 | 7450 | 5230 |
| 3610 | 4775 | 5273 | 5313 | 5313 | 5313 | 4774 | 0324 | 4320 | 5210 | 4224 | 1141 | 4224 | 1376 | 4553 | 1142 | 4224 | 1143 |
| 3620 | 4774 | 0252 | 5313 | 4774 | 0301 | 5323 | 4774 | 0275 | 5220 | 4224 | 1144 | 4224 | 5600 | 0000 | 1375 | 4553 | 5624 |
| 3630 | 5313 | 4774 | 0256 | 5313 | 4774 | 0323 | 5326 | 4774 | 5230 | 1377 | 4553 | 1141 | 7640 | 5211 | 1377 | 4553 | 5213 |
| 3640 | 0322 | 5330 | 4774 | 0327 | 5332 | 4774 | 0311 | 5334 | 5240 | 1774 | 3131 | 1531 | 3131 | 1531 | 3164 | 2131 | 1531 |
| 3650 | 4774 | 0304 | 5336 | 4774 | 0314 | 5340 | 4774 | 0320 | 5250 | 3165 | 4773 | 0164 | 4200 | 5772 | 4771 | 5554 | 5261 |
| 3660 | 5342 | 4774 | 0214 | 5344 | 4774 | 0221 | 5773 | 5346 | 5260 | 5554 | 1146 | 7041 | 1126 | 7001 | 4770 | 7041 | 3346 |
| 3670 | 0101 | 3101 | 5206 | 1101 | 7040 | 3101 | 1101 | 0377 | 5270 | 1126 | 4770 | 1175 | 1367 | 3347 | 1347 | 4766 | 1347 |
| 3700 | 7640 | 5772 | 1312 | 7650 | 5772 | 1101 | 0371 | 1370 | 5300 | 1365 | 3350 | 7240 | 1146 | 3351 | 4764 | 5351 | 7200 |
| 3710 | 3101 | 5772 | 0000 | 7200 | 3101 | 7001 | 3163 | 5302 | 5310 | 1122 | 3106 | 1123 | 3107 | 7200 | 1124 | 3110 | 1125 |
| 3720 | 7040 | 3767 | 5766 | 7040 | 3765 | 5206 | 1364 | 5270 | 5320 | 3111 | 4763 | 1747 | 3750 | 7240 | 1347 | 3347 | 7240 |
| 3730 | 1363 | 5270 | 1362 | 5270 | 1361 | 5270 | 1360 | 5270 | 5330 | 1350 | 3350 | 2346 | 5322 | 2126 | 2127 | 1146 | 4770 |
| 3740 | 1357 | 5270 | 1371 | 5270 | 5204 | 1356 | 4553 | | 5340 | 1175 | 3131 | 4762 | 4761 | 2146 | 5261 | 0000 | 0000 |
| 3750 | 1355 | 4553 | 5206 | 4040 | 2223 | 0212 | 0277 | 7577 | 5350 | 0000 | 0000 | 4040 | 4040 | 4040 | 4040 | 1215 | 6132 |
| 3760 | 7677 | 7767 | 7773 | 7775 | 7776 | 4035 | 2201 | 4036 | 5360 | 5757 | 4037 | 6200 | 3600 | 6400 | 0005 | 6276 | 0004 |
| 3770 | 0400 | 7377 | 4000 | 6540 | 5135 | 6242 | 5527 | 0012 | 5370 | 2520 | 3400 | 5007 | 4250 | 5000 | 0260 | 0256 | 0240 |
| 4000 | 1101 | 0377 | 7640 | 5223 | 4776 | 0102 | 3163 | 1235 | 5400 | 4777 | 5554 | 5272 | 5204 | 1146 | 7041 | 1147 | 7041 |
| 4010 | 3775 | 3235 | 4776 | 0104 | 1235 | 3774 | 3235 | 4550 | 5410 | 3275 | 1147 | 7041 | 1126 | 7650 | 5243 | 7001 | 1147 |
| 4020 | 1773 | 3237 | 5637 | 7200 | 3102 | 3103 | 3104 | 3105 | 5420 | 4776 | 1175 | 3277 | 1146 | 4776 | 1175 | 3300 | 1147 |
| 4030 | 3106 | 3107 | 3110 | 3111 | 5217 | 0000 | 0000 | 0000 | 5430 | 7041 | 1126 | 4776 | 7041 | 3301 | 1677 | 3700 | 2277 |
| 4040 | 7300 | 1107 | 1103 | 3107 | 7204 | 1106 | 1102 | 3106 | 5440 | 2300 | 2301 | 5235 | 1275 | 7041 | 1126 | 3126 | 1275 |
| 4050 | 7100 | 1111 | 1105 | 3111 | 7204 | 1110 | 1104 | 3110 | 5450 | 7041 | 1127 | 3127 | 1126 | 3276 | 4775 | 5476 | 7200 |
| 4060 | 1236 | 7640 | 5637 | 1106 | 7710 | 5331 | 1110 | 7700 | 5460 | 1122 | 3106 | 1123 | 3107 | 7200 | 1124 | 3110 | 1125 |
| 4070 | 5340 | 1112 | 3024 | 1113 | 3025 | 4772 | 0106 | 1024 | 5470 | 3111 | 5774 | 1146 | 3147 | 5204 | 0000 | 0000 | 0000 |
| 4100 | 7710 | 5322 | 1114 | 3024 | 1115 | 3025 | 4771 | 0110 | 5500 | 0000 | 0000 | 0000 | 4773 | 3326 | 1326 | 1171 | 7650 |
| 4110 | 1024 | 2700 | 5637 | 4352 | 1370 | 4553 | 1367 | 4553 | 5510 | 5303 | 1326 | 1372 | 7650 | 5774 | 1326 | 1371 | 7650 |
| 4120 | 4550 | 5637 | 4352 | 1366 | 4553 | 1365 | 4553 | 4550 | 5520 | 5323 | 1326 | 5702 | 1370 | 4553 | 5321 | 0000 | 0000 |
| 4130 | 5302 | 4352 | 1370 | 4553 | 1365 | 4553 | 4550 | 5266 | 5530 | 4773 | 3350 | 1350 | 1367 | 7650 | 5766 | 1350 | 1167 |
| 4140 | 1111 | 7650 | 5271 | 1366 | 4553 | 1367 | 4553 | 4550 | 5540 | 7650 | 5344 | 1350 | 5727 | 1370 | 4553 | 1365 | 5727 |
| 4150 | 4550 | 5271 | 0000 | 1364 | 4763 | 5752 | 2220 | 7715 | 5550 | 0000 | 1364 | 4763 | 4155 | 5766 | 1617 | 4002 | 4043 |
| 4160 | 4173 | 4040 | 4040 | 6600 | 6353 | 0330 | 0253 | 0331 | 5560 | 0000 | 6377 | 1500 | 6600 | 5555 | 0240 | 2336 | 5500 |
| 4170 | 0255 | 0307 | 0271 | 3600 | 6945 | 6044 | 5000 | 0002 | 5570 | 0212 | 7563 | 7441 | 5600 | 2026 | 6400 | 2520 | 3400 |
| 4200 | 0000 | 7200 | 1377 | 4553 | 1376 | 4553 | 5600 | 4775 | 5600 | 0000 | 6031 | 5201 | 6036 | 1377 | 7450 | 5212 | 1376 |
| 4210 | 1167 | 7640 | 5554 | 4250 | 0106 | 4774 | 4250 | 0110 | 5610 | 4215 | 5600 | 7200 | 4550 | 5207 | 0000 | 6041 | 5216 |
| 4220 | 4774 | 5773 | 0000 | 4772 | 3131 | 4771 | 7200 | 1022 | 5620 | 6046 | 5615 | 7200 | 1375 | 4553 | 5774 | 4773 | 5232 |
| 4230 | 3112 | 1023 | 3113 | 4770 | 5622 | 0000 | 4772 | 3131 | 5630 | 5252 | 5267 | 1126 | 7450 | 5774 | 7041 | 3303 | 3302 |
| 4240 | 4771 | 7200 | 1022 | 3114 | 1023 | 3115 | 4767 | 5635 | 5640 | 4772 | 5702 | 2302 | 4771 | 0146 | 7240 | 1146 | 3302 | 4772 |
| 4250 | 0000 | 1531 | 2630 | 3131 | 1531 | 3022 | 2131 | 1531 | 5650 | 5242 | 5774 | 4771 | 0146 | 7240 | 1146 | 3302 | 4772 |
| 4260 | 3023 | 1022 | 7700 | 5271 | 1366 | 3145 | 4765 | 0022 | 5660 | 5702 | 7201 | 1302 | 3302 | 4770 | 4550 | 5774 | 7240 |
| 4270 | 5273 | 1364 | 3145 | 1363 | 3131 | 1362 | 3351 | 1361 | 5670 | 1146 | 3302 | 4772 | 5702 | 1147 | 7041 | 1146 | 1367 |

```
5700   3303 5242 0000 0000 4773 5310 5331 5341
5710   1126 7450 5774 7041 3303 3302 4155 2302
5720   5764 3133 4771 5702 4766 2303 5317 4155
5730   5774 4771 0146 4155 5765 3133 4766 4155
5740   5774 7240 1146 3302 1147 7041 1146 1367
5750   3303 5316 5752 7773 7776 7757 7737 7577
5760   7677 7767 7377 7775 4755 4761 4400 7777
5770   4600 2505 6400 3400 2026 0277 0275 7503
6000   0000 1244 7640 5220 7200 1102 3024 1103
6010   3025 4777 6040 7200 1024 3102 1025 3103
6020   1245 7640 5600 7200 1104 3024 1105 3025
6030   4777 6042 7200 1024 3104 1025 3105 5600
6040   0000 0000 0000 0000 0000 0000 0000 4704
6050   0000 7200 1112 3024 1113 3025 4777 6114
6060   1024 7540 5267 7640 5270 1025 7640 7201
6070   3320 5650 0000 7200 1114 3024 1115 3025
6100   4777 6116 1024 7540 5311 7640 5312 1025
6110   7640 7201 3321 5672 0014 6424 0007 1474
6120   0000 0000 7775 4360 7777 6030 7777 7634
6130   7777 7766 1130 7450 5745 7041 1147 3147
6140   1130 7041 1146 3146 5745 3407 1130 7041
6150   1127 1361 7710 2127 5760 7240 3771 5770
6160   2336 7664 4057 2217 2524 1116 0540 2417
6170   5007 4035 2026 0260 4250 7503 5502 0271
6200   0000 1101 4102 4214 1103 4214 1104
6210   4214 1105 4214 5600 0000 3531 2131 5614
6220   1777 7640 5776 2777 1775 1173 7700 5776
6230   1143 3140 1144 3141 3143 3144 1374 3020
6240   3775 5773 0000 7200 1131 1171 7650 5642
6250   2242 1131 1372 7650 5642 2242 1131 1371
6260   7650 5642 2242 1131 1176 7710 5274 1131
6270   1170 7700 5274 5642 2242 5642 0000 7100
6300   1370 1367 7620 5676 1366 4765 5764 0000
6310   1145 7012 7630 1363 1362 4553 1361 3331
6320   1330 3020 2020 1420 4332 2331 5322 5707
6330   0137 0000 0000 1340 3131 1531 4553 5732
6340   6341 0040 0001 0002 0023 0004 0025 0026
6350   0007 0010 0031 1706 1417 2700 0440 1140
6360   2405 7773 0100 0060 6146 6600 6530 0201
6370   0005 7523 7525 3212 0142 3340 3303 3337
6400   0000 1600 3131 1531 4777 1175 3131 7200
6410   1116 3024 1117 3025 4273 5231 4776 7006
6420   1217 7041 1131 7710 5231 1375 1217 3217
6430   5216 7200 1024 3122 1025 3123 1374 3217
6440   7200 1120 3024 1121 3025 4273 5262 4776
6450   7010 1250 7041 1131 7710 5262 1375 1250
6460   3250 5247 7200 1024 3124 1025 3125 1373
6470   3250 2200 5600 0000 1175 7041 1131 7640
6500   2273 5673 4200 0126 7200 1122 3106 1123
6510   3107 7200 1124 3110 1125 3111 7240 3772
6520   5771 0000 4770 1167 7640 5554 4550 5721
6530   0317 2205 4011 2340 0625 1414 5615 1200
6540   1151 7640 5767 4550 1766 7640 5765 5764
6550   0000 7200 1363 4553 5750 2520 2440 1517
6560   1611 2417 2240 0240 2201 2232 4036 3342
6570   5502 2026 2162 7010 7006 0005 0307 2520
6600   0000 3335 7040 2135 2335 3217 1217
6610   7012 7012 7012 4220 1217 4220 5204 0000
6620   0000 0275 7450 5600 2273 5243 1276 7510
6630   5233 1277 5261 1274 7440 5241 7200 3273
6640   5620 1300 5261 1301 7440 5253 7200 1302
6650   4265 1303 5261 3305 1300 4265 1305 1304
6660   5226 4265 7240 3273 5620 0000 6041 5266
6670   6046 7200 5665 7777 0023 0077 7740 0240
6700   0315 7766 0215 0212 0012 0000 3200 1200
6710   0333 7112 3217 1217 7010 1217 7041 1200
6720   3200 1200 0334 7112 3217 1217 7010 1217
6730   7041 1200 5705 7400 7760 0000 3200 3217
6740   1372 3220 1371 3350 7410 3200 7100 1200
6750   1373 7430 2217 7430 5345 7200 1217 1377
6760   6041 5360 6046 7200 3217 2350 2220 5347
6770   5735 1373 7774 6030 7634 7766 7777 0260
7000   0000 1116 2324 2225 0324 1117 1623 7715
7010   1200 0317 1515 0116 0440 1517 0405 4003
7020   1715 1501 1604 2315 1215 1223 5511 1611
7030   2411 0114 4004 0124 0115 1205 5522 0524
7040   2522 1640 0401 2401 1512 1155 2320 0503
7050   1101 1440 0516 2422 3140 0401 2401 1512
7060   0255 2305 2440 0214 1703 1340 0317 2516
7070   2405 2215 1203 5503 1720 3115 1230 5503
7100   1720 3140 3040 2205 2615 1231 5503 1720
7110   3140 3140 2205 2615 1215 5503 1720 3140
7120   3046 3140 2205 2615 1222 0555 2205 0104
7130   4024 0120 0554 4005 1101 4003 1704 0504
7140   1512 2201 5522 0501 0440 2401 2005 5440
7150   0123 0311 1140 0317 0405 0415 1220 5520
7160   2516 0310 4024 0120 0515 1224 5520 2516
7170   0310 4024 2201 1114 0522 1512 1655 2025
7200   1603 1055 1517 2605 4024 1740 1722 1107
7210   1116 1512 2755 2025 1603 1040 2205 2711
7220   1604 2240 1703 0310 0122 0103 2405
7230   2215 1214 5514 1123 2415 1213 5513 1114
7240   1415 1204 5504 0514 0524 0515 1201 5501
7250   0223 1714 2524 0540 2017 2311 2411 1716
7260   1512 5775 5520 2211 1624 4002 2506 0605
7270   2240 1405 1607 2410 1512 1512 1512 0401
7300   2401 4015 1704 0540 5540 0317 1515 0116
7310   0423 1512 1512 2255 2205 2422 0103 2415
7320   1227 5522 0527 1116 0415 1211 5511 1610
7330   1102 1124 4020 2516 0310 1512 2355 2324
7340   1720 1512 1455 1417 0104 4020 1711 1624
7350   1512 0455 0411 0540 0310 0116 0705 1512
7360   2455 0125 2417 4024 1717 1440 0310 0116
7370   0705 1512 2055 2025 1603 1040 1716 1512
7400   7200 7404 3256 7402 7404 7040 1256 3257
7410   5213 2260 5226 1265 3260 4247 1256 4661
7420   1265 3247 1264 4241 2247 5222 7200 1656
7430   4661 1264 4241 2256 2257 5211 4247 7402
7440   5200 7433 6046 6041 5243 7200 5641 0000
7450   7200 1263 4241 1262 4241 5647 7456 7457
7460   7770 7466 0212 0215 0240 7770 7431 3311
7470   1313 3310 1311 7004 7004 7006 3311 1311
7500   0314 1315 4712 1311 2310 5274 7200 5666
7510   0000 0000 7441 7774 0007 0260 4015 1704
7520   0540 5540 0522 2217 2240 2205 0317 2605
7530   2231 1512 1512 5027 1124 1040 0317 1624
7540   2217 1440 2310 1106 2451 1512 0655 0405
7550   1405 2405 2340 1625 1505 2211 0340 0611
7560   0514 0415 1214 5504 0514 0524 0523 4016
7570   2515 0522 1103 4014 1116 0515 0000 5504
7600   3325 5212 1350 3325 5212 1347 3325 0006
7610   0300 0010 0000 6201 0200 0510 7516 7450
7620   5744 7041 3324 1324 3322 3321 7725 3212
7630   4260 1300 7750 5237 2212 7040 5227 1212
7640   7640 5230 1214 0210 1341 7510 2226 7750
7650   5626 1214 0256 1257 3213 5230 0070 6201
7660   7631 5270 6031 5262 6036 3214 1214 5660
7670   6011 5270 6012 6014 5265 4343 7041 1215
7700   7402 6032 6014 6224 1257 3213 7604 7700
7710   1207 1352 3261 4226 5313 3215 1213 3336
7720   1214 3376 4260 3211 4226 5275 4343 7420
7730   5336 3216 1376 1211 1215 5315 6201 3616
7740   2216 7600 5332 7676 1376 7106 7006 7006
7750   1211 5743 5262 7600 6016 7160 7006 7140
7760   7006 6011 5361 7510 5353 7006 6012 7430
7770   3376 3776 6014 7420 2376 5357 0005 5301
```

II. SYMBOLIC EXPLANATION OF MEMORY CONTENTS

DEFINE WAITFO/MACRO DEFINITIONS
<JMS WAIT>
DEFINE DOMOVE
<JMS MOVER>
DEFINE EXEQ COMM
<TAD COMM;LCF;CLA CLL>
DEFINE ADD ARGA
<JMS DBADD;ARGA>
DEFINE CLE
<CLA CLL;DCA DAC; DCA DAC+1>
DEFINE SUB ARGB
<JMS DBSUB;ARGB>
DEFINE TRANS DIGIT
<JMS ELABIN;DIGIT>
DEFINE DCIA ARGC
<JMS DBCIA;ARGC>
DEFINE PRINT ARGD
<TAD (ARGD;JMS MESAGE>

/ACTUAL LOCATIONS OF VARIABLES USED BY BOTH CONTROL AND/TAPE-PREP. (FOR ASSEMBLY PURPOSES):

T1=20
T2=21
DAC=24
DMQ=22
ADDS=323
DBADD=307
DBCIA=246
DBSUB=271
EIABIN=200
SHLI=235

/STATUS WORD AND COMMAND WORD REGISTER IOT DEFINITIONS:

RDXH=6731/READ UPPER X-AXIS COUNTER INTO ACC
RDXL=6744/READ LOWER X-AXIS COUNTER INTO ACC
RDYH=6761/READ UPPER Y-AXIS COUNTER INTO ACC
RDYL=6774/READ LOWER Y-AXIS COUNTER INTO ACC
CLXH=6732/CLEAR UPPER X-AXIS COUNTER.
CLXL=6722/CLEAR LOWER X-AXIS COUNTER.

II—Continued

CLYH=6762/CLEAR UPPER Y-AXIS COUNTER.
CLYL=6752/CLEAR LOWER Y-AXIS COUNTER.
HX=6741/SET X-AXIS SYNCHRONIZER.
HY=6771/SET Y-AXIS SYNCHRONIZER.
LDXH=6736/CLEAR & LOAD UPPER X-AXIS & CLEAR X-AXIS SYNCH.
LDXL=6726/CLEAR & LOAD LOWER X-AXIS & CLEAR X-AXIS SYNCH.

```
                    LDYH=6766    /  "    "    "  UPPER Y-AXIS & CLEAR Y-AXIS SYNCH
                    LDYL=6756    /  "    "    "  LOWER  "    "    " .
                    LCF=6704     /LOAD ACC. INTO COMMAND WORD REGISTER.
                    RSW=6712         /READ STATUS WORD INTO ACC
                    CLCW=6702    /CLEAR TOOL LIGHT & REV.READ BITS IN COMM.WORD.
                    CLSW=6714    /CLEAR DATA RESET AND CLOCK BITS.
                    CLSF=6701    /CLEAR STATUS WORD FLAG. (FOR INTERRUPT)
                    SNSF=6711    /SKIP IF STATUS WORD FLAG IS NOT SET.
        /BEGIN LOCATION ASSIGNMENTS.
        *1
                    0001  5402  JMP I .+1 /INTERRUPT RETURNS HERE FROM TAPE PREP.
                    0002  0503  INTSER
        0003  0000      TBUF,0                /BUFFER FOR 'TYPE' MODE
                    0004  0000  0
                    0005  0000  0
                    0006  0000  0
                    0007  0000  0
                    0010  0000  0
        0011  0002      TPTR,TBUF-1           /POINTER FOR TBUF
        0012  1160      RP,RB-1               /READER BUFFER POINTER.(AUTO-INDEXER)
        *26
        0026  0000      PONSW,0               /SWITCH TO TELL IF PUNCH SHOULD BE ON
        0027  4000      PUNCH,4000            /COMMAND WORD REGISTER BIT DEFINES.
        0030  2000      BLOKCT,2000
        0031  1000      RESET,1000
        0032  0400      RETRACT,400
        0033  0200      MOVE,200
        0034  0100      TOOLL,100
        0035  0060      LPOSL,40+20
        0036  0014      ERROR,10+4
        0037  0004      RUNOFF,4
        0040  0002      REVREAD,2
        0041  0100      RUNSW,100
        0042  0020      STEPSW,20             /STATUS WORD REGISTER BIT MASKS.
        0043  7600      STACLR,7600
        0044  0002      DATARES,2
        0045  0012      RIBITS,12
        0046  0400      PBIT,400              /RETRACT AND INHIBIT
        0047  0004      TYPESW,4              /G68 BIT-PUNCH ON
        0050  7700      RUNCLR,7700           /STAT REG BIT FOR 'TYPE' MODE
        0051  0000      BSS,0                 /COMBINATION OF RUN AND STACLR
        0052  0000      BES,0                 /LOCATION NAMES.
        0053  0000      LS,0
        0054  0000      ACS,0
        0055  0000      CHAR,0
        0056  0000      LNK,0
        0057  0000      COUNT1,0
        0060  0000      PARITY,0
        0061  0000      TEMP,0
        0062  0000      RCODE,0               /WORD CONTAINING CODE BITS
        0063  0000      RCNT,0                /COUNTER FOR RIS
        0064  0000      XXIH,0
        0065  0000      XXIL,0
        0066  0000      YYIH,0
        0067  0000      YYIL,0
        0070  0000      RISP,0
        0071  0000      CLISP,0
        0072  0532      TYPOUT,CL2            /LINK FOR EXIT FROM TYPE MODE
        0073  0000      SW3,0
        0074  2000      SATPRP,2000           /STARTING ADDRESS OF TAPE PREP.
        0075  0600      LISI,LISAVE           /SOME PAGE ZERO LINKS
        0076  1226      MOVI,MOVER
        0077  0200      EIABI,EIABIN
        0100  0246      DBCI,DBCIA
        *166
        0166  7772      M6,-6
        0167  7563      M215,7563             /SOME CONSTANTS STOLEN FROM TAPE PREP
        *177
        0177  0017      PL17,17
                        PAUSE
        PAGE
        *400
        0400  7300  CLA CLL /STARTING ADDRESS OF STRIPPIT CONTROL PROGRAM
        0401  1074  TAD SATPRP
        0402  3000  DCA 0 /PUT S.A. OF TAPE PREP INTO LOC.0.
        0403  1031  INIT,TAD RESET/RESET CONTAINS 1000
        0404  3070  DCA RISP/PUT SA OF READER INT SERVICE INTO RISP
        0405  1377  TAD (CLIS
        0406  3071  DCA CLISP /PUT ADDR. OF CLOCK INT. SER. INTO CLISP.
        0407  1031  EXEQ RESET /RESET BLOCK COUNT.
        0410  6704
        0411  7300
        0412  3073  INITA,DCA SW3 /SET UP TO READ BLOCK
        0413  2052  ISZ BES /SET SW TO BLOCK NOT ENDED
        0414  2051  ISZ BSS /SET TO BLOCK NOT STARTED
        0415  1376  TAD (RBOB
        0416  3775  DCA RISOUT /SET TO LOOK FOR BOB
        0417  6714  CLSW /CLEAR CLOCK & DATA RESET BITS.
```

```
0420 6701  CLSF /CLEAR STATUSWORD FLAG.
0421 4267  INITB,WAITFORINTSER /GO TO TAPE PREP & WAITFOR AN INTER.
0422 6712  RSW /RETURN HERE & READ STATUS.
0423 0050  AND RUNCLR /CHECK RUN & STACLR FOR RU N ONLY
0424 1050  TAD RUNCLR /RUNCLR CONTAINS -100
0425 7640  SZA CLA
0426 5221  JMP INITB /NO, TRY GAIN.
0427 6702  CLCW /CLEAR TOOL LIGHT & REV.READ BITS.
0430 6014  RFC /FETCH A CHAR.FROM TAPE INTO H.S.READER.
/BEGIN MAIN LOOP.
0431 4267  LOOPA,WAITFORINTSER /WAITFOR INTERRUPT.
0432 6712  RSW /READ STATUS.
0433 0041  AND RUNSW
0434 7650  SNA CLA /RUN FLIP FLOP SET?
0435 5231  JMP LOOPA /NO, TRY AGAIN.
0436 6702  CLCW /CLEAR TOOL LIGHT & REV.READ BITS.
0437 1052  TAD BES /BES=0 WHEN DATA BLOCK COMPLETE
0440 7640  SZA CLA /DATA BLOCK COMPLETE?
0441 5231  JMP LOOPA /NO, TRY AGAIN.
0442 1060  TAD PARITY /YES, NOW CHECK FOR PARITY ERROR.
0443 7640  SZA CLA /ERROR?
0444 5263  JMP LOOPC /YES.
0445 1073  TAD SW3 /NO--SW3-0 IF BLOKNUM WAS ZERO
0446 7640  SZA CLA
0447 1031  TAD RESET /SET UP TO GET 2000 IN AC
0450 1031  TAD RESET /GETS RESET OR BLKCNT
0451 6704  LCF /EXECUTE IT
0452 4774  LOOPB,DOMOVE /EXECUTE THE MOVE
0453 6712  RSW /READ STATUS.
0454 0043  AND STACLR
0455 7650  SNA CLA /BITS 0-4 IN STATUS WORD CLEAR?
0456 5261  JMP .+3 /YES, CONTINUE.
0457 4267  WAITFORINTSER /NO, TRY AGAIN.
0460 5253  JMP LOOPB+1
0461 4773  JMS COMAND /EXECUTE SPECIAL & LIGHT COMMANDS.
0462 5231  JMP LOOPA /RETURN TO START OF MAIN LOOP
0463 1036  LOOPC,EXEQ ERROR /PARITY ERROR. TURN ON ERROR LIGHT,
0464 6704
0465 7300
0466 5203  JMP INITA/TURN OFF RUN FLIP FLOP, & JUMP-TO
/INITIAL ADDRESS OF CONTROL.
/END OF MAIN LOOP.-

0467 0000  WAIT,0 /"WAITFORINTSER" CAUSES A JUMP TO THIS ROUTINE.
0470 7604  TPREP,LAS /READ SWITCHES
0471 7010  RAR
0472 7620  SNL CLA /BIT 11 SET?
0473 5276  JMP .+3 /NO.
0474 1372  TAD (2022 /YES,
0475 3000  DCA 0 /SET LOC.0 TO RET.TO MAIN LOOP OF T.PREP.
0476 1053  TAD LS /RESTORE LINK.
0477 7110  CLL RAR
0500 1054  TAD ACS /RESTORE ACC.
0501 6001  ION /TURN INTERRUPT ON.
0502 5400  JMP I 0 /RETURN TO TAPE PREP OR TYPEXT
/
/INTERRUPT SERVICE ENTRY POINT.
/
0503 3054  INTSER,DCA ACS /RETURN POINT FROM TAPE PREP VIA INTERRUPT.
0504 7004  RAL /SAVE ACC.
0505 3053  DCA LS /SAVE LINK.
0506 6011  RSF /SKIP IF READER CAUSED INTERRUPT.
0507 5471  JMP I CLISP /NO,MUST BE CLOCK
0510 4470  JMS I RISP /YES, SERVICE READER (RIS OR RWIS)
0511 5270  JMP TPREP
0512 6701  CLIS,CLSF /SERVICE CLOCK, NOT REWINDING
0513 6712  RSW
0514 6714  CLSW /CLEAR CLOCK AND DATA RESET BITS
0515 0044  AND DATARESET
0516 7650  SNA CLA /IS DATA RESET ON?
0517 5324  JMP CL1 /NO, CONTINUE CLIS
0520 1037  EXEQ RUNOFF /YES, TURN RUN OFF AND WAIT
0521 6704
0522 7300
0523 5212  JMP INITA /REMAIN IN CONTROL MODE
0524 6712  CL1,RSW
0525 0047  AND TYPESW /DID 'TYPE' JUST COME ON?
0526 7650  SNA CLA
0527 5667  JMP I WAIT /NO - SERVICE AS NORMAL
0530 4475  JMS I LISI /YES,
0531 5771  JMP TYPEXT /  GO SERVICE IT
0532 4770  CL2,JMS LISRET /EXIT FORM TYPE MODE
0533 5276  JMP TPREP+6 /RETRN SHARED VALUES AND RESUME T PREP
0534 6701  TPREP1,CLSF /EXIT FOR CLOCK INRUPT WHILE REWINDING
0535 5270  JMP TPREP
PAUSE
0570 0621  *600
0571 0336
0572 2022
0573 0631
0574 1226
0575 1026
0576 1032
0577 0512
```

```
/ROUTINE TO SAVE CURRENT VALUES OF LOCATIONS USED BY TAPE
/PREP WHICH MAY ALSO BE USED BY CONTROL/
0600  0000  LISAVE,0
0601  4207  JMS SAVER /SET UP.
0602  1461  TAD I TEMP/GET VALUE.
0603  3411  DCA I 11 /STORE IT IN STAK BUFFER THRU A,I.11.
0604  2057  ISZ COUNT1 /STORED ALL VALUES YET?
0605  5216  JMP LIS1 /NO, GET ANOTHER.
0606  5600  JMP I LISAVE /YES, RETURN.
0607  0000  SAVER,0 /ROUTINE TO SET UP FOR STORING & RETURNING
/SHARED LOCATION VALUES.
0610  1377  TAD (-14
0611  3057  DCA COUNT1
0612  1376  TAD (SHLIST-1
0613  3010  DCA 10
0614  1375  TAD (STAK-1
0615  3011  DCA 11
0616  1410  LIS1,TAD I 10 /GET A VALUE.
0617  3061  DCA TEMP /STORE IT IN A TEMPORARY LOC.
0620  5607  JMP I SAVER /RETURN
0621  0000  LISRET,0 /ROUTINE TO RETURN SAVED VALUES TO TAPE PREP.
0622  4207  JMS SAVER /SET UP.
0623  1411  TAD I 11 /GET VALUE FROM STAK BUFFER.
0624  3461  DCA I TEMP /PUT IT BACK INTO CORRECT LOCATION.
0625  2057  ISZ COUNT1 /RESTORED ALL VALUES YET?
0626  5216  JMP LIS1 /NO, GET ANOTHER.
0627  5621  JMP I LISRET /YES, RETURN.
/
/ROUTINE TO EXECUTE SPECIAL AND LIGHT COMMANDS.
0630  0000  CDWORD,0 /THIS REGISTER CONTAINS COMMAND CODE BITS
0631  0000  COMAND,0
0632  1062  TAD RCODE
0633  3230  DCA CDWORD
0634  1230  TAD CDWORD
0635  0046  AND PBIT /IS PUNCH ON BIT SET?
0636  7640  SZA CLA
0637  2026  ISZ PONSW /YES, SET INDICATOR
0640  1230  TAD CDWORD
0641  0045  AND RIBITS /RETRACT OR INHIBIT SET?
0642  7640  SZA CLA
0643  3026  DCA PONSW /YES, ZERO INDICATOR
0644  1230  TAD CDWORD /IS STOP BIT SET?
0645  7010  RAR
0646  7630  SZL CLA
0647  5257  JMP COM1 /YES, DONT START TAPE
0650  1230  TAD CDWORD /NO, IS REWIND?
0651  0037  AND RUNOFF
/RUNOFF CONTAINS 4
0652  7640  SZA CLA
0653  4257  JMS COM1 /YES
0654  2051  ISZ BSS /BLOCK NOT STARTED
0655  2052  ISZ BES /BLOCK NOT ENDED
0656  6014  RFC /FETCH ANOTHER CHARACTER
0657  1230  COM1,TAD CDWORD
0660  7012  RTR
0661  7620  SNL CLA /RETRACT BIT SET?
0662  5273  JMP COM2 /NO.
0663  6732  CLXH /YES,CLEAR X & Y AXES BEFORE RETRACT.
0664  6722  CLXL
0665  6762  CLYH
0666  6752  CLYL
0667  1032  EXEQ RETRACT /DO A RETRACT.
0670  6704
0671  7300
0672  5305  JMP COM3
0673  1026  COM2,TAD PONSW /MUST TURN PUNCH ON THIS TIME?
0674  7650  SNA CLA
0675  5313  JMP COM4 /NO
0676  6712  RSW /READ STATUS
0677  0042  AND STEPSW /CAN'T PUNCH IF STEP MODE SW. SET.
0700  7640  SZA CLA /STEP MODE SW. SET?
0701  5313  JMP COM4 /YES.
0702  1027  EXEQ PUNCH /DO A PUNCH.
0703  6704
0704  7300
0705  6712  COM3,RSW /READ STATUS
0706  0043  AND STACLR
0707  7650  SNA CLA /BITS 0-4 IN STATUS = 0?
0710  5313  JMP COM4 /YES.
0711  4774  WAITFORINTSER /NO, TRY AGAIN.
0712  5305  JMP COM3
0713  1230  COM4,TAD CDWORD
0714  0041  AND RUNSW
/RUNSW CONTAINS 100
0715  7650  SNA CLA /TOOL LIGHT BIT SET?
0716  5322  JMP COM5 /NO.
0717  1034  EXEQ TOOLL /YES, TURN TOOL LIGHT ON.
0720  6704
0721  7300
0722  1230  COM5,TAD CDWORD
0723  7010  RAR
0724  0041  AND RUNSW
0725  7650  SNA CLA /LOAD POSITION BIT SET?
0726  5332  JMP COM6 /NO.
0727  1035  EXEQ LPOSL /YES, TURN LOAD POS. LIGHT ON AND PUT
0730  6704
```

```
0731 7300
/SIDE GAUGE UP.
0732 6712 COM6,RSW /READ STATUS
0733 0042 AND STEPSW
0734 7650 SNA CLA /STEP-MODE SWITCH SET?
0735 5341 JMP COM7 /NO.
0736 1037 EXEQ RUNOFF /YES, TURN RUN FLIP FLOP OFF.
0737 6704
0740 7300
0741 1230 COM7,TAD CDWORD
0742 7012 RTR
0743 7010 RAR
0744 7630 SZL CLA /REWIND BIT SET?
0745 5773 JMP REWIND /YES, GO TO REW ROUTINE
0746 1230 TAD CDWORD
0747 7010 RAR
0750 7620 SNL CLA /STOP BIT SET?
0751 5631 JMP I COMAND /NO, RETURN TO MAIN LOOP.
0752 1037 EXEQ RUNOFF /YES, TURN RUN FLIP FLOP OFF.
0753 6704
0754 7300
0755 5772 JMP INITA /AND RETURN TO START OF CONTROL.
/(DON'T RESET BLOCK COUNT)
/
/
0756 0000 STAK,0 /STORAGE FOR CONTENTS OF
0757 0000 0 /LOCATIONS USED BY BOTH
0760 0000 0 /CONTROL AND TAPE-PREP.
0761 0000 0
0762 0000 0
0763 0000 0
0764 0000 0
0765 0000 0
0766 0000 0
0767 0000 0
0770 0000 0
0771 0000 0
PAUSE
0772 0412 PAGE
0773 1266
0774 0467
0775 0755
0776 1316
0777 7764
*1000
1000 0000 RIS,0 /READ A 221 TAPE BLOCK
1001 6012 RRB
1002 7450 SNA
1003 5227 JMP RISOUT+1 /IGNORE BLANK TAPE
/ NOTE THAT RUBOUTS ARE NOT IGNORED
1004 3055 DCA CHAR
1005 4777 JMS PARCH
1006 5217 JMP RISEND /PARITY BAD
1007 1051 TAD BSS /ARE WE PAST BOB
1010 7640 SZA CLA
1011 5626 JMP I RISOUT /NOPE
1012 1055 TAD CHAR /YES
1013 1043 TAD STACLR /AT EOB YET
/STACLR CONTAINS -200
1014 7650 SNA CLA
1015 5217 JMP RISEND /YES, HAVE EOB
1016 5626 JMP,I RISOUT
1017 1376 RISEND,TAD (RBOB /ENDOF BLOCK
1020 3226 DCA RISOUT /SET SO LOOK FOR BOB NEXT TIME
1021 3052 DCA BES /SET END SWITCH TO ZERO
1022 1062 TAD RCODE
1023 7040 CMA
1024 3062 DCA RCODE /FIX CODE WORD
1025 5600 JMP I RIS /EXIT, DONT FETCH
1026 1032 RISOUT,RBOB /THIS LOC WILL CONTAIN LOC TO
/RETURN TO WITH NEXT LEGAL CHARACTER
1027 6014 RFC /FETCH NEXT CHAR
1030 5600 JMP I RIS /EXIT AND WAIT FOR NEXT
1031 4226 JMS RISOUT
1032 1055 RBOB,TAD CHAR
1033 1375 TAD (-105 /IS THIS N
1034 7640 SZA CLA
1035 5231 JMP RBOB-1 /WAIT FOR N
1036 1327 TAD RCMND+11 /YES IT IS
/RCMND+11 CONTAINS -3
1037 3063 DCA RCNT
1040 3073 DCA SW3 /INITIALIZE TO ZERO
1041 4226 JMS RISOUT
1042 1055 TAD CHAR /NEXT IS 3 DIGIT ID
1043 0177 AND PL17
1044 1073 TAD SW3
1045 3073 DCA SW3 /SW3 CONTAINS SUM OF ID DIGS
1046 2063 ISZ RCNT /DONE WITH ID YET
1047 5241 JMP .-6 /NIT YET
1050 3051 DCA BSS /YES, SET SWITCH TO ZERO
1051 7040 CMA
1052 3062 DCA RCODE /INITIALIZE CODE WORD
1053 3064 DCA XXIH
1054 3065 DCA XXIL
1055 3066 DCA YYIH
1056 3067 DCA YYIL /INITIALIZE INCREMENTS
```

```
1057 4226 JMS RISOUT
1060 1055 RXCHK,TAD CHAR /LOOK FOR AN X
1061 1374 TAD (-67
1062 7640 SZA CLA
1063 5272 JMP RYCHK /NOT AN X-
1064 4330 JMS R6
/YES, READ THE NUMBER
1065 1361 TAD RB
1066 3064 DCA XXIH
1067 1362 TAD RB+1
1070 3065 DCA XXIL
1071 4226 JMS RISOUT
1072 1055 RYCHK,TAD CHAR /LOOK FOR Y
1073 1373 TAD (-70
1074 7640 SZA CLA
1075 5304 JMP RCODIT /NOT Y, MUST BE G OR M
1076 4330 JMS R6 /YES, HAVE A Y
1077 1361 TAD RB
1100 3066 DCA YYIH
1101 1362 TAD RB+1
1102 3067 DCA YYIL
1103 4226 JMS RISOUT
1104 4226 RCODIT,JMS RISOUT /HAVE G OR M CODE, IGNORE + WAIT
1105 4226 JMS RISOUT /IGNORE FIRST DIGIT
1106 1055 TAD CHAR /HAVE SECOND DIGIT
1107 0177 AND PL17
1110 1316 TAD RCMND
1111 3312 DCA .+1
1112 7402 HLT /GET CODE BIT FOR THIS COMMAND
1113 0062 AND RCODE
1114 3062 DCA RCODE /UPDATE CODE WORD
1115 5257 JMP RXCHK-1 /WAIT FOR CHAR AND THEN CHECK ALL AGAIN
1116 1316 RCMND,TAD .
1117 7773 7773 /TABLE OF COMMAND BITS
1120 7776 7776
1121 7777 7777
1122 7777 7777
1123 7577 7577
1124 7677 7677
1125 7767 7767
1126 7377 7377
1127 7775 7775
1130 0000 R6,0 /READ SIGN + 5 DIGITS + CONVERT
1131 1166 TAD M6
1132 3063 DCA RCNT
1133 1372 TAD (RB-1
1134 3012 DCA RP
1135 4226 JMS RISOUT /WAIT FOR NEXT CHAR
1136 1055 TAD CHAR
1137 3412 DCA I RP
1140 2063 ISZ RCNT /READ 6 CHARS YET
1141 5335 JMP .-4
1142 4475 JMS I LISI /BETTER SAVE SHARED LOCS
1143 4477 JMS I FIABI /YES, CONVERT TO DP BINARY
1144 1162 RB+1
1145 1361 TAD RB /GET SIGN
1146 0035 AND LPOSL /IS IT PLUS
/LPOSL CONTAINS 60
1147 7640 SZA CLA
1150 5353 JMP R6A /YES
1151 4500 JMS I DBCI /NO, COMPLEMENT
1152 0022 DMQ
1153 1022 R6A,TAD DMQ /LEAVE RESULTS IN RB
1154 3361 DCA RB
1155 1023 TAD DMQ+1
1156 3362 DCA RB+1
1157 4771 JMS LISRET /RETURN SHARED LOCS
1160 5730 JMP I R6 /RETURN TO X/OR YCHECK
1161 0000 RB,0
1162 0000 0
1163 0000 0
1164 0000 0
1165 0000 0
1166 0000 0
PAUSE
1171 0621 *1200
1172 1160
1173 7710
1174 7711
1175 7673
1176 1032
1177 1200
/
/ROUTINE TO CHECK FOR PARITY ERROR.
1200 0000 PARCH,0
1201 1377 TAD (-10
1202 3057 DCA COUNT1 /SET COUNTER TO -10 OCTAL
1203 3060 DCA PARITY /SET ANOTHER TO ZERO
1204 1055 TAD CHAR
1205 7010 RAR
1206 7430 SZL /SKIP IF EVEN BIT.
1207 2060 ISZ PARITY /COUT NUMBER OF ODD BITS
1210 2057 ISZ COUNT1 /PROCESSED ALL 8 CHANNELS YET?
1211 5205 JMP .-4 /NO, CONTINUE PROCESSING.
1212 7300 CLA CLL /YES.
1213 1060 TAD PARITY /CONTAINS NUMBER OF ODD BITS
```

```
1214 7010 RAR
1215 7420 SNL /SKIP IF ODD NUMBER OF BITS WERE SET.
1216 5222 JMP .+4 /HAD EVEN PARITY.
1217 7300 CLA CLL
1220 2200 ISZ PARCH /RETURN +2 IF PARITY OKAY (ODD)
1221 5224 JMP .+3
1222 7200 CLA
1223 7001 IAC
1224 3060 DCA PARITY /SET PARITY SWITCH TO 0 IF PARITY OK,
/OTHERWISE, SET IT TO 1.
1225 5600 JMP I PARCH /RETURN +1 IF PARITY ERROR.
/
/ROUTINE TO EXECUTE A MOVE.
1226  0000  MOVER,0
1227 7300 CLA CLL
1230 6741 HX /SET X-AXIS SYNCHRONIZER.
1231 6744 RDXL /PUT LOW X-AXIS INTO ACC.
1232 1065 TAD XXIL /PUT LOW SIDE OF X MOVE INTO ACC.TOO.
1233 6726 LDXL /CLEAR LOW X-AXIS & LOAD ACC.INTO SAME.
1234 7204 GLK /PUT LINK INTO ACC (IN CASE OF A CARRY)
1235 3056 DCA LNK /SAVE IT IN LNK.
1236 6731 RDXH /PUT UPPER X-AXIS COUNTER INTO ACC.
1237 7510 SPA /IS IT NEGATIVE?
1240 1376 TAD (3760 /YES, MAKE IT TRUE COMPLEMENT
1241 1056 TAD LNK /ADD LINK IN.
1242 1064 TAD XXIH /PUT HIGH SIDE OF X IN.
1243 6736 LDXH /ZERO HIGH X-AXIS COUNTER, LOAD ACC.INTO
/HIGH X-AXIS COUNTER, & RELEASE X-AXIS SYNCH.
1244 7300 CLA CLL
1245 6771 HY
1246 6774 RDYL /SAME AS FOR X-HIGH AND X-LOW.
1247 1067 TAD YYIL
1250 6756 LDYL
1251 7204 GLK
1252 3056 DCA LNK
1253 6761 RDYH
1254 7510 SPA /IS IT NEGATIVE?
1255 1375 TAD (3770 /MAKE IT TRUE COMPLEMENT
1256 1056 TAD LNK
1257 1066 TAD YYIH
1260 6766 LDYH
1261 7300 CLA CLL
1262 1033 EXEQ MOVE /EXECUTE THE MOVE.
1263 6704
1264 7300
1265 5626 JMP I MOVER /RETURN TO MAIN LOOP.
/
/SET UP POINT FOR REWIND INTERRUP SERVICE,
1266 1374  REWIND,TAD (TPREP1
1267 3071 DCA CLISP
1270 1373 TAD (RWIS
1271 3070 DCA RISP-
            1272 3063 DCA RCNT /ZERO THE COUNTER
1273 1040 EXEQ REVREAD /CHANGE TO READ REVERSE
1274 6704
1275 7300
1276 6014 RFC
1277 4772 WAITFORINTSER /WAIT FOR READER INTERRUPT
/& RETURN THRU RWIS.
/
/REWIND INTERRUPT SERVICE.
1300  0000  RWIS,0
1301 6012 RRB /GET THE CHAR
1302 1371 TAD (-13
1303 7640 SZA CLA /IS IT REWIND STOP CODE?
1304 5315 JMP RWIS1 /NO
1305 1770 TAD CDWORD /YES
1306 7010 RAR
1307 7620 SNL CLA /DID LAST BLOCK HAVE 'STOP'?
1310 5767 JMP INIT /NO-START CONTROL AGAIN
1311 1037 EXEQ RUNOFF /YES-TURN OFF RUN
1312 6704
1313 7300
1314 5767 JMP INIT
1315  6014  RWIS1,RFC
1316 5766 JMP TPREP /LOOK SOME MORE
/LIST OF LOCATIONS SHARED
1317 0271  SHLIST,DBSUB
1320 0323  ADDS
1321 0246 DBCIA
1322 0200 EIABIN
1323 0235 SHL1
1324 0307 DBADD
1325 0021 T2
1326 0020 T1
1327 0022 DMQ
1330 0023 DMQ+1
1331 0024 DAC
1332 0025 DAC+1
PAUSE
1366 0470 *336
1367 0403
1370 0630
1371 7765
1372 0467
1373 1300
```

```
1374 0534
1375 3770
1376 3760
1377 7770
/RELOCATED TYPE MODE
/ 336-375
/1333-1365
/1534-1562
0336  4362  TYPEXT,JMS KBWAIT / WAIT FOR CHAR.
0337  1361  TAD M305 / LOOKING FOE E
0340  7640  SZA CLA
0341  5336  JMP .-3
0342  4550  JMS I CRLFI
0343  4775  TYPX,JMS I RETINC
0344  3064  DCA XXIH
0345  4775  TYPY,JMS I RETINC
0346  3066  DCA YYIH
0347  6712  TYPMOV,RSW
0350  0041  AND RUNSW
0351  7650  SNA CLA
0352  5347  JMP TYPMOV
0353  4476  JMS I MOVI
0354  6712  RSW
0355  0043  AND STACLR
0356  7640  SZA CLA
0357  5354  JMP .-3
0360  5342  JMP TYPX-1
0361  7473  M305,-305
0362  0000  KBWAIT,0
0363  6712  RSW
0364  0047  AND TYPESW
0365  7650  SNA CLA
0366  5472  JMP I TYPOUT
0367  6031  KSF
0370  5363  JMP*KBWAIT+1
0371  5774  JMP I CKB / GO TO CONTINATOIN OF KBWAIT
0372  5762  JMP I KBWAIT
0373  7402  HLT / FREE LOCATION
0374  1333  CKB,CCKB / ADDRESSS OF CONT. KBWAIT -1333-
0375  1342  RETINC,GETINC
*1333
/ CONTINUATION OF KBWAIT
1333  6036  CCKB,KRB
1334  1167  TAD M215
1335  7650  SNA CLA
1336  5342  JMP GETINC
1337  6036  KRB
1340  6046  TLS
1341  5765  JMP I AWAIT
/ AWAIT CONTAINS ADDRESS OF KBWAIT
1342  0000  GETINC,0
1343  1166  TAD M6
1344  3760  DCA I AGET2
1345  7126  STL RTL
1346  3011  DCA TPTR
1347  4764  JMS I BKBW / ADDRESS OF KBWAIT
1350  3411  DCA I TPTR
1351  2760  ISZ I AGET2
1352  5347  JMP .-3
1353  4477  JMS I EIABI
1354  0004  TBUF+1
1355  1003  TAD TBUF
1356  7012  RTR
1357  5762  JMP I KKB
/ KKB HAS ADDRESS OF CONT.
1360  1546  AGET2,GET2
1361  7402  HLT / FREE LOC
1362  1534  KKB,KKKB
1363  5742  JMP I GETINC
1364  0362  BKBW,KBWAIT
1365  0372  AWAIT,CKB-2 / RETURN TO A JMP I KBWAIT
*1534
1534  7630  KKKB,SZL CLA
1535  5340  JMP GET1
1536  4500  JMS I DBCI
1537  0022  DMQ
1540  4355  GET1,JMS REVIS / REVISE TAD I FOR CONT.
1541  3346  DCA GET2
1542  4355  JMS REVIS
1543  7001  IAC
1544  3350  DCA .+4
1545  1022  TAD DMQ
1546  7402  GET2,HLT
1547  1023  TAD DMQ+1
1550  7402  HLT
1551  4550  JMS I CRLFI
1552  2754  ISZ I AGETIC
1553  5730  JMP*I 1530
1554  1342  AGETIC,GETINC
1555  0000  REVIS,0 / ROUTINE TO ALLOW FOR RELOC.
1556  1754  TAD I AGETIC
1557  3362  DCA AASAVE
1560  1762  TAD I AASAVE
1561  5755  JMP I REVIS / RETURN
1562  0000  AASAVE,0
        CRLFI=150
        TYPOUT=72
```

FIGS. 20-36

FIGS. 20-36 are flow diagrams illustrating certain executive control sequences for the commercial system. These flow diagrams will be self-explanatory to those skilled in the art particularly when considered with reference to the illustrative stored program listings given herein. As another embodiment of the executive control means outlined in the flow diagrams, the control sequences may be effected by a fixed program wired and/or built in which may take the form of logic combinations of gates and other circuits to perform in accordance with well-known techniques.

FIG. 37.

Figure 37:
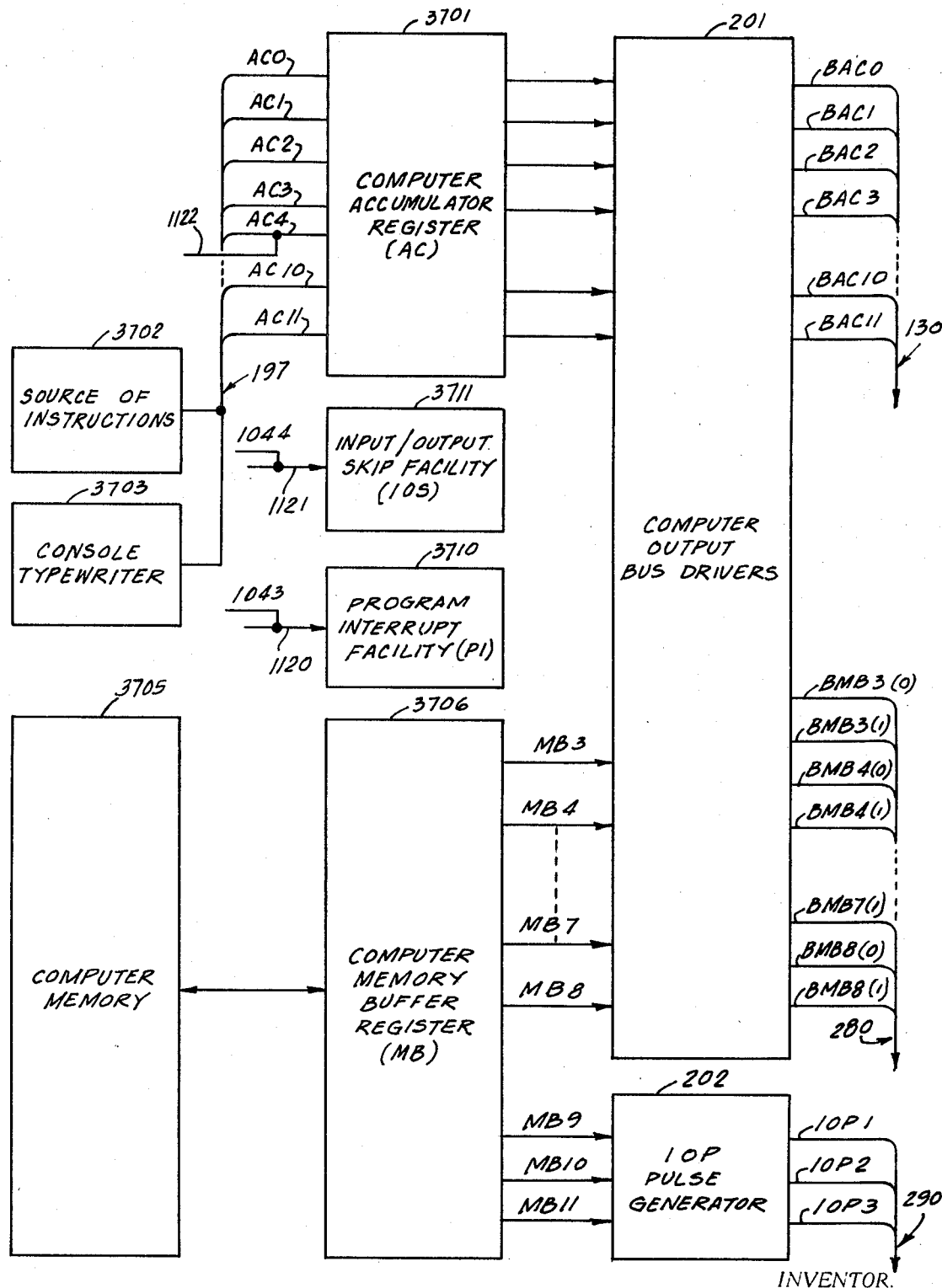
FIG. 37 shows an overall block diagram of pertinent portions of the computer together with certain input components therefor.
Figure 38:
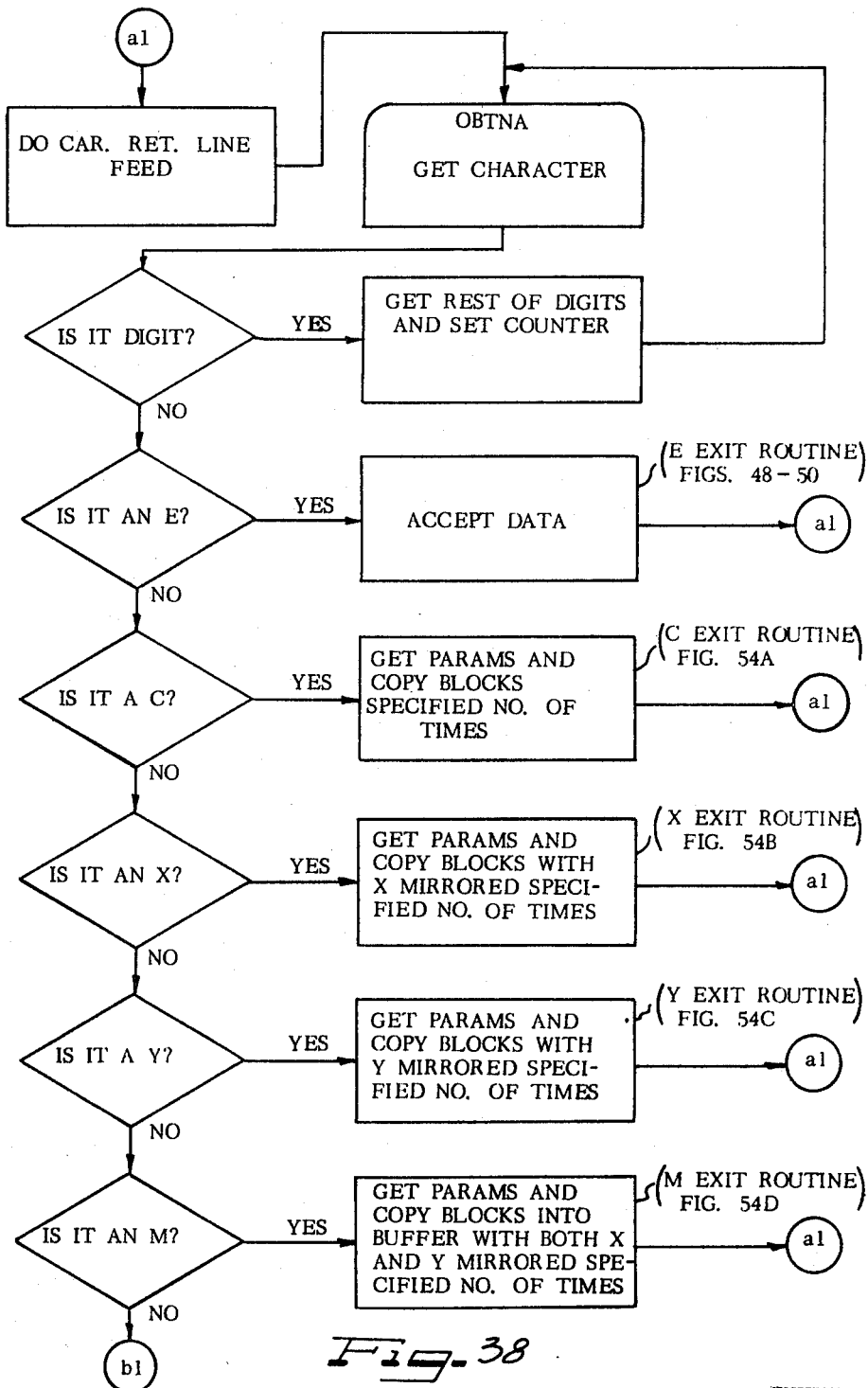
Figure 39:
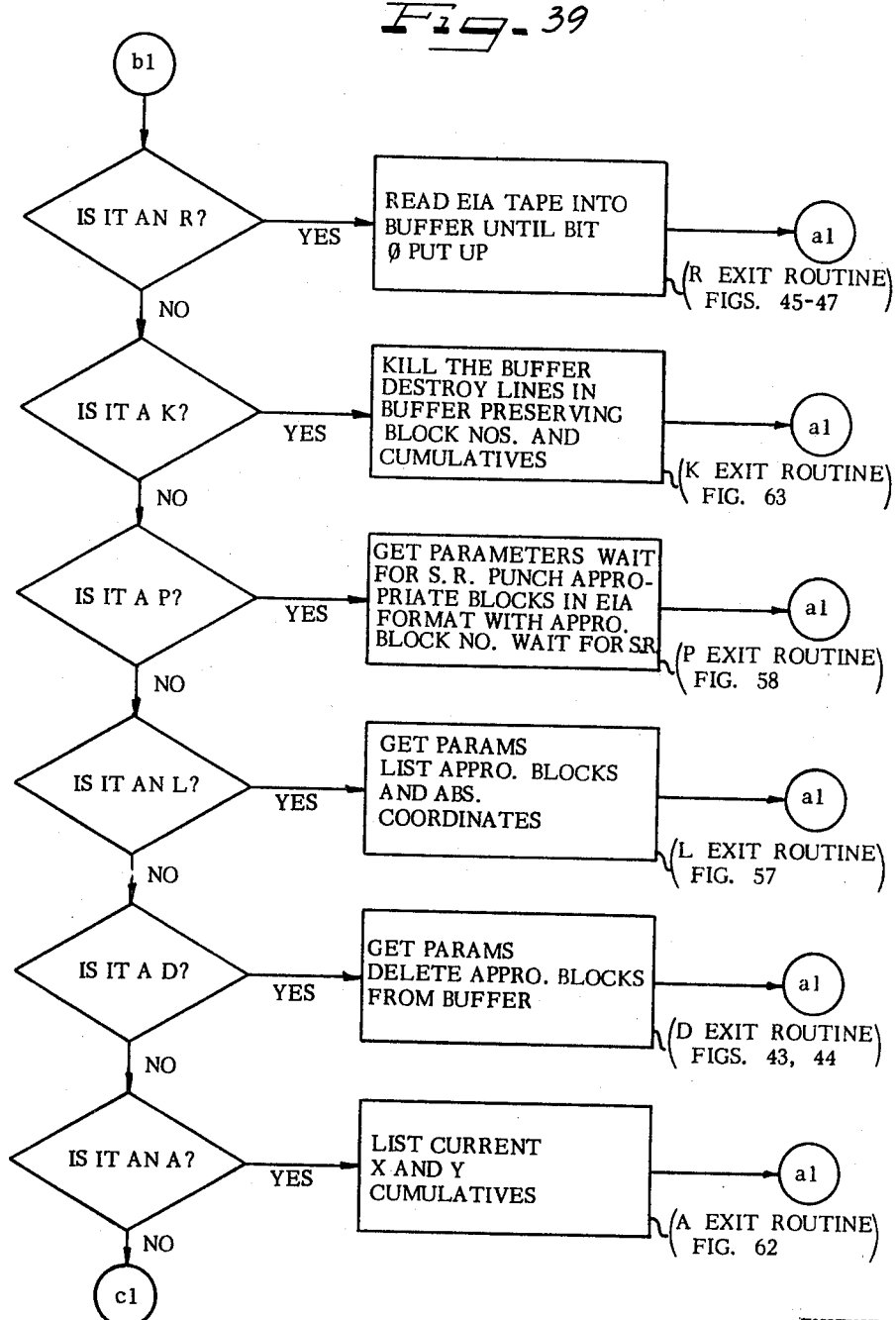
Figure 40:
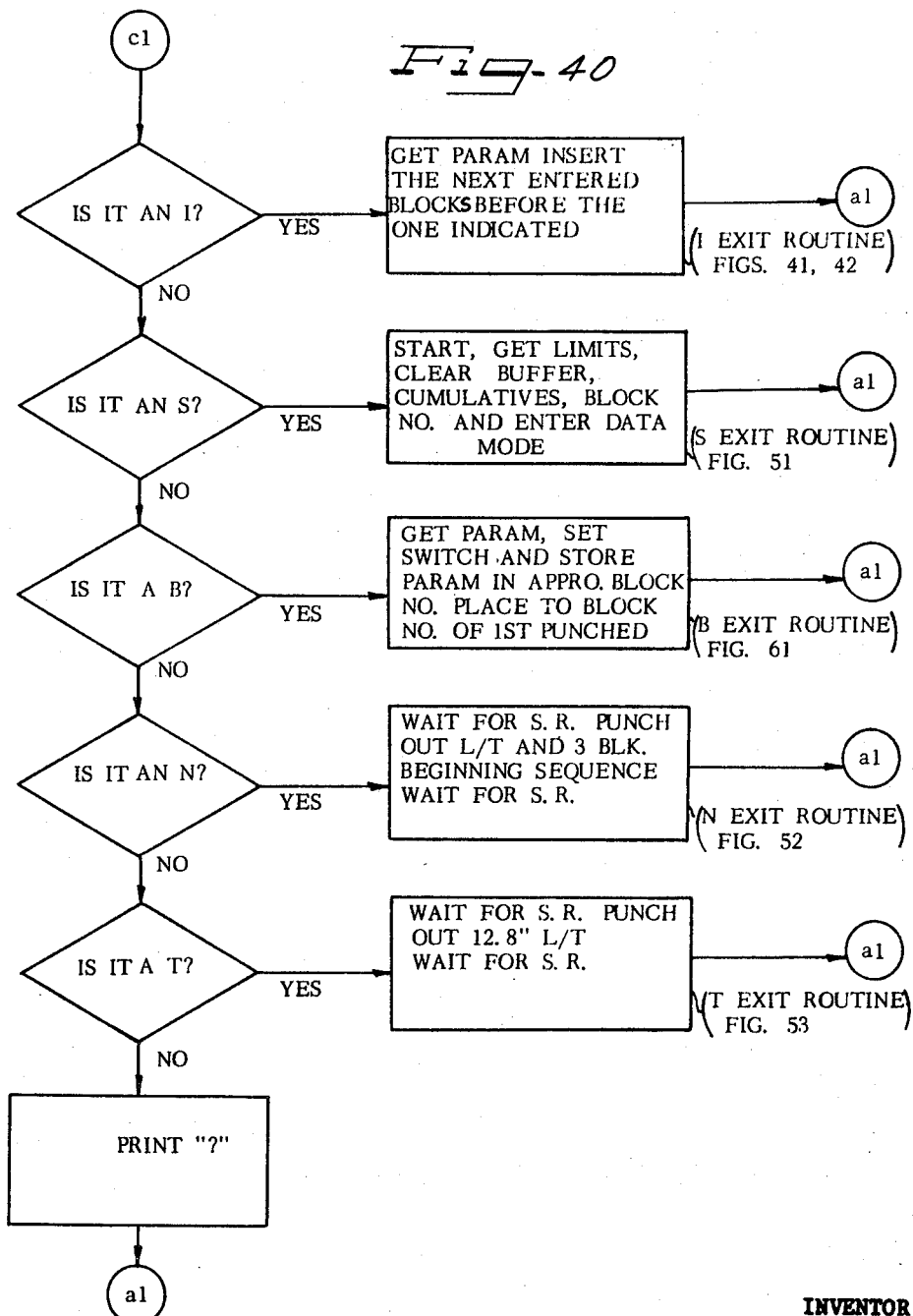
Figure 41:
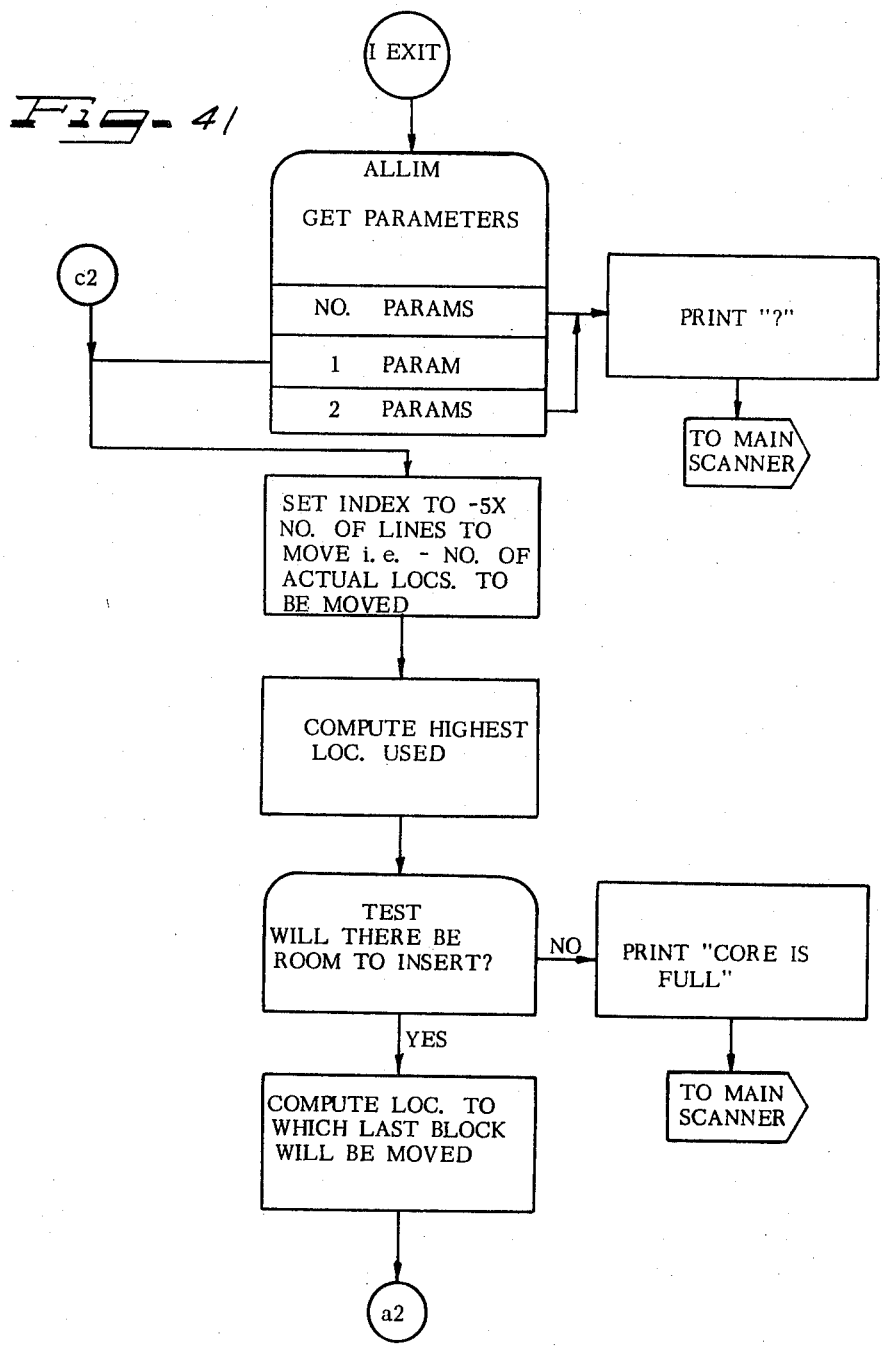
Figure 42:
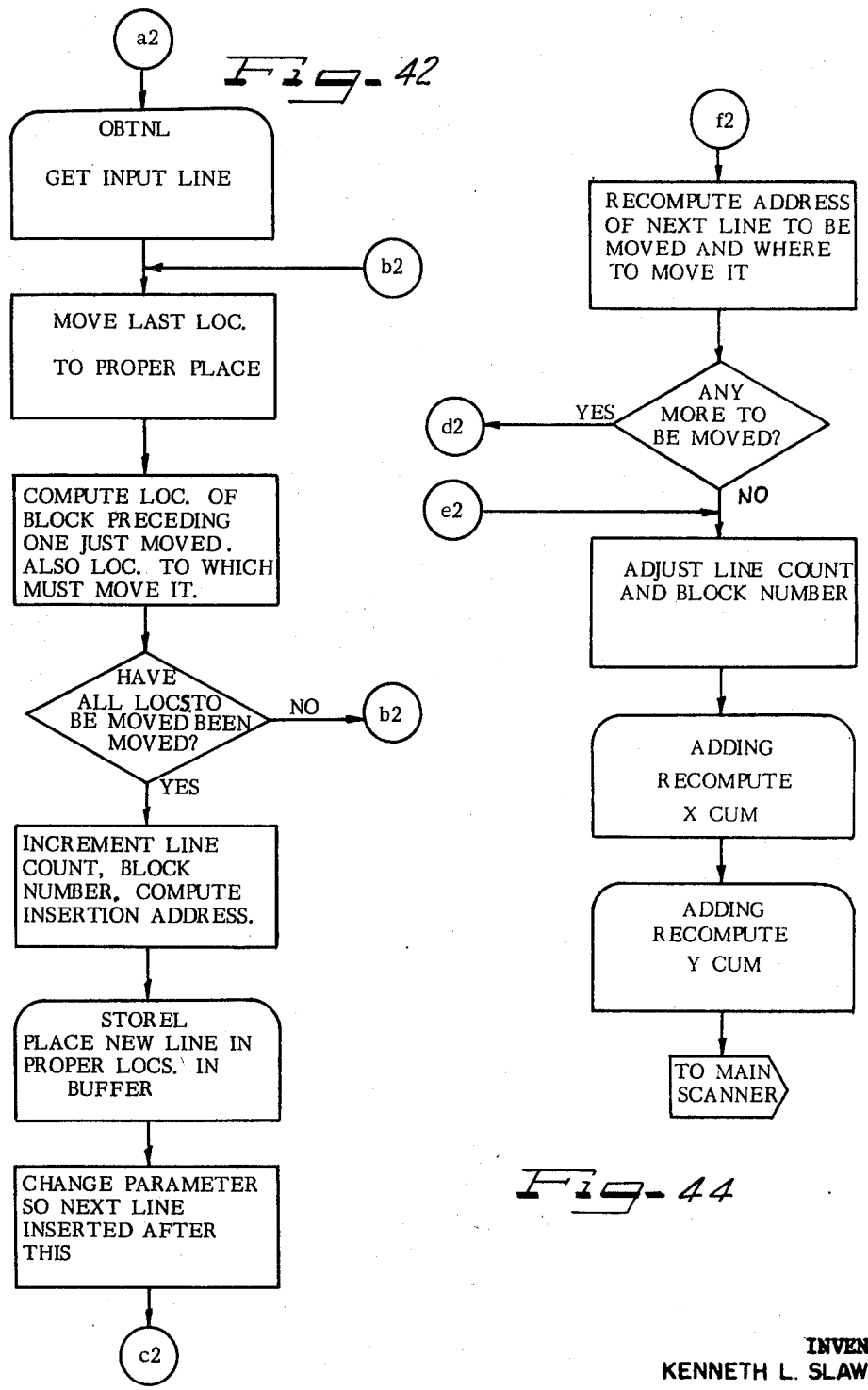
Figure 43:
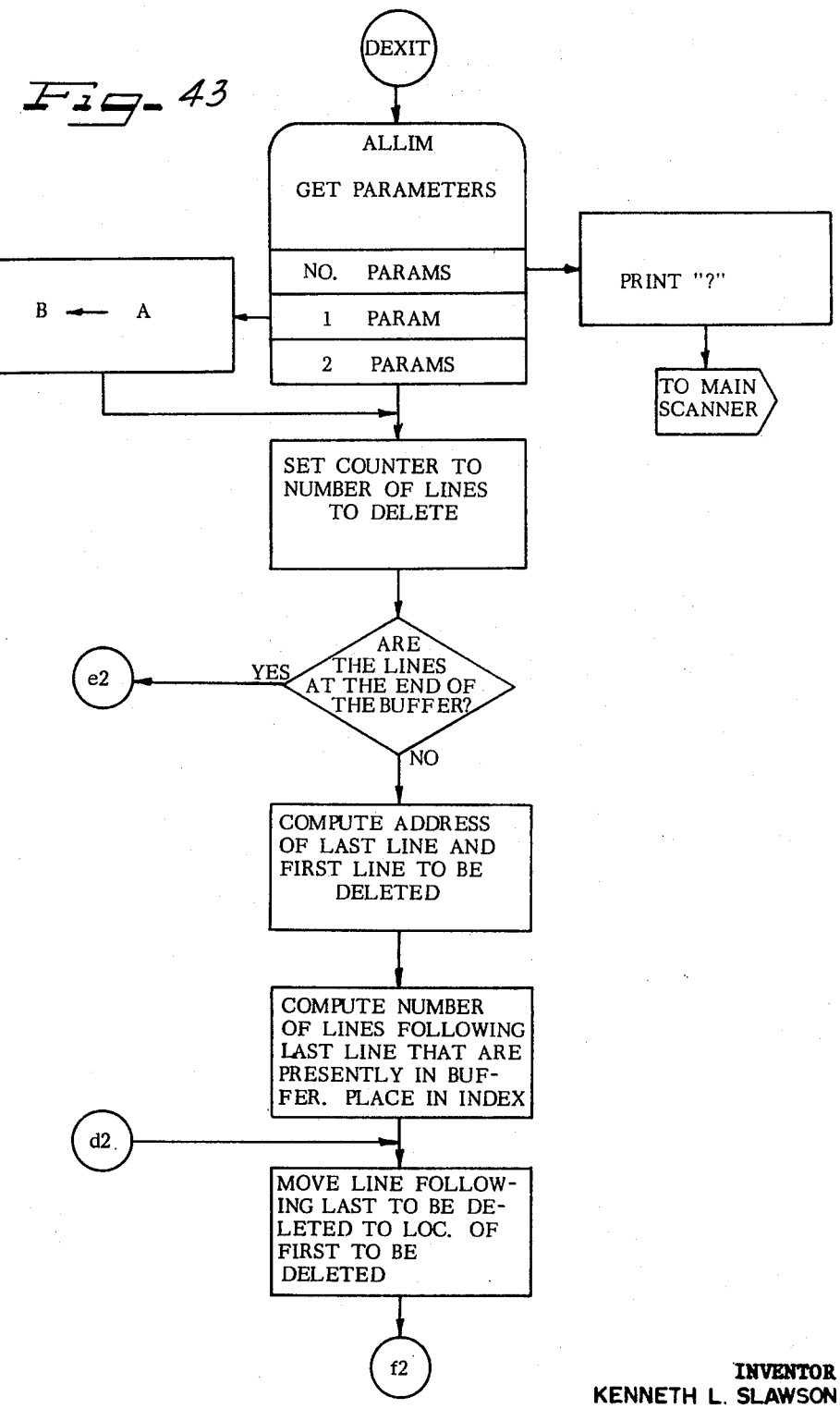
Figure 45:
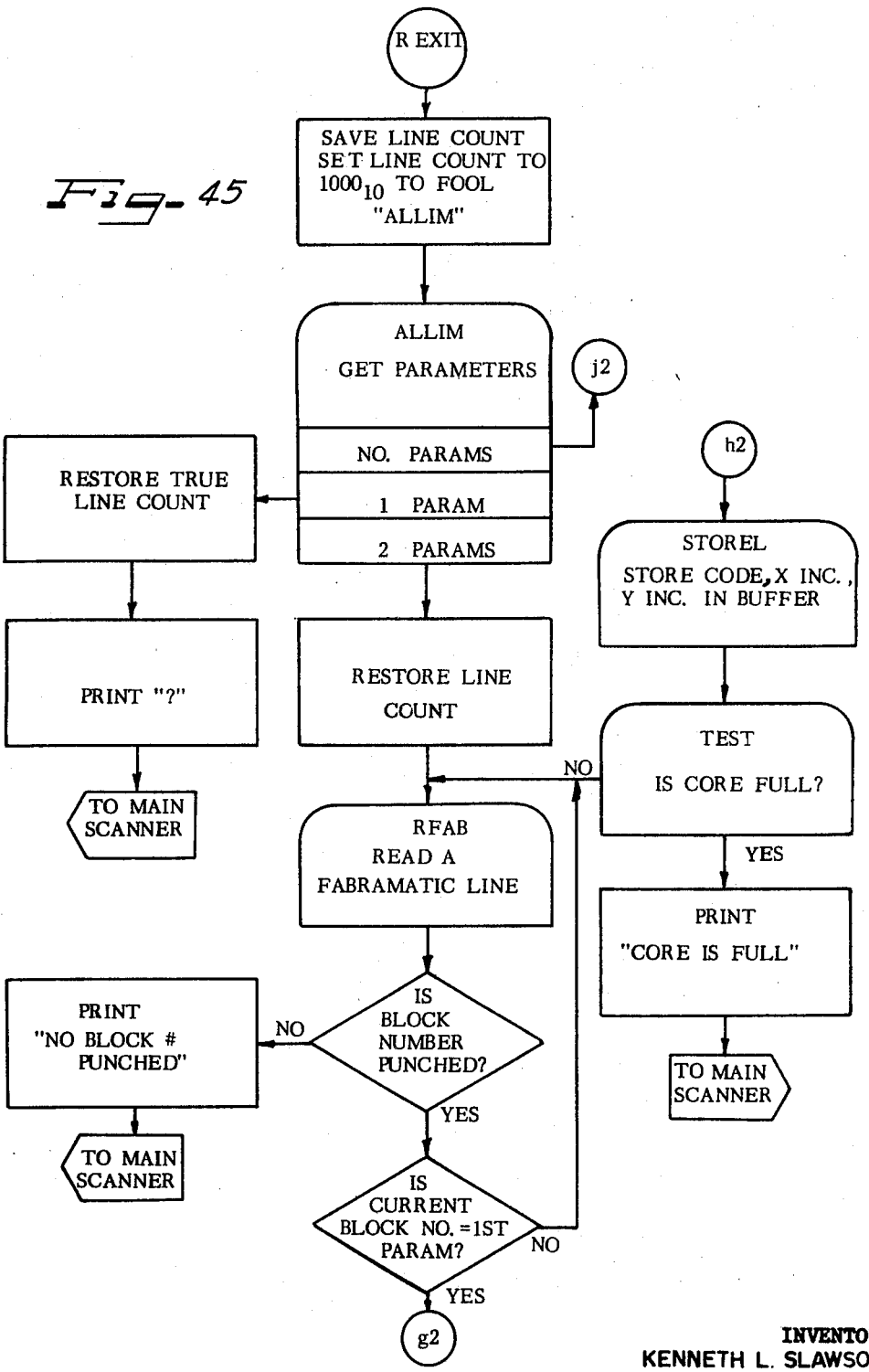
Figure 48:
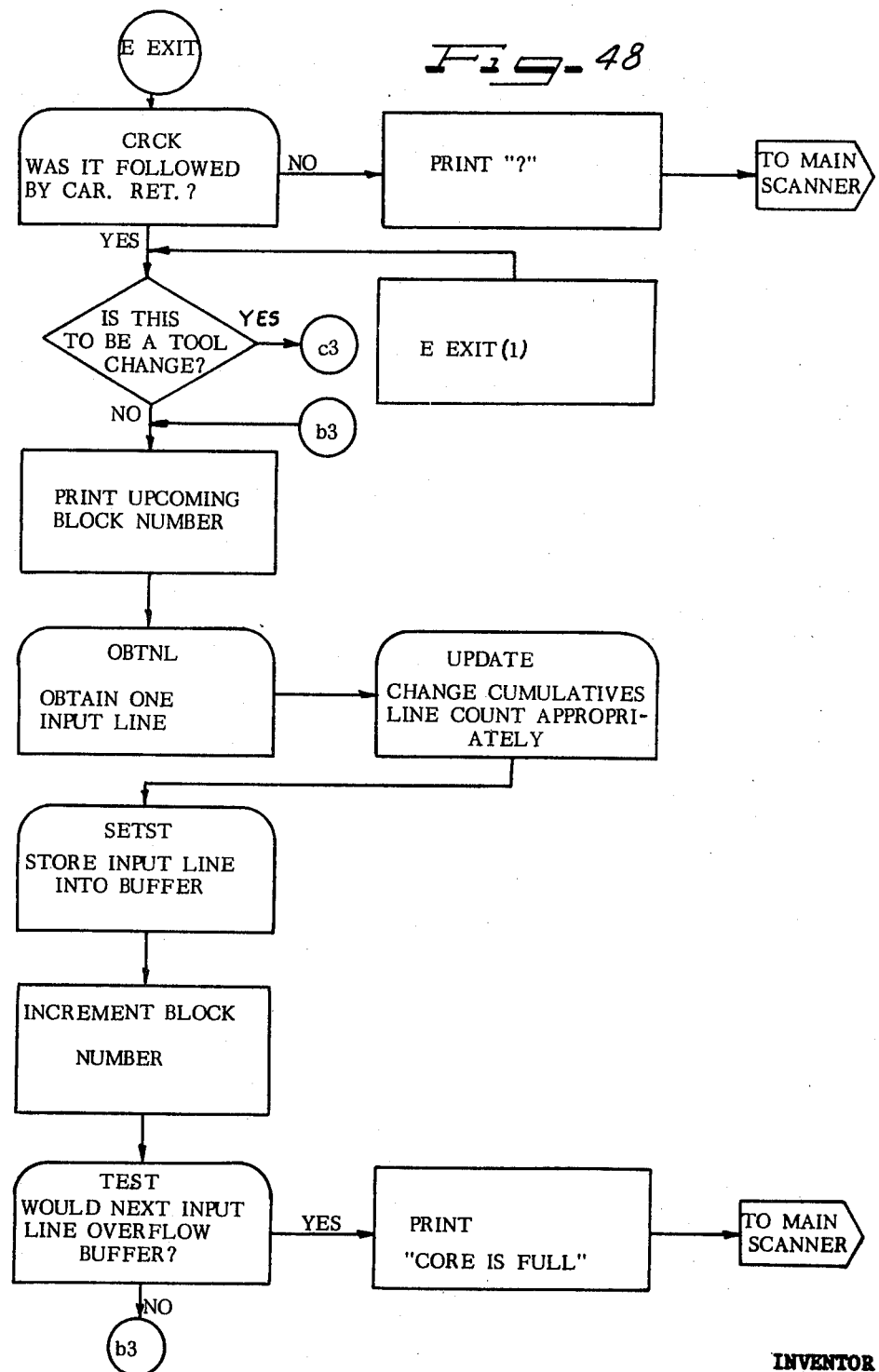
Figure 49:
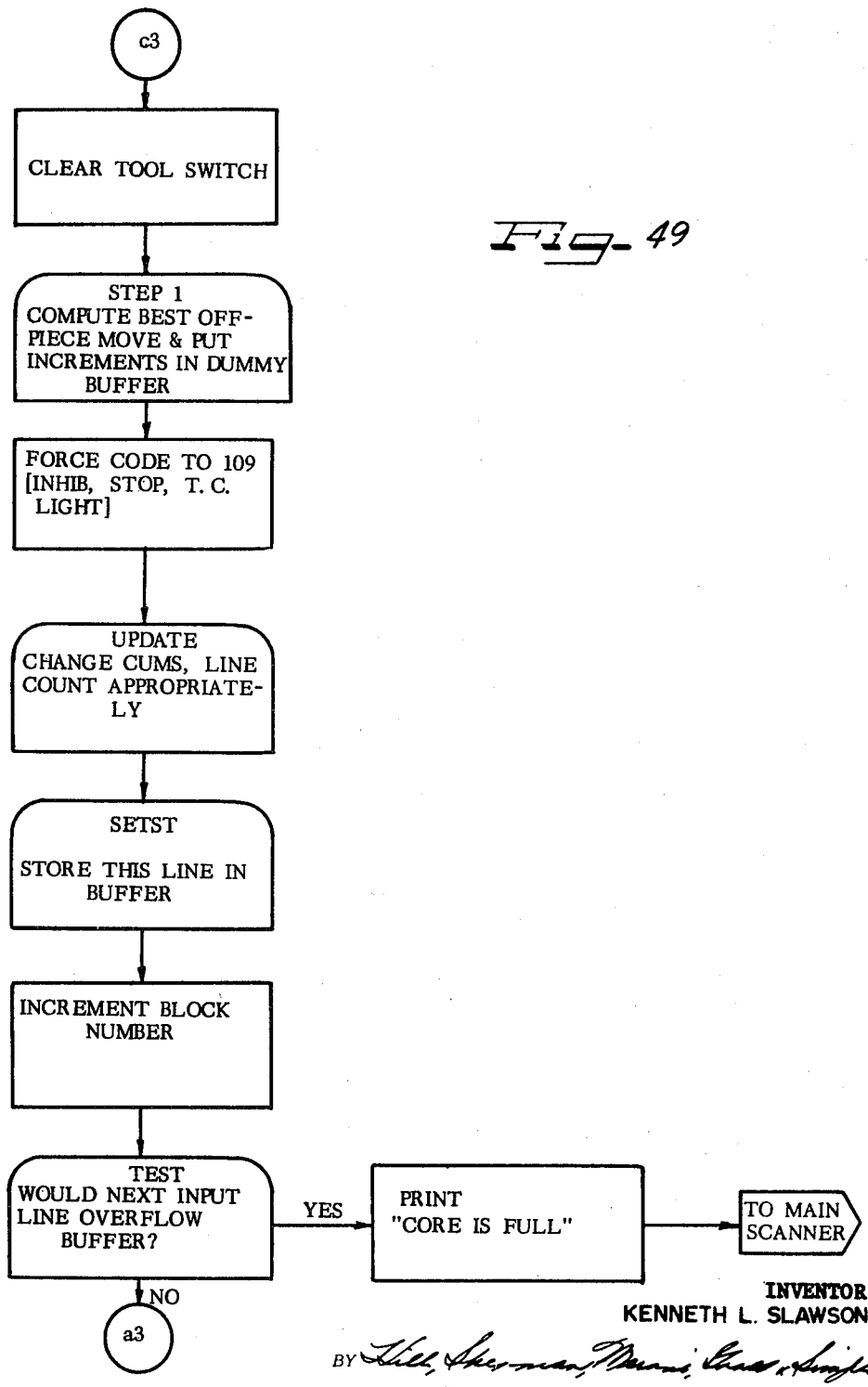
Figure 50:
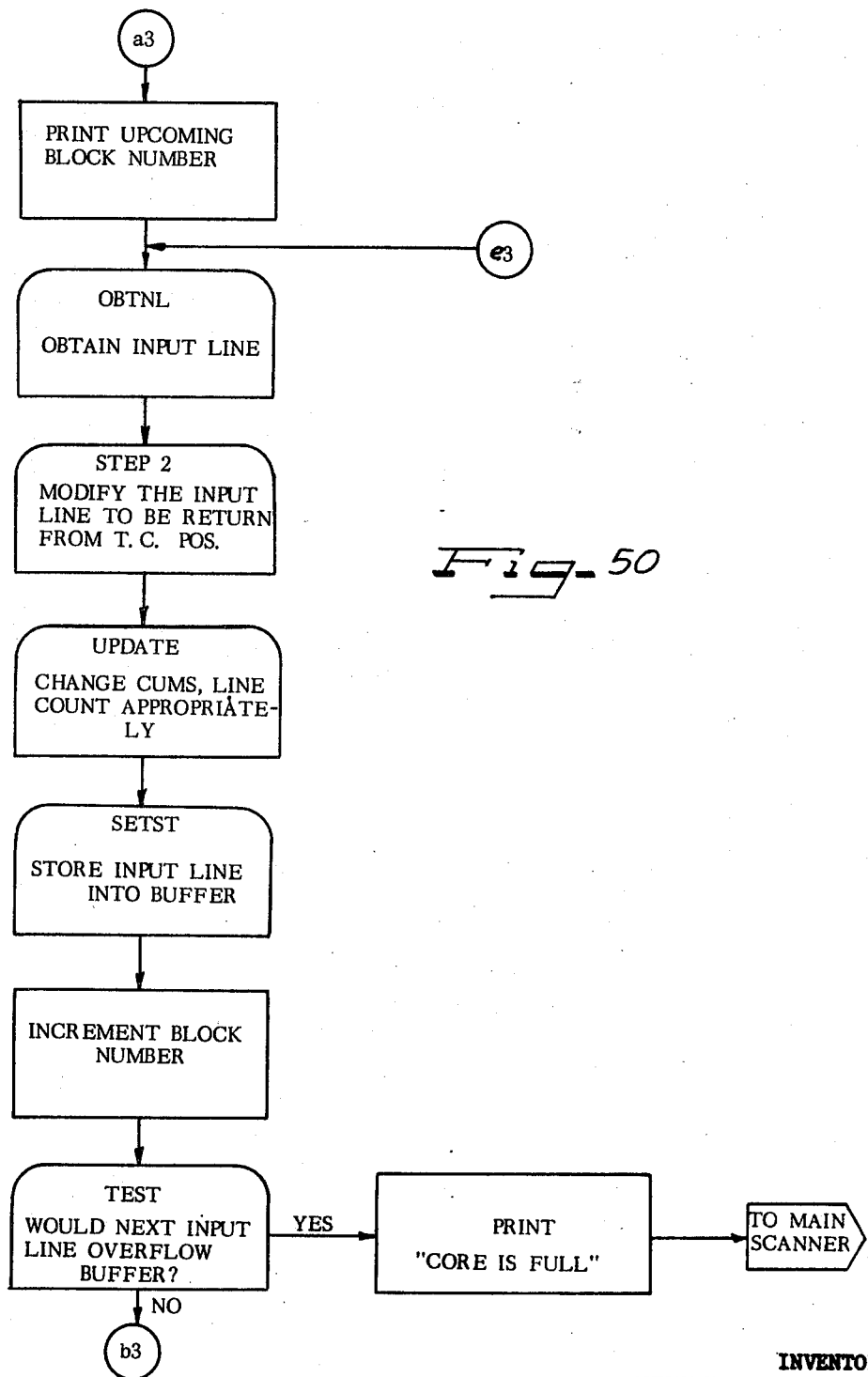
Figure 51:
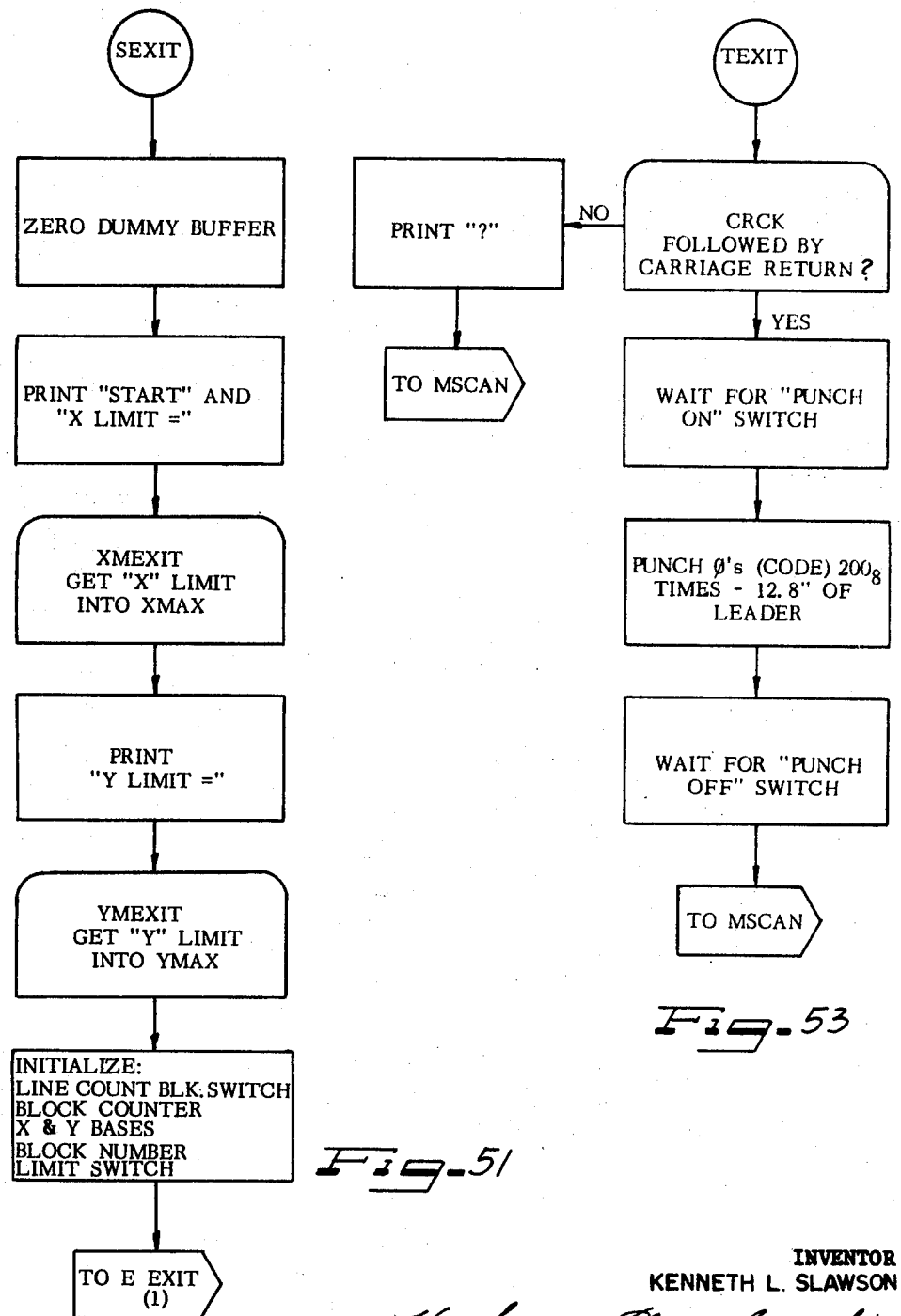
Figure 52:
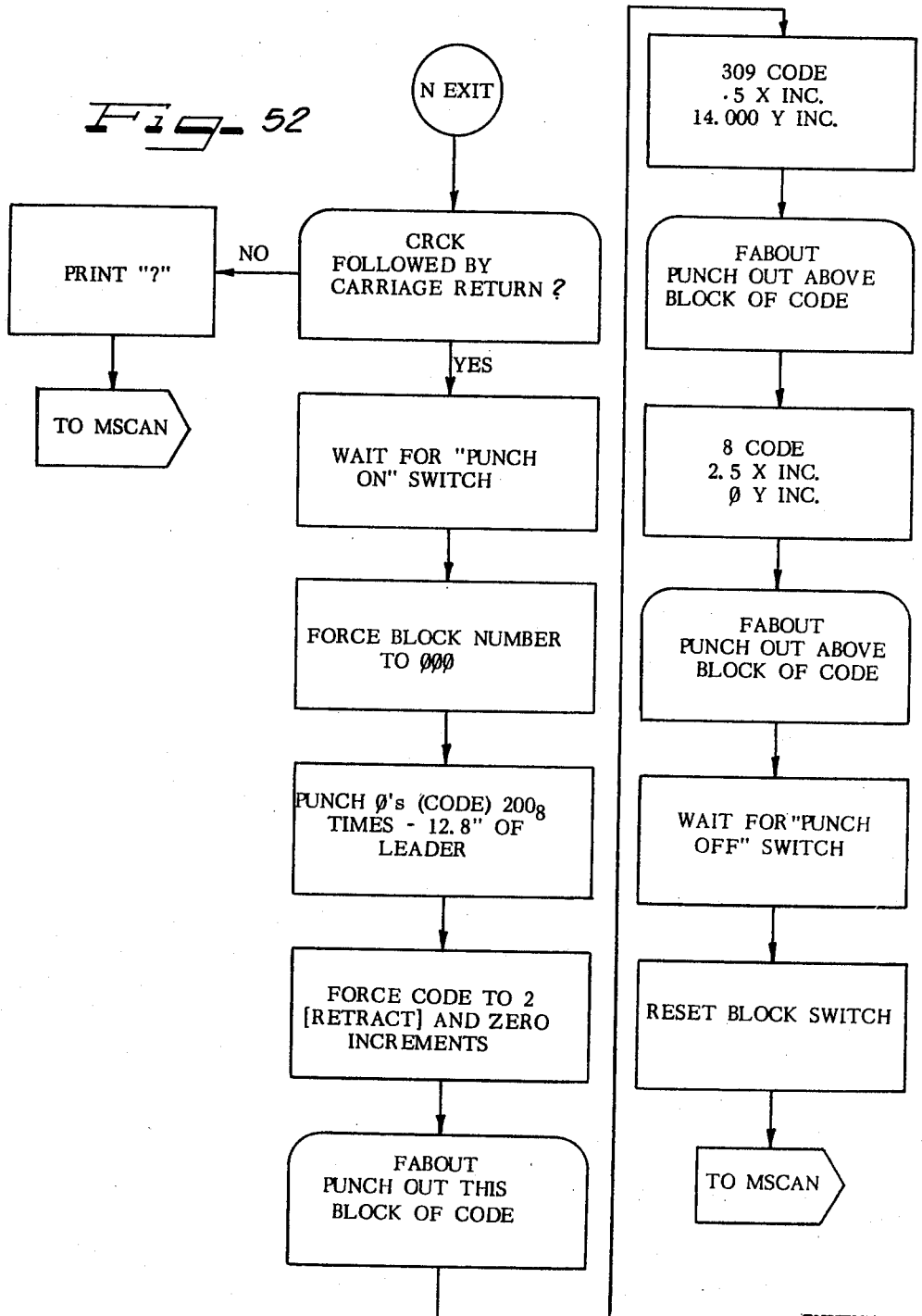
Figure 54A:
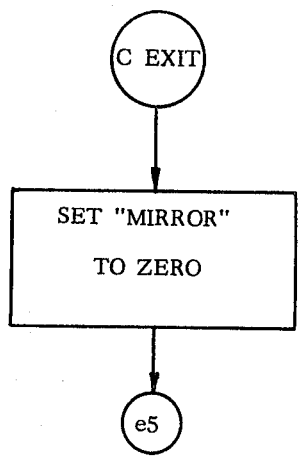
Figure 54B:
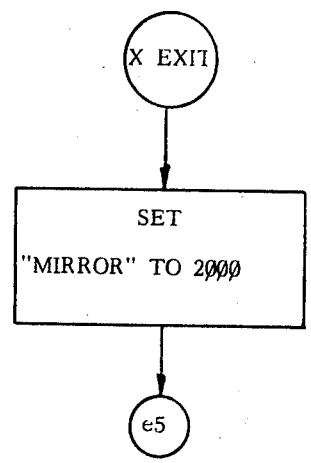
Figure 54C:
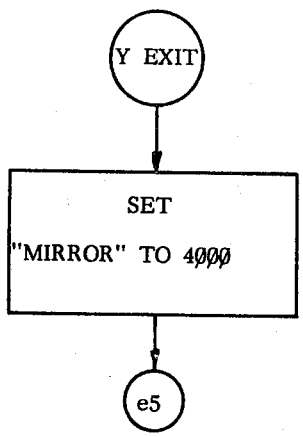
Figure 54D:
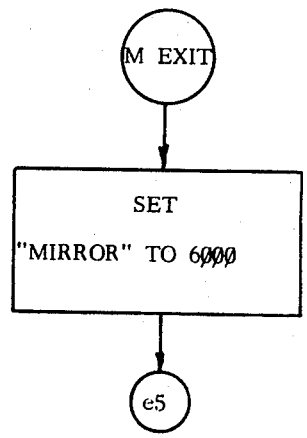
Figure 54E:
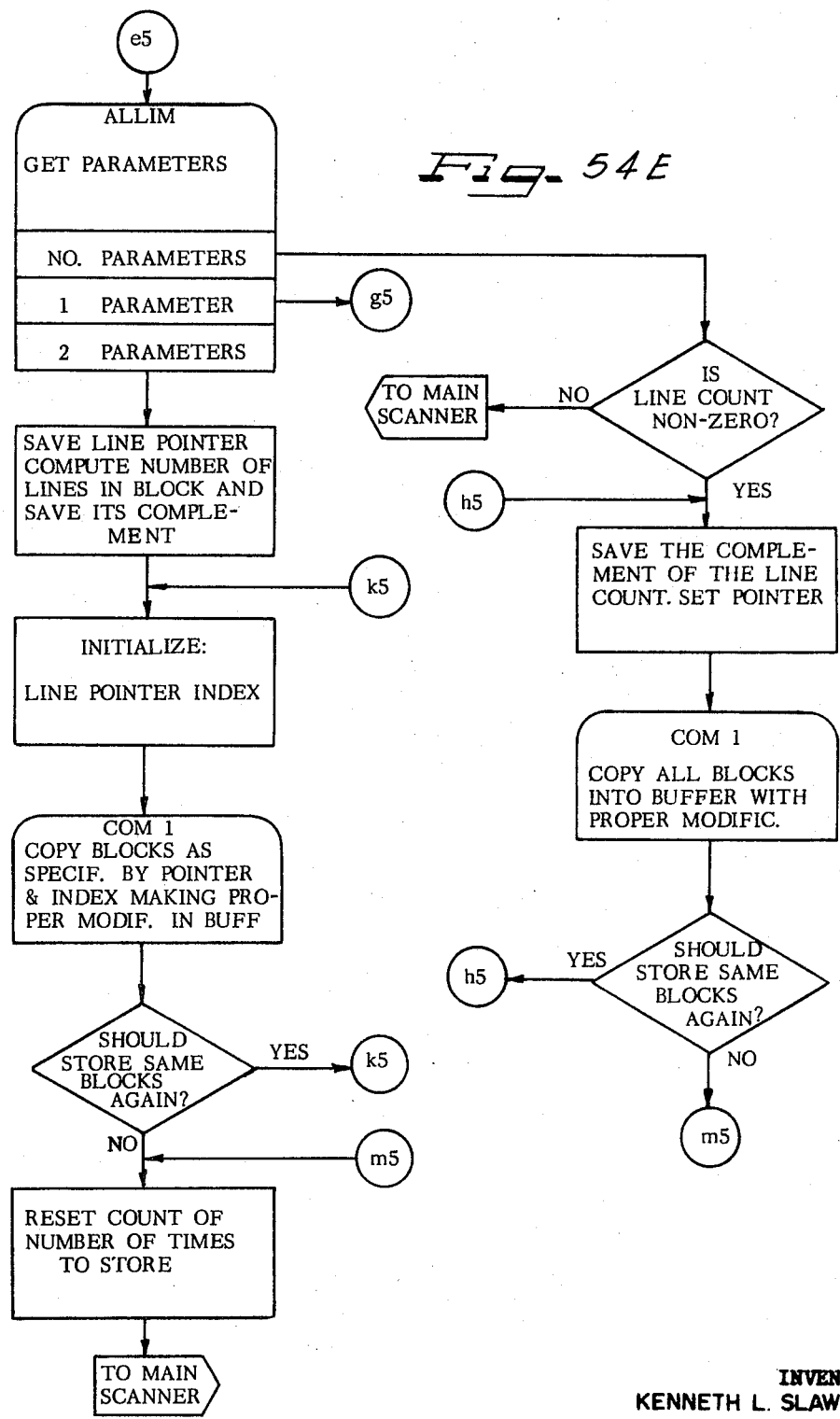
Figure 55:
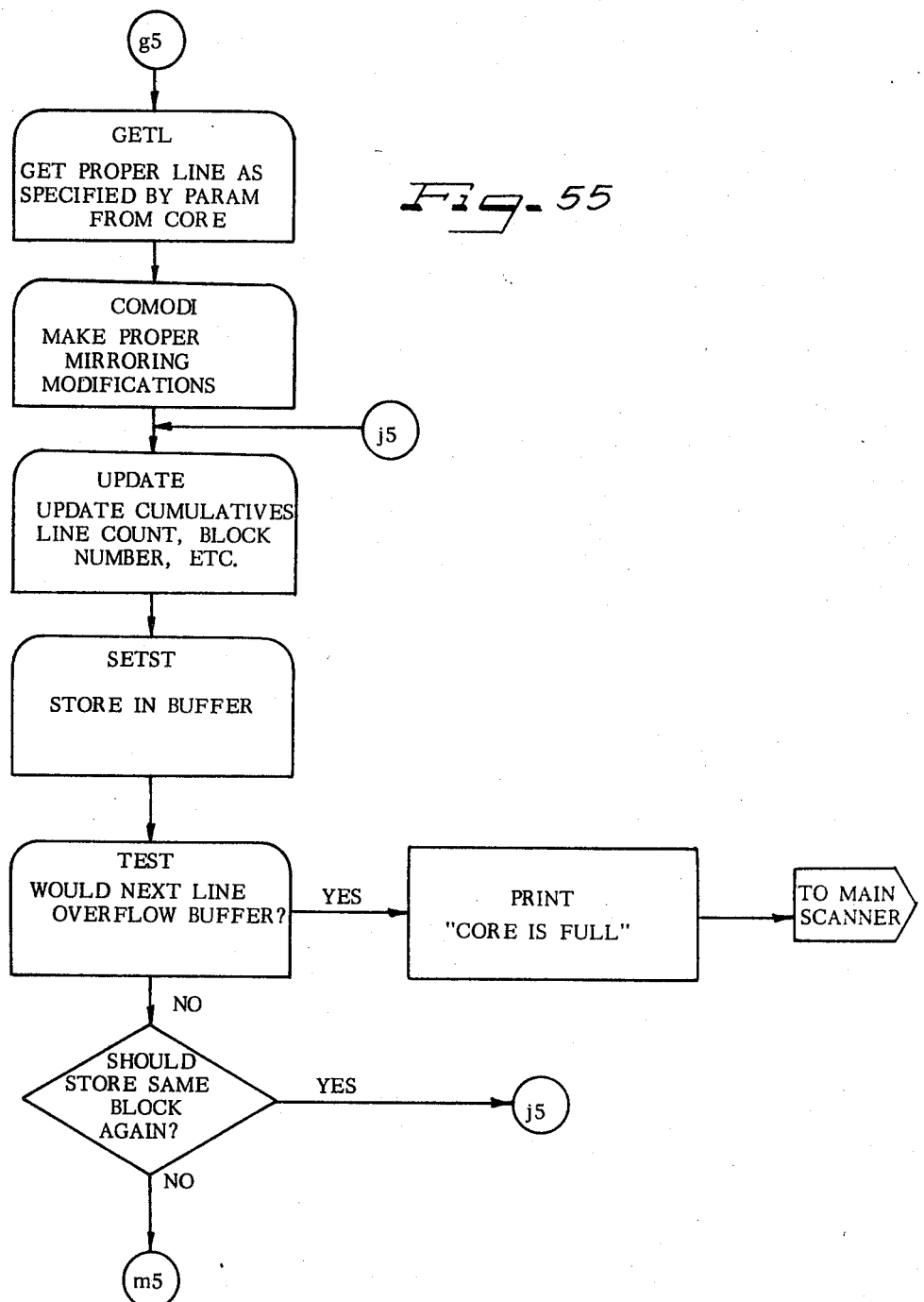
Figure 56:
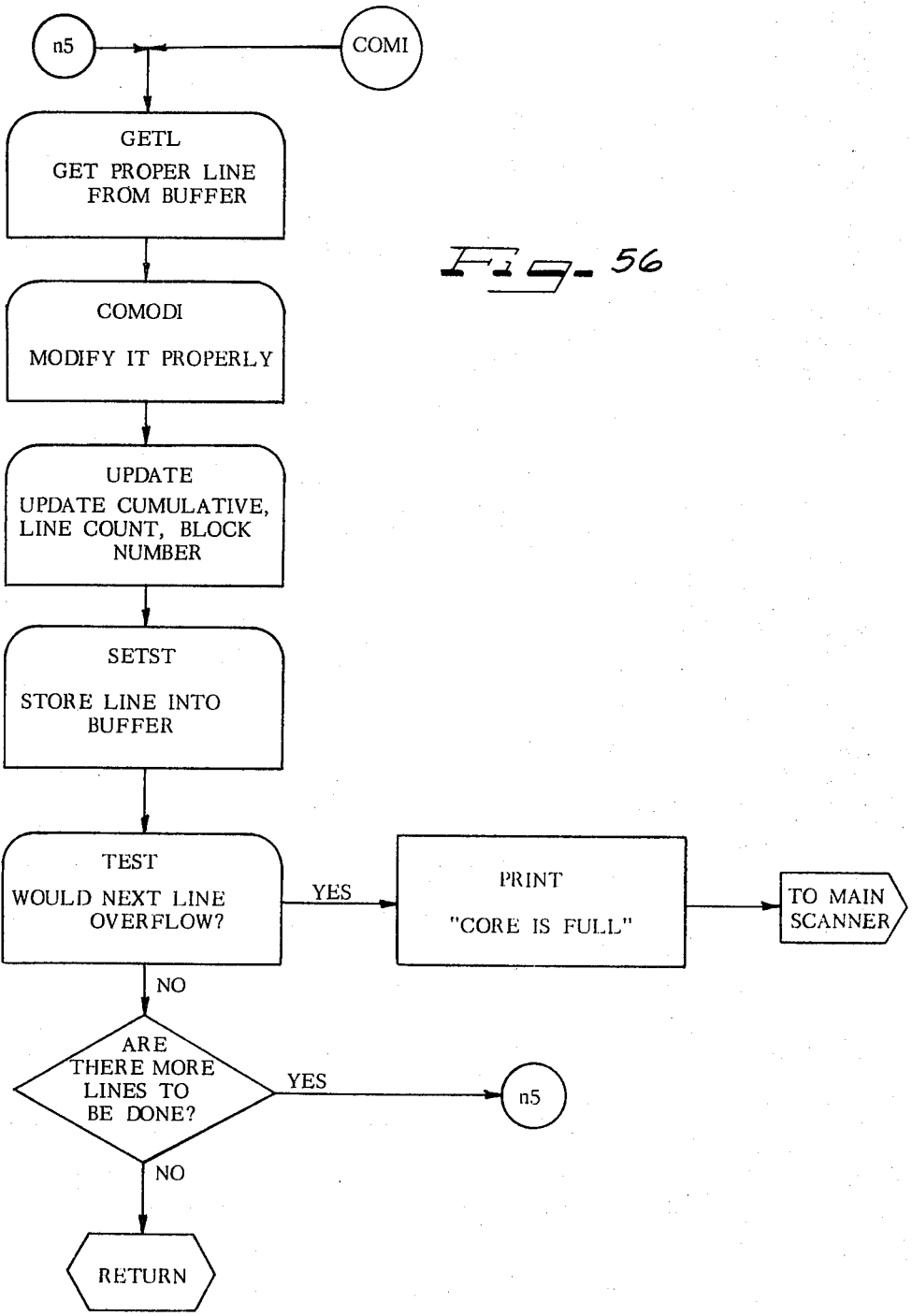
Figure 57:
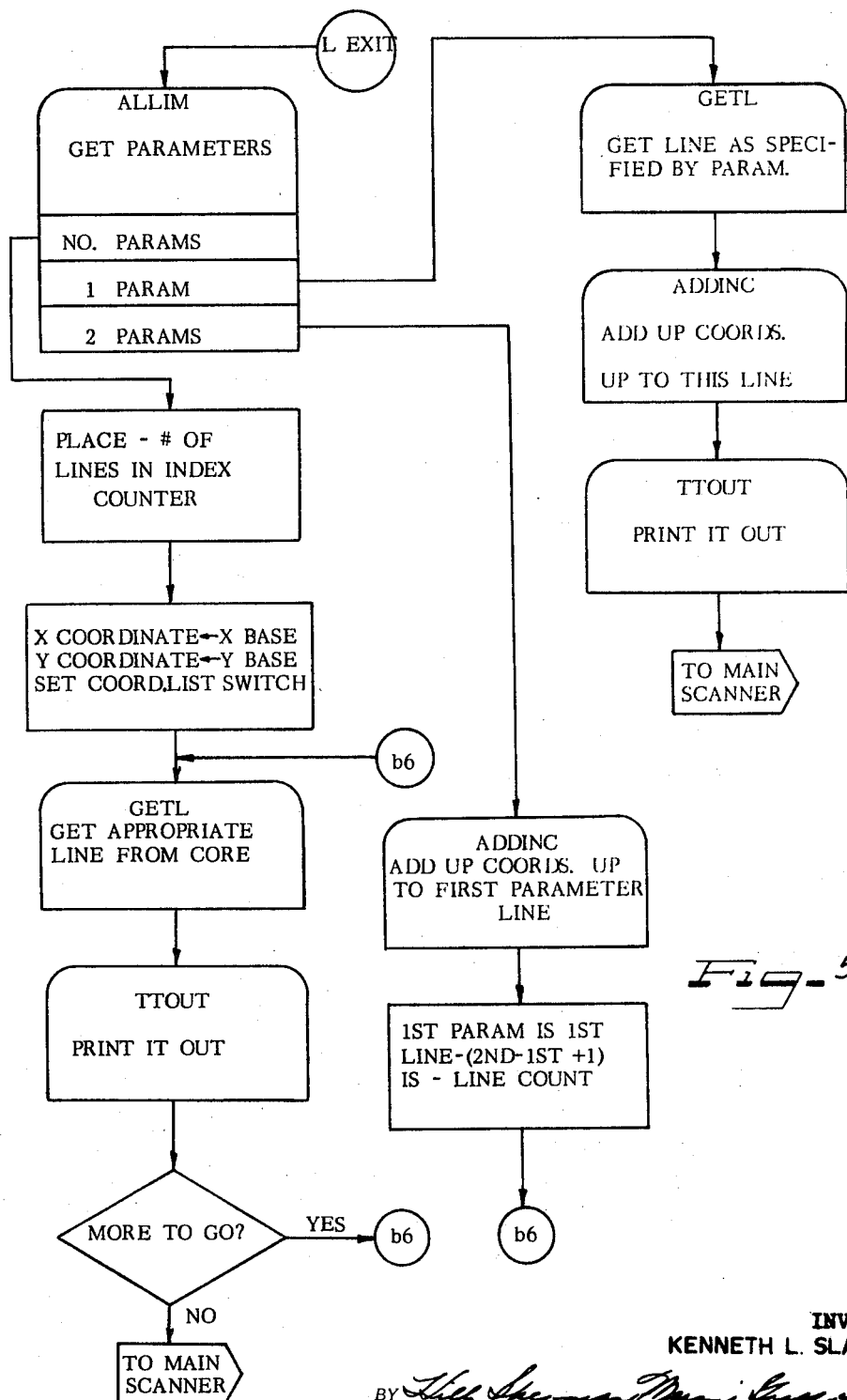
Figure 58:
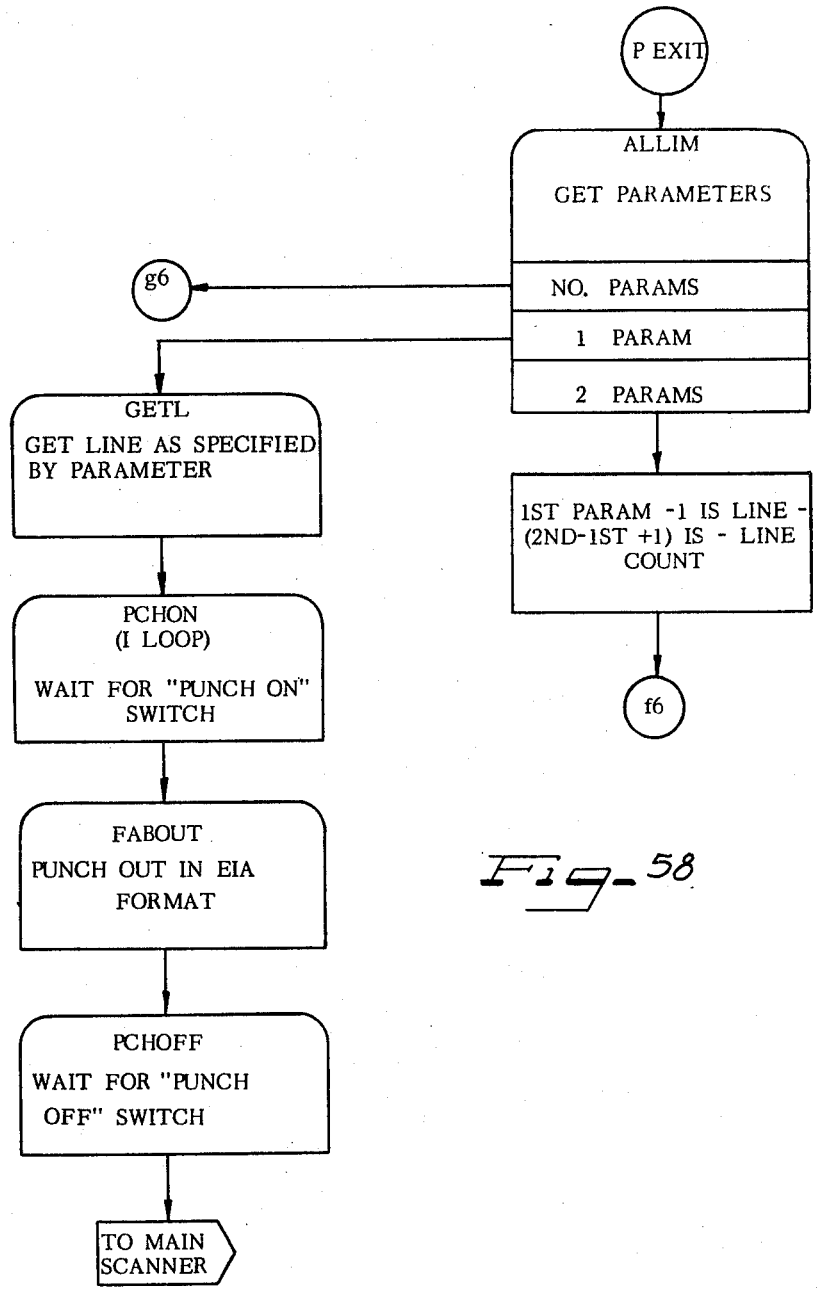
Figure 61:
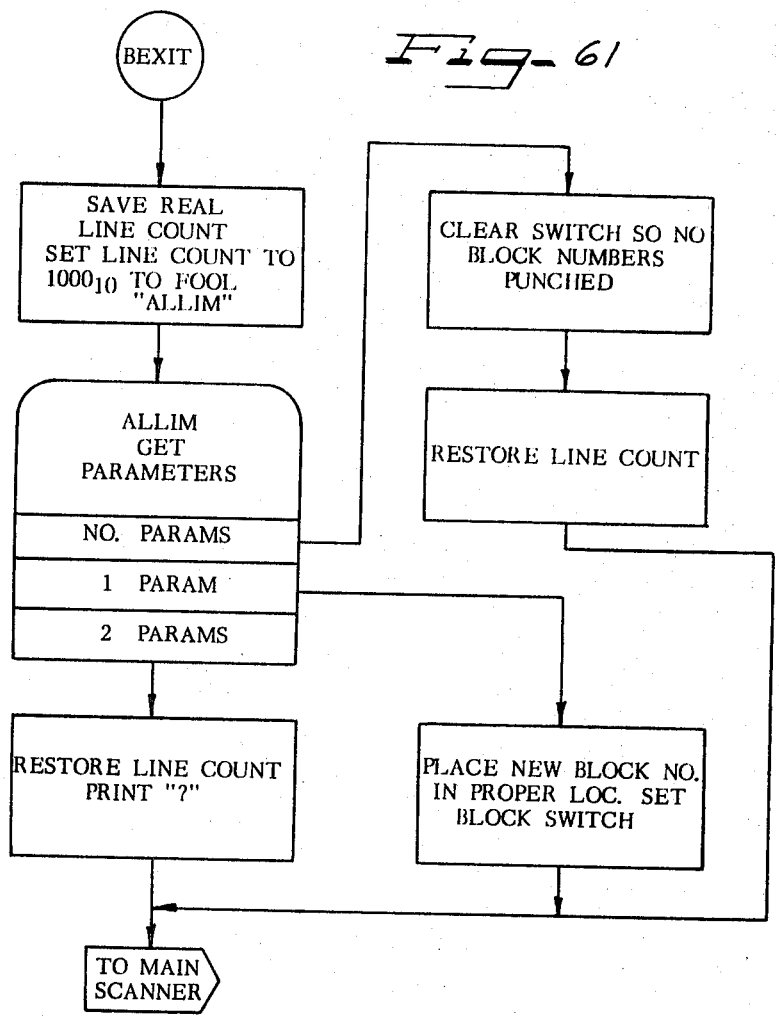
Figure 64:
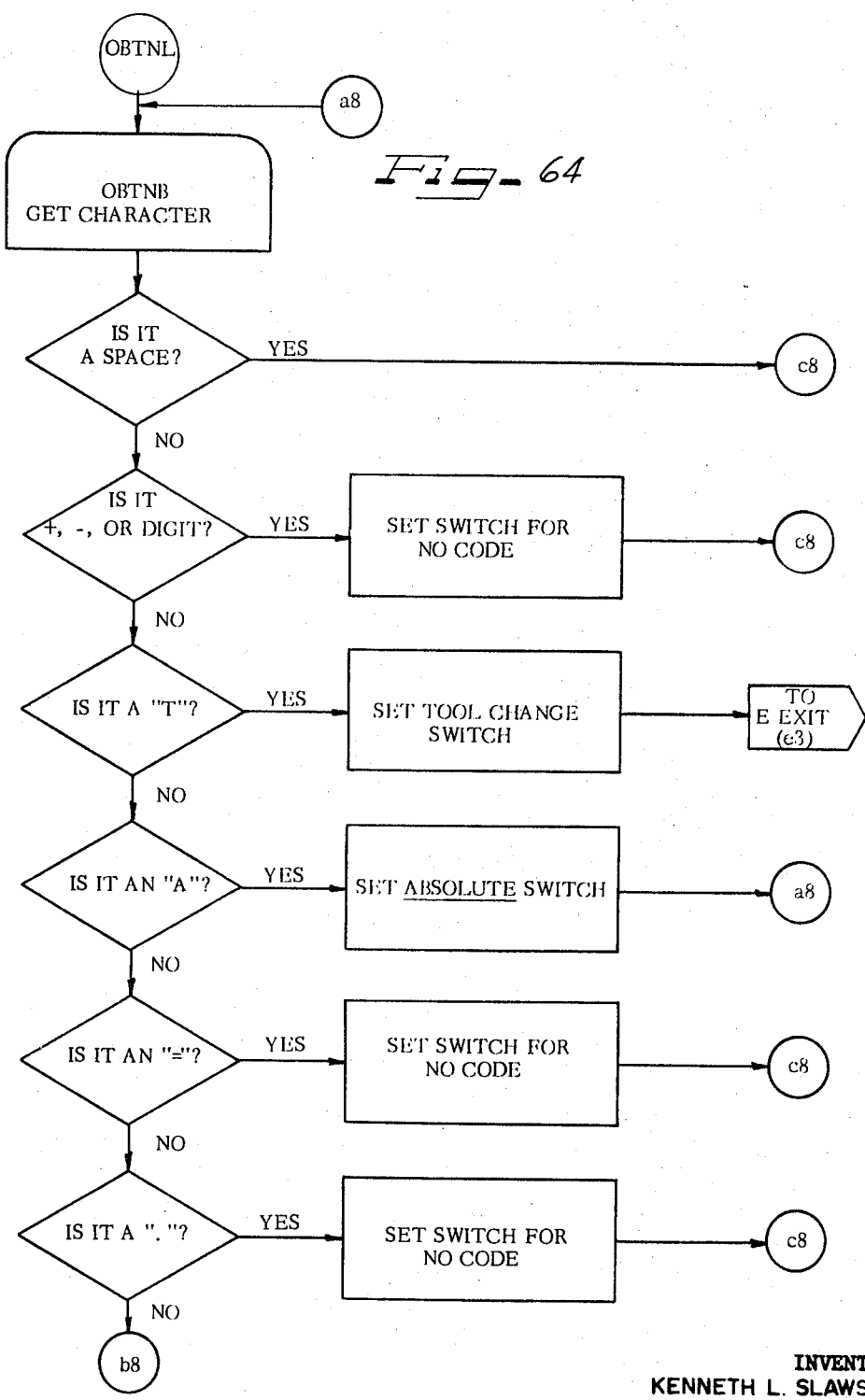
Figure 65:
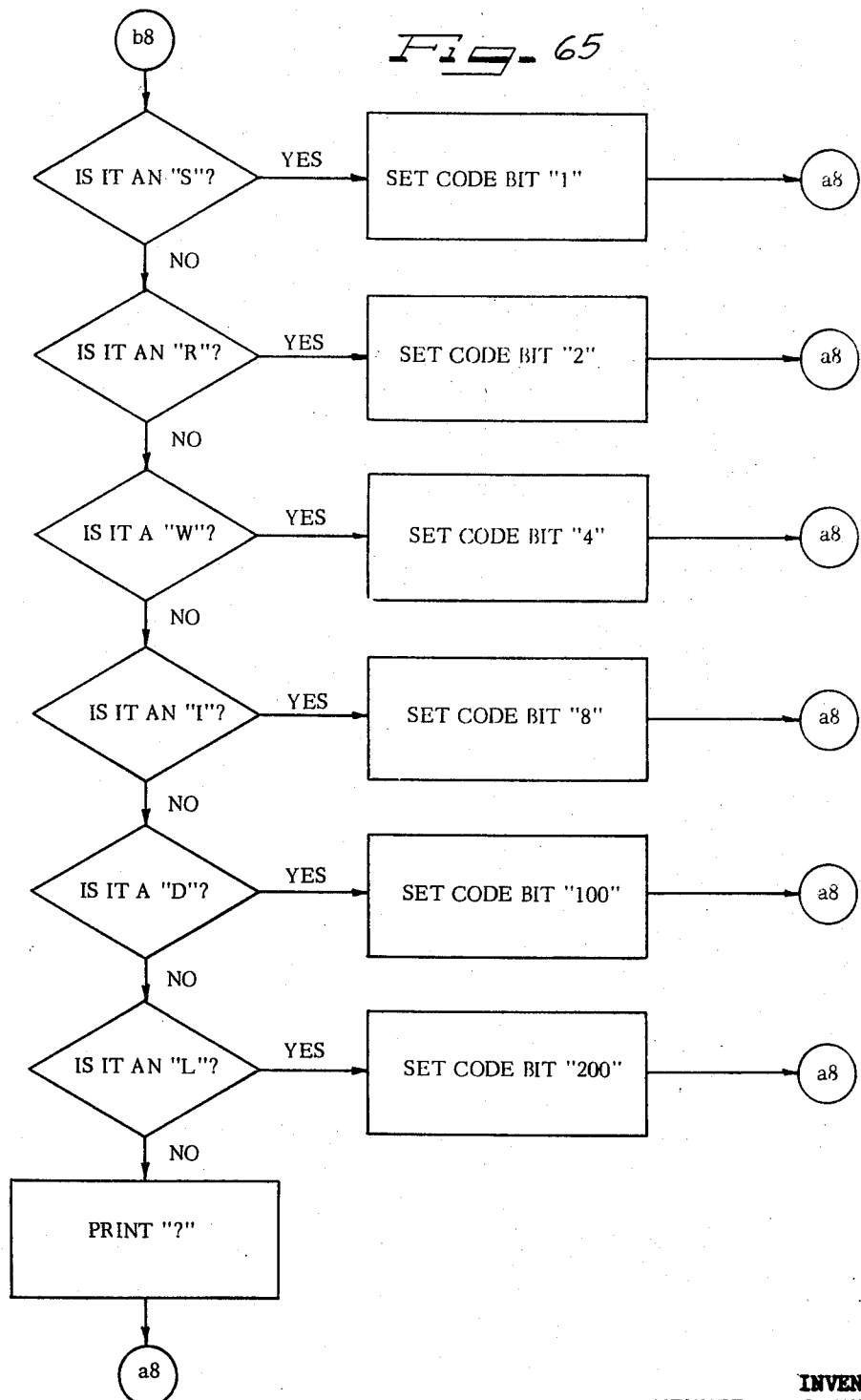
Figure 66:
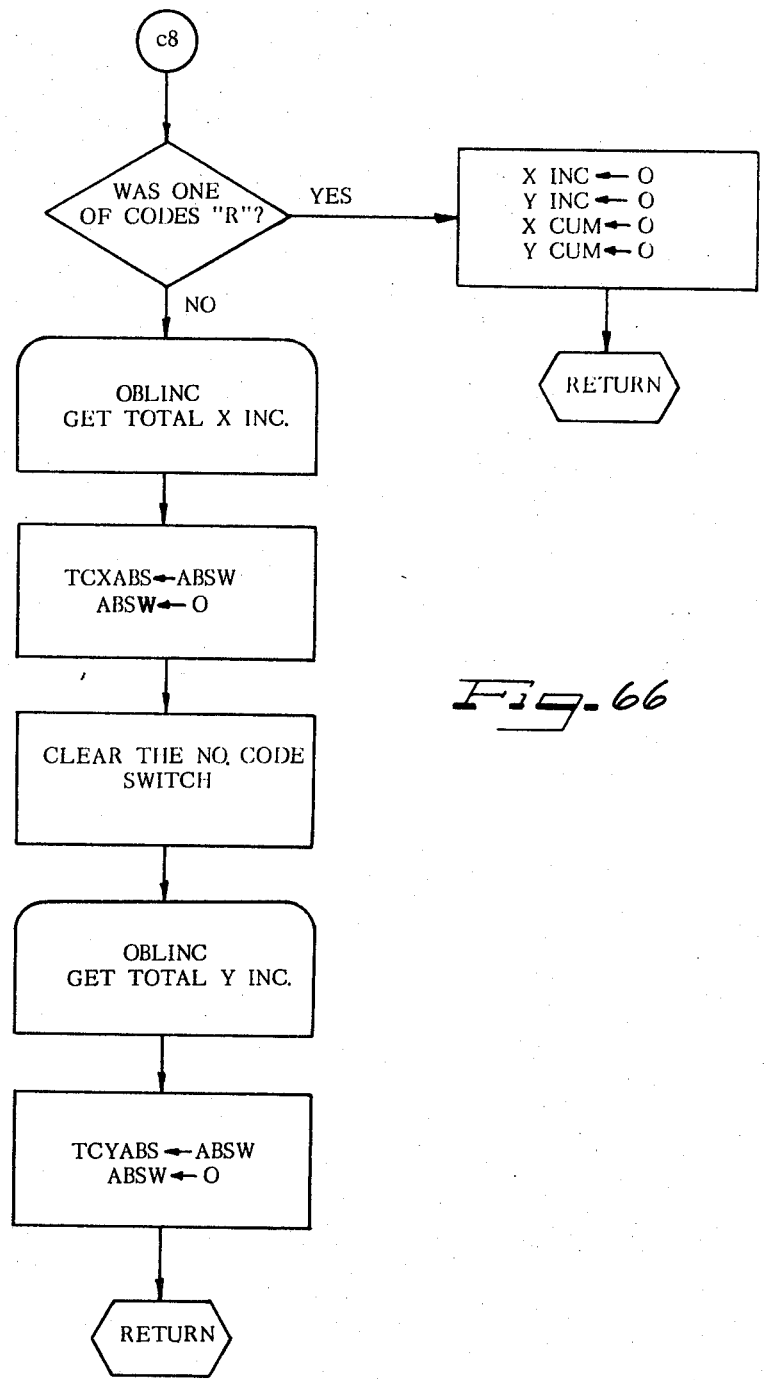
Figure 67:
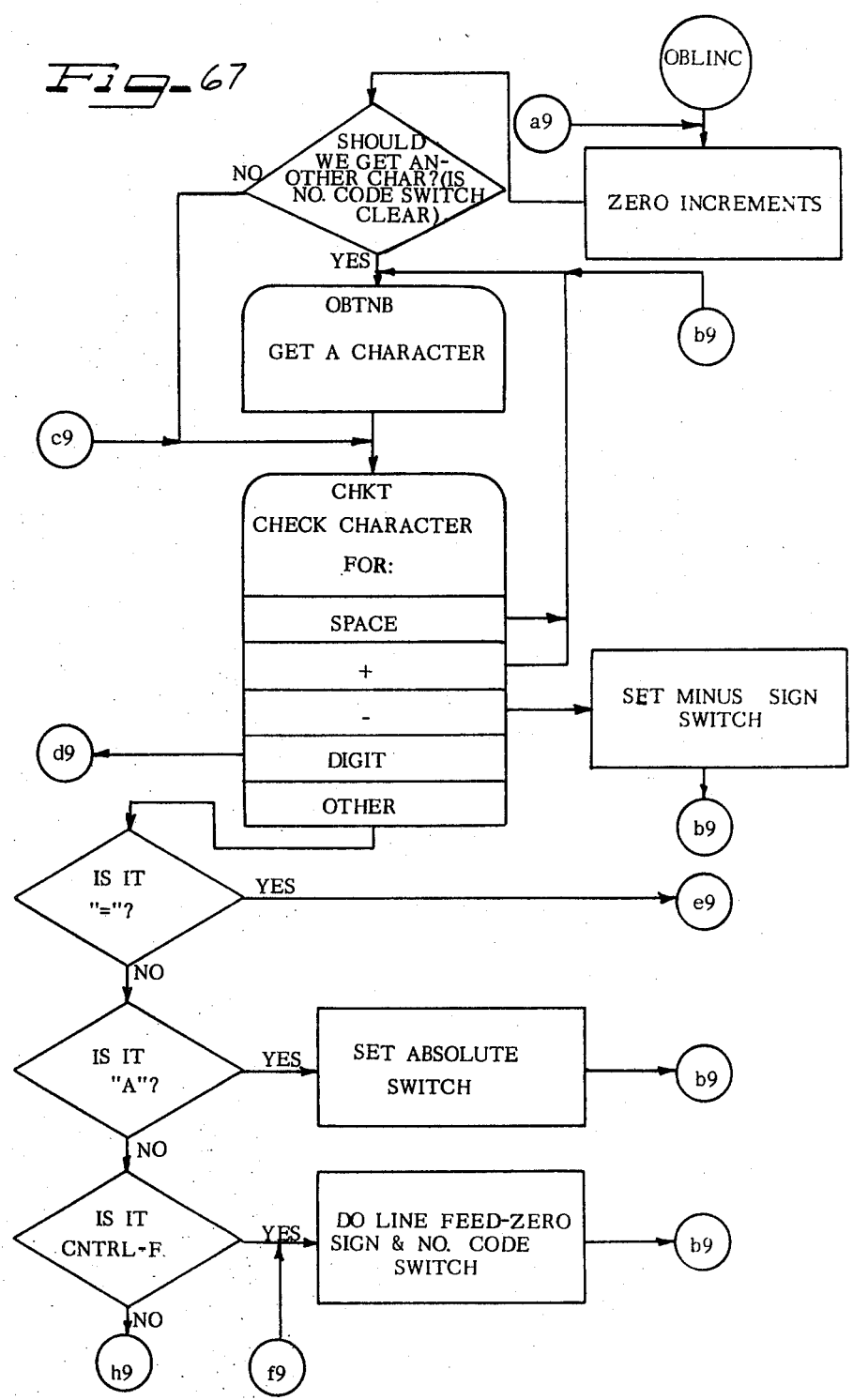
Figures 68, 69:
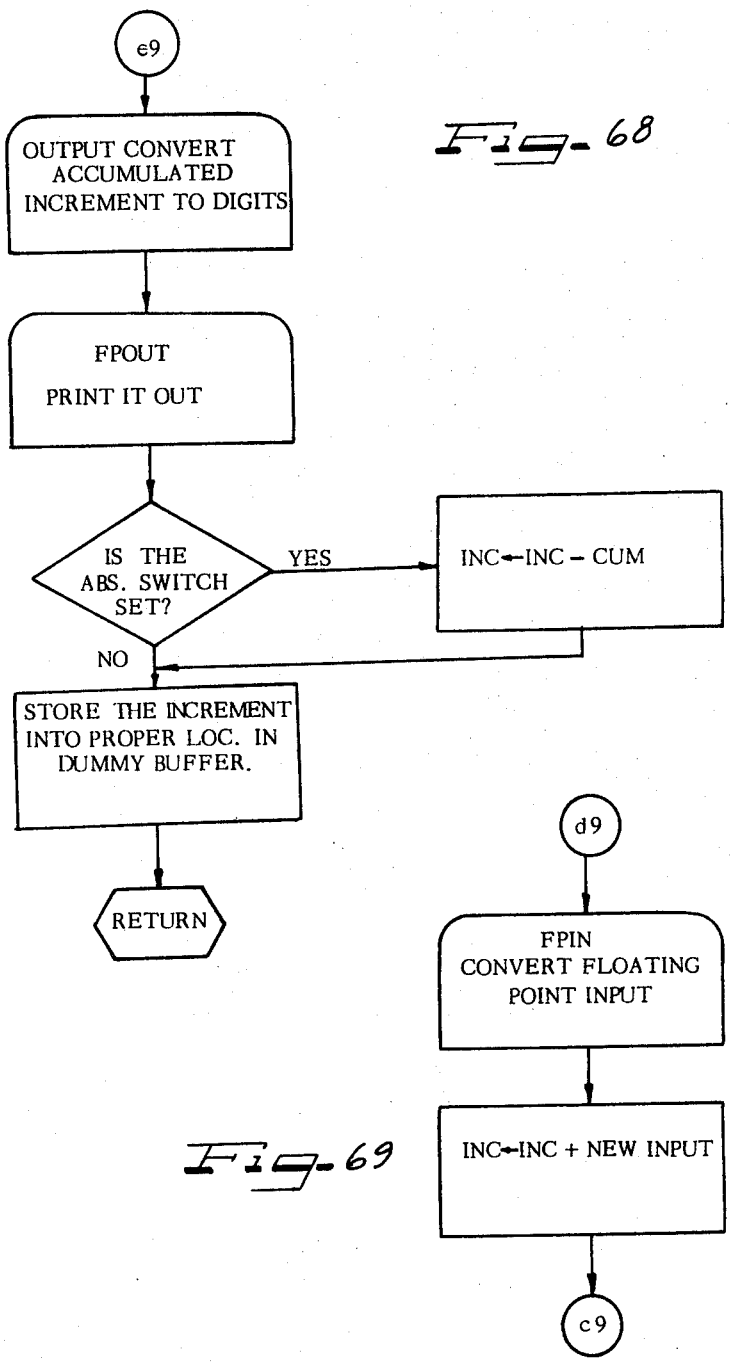
Figure 70:
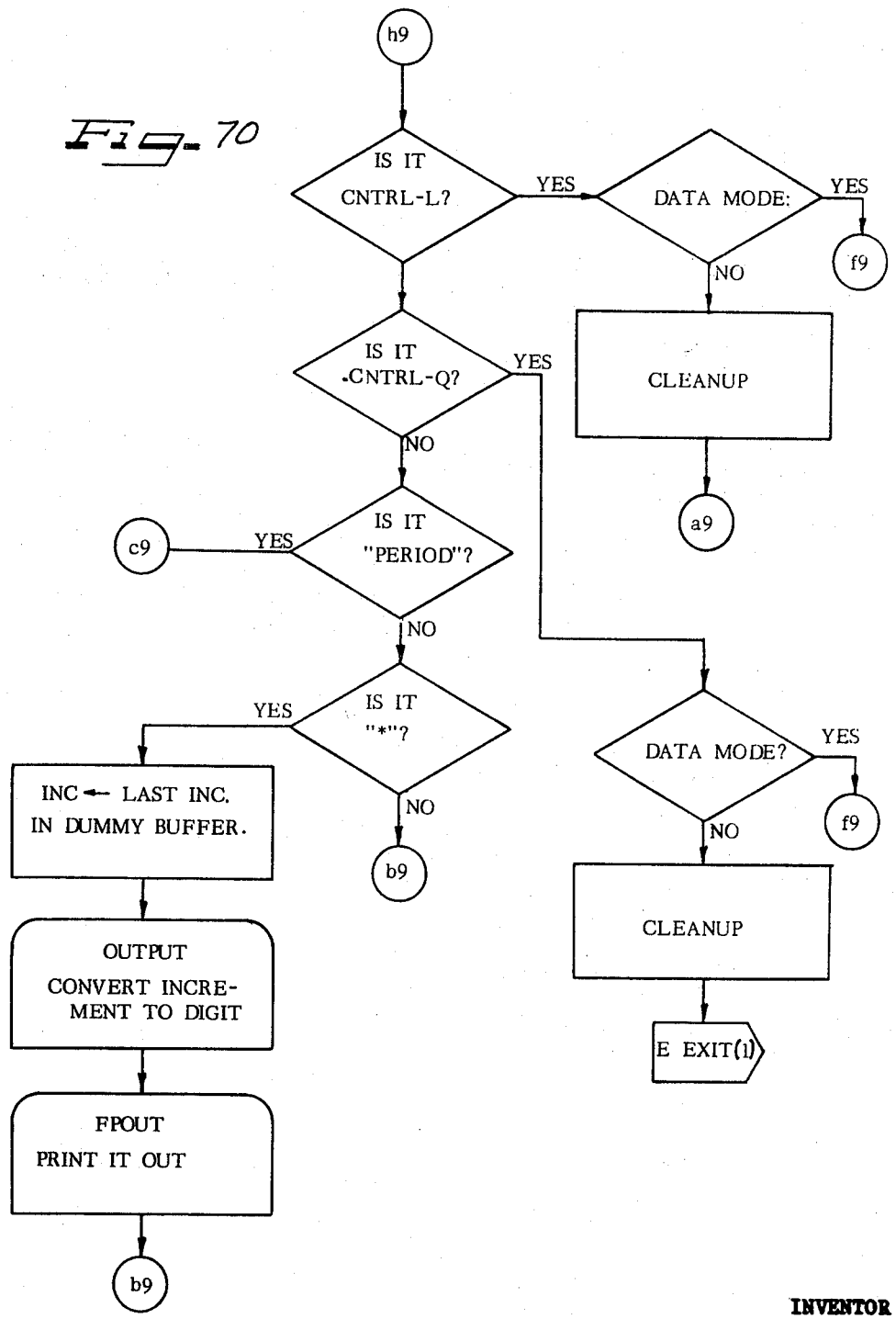
Figure 71:
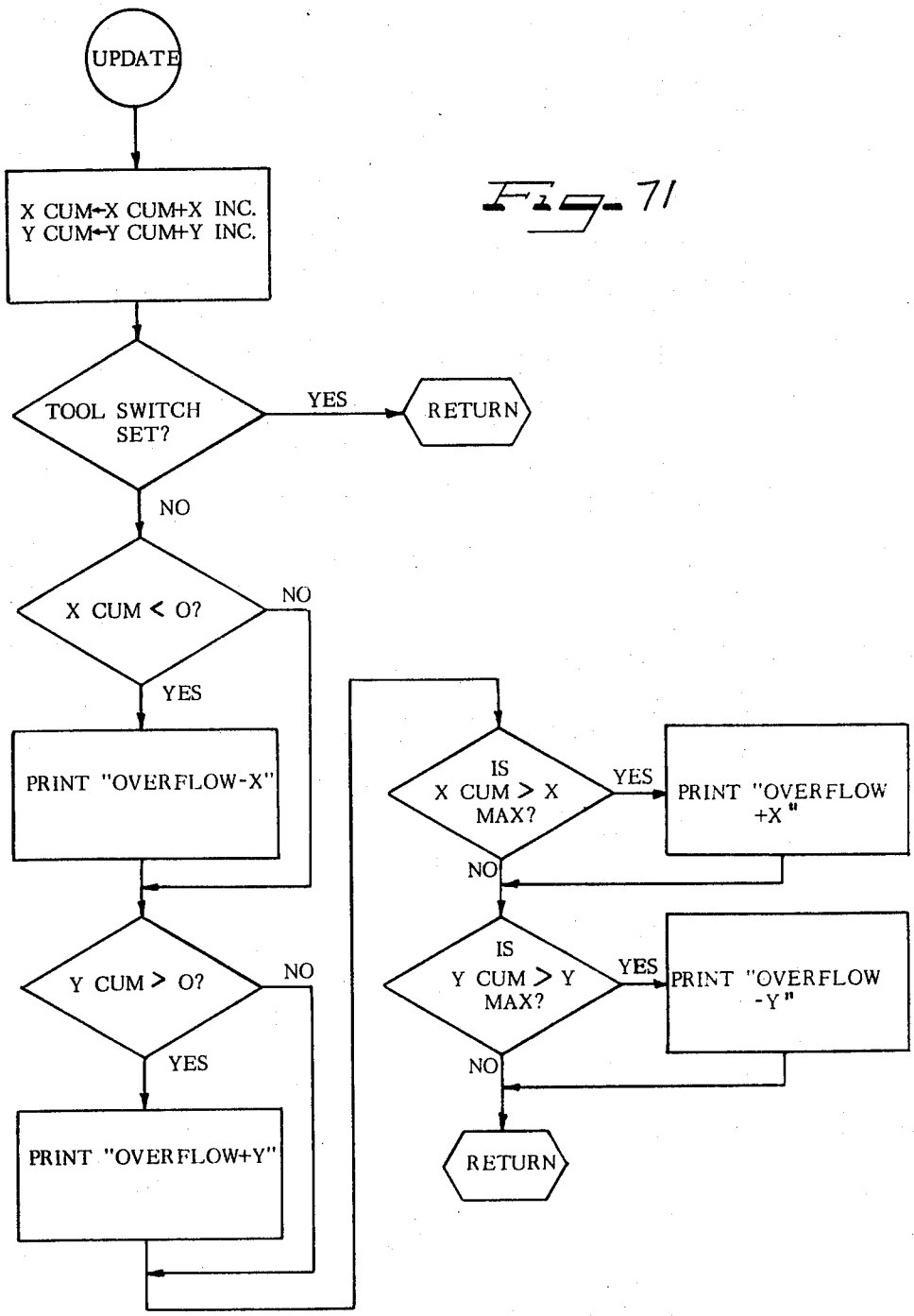
Figure 72:
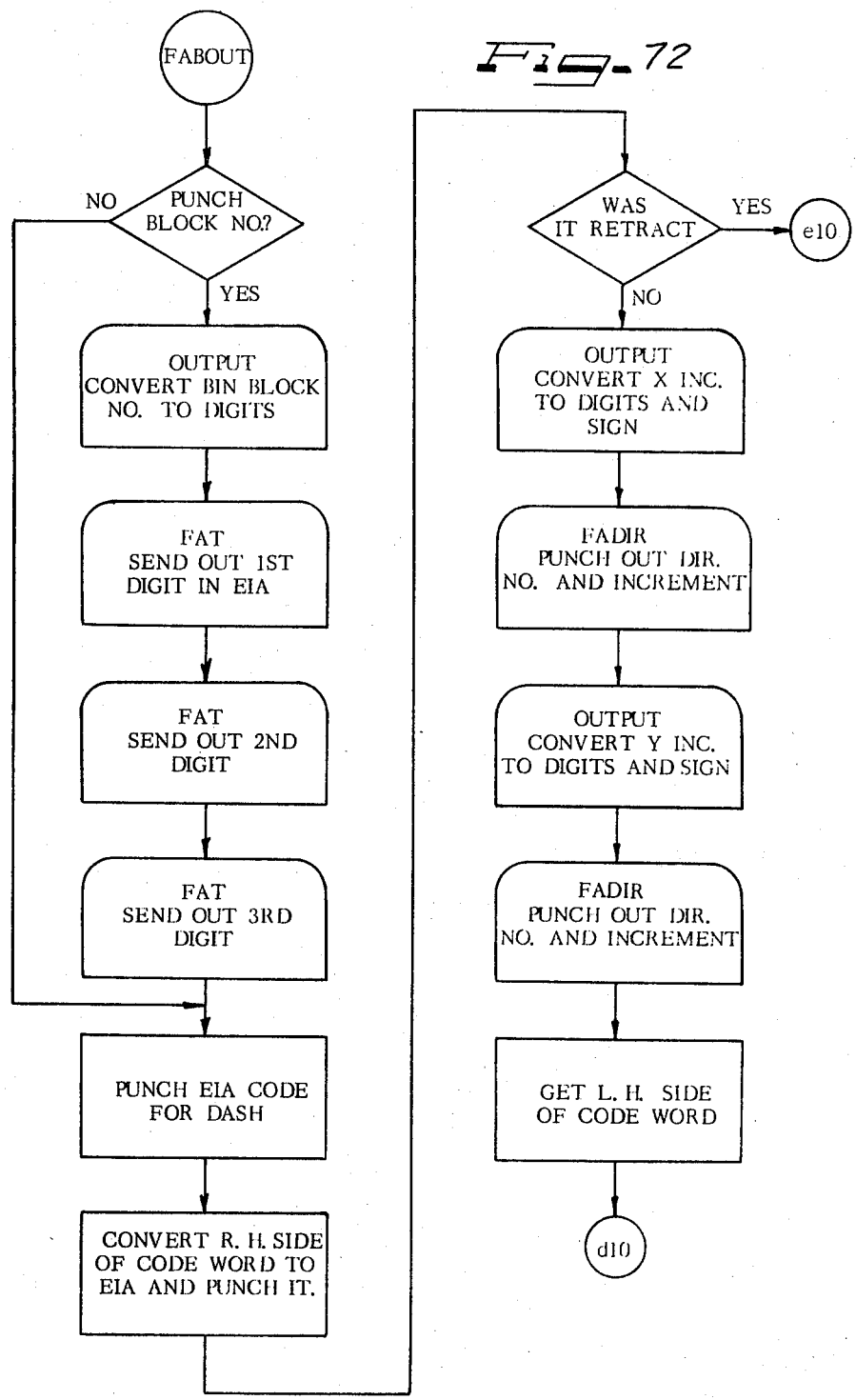
Figure 75:
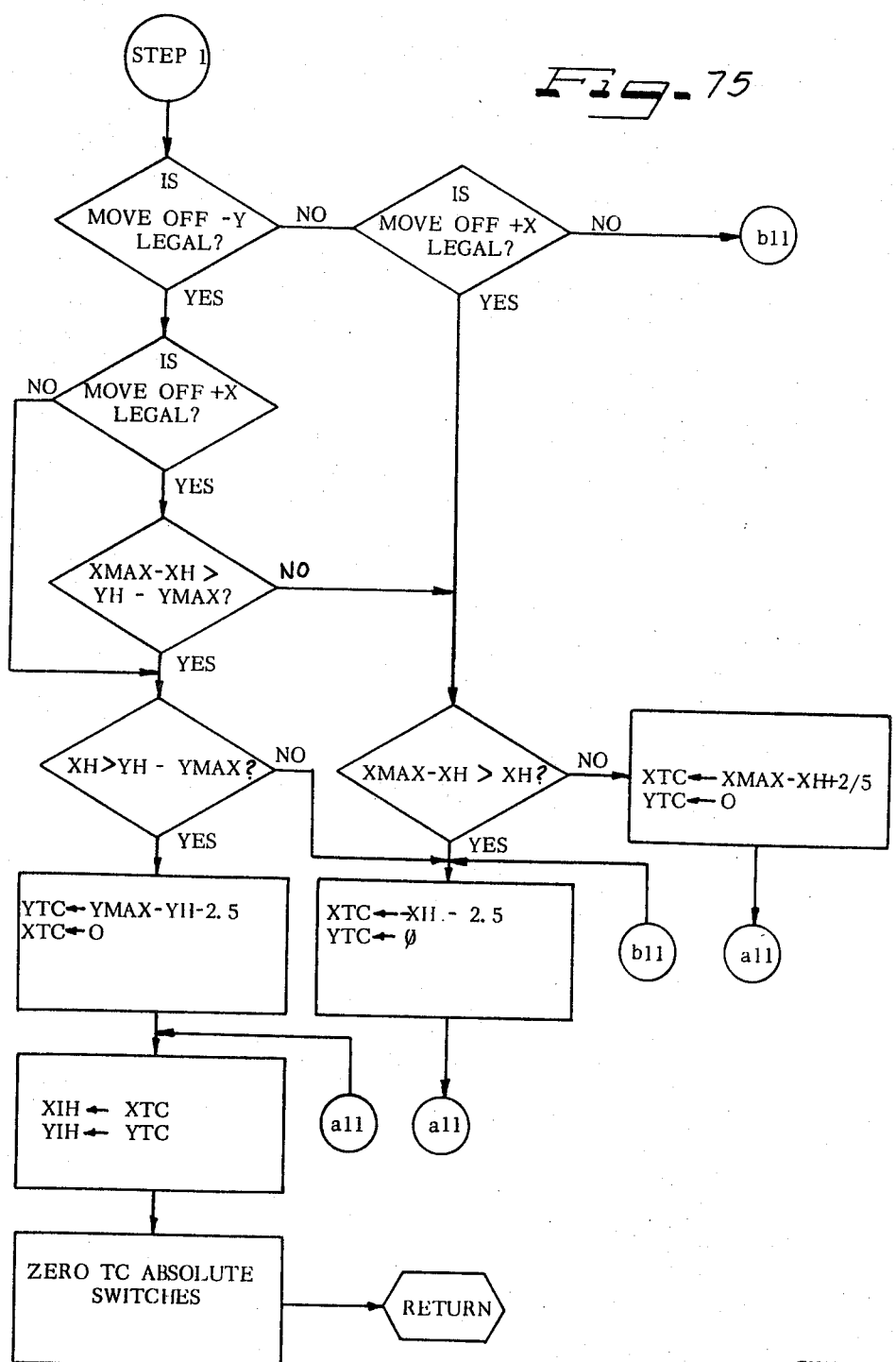
Figure 76:
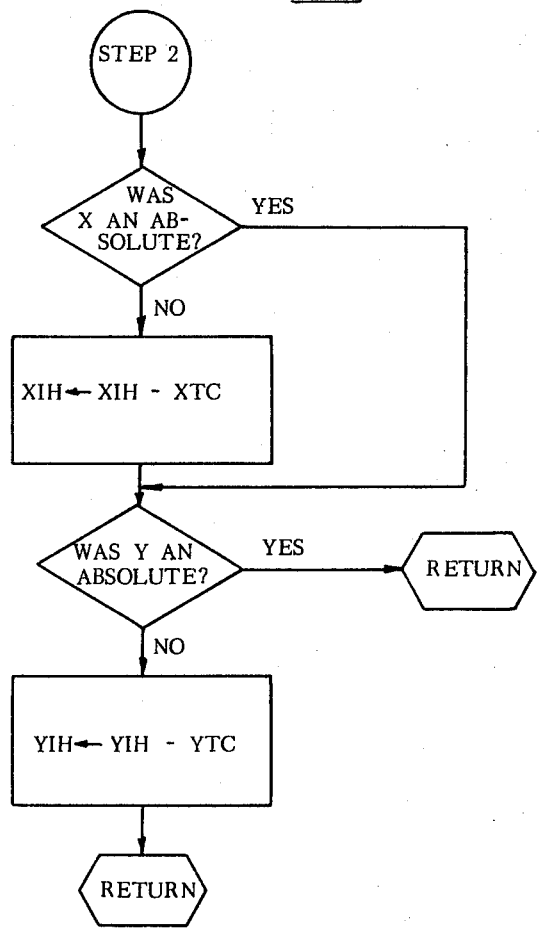
Figure 77:
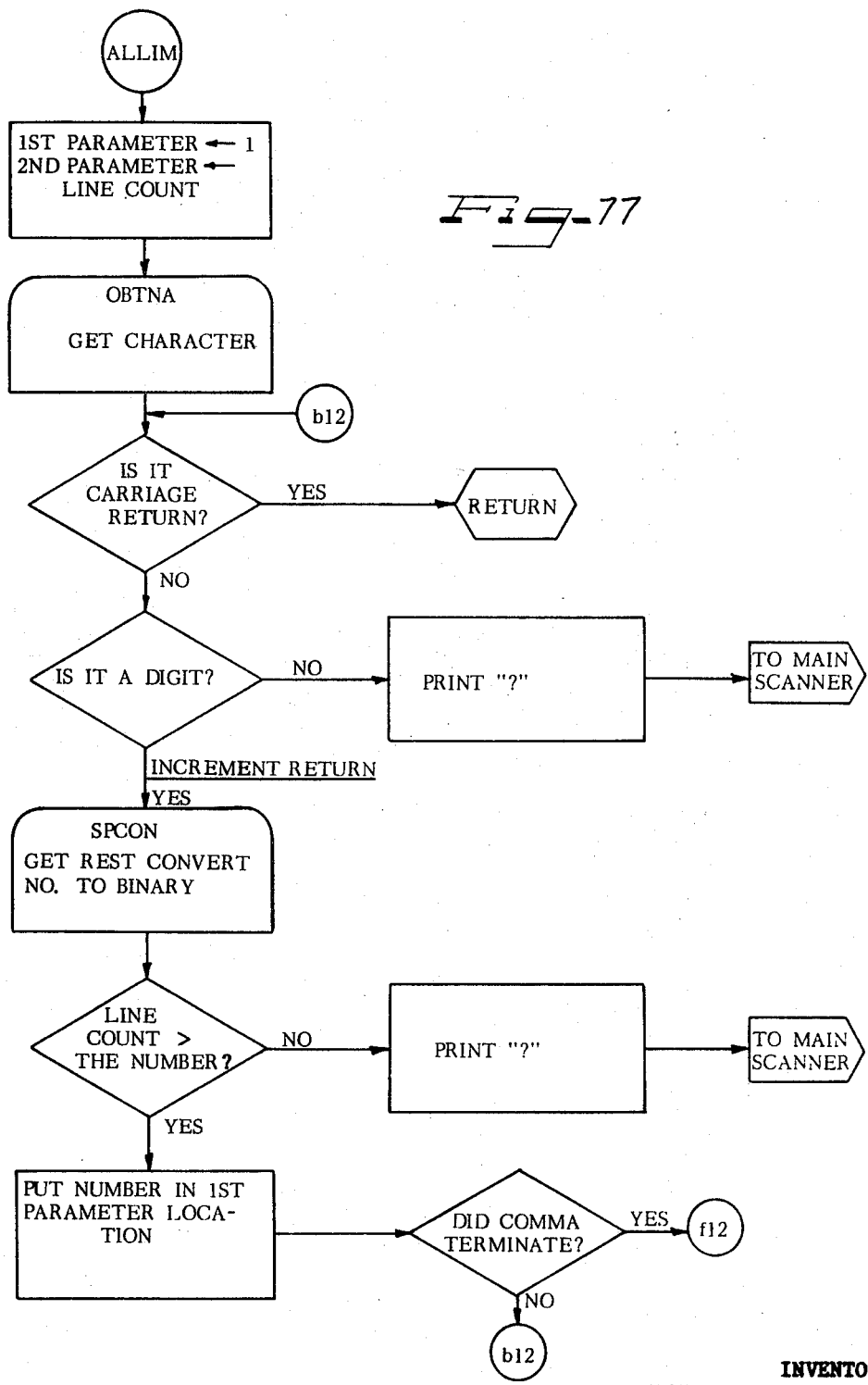
Figure 78:
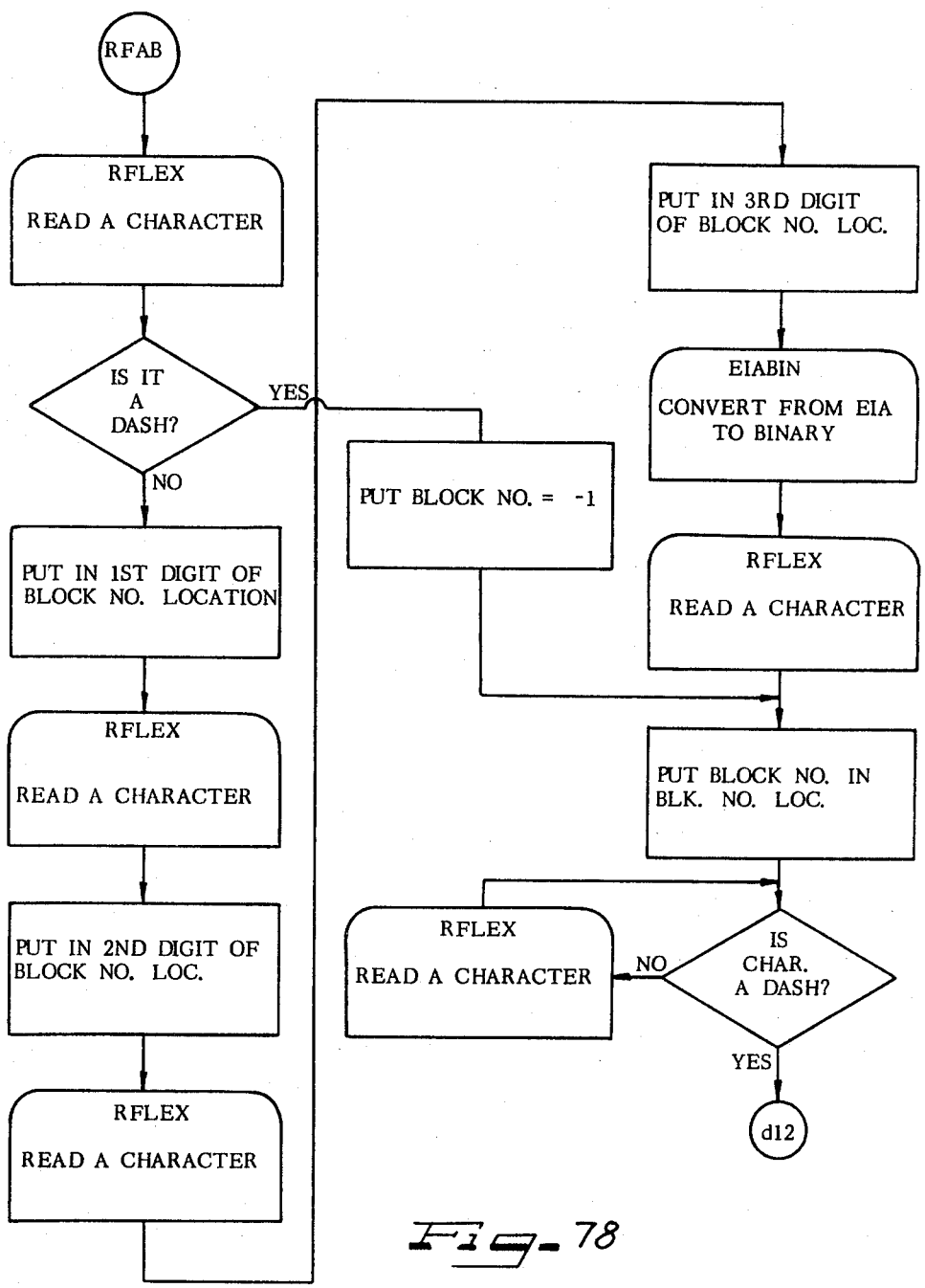
Figure 79:
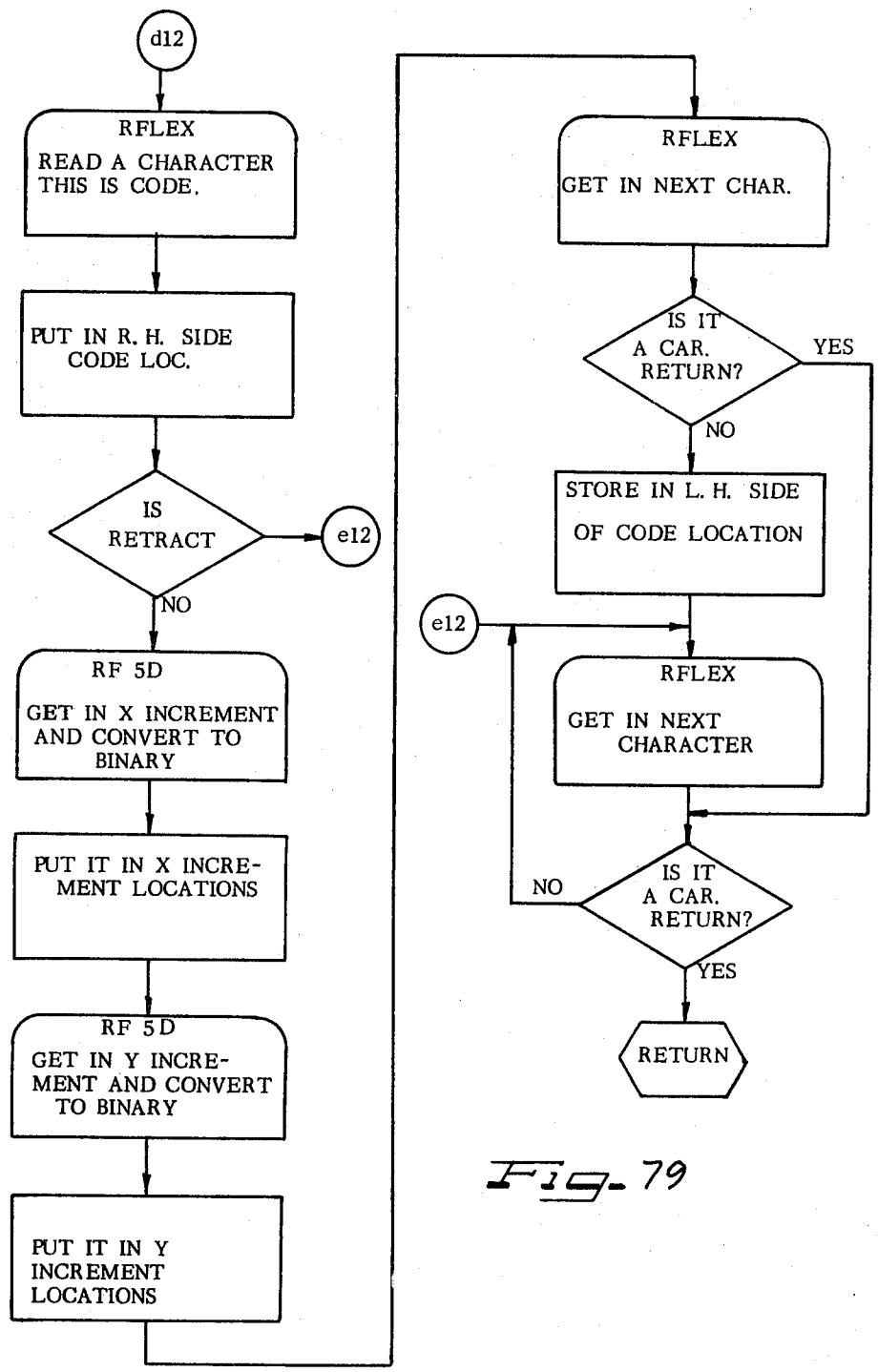
Figure 80:
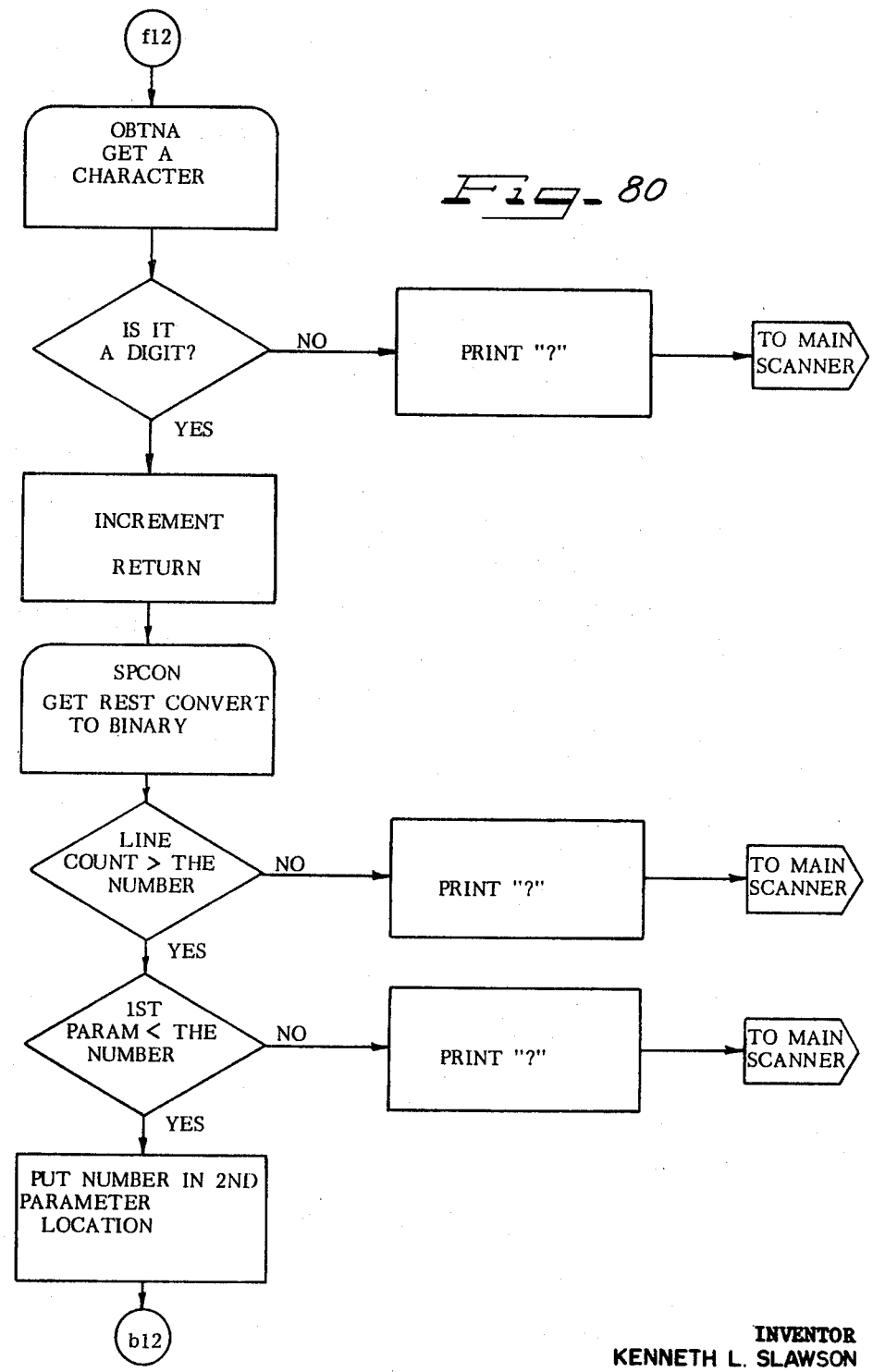
Figure 81:
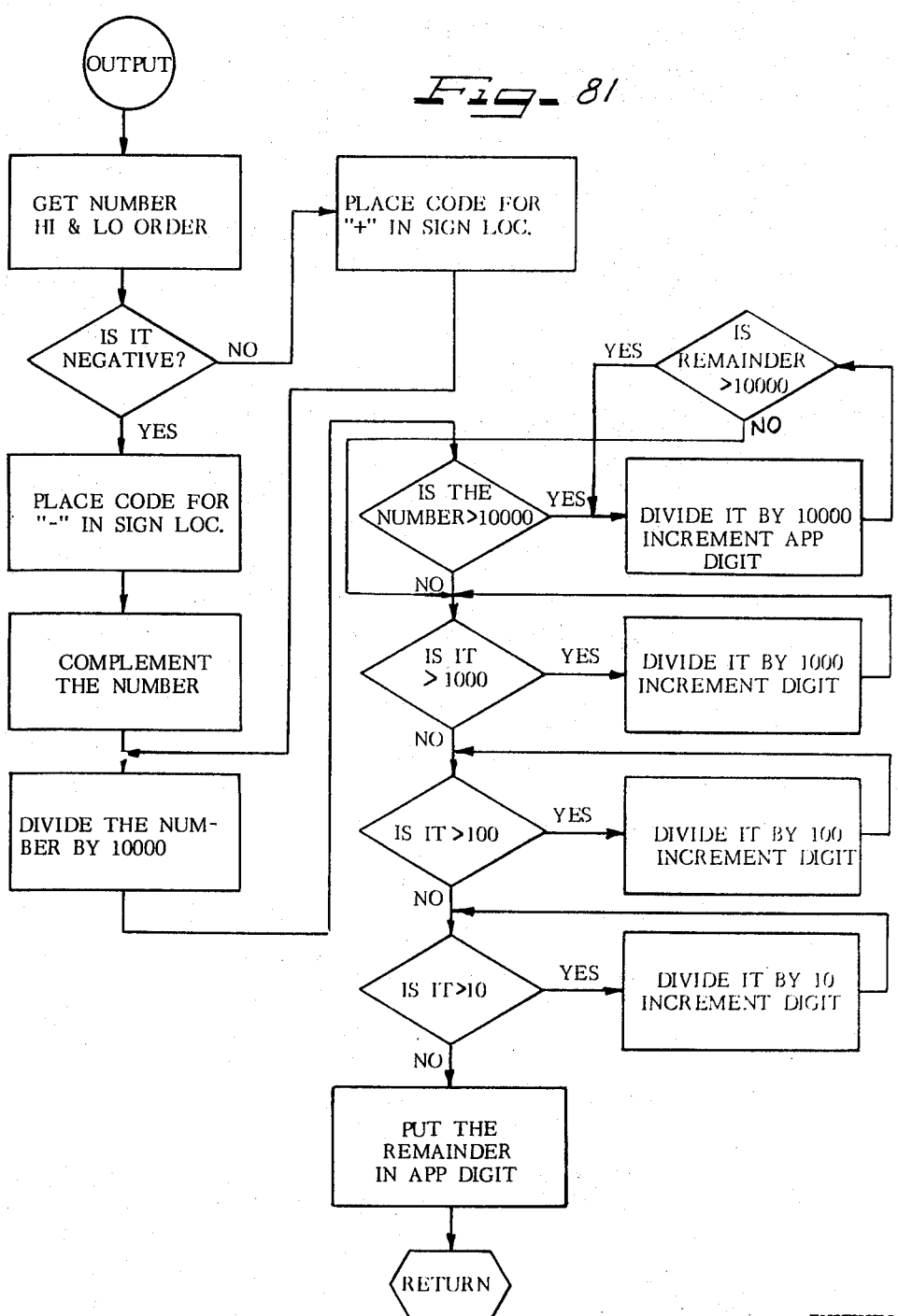
Figure 82:
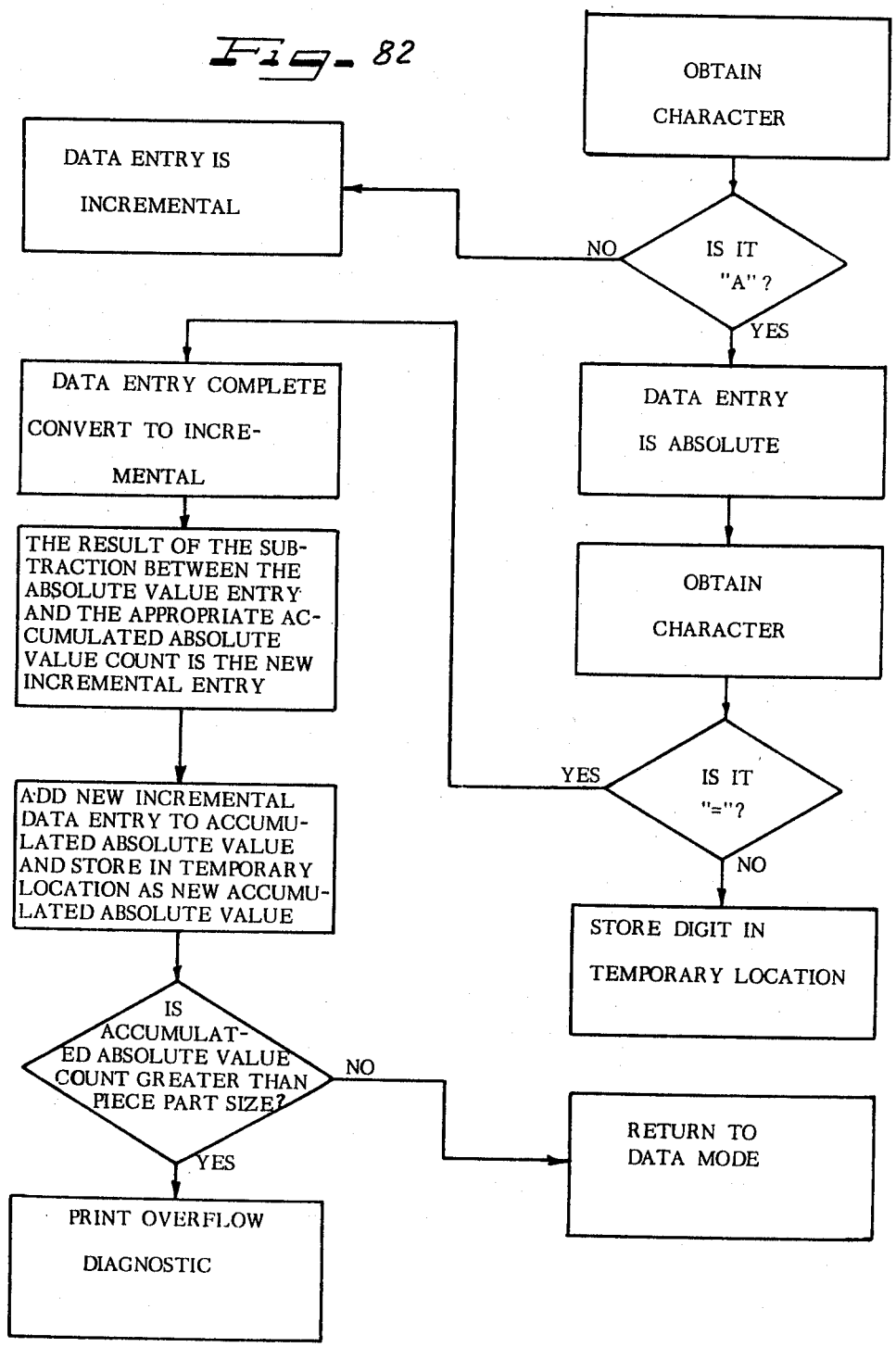
FIG. 82 shows a flow diagram illustrating the operation of tape preparation with incremental and/or absolute data entry corresponding to Flow Diagram A of the aforementioned copending application Ser. No. 652,968.
Figure 84B:
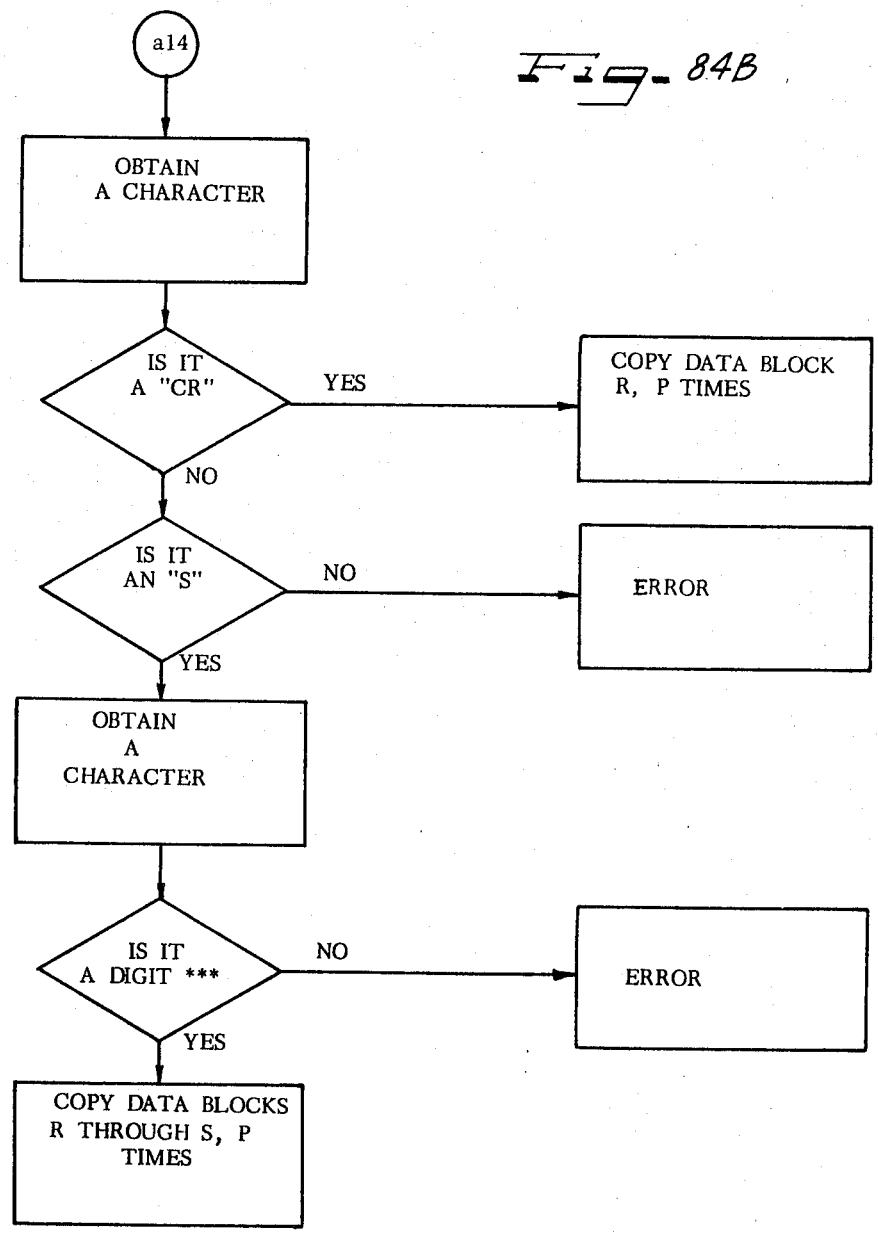

FIG. 37 is a general block diagram illustrating pertinent portions of the computer substantially as found at DEC-B, pages 85, 89, 425 and 432. As seen at DEC-B, page 432, the computer accumulator register (AC) which is generally designated by reference numeral 3701 includes inputs designated ACO-AC11, while the computer output bus drivers component 201 has outputs designated BAC0-BAC11. FIG. 6 shows a tape reader 600 and tape reader interface 601 coupled with the computer, and this is represented by component 3702 which thus represents source means connected with the accumulator register 3701 for supplying successive segments of previously established machine control instructions as described with respect to FIGS. 6 and 10 herein, for example. There is also illustrated in FIG. 37 a component 3703 which forms part of the console 602 and which includes the manually controlled keyboard of the console typewriter and which thus constitutes manually controlled input means connected to the accumulator register 3701 and operable to generate a sequence of coded input signals as manually selected by operator and for supplying the coded input signals to the accumulator register 3701. As described herein under "Type Mode," in type mode, the typewriter at the console as represented at 3703 is operative to enter positioning coordinates for controlling the machine tool.

As indicated in FIG. 2, the output cable 130 from the computer output bus drivers component 201 energizes the various gate components 203-206 so as to load into the machine tool positioning control means of FIGS. 1 and 2 the X- and Y-axis machine tool displacement commands from computer output 201. The output means comprising cable 130, conductors such as 221-232, 241-245 and gates components 203-206 provide a direct and immediate connection between the computer output 201 and the X and Y axis counters such as that represented in FIG. 1 without any intermediate storage or processing of the displacement commands.

A computer memory 3705 is indicated in FIG. 37 for storing the program information given under the heading "Contents Of Computer Memory." A generalized diagram of the computer including the computer memory is found at DEC-B, page 89, and a general description of the memory is found at DEC-B, page 86. As there explained, all information transfer between the computer processor registers and the core memory 3705 are temporarily held in the memory buffer register (MB), indicated in FIG. 37 at 3706. As indicated at DEC-B, page 429, outputs MB3-MB8 of memory buffer register 3706 are connected with bus drivers of component 201 to provide both binary one and binary zero output signals BMB3(1)-1) and BMB3(0)-8(0) as indicated in FIG. 37.

See DEC-B, page 218, 222 and 226. The BMB outputs are connected by means of a cable 280 with the device selectors 101, 114, 207 and 208 as explained in connection with FIG. 2. Similarly as shown at DEC-B page 89, IOP bus generator component 202 transmits pulses via conductors IOP 1, IOP 2 and IOP 3. See DEC-B, pages 222, 226 and 426-429.

The computer memory 3705 contains a machine tool control program for controlling the transmission to the computer output 201 of the X- and Y-axis machine tool displacement commands in accordance with the machine tool positioning instructions supplied to the accumulator register 3701 from the source of such instructions represented by component 3702. The computer memory 3705 also stores a tape preparation program for controlling the transfer of the sequence of coded input signals from the manually controlled input means of component 3703 to the accumulator register 3701 and for controlling the conversion of the coded input signals into a sequence of new machine control instructions.

As explained in DEC-B, at pages 429-430, for the case of selecting component 101, FIG. 2, from computer output 201, the stored program within computer memory 3705 would cause the octal number 72 to be transferred to the memory buffer register 3706 of the computer (at stages or bits 3-8 thereof). Thus for the octal number 72, a standard ground level signal would appear at terminals MB3, MB4, MB5 and MB7 to produce standard minus 3-volt signals at BMB3 (1), BMB4 (1), BMB5 (1) and BMB7 (1). Referring to DEC-B, page 430, it will be apparent that the resultant signal at the six conductors of line 281, FIG. 2 will cause load XL selector 101 to be activated. A similar operation obtains for activating the other device selectors from the program stored in computer memory 3705.

Referring to the example of FIG. 19, displacement commands as generated by the computer and supplied to component 201 specify movement of the work table parallel to the X-axis and parallel to the Y-axis as represented in FIG. 19. If the work supporting table of the punch press starts with reference point A, FIG. 19, at the operating position of the machine, the first instruction from the tape reader 3702 might specify movement of the worktable parallel to the X-axis for a distance of plus 1.500 inch (in binary coded decimal notation) and a movement parallel to the Y-axis for a distance of minus 2.000 inch. The machine tool control program stored in computer memory 3705 would control the computer to convert such machine tool positioning instructions into successive binary coded computer words for transmission via the computer output 201. For example, a first computer word might be loaded into the counter stages XU11-XUO, FIG. 1B under the control of gates component 204, FIG. 2, a second computer word (of 12 binary bits) would be loaded into the lower counter stages XL11-XLO, FIG. 1 and so on. Thus the computer would load into the counter stages a binary number which would cause the machine tool table to be moved a distance of 1.5 inches to the left and two inches upwardly as viewed in FIG. 19, so that the hole number one of FIG. 19 would occupy the present position of reference point A. The instructions from the tape reader 3702 would then be to execute a punch operation, and the computer memory 3705 is such as to interpret such input instruction and to cause the punch operation to be executed when appropriate.

Referring to FIG. 11, it will be recalled that when the machine table is at the commanded end position (such as represented by hole number one in FIG. 19, coinciding with the present position of reference point A,) the relays 181 and 1107 will be energized to close the series contacts 182 and 1130 indicating that both the X-axis and Y-axis counters are within a predetermined small distance of the commanded end position. If the contacts 182 and 1130 remain closed for a predetermined time interval, oscillator component 1108 will transmit an output signal to the Move flip-flop 1114. The computer program stored in computer memory 3705 is periodically activated in response to an output from the status flag component 1113 which supplies an interrupt signal at input line 1120 to the computer, which leads to the program interrupt facilitate component 3710 of the computer. (See DEC-B pages 89, 108-109, 425 and 435-436.) In response to the clock interrupt signal at interrupt request bus 1120, the computer program is caused to activate device selector 1111, FIG. 11, as represented, for example by the instruction in octal code 6712 shown at core memory location 0422, of computer memory 3705. In response to the program information at location 0422, the computer output drives the conductors of output cable 280 with such a pattern of voltage levels that component 1111 is activated causing a signal to appear at output conductor 1122 of gate 1105 which has been shown in FIG. 37 as connecting with input conductor AC4 in conformity with the description of FIG. 11. As described with reference to FIG. 11, by assigning the input signals such as that at conductor 1122 different predetermined binary weights in the accumulator, the computer under the control of the program in computer memory 3705 can detect, for example, that the status of the move flip-flop 1114 has changed, and thus that a commanded move has been completed.

If the instruction from the tape reader 3702 specifies that a punch operation is next to be executed, as has been described with reference to FIG. 11, the output bus cable 130 from component 201, FIG. 37, may control the setting of punch flip-flop 935, FIG. 9, under the control of the program stored in memory 3705. In FIG. 9, conductor BACO is shown as being coupled to the punch flip-flop 935 under the control of selector component 1109. As seen from DEC-A, page 70, a ground level signal at direct set terminal N of punch solenoid flip-flop component 930, FIG. 9, will cause the line 930' to be driven to the output level of -3 volts. As shown at DEC-A pages 57 and 140, under this condition a load current will flow at the output of relay driver 932 for energizing the coil 918 of relay 9-k2 causing the normally open contacts 9-k2-1 to close. This in turn energizes relay 9-kpu, closing contacts 9-kpu-1 and thus energizing punch solenoid 915.

Referring to FIG. 37, output conductors 1043 and 1044 from the tape reader interface are shown as connecting respectively with the interrupt request bus 1120 and the input/output skip bus 1121 which is shown as leading to input/output skip facility component 3711. Component 3711 is explained, for example, at DEC-B pages 430 and 431. Component 3711 assists the computer in determining whether reader flag component 1014, FIG. 10, or status flag component 1113, FIG. 11, is in the actuated condition. Thus, as previously described, the computer can transmit via output 201 and cable 280 a code to activate component 1008, FIG. 10, which will then transmit a pulse to the input of AND-gate 1006, causing a signal to be transmitted via conductor 1044 to the skip bus 1121, FIG. 37. The computer automatically responds to the skip signal so as to begin processing the tape reader, for example, under the control of the program stored in computer memory 3705.

FIGS. 38-81

FIGS. 38-81 are flow diagrams illustrating the tape preparation program for the commercial system, the detailed tape preparation program being set forth under the heading "Contents Of Computer Memory."

SUMMARY OF FEATURES OF THE TAPE PREPARATION PROGRAM

In general, as will be apparent from section 1.10 "Example of Piece Part Programming" the computer of FIG. 37 operates under the control of its stored program stored in computer memory 3705 to respond to certain coded input signals received from an input device such as the manually operated input device 3703. For example, where the input device includes a "keyboard," the keyboard can be manually actuated to type the letter "S" standing for the "Start" command explained in section 1.8-1. The computer under the control of its stored program responds to the "start" or "initial" coded input signal so generated to print out "X-Limit =." The operator then types on the keyboard the X-dimension of the work piece, for example "18" for the workpiece of FIG. 19 having a dimension of 18 inches parallel to the X-axis. The computer under the control of the stored program upon receipt of the X-axis limit causes the typewriter to print out "Y-Limit =, " whereupon the operator types in the Y-dimension of the work piece, for example "12" for the workpiece of FIG. 19 having a dimension of 12-inches parallel to the Y-axis. As explained under section 1.8 hereof, "4. Diagnostics" the computer program provides for an "Overflow" printout to advise the operator that the last block contained an increment which cause the cumulative coordinates with respect to an initial reference point (such as REF. PT. "A" of FIG. 19) to be off the workpiece as defined by the aforesaid X-Limit and Y-Limit previously given by the operator.

Further, as explained under "2. Move Entries" a coded input signal of a pattern type may call for the generation of machine tool control data by the computer for carrying out an automatic tool change move. The computer in response to the typing of a symbol "T" signifying the automatic tool change, may utilize the Y-Limit in conjunction with an accumulated absolute displacement value representing the present work table position to compute an incremental displacement value required to shift the workpiece clear of the tool operating position. Thus, referring to section 1.10 hereof, the "T" coded input signal is shown as being generated in reference block No. 0020. Referring to the workpiece of FIG. 19, it will be observed that the machine tool operating position is in alignment with REF. PT. "B" for block "19" corresponding to block No. 0019. Since the accumulated Y-axis displacement value is −6.000 for REF. PT. B in FIG. 19, and since tool change is to take place 2.5 inches off the workpiece, the computer will determine that an incremental move of 12.000 −6.000 +2.5000 is required along the Y-axis in order to move the workpiece to the required offset position. Thus block No. 0020 requires an incremental X-axis move of 0.000 and an incremental Y-axis move of −8.5000. The computer program will also generate suitable auxiliary function commands such as "S" meaning "Stop," "I" meaning "Inhibit Punch" and "D" meaning "Die Change." See the commands for block 0020.

Referring to FIG. 19, it will be observed that the larger diameter hole to be punched for block 21 is located at absolute displacement values relative to REF. PT. "A" of X = 14. and Y = −8. As seen in section 1.10 after the tool change operation of block 0020, the operator may enter the coordinates of the next position, whereupon the computer will determine the necessary incremental moves required to move the work table from the offset position indicated at "20" in FIG. 19. Thus, referring to the printout of block 0021 it will be observed that the computer has determined that incremental moves of X = +5.000 and Y = +6.500 will move the work table so that the workpiece of FIG. 19 has the large diameter hole of block No. 21 disposed at the tool-operating position. As indicated in one of the Notes of section 1.8 it is not necessary to program a "P" after a block that has an inhibit punch ("I"). Thus while the symbol "I" was automatically inserted by the computer for block 0020, the computer will automatically insert the punch command "P" for block 0021. Thus, in executing block No. 0021, the computer would cause the machine tool control to move the worktable 5 inches to the left and 6.5 inches in an outward direction so that location 21 of FIG. 19 would then be at the machine tool operating position, and whereupon the computer would cause a punch operation to be executed.

The response of the computer under the control of the stored program to other pattern-type coded input signals is explained in sections 1.8, 1.10 and 2.4 of the present specification. These pattern-type coded input signals include the following: C directing the computer to generate a series of new blocks corresponding to a series of previous blocks (see reference block No. 0003); X meaning copy a specified series of previous blocks with the sign of the X-axis displacement increments reversed; Y meaning copy a specified series of previous blocks with the sign of the Y-axis increments reversed; and M meaning copy a specified series of blocks with both the X and Y increments reversed in sign. The C, X, Y and M commands are represented by blocks 0003 and 0011–0019. Thus, it will be observed that these pattern-type coded input signals generate moves which are repetitions of or mirror images of the moves specified by a previous series of blocks. For example referring to FIG. 19, it will be observed that the movements to holes generated by blocks No. 11, 12, 17 and 18 form a mirror image in relation to the holes of block Nos. 8, 9, 14 and 15.

Referring to block No. 0023, it will be noted that the blocks of machine tool control data generated by the input device can be placed on punched tape in response to the command "P" which is explained in section 1.8, paragraph No. 9. Thus, the computer under the control of the stored program will punch a tape in EIA code in accordance with the blocks such as listed in section 1.10.

As explained in section 2.5, the tape reader 600 may read successive blocks of information which are presented in the EIA format. As explained in section 2.1, in step mode of operation, the computer is operable to read one block of information at a time while inhibiting the machine function so that this mode of operation can be used by the machine tool operator to verify the positioning of machine tools without producing a piece part. As explained in section 2.4, under "Part and Program Verification" the machine tool operator may stop the piece part production at any point and examine the schematic diagram in comparison to the value displayed in the absolute value display counters such as 450, FIG. 4. Further, the standard machine tool program will allow the machine to punch any given part at its maximum speed, while at the same time the console typewriter attached to the computer control will be printing out as fast as it can the positioning error for X and Y for each move of the piece part. Thus, when the piece part is finished and the typewriter has stopped printing, the machine operator will have a finished part and written record of the positioning accuracy of the machine tool.

Other important features of the tape preparation program are summarized in section 2.4 of the specification.

SUMMARY OF TAPE PREPARATION OPERATION

As explained in section 1.2 hereof with respect to the "Console Typewriter Module" the computer console 602 includes not only the console typewriter represented by component 3703 but also includes a tape punch or coded record producing device, and a tape reader or coded record reading device. These components are distinct from the high-speed tape reader 600 which has an interface 601 shown in some detail in FIG. 10. The source of instructions 3702 may be thought of as constituting the high-speed tape reader 600 and interface 601 and/or the coded record device of the Console Typewriter Module, since either coded record device may be utilized for transmitting successive blocks of machine tool control data to the computer accumulator register 3701.

To read coded records into the computer memory 3705, certain coded input signals are generated by the console typewriter 3703 which serves as a manually controllable input device. Where the coded record is in EIA format the characters RE are generated by component 3703 as explained in paragraph 11 of section 1.8, while if the coded record is in ASCII format, the characters RA are generated as described in paragraph number 12. As described in paragraph 12, as the blocks are transmitted to the computer, the computer under the control of its stored program will renumber the blocks as they are stored in the computer memory 3705, starting with one.

It will be observed from section 1.8, that numerous commands can be transmitted to the computer from the console 3703 by means of a single character-generating manual actuation of the input keyboard, exclusive of actuations of the keyboard to identify a series of blocks, or to identify a plurality of repetitions with respect to a series of blocks. Thus the characters S, E, I, L, D, C, and so on, are all transmitted to the computer by means of a single character-generating manual actuation of the console keyboard.

As explained, for example, in section 1.8, with the exception of the coded insert signal represented by the character I, the computer under the control of the stored program will cause the console typewriter 3703 to print out a block number before the entry of each successive data block. Thus, as indicated at the right hand column of the tabulation in section 1.10, after the "Start" operation, the computer will cause the console typewriter 3703 to print out "000," signifying that the computer is now ready to receive the displacement-type coded input signals such as "1.5" representing the incremental move with respect to the X-axis. The console typewriter 3703 thus includes a display device under the control of the computer for displaying the successive block numbers to which the computer will assign the next set of coded input signals from the console keyboard. As also indicated in section 1.10, the console typewriter 3703 acting as a display device will print out the successive block numbers together with the associated machine tool function commands (such as P for punch) and incremental and absolute displacement values for the respective axes.

A more detailed summary of operation is found in section 2 hereof.

I claim as my invention:

1. A machine tool control system for controlling positioning operations along respective X- and Y-axes of a machine tool, said control system comprising
   a. source means for supplying machine tool positioning instructions,
   b. a digital computer having as part thereof a computer memory and a computer output, said computer being operatively connectable to said source means to receive said machine tool positioning instructions therefrom, said computer memory having stored therein a machine tool control program for controlling the operation of the computer in transmission to said computer output of X- and Y-axis machine tool displacement commands in accordance with the machine tool positioning instructions supplied to said computer,
   c. machine tool positioning control means operatively connectable with parts of the machine tool which are movable along the X- and Y-axes for controlling movement of such parts along the X- and Y-axes of the machine tool, and comprising X- and Y-axis counters for registering displacement commands with respect to the respective axes and for receiving and counting X and Y-axis motion pulses which are generated as a function of displacement of the parts of the machine tool along the X- and Y-axes, respectively, and
   d. output means operatively connectable with said computer output and with said X- and Y-axis counters of said machine tool positioning control means to provide a direct and immediate connection between said computer output and said X- and Y-axis counters for the transmission of said X- and Y-axis machine tool displacement commands thereto without any intervening storage of said displacement commands.

2. A machine tool control system for generating displacement commands and for controlling movement of parts of a machine tool in accordance therewith, said control system comprising
   a. source means for supplying successive machine tool control instructions of a previously established sequence,
   b. manually controlled input means operable to produce coded input signals as manually selected by an operator,
   c. a digital computer operatively connectable to said source means to receive said previously established sequence of machine tool control instructions therefrom and operatively connectable to said manually controlled input means to receive said coded input signals therefrom, said digital computer including a computer memory storing a program for controlling operation of said computer to convert said previously established sequence of machine tool control instructions to displacement commands specifying movements of the parts of the machine tool so as to execute said previously established sequence of machine tool control instructions and to convert said coded input signals into a newly generated sequence of machine tool control instructions as determined by the manually selective control of said input means, and
   d. machine tool control means operatively connectable to the machine tool and connected on line with said digital computer and responsive to said displacement commands produced by said computer to control movements of the parts of the machine tool in accordance therewith.

3. A machine tool control system in accordance with claim 2 with said manually controlled input means being operable to produce coded input signals representing a plural digit decimal number with respect to any one of a plurality of machine tool axes along which respective parts of the machine tool are movable, and said digital computer including computer memory locations and being operable under the control of said program to store said newly generated sequence of machine tool control instructions in said computer memory locations as successive blocks having successive block identifying numbers, and being responsive to coded input signals representing a plural digit decimal number with respect to successive ones of said plurality of machine tool axes to store said plural digit decimal numbers as representing displacement values relative to said machine tool axes in one of said successive blocks having one of said successive block identifying numbers.

4. A machine tool control system in accordance with claim 3 with said manually controlled input means being operable to produce coded input signals including a coded "list" signal for instructing the digital computer to list all blocks of said newly generated sequence of machine tool control instructions stored in said computer memory locations, and said digital computer being operable under the control of said program to respond to said coded "list" signal to list said blocks of said newly generated sequence of machine tool control instructions together with said block identifying numbers in the sequence of said successive block identifying numbers.

5. A machine tool control system in accordance with claim 3 with said manually controlled input means being operable to produce coded input signals including a "delete" signal instructing the computer to delete identified blocks of said newly generated sequence of machine tool control instructions in said computer memory locations, and said digital computer being operable under the control of said program to respond to said "delete" signal to delete blocks of said newly generated sequence of machine tool control instructions from said computer memory locations as identified by said "delete" signal.

6. A machine tool control system in accordance with claim 2 with said manually controlled input means being operable to supply to said computer coded input signals including a coded incremental displacement signal expressing displacement incrementally with respect to the next previous position of a part of the machine tool along a given machine tool axis, and including a coded absolute displacement signal expressing a desired new position of a part of the machine tool with respect to a given machine tool axis and with respect to a predetermined reference point of the machine tool, and said digital computer including computer memory locations and being operable under the control of said program to convert said coded incremental displacement signal to a corresponding machine tool control instruction and operable to store said corresponding machine tool control instruction in one of said computer memory locations, and being operable under the control of said program to respond to said coded absolute displacement signal to generate a corresponding incremental machine tool control instruction expressing displacement with respect to the next previous one of said sequence of machine tool control instructions in said computer memory locations, and operable to store said corresponding incremental machine tool control instruction in said computer memory locations.

7. A machine tool control system in accordance with claim 2 with said manually controlled input means being operable to supply to said digital computer coded input signals including a coded incremental displacement signal representing an incremental displacement value expressed incrementally with respect to the next previous commanded position with respect to a given machine tool axis, said digital computer including computer memory locations and being operable under the control of said program to store said newly generated sequence of machine tool control instructions as successive blocks of machine tool control data in said computer memory locations, said digital computer being operable under the control of said program to compute respective accumulated absolute displacement values for said successive blocks of machine tool control data representing respective commanded positions with respect to a common reference point along a given machine tool axis and to store said accumulated absolute displacement values as part of the respective blocks in said computer memory locations, and being operable under the control of said program to respond to said coded incremental displacement signal to algebraically combine the incremental displacement value represented thereby with the accumulated displacement value of the preceding block stored in said computer memory locations to obtain an accumulated displacement value for storage as part of a further block of machine tool control data in said computer memory locations.

8. A machine tool control system in accordance with claim 7 with said digital computer being operable under the control of the program to store in said computer memory locations as part of each successive block an incremental displacement value and the corresponding accumulated absolute displacement value.

9. A machine tool control system in accordance with claim 8 with said digital computer being operable under the control of said program to print out from said computer memory locations successive blocks of machine tool control data including both said incremental displacement values and said corresponding accumulated absolute displacement values.

10. In combination with a machine tool having X- and Y-axis drive circuits for positioning parts of the machine tool along respective X- and Y-axes of the machine tool, a machine tool control system comprising
   a. source means for supplying machine tool positioning instructions,
   b. a digital computer including a computer memory and a computer output, said computer being operatively connectable to said source means to receive said machine tool positioning instructions therefrom, said computer memory having stored therein a machine tool control program for controlling the transmission to said computer output of X- and Y-axis machine tool displacement commands in accordance with the machine tool positioning instructions supplied to said computer by said source means,
   c. a machine tool positioning control operatively connectable with said X- and Y-drive circuits of said machine tool for controlling positioning movement of the respective parts of the machine tool along the respective X- and Y-axes of the machine tool, and
   d. output gates directly connected with said computer output and directly connected with said machine tool positioning control and selectively providing a direct and immediate multiple channel connection between said computer output and said machine tool positioning control for the transmission of said X- and Y-axis machine tool displacement commands thereto in coded form without any intervening storage of said displacement commands, for effecting positioning of said parts by means of said X- and Y-drive circuits in accordance with said X- and Y-machine tool displacement commands produced by said digital computer under the control of said machine tool control program.

11. The combination of claim 10 with X- and Y-digital feedback components coupled with the respective drive circuits for generating digital feedback pulses as a function of movement of said parts of said machine tool along the respective axes, said machine tool control comprising X- and Y-axis counting circuits for initially registering said X- and Y-axis machine tool displacement commands as initial count values therein, and for responding to digital feedback pulses from the respective X- and Y-digital feedback components to progressively reduce the count values registered in the respective counting circuits as said parts approach the commanded position corresponding to said X- and Y-axis machine tool displacement commands, said machine tool control further comprising X- and Y-axis converter circuits connected respectively with said X- and Y-axis counting circuits and with said X- and Y-axis drive circuits for responding to the count values registered in said counting circuits to generate analog error signals as a function of said count values and for transmitting said analog error signals to said drive circuits to control the positioning of said parts in accordance therewith,
   said output gates being connected directly to said X- and Y-axis counting circuits for direct and immediate transmission of said X- and Y-axis machine tool displacement commands from said computer output to said counting circuits, to effect a corresponding positioning operation by means of said drive circuits.

12. The combination of claim 11 with said X- and Y-axis digital feedback components supplying digital feedback pulses for each predetermined increment of movement of said parts of the machine tool along the respective axes, said parts of the machine tool having predetermined ranges of movement along the respective axes which correspond to predetermined numbers of said digital feedback pulses, and said X and Y-axis counting circuits having count capacities at least equal to the respective predetermined numbers of said digital feedback pulses corresponding to said predetermined ranges of movement of said parts of said machine tool along the respective axes.

13. The combination of claim 11 with said machine tool control comprising a move-complete circuit controlled by the count values in said X- and Y-axis counting circuits to establish a move-complete condition when both the counting circuits indicate that said parts of the machine tool are substantially at the commanded position with respect to the X and Y-axes and said computer under the control of said machine tool control program being operable to detect said move-complete condition.

14. The combination of claim 10 with auxiliary function circuitry operatively connected via a direct and immediate transmission path with said computer and with said machine tool and responsive to an auxiliary function command for causing the machine tool to execute an auxiliary function other than a positioning operation, and said computer under the control of said machine tool control program being operable at the completion of a machine tool positioning operation to transmit said auxiliary function command via said direct and immediate transmission path to said auxiliary function circuitry for causing the machine tool to execute said auxiliary function.

15. The combination of claim 11 with absolute position readout means connected with the X- and Y-axis digital feedback components and responsive to said digital feedback pulses to maintain a visual count thereof for indicating the position of said parts of said machine tool along the respective axes in relation to a reference point, throughout successive positioning operations, to provide for verification of a sequence of said machine tool positioning instructions supplied to said computer from said source means, by visual inspection of said absolute position readout means.

16. The combination of claim 15 with means connected with said digital computer for placing said computer in a step mode of operation whereby said digital computer under the control of said machine tool control program in said step mode of operation stops the machine tool after the execution of each machine tool positioning instruction from said source means, to provide for visual inspection of said readout means.

17. In combination, a. a machine tool having parts thereof movable along respective machine tool axes of the machine tool, b. machine tool closed loop digital servos for controlling positioning of said parts of the machine tool along the respective axes in accordance with machine tool displacement commands supplied thereto in digital form, said servos comprising respective machine tool drive circuits connected with the machine tool for driving said parts thereof along the respective machine tool axes in accordance with respective analog error signals, comprising respective digital feedback components driven by the respective drive circuits in accordance with the movement of said parts of the machine tool along the respective machine axes and operable to generate digital feedback signals as a function of such movement, and comprising digital control circuits connected with said digital feedback components and operable to register said machine tool displacement commands and operable to respond to said digital feedback signals from said digital feedback components and to generate said analog error signals in accordance with any error between said machine tool displacement commands and said digital feedback signals for the respective machine tool axes, and connected with said drive circuits to supply said analog error signals to said drive circuits, c. a source for supplying machine tool positioning instructions, d. a stored program digital computer connected with said source and including a computer memory containing a stored machine tool control program, said digital computer under the control of said stored machine tool control program being operable to respond to machine tool positioning instructions from said source and to convert said positioning instructions to said machine tool displacement commands in said digital form, and e. output circuitry connected directly with said computer and connected directly with said digital control circuits and providing a direct and immediate connection between said stored program digital computer and said digital control circuits for transmitting said machine tool displacement commands in said digital form to said digital control circuits, thereby to cause execution of the machine tool positioning instructions supplied by said source.

18. The combination of claim 17 with said machine tool closed loop digital servos including in-position detectors for the respective axes for generating in-position signals when the respective parts of said machine tool substantially attain the respective commanded positions along the respective axes as represented by said machine tool displacement commands registered by said digital control circuits, and including a move-complete circuit connected with said in-position detectors and responsive to the simultaneous existence of in-position signals from both of said in-position detectors for a predetermined substantial time interval to establish a move-complete condition, said stored program digital computer under the control of said stored machine tool control program being operable to respond to said move-complete condition as signalling that a positioning operation of said machine tool closed loop digital servos has been completed.

19. The combination of claim 18 with said move-complete circuit being adjustable to provide a predetermined substantial range of time intervals, thereby to require simultaneous existence of said in-position signals from both of said in-position detectors over a predetermined substantial time interval which time interval is adjustable over said predetermined substantial range.

20. The combination of claim 18 with said move-complete circuit comprising an adjustable time delay component having its time delay adjustable over a substantial range with the time delay of said component determining said predetermined substantial time interval during which said in-position signals must be present to establish said move-complete condition.

21. The combination of claim 18 with said move-complete circuit requiring that said in-position signals both be present for a time interval of the order of 100 milliseconds before said move-complete condition is established.

22. The combination of claim 18 with said stored program digital computer under the control of said machine tool control program being responsive to the existence of said move-complete condition to selectively execute at least one special command.

23. The combination of claim 18 with said machine tool being responsive to a special command to execute a machine tool function at the completion of a positioning operation of said machine tool closed loop digital servos, said stored program digital computer under the control of said machine tool control program being responsive to said move-complete condition of said move-complete circuit to selectively generate said special command, and an interface circuit connecting via a direct and immediate transmission path said stored program digital computer with said machine tool for transmitting said special command to said machine tool thereby to cause said machine tool to execute said machine tool function.

24. The combination of claim 18 with said machine tool comprising a punch press responsive to a special punch command to execute a punching operation, said stored program digital computer under the control of said machine tool control program being connected with said move-complete circuit and being responsive to said move-complete condition thereof to selectively generate said special punch command, and an interface circuit connecting said stored program digital computer on line with said machine tool for transmitting said special punch command to said machine tool thereby to cause said machine tool to execute said punching operation at the completion of a positioning operation of said machine tool closed loop digital servos.

25. In combination,
a. a machine tool having parts thereof movable along respective machine tool axes for positioning a workpiece with respect to a machine tool operating position,
b. a source for supplying successive machine tool control instructions of a previously established sequence for controlling movement of said parts of said machine tool with respect to said axes,
c. a manually controlled input device operable to produce coded input signals as manually selected by an operator,
d. a stored program digital computer operatively connected to said source and to said manually controlled input device and comprising a computer memory containing first and second stored programs, said digital computer being operable under the control of said first stored program to receive said previously established sequence of machine tool control instructions from said source and to convert said previously established sequence of machine tool control instructions to displacement commands specifying movement of said parts of said machine tool in accordance with said previously established sequence, and operable under the control of said second program for online communication with said manually controlled input device to convert said coded input signals into newly generated machine tool control instructions as determined by the manually selective control of said input device, and
e. a machine tool control operatively connectable to the machine tool and to said digital computer and responsive to said displacement commands produced by said digital computer to control movements of the parts of said machine tool in accordance therewith.

26. The combination of claim 25 with said stored program digital computer providing for contemporaneous operation of said manually controlled input device and said source on a time-sharing basis.

27. The combination of claim 25 with said manually controlled input device being operable to produce coded input signals as manually selected by an operator representing a newly generated sequence of machine tool control instructions, and said stored program digital computer being operable under the control of said second stored program to convert said coded input signals into said newly generated sequence of machine tool control instructions and to store said newly generated sequence of machine tool control instructions in said computer memory.

28. The combination of claim 25 with said manually controlled input device being operable to produce coded input signals representing machine tool control instructions in both incremental and absolute form, and said stored program digital computer being operable under the control of said second stored program to accept said coded input signals in both said incremental and said absolute form and to convert both types of said coded input signals to machine tool control instructions which can be processed by said digital computer under the control of said first program so as to be effective for operating said machine tool control.

29. The combination of claim 25 with said combination including a plurality of machine tools each having parts thereof movable with respect to a plurality of axes to position respective workpieces with respect to respective machine tool operating positions, said machine tool control comprising respective machine tool control units for controlling movement of said parts along the respective axes of the respective machine tools, and said stored program digital computer being operable to control positioning operations of each of said machine tool control units.

30. The combination of claim 25 with said combination including a plurality of manually controlled input devices operable to produce respective series of coded input signals as manually selected by respective operators thereof, said stored program digital computer being operably connected for online communication with each of said input devices so as to provide for the contemporaneous preparation of a plurality of newly generated sequences of machine tool instructions as determined by the manually selective control of the respective input devices.

31. In combination, a machine tool having a worktable for displacement along respective axes in positioning a workpiece relative to a machine tool operating position, a machine tool control connected with said machine tool for controlling positioning operations of said worktable in accordance with machine tool displacement commands, a stored program digital computer including a computer memory containing a stored program for controlling the computer to respond to coded input signals to generate said displacement commands in accordance therewith, and connected with said machine tool control, a manually controlled input device connected with said digital computer and operable to produce said coded input signals as manually selected by an operator for transmission to said digital computer, and a coded record input device connected with said computer and having a record with a stored previously established sequence of machine tool control instructions thereon for sequential transmission to said digital computer, said digital computer under the control of said stored program being operable to convert said previously established sequence of machine tool instructions from said coded record input device to displacement commands corresponding to said previously established sequence of machine tool instructions for transmission to said machine tool control, and said digital computer under the control of said stored program being responsive to said manually controlled input device and said coded record input device on a time-sharing basis.

32. In combination, a machine tool having a worktable for displacement along respective axes in positioning a workpiece relative to a machine tool operating position, a machine tool control connected with said machine tool for controlling positioning operations of said worktable in accordance with machine tool displacement commands, a stored program digital computer including a computer memory containing a stored program for controlling the computer to respond to coded input signals to generate said displacement commands in accordance therewith, and connected with said machine tool control, an input device connected on line with said computer and operable to generate a sequence of sets of coded input signals each such set of coded input signals representing a block of machine tool control data, and each block of machine tool control data representing respective machine tool displacement commands for the respective axes for producing a single move of the workpiece relative to the machine tool operating position, said stored program digital computer being operable under the control of said stored program to respond to each of said sets of coded input signals to generate a corresponding block of machine tool displacement commands for the respective axes, and said stored program digital computer being operable under the control of said stored program to transmit the blocks of machine tool displacement commands from said stored program digital computer to said machine tool control, for causing the machine tool control to execute the successive moves represented by said sequence of sets of coded input signals.

33. The combination of claim 32 with said input device being operable to generate a pattern type coded input signal representing a series of moves of a workpiece relative to the machine tool operating position, said stored program digital computer being operable under the control of said stored program to respond to said pattern type coded input signal to calculate a series of blocks of machine tool control data representing said series of moves of said workpiece relative to said machine tool operating position.

34. In combination, a machine tool having a worktable for displacement along respective axes in positioning a workpiece relative to a machine tool operating position, a machine tool control connected with said machine tool for controlling positioning operations of said worktable in accordance with machine tool displacement commands, a stored program digital computer including a computer memory containing a stored program for controlling the computer to respond to coded input signals to generate said displacement commands in accordance therewith, and connected with said machine tool control, an input device connected on line with said computer and being operable to generate a sequence of sets of coded input signals, each such set representing a corresponding block of machine tool control data and representing a corresponding move of the machine tool, said sequence of sets of coded input signals thus representing a sequence of said blocks of machine tool control data, said input device further being operable to generate a pattern type coded input signal calling for a repetition of a previous series of movements of the machine tool and identifying a previous series of said blocks of said sequence corresponding to said previous series of movements, said stored program digital computer being operable under the control of said stored program to respond to each of said sets of coded input signals to generate the corresponding block of machine control data and to store the sequence of said blocks of machine control data so generated in said computer memory, and said stored program digital computer being operable under the control of said stored program to respond to said pattern-type coded input signal to call up from said computer memory the previous series of said blocks of machine control data identified by said pattern-type coded input signal and to generate a new series of blocks of machine control data substantially identical to said previous series.

35. In combination, a machine tool having a worktable for displacement along respective axes in positioning a workpiece relative to a machine tool operating position, a machine tool control connected with said machine tool for controlling positioning operations of said worktable in accordance with machine tool displacement commands, a stored program digital computer including a computer memory containing a stored program for controlling the computer to respond to coded input signals to generate said displacement commands in accordance therewith, and connected with said machine tool control, an input device connected on line with said computer and being operable to generate a sequence of sets of coded input signals, each such set representing a corresponding block of machine control data and representing a movement of the worktable of the machine tool along the respective axes, the sequence of sets of coded input signals thus representing a sequence of blocks of machine control data and a corresponding sequence of movements of the machine tool, said input device further being operable to generate a pattern-type coded input signal representing a mirror image of a previous series of movements and identifying a previous series of said blocks of said sequence of blocks corresponding to said previous series of movements, said stored program digital computer being operable under the control of said stored program to respond to each of said sets of coded input signals to generate the corresponding block of machine control data and to store the sequence of said blocks of machine control data so generated in said computer memory, and said stored program digital computer being operable under the control of said stored program to respond to said pattern-type coded input signal to call up from said computer memory the previous series of said blocks identified by said pattern-type coded input signal, and to generate a new series of blocks of machine tool control data based on said previous series but representing a series of movements which constitute a mirror image of the previous series of movements.

36. In combination, a machine tool having a worktable for displacement along respective axes in positioning a workpiece relative to a machine tool operating position, a machine tool control connected with said machine tool for controlling positioning operations of said worktable in accordance with machine tool displacement commands, a stored program digital computer including a computer memory containing a stored program for controlling the computer to respond to coded input signals to generate said displacement commands in accordance therewith, and connected with said machine tool control, an input device connected on line with said computer and being operable to generate a coded input signal representing a limit value relative to a given reference point which is a function of the size of the workpiece, said input device further being operable to generate a sequence of sets of coded input signals, each such set representing a corresponding block of machine control data and representing a respective movement of the worktable along the respective axes, said sequence of sets of coded input signals thus corresponding to a sequence of blocks of machine tool control data representing a sequence of movements of the worktable, said input device further being operable to generate a pattern-type coded input signal calling for a movement of the worktable from a presently attained position represented by the last of the sequence of blocks of machine tool control data to an offset position with said machine tool operating position offset from the workpiece by a predetermined distance, said stored program digital computer being operable under the control of said stored program to store at a predetermined location in said computer memory said limit value relative to said given reference point, said stored program digital computer being further operable under the control of said stored program to respond to each of said sets of coded input signals to generate the corresponding block of machine tool control data and to store the sequence of said blocks of machine tool control data so generated in said computer memory, and to respond to said pattern-type coded input signal to call up from said computer memory said limit value relative to said given reference point and said last of the sequence of blocks of machine tool control data and to calculate from the absolute displacement value represented by said last of said sequence of blocks of machine tool control data and said limit value a further block of machine tool data corresponding to a move of the worktable from said presently attained position represented by said last of said sequence of blocks to said offset position with said machine tool operating position offset from said workpiece by said predetermined distance.

37. The combination of claim 36 with said stored program digital computer being operable under the control of said stored program to respond to a further set of coded input signals supplied by said input device following said pattern-type coded input signal and representing an incremental movement of the worktable relative to said presently attained position to calculate the required incremental displacement value for movement of the worktable from said offset position to the new position represented by said further set of coded input signals.

38. In combination, a machine tool having a worktable for displacement along respective axes in positioning a workpiece relative to a machine tool operating position, a machine tool control connected with said machine tool for controlling positioning operations of said worktable in accordance with machine tool displacement commands, a stored program digital computer including a computer memory containing a stored program for controlling the computer to respond to coded input signals to generate said displacement commands in accordance therewith, and connected with said machine tool control, an input device operatively connectable on line with said stored program digital computer and operable to generate an "initial" coded input signal signalling that a sequence of machine tool control data is to be generated representing successive movements of the worktable along the respective axes in positioning a given workpiece relative to the machine tool operating position, and operable to generate a sequence of digit-representing coded input signals for representing plural digit decimal numbers, said stored program digital computer being operable under the control of said stored program to respond to said "initial" coded input signal to signal a request for a limit value relative to a given reference point which is a function of the size of the given workpiece, said stored program digital computer then being automatically operable under the control of said stored program to store the sequence of digit-representing coded input signals from the input device representing said limit value in said computer memory for subsequent use by said computer in connection with the generation of said sequence of machine tool control data.

39. In combination
a. a machine tool system for effecting a machine tool operation at an operating position, and including a worktable for movement along respective axes in positioning a workpiece relative to said operating position, and worktable drives for driving the worktable relative to the respective axes, said machine tool system including a machine tool control operably connectable on line with said worktable drives and operable in response to machine tool displacement commands to control the operation of said worktable drives in positioning a workpiece,
b. an input device operable to produce displacement-type coded input signals representing machine tool displacement commands, and operable to produce sets of pattern-type coded input signals, each such set representing in abbreviated form a series of blocks of machine tool displacement commands for said machine tool system, and
c. a stored program digital computer operably connectable on line with said machine tool system for transmitting machine tool displacement commands thereto, and operably connectable on line with said input device for receiving said displacement-type coded input signals and said sets of pattern-type coded input signals from said input device, and including a computer memory and a stored program stored in said computer memory for controlling the conversion by said computer of said displacement-type coded input signals into corresponding machine tool displacement commands and for controlling the conversion of said sets of pattern-type coded input signals into respective series of blocks of machine tool displacement commands.

40. The combination of claim 39 with
said input device being operable to generate a displacement-type coded input signal including a series of displacement values whose algebraic sum represents a coordinate value specifying a movement of the worktable relative to one of said axes, and said stored program digital computer under the control of said stored program being operable in response to said coded input signal including said series of displacement values to compute said algebraic sum and to generate a block of machine tool displacement commands including said coordinate value and specifying a movement of the worktable relative to the respective axes.

41. The combination of claim 40 with said input device including a manually operable line-type character generator for generating in successive line operations thereof successive lines of coded input signals, and being operable to generate said displacement-type coded input signal including said series of displacement values in a single one of said line operations thereof, and a display device including a display region operably connectable with said character generator for displaying successive lines of coded input signals as generated by manual operation of said character generator along respective vertically offset horizontal lines on said display region.

42. The combination of claim 41 with said manually operable line-type character generator being operable to generate a set of said pattern-type coded input signals representing a series of blocks of machine tool displacement commands in a single one of said line operations of said character generator.

* * * * *